US012024417B2

(12) United States Patent
Cimatti et al.

(10) Patent No.: US 12,024,417 B2
(45) Date of Patent: Jul. 2, 2024

(54) BEVERAGE DISPENSING SYSTEM

(71) Applicant: PepsiCo, Inc., Purchase, NY (US)

(72) Inventors: Marco Cimatti, Purchase, NY (US);
Anton Ljunggren, Purchase, NY (US);
Martin Eduardo Broen, New York, NY (US); Stephen Lim, Chappaqua, NY (US); Martin Ivar Franzen, Milan (IT); Ivana Babic, Purchase, NY (US)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 16/658,790

(22) Filed: Oct. 21, 2019

(65) Prior Publication Data

US 2020/0122994 A1 Apr. 23, 2020

Related U.S. Application Data

(60) Provisional application No. 62/748,748, filed on Oct. 22, 2018.

(51) Int. Cl.
*B67D 1/08* (2006.01)
*B67D 1/00* (2006.01)
*G06Q 20/14* (2012.01)
*G06Q 30/0251* (2023.01)
*G07F 13/06* (2006.01)

(52) U.S. Cl.
CPC ......... *B67D 1/0888* (2013.01); *B67D 1/0034* (2013.01); *G06Q 20/145* (2013.01); *G06Q 30/0267* (2013.01); *G07F 13/065* (2013.01)

(58) Field of Classification Search
CPC .... B67D 1/0888; B67D 1/0034; G07F 16/065
See application file for complete search history.

(56) References Cited

U.S. PATENT DOCUMENTS

| 7,455,867 | B1 * | 11/2008 | Gutwein | A47J 31/521 |
| | | | | 426/433 |
| 9,499,385 | B1 * | 11/2016 | Studor | G06Q 20/18 |
| 2005/0048461 | A1 * | 3/2005 | Lahteenmaki | G06Q 10/10 |
| | | | | 435/3 |
| 2009/0069930 | A1 * | 3/2009 | Peters | G06Q 10/087 |
| | | | | 700/236 |
| 2011/0049180 | A1 * | 3/2011 | Carpenter | B67D 1/0031 |
| | | | | 222/145.6 |
| 2013/0106690 | A1 * | 5/2013 | Lim | G07F 13/065 |
| | | | | 345/156 |

(Continued)

FOREIGN PATENT DOCUMENTS

WO 2017192871 A1 11/2017

OTHER PUBLICATIONS

International Search Report and Written Opinion of the International Searching Authority for PCT/US19/57138, mailed Jan. 14, 2020, 16 pages.

*Primary Examiner* — Timothy R Waggoner
(74) *Attorney, Agent, or Firm* — Sterne, Kessler, Goldstein & Fox P.L.L.C.

(57) ABSTRACT

Systems and methods for dispensing compositions, such as beverages, are provided. A beverage dispenser may be configured to receive input corresponding to a selection of a beverage. The beverage dispenser may receive additional input corresponding to an adjustment of an ingredient of the selected beverage.

22 Claims, 104 Drawing Sheets

(56) References Cited

U.S. PATENT DOCUMENTS

| | | | |
|---|---|---|---|
| 2013/0282169 A1* | 10/2013 | Moore | G07F 13/065 700/235 |
| 2014/0114469 A1 | 4/2014 | Givens et al. | |
| 2014/0196811 A1* | 7/2014 | Ramos, III | G07F 13/065 141/2 |
| 2015/0082243 A1* | 3/2015 | Taylor | G06F 3/0482 715/814 |
| 2015/0144653 A1* | 5/2015 | Kline | B67D 1/0888 222/1 |
| 2015/0251891 A1 | 9/2015 | Peters et al. | |
| 2016/0143474 A1* | 5/2016 | Wessels | A47J 31/525 426/231 |
| 2016/0368753 A1* | 12/2016 | Bethuy | A47J 31/4403 |
| 2018/0288594 A1 | 10/2018 | Kim | |

* cited by examiner

| | |
|---|---|
| Vitamin D | 100% |
| Calcium | 100% |
| Iron | 100% |
| Potassium | 100% |
| Vitamin C | 100% |
| Magnesium | 100% |
| Pantothenic Acid | 100% |
| Vitamin B6 | 100% |
| Vitamin B12 | 100% |
| Zinc | 100% |

Not a significant source of other nutrients.
*Percent Daily Values are based on a 2,000 calorie diet.

Ingredients
Water, Citric Acid, Calcium Phosphate, Potassium Phosphate, Vitamin C, Natural Flavors, Vitamin B5, Calcium Pantothenate, Vitamin E(Alpha-Tocopheryl Acetate), Vitamin B6 (Pyridoxine Hydrochloride), Vitamin A Palmitate.

FIG. 34B

BEVERAGE DISPENSING SYSTEM

BACKGROUND

Field

Embodiments of the present invention relate to beverage dispensers and beverage dispensing systems to create and dispense a custom beverage.

Background

Post-mix dispensers typically permit a beverage to be created on-demand from a mixture of ingredients. An advantage of dispensing beverage in this form is that the concentrate containers and water supply typically occupy significantly less space than is otherwise required to store the same volume of beverage in individual containers. Moreover, this dispensing equipment eliminates increased waste formed by the empty individual containers as well as additional transport costs. These and other technological advances have allowed food and beverage vendors to offer more diverse choices to consumers through post-mix dispensing systems.

Post-mix dispensers are typically limited to dispensing syrup or liquid concentrates from a bag-in-box package. The syrup or concentrate is introduced into the system through the use of a pump or a pressurized gas tank, e.g., $CO_2$. A typical post-mix system requires a number of components and technical understanding to set up and maintain the system.

BRIEF SUMMARY

One aspect of the invention provides a method for dispensing a custom beverage including providing a beverage dispenser having an electronic user interface, authenticating an electronic user profile at the beverage dispenser, receiving a first user input on the user interface to select an ingredient to create an electronic custom recipe, dispensing a first custom beverage according to the electronic custom recipe, authenticating the electronic user profile at the beverage dispenser after dispensing the first custom beverage, and dispensing a second custom beverage according to the electronic custom recipe. Prior to dispensing the first custom beverage, the method can include displaying a price of the electronic custom recipe. The price can be based on the ingredient. The method can include billing the electronic user profile after dispensing the first custom beverage and the electronic user profile can include payment information. The method can include dispensing a free sample custom beverage according to the electronic custom recipe prior to billing the electronic user profile. The method can include authenticating the electronic user profile at the beverage dispenser after dispensing the second custom beverage, and dispensing a free beverage. The method can include receiving a second user input on the electronic user interface to dispense the first custom beverage prior to dispensing the first custom beverage. The method can include authenticating the electronic user profile at a second beverage dispenser, and dispensing a third custom beverage according to the electronic custom recipe from the second beverage dispenser.

Another aspect of the invention can include a method for creating a custom beverage including authenticating an electronic user profile, receiving a first electronic user input to select an amount of an ingredient for a first electronic recipe, dispensing a first custom beverage from a beverage dispenser according to the first electronic recipe, requesting a second electronic user input related to the first electronic recipe after dispensing the first custom beverage, altering the first recipe based on the second electronic user input to create a second electronic recipe, authenticating the electronic user profile, and dispensing a second custom beverage according to the second electronic recipe. Altering the first electronic recipe can include altering the amount of the ingredient. Dispensing the second custom beverage according to the second electronic recipe can occur at a second beverage dispenser. The method can include suggesting a custom recipe to the user based on electronic user profile data prior to receiving the first electronic user input. The electronic user profile data can include promotional information, user taste preferences, available ingredients, time of day, weather, user location, or sensed physiological data. The method can include electronically sending the second recipe to a second electronic user profile, authenticating the second electronic user profile, and dispensing a third custom beverage according to the second electronic recipe. Authenticating the electronic user profile can be based on electronic information associated with a reusable beverage container. Authenticating the electronic user profile can occur at a mobile electronic device. Authenticating the user profile can occur at the beverage dispenser. The method can include determining the presence of a beverage container using an electronic sensor connected to the beverage dispenser prior to dispensing the first custom beverage.

An aspect of the invention can include a beverage dispensing system including a network interface coupled to an electronic network, a first beverage dispenser including a first processor coupled to the network interface, and a second beverage dispenser including a second processor coupled to the network interface. The first processor and the second processor can be configured to authenticate an electronic user profile, receive a first electronic user input related to an amount of an ingredient to create an electronic beverage recipe, save the electronic beverage recipe to the user profile, and dispense a custom beverage according to the electronic beverage recipe at the first beverage dispenser or the second beverage dispenser. The beverage dispensing system can include a mobile electronic device including a third processor coupled to the network interface. The third processor can be configured to authenticate the electronic user profile, receive a second electronic user input to change the amount of the ingredient in the electronic beverage recipe to create an updated electronic beverage recipe, and save the updated electronic beverage recipe to the user profile.

An aspect of the invention includes a beverage dispensing system including a network interface coupled to an electronic network, a first beverage dispenser including a first processor coupled to the network interface, and a second beverage dispenser including a second processor coupled to the network interface. The first processor and the second processor are configured to receive suggested beverage ingredient data, transmit authentication information to a database to authenticate an electronic user profile, suggest a beverage ingredient to a user based on the suggested beverage ingredient data, receive a first electronic user input related to the suggested beverage ingredient to create an electronic beverage recipe, and dispense a custom beverage according to the electronic beverage recipe at the first beverage dispenser or the second beverage dispenser. The suggested beverage ingredient data can include one or more of top selling ingredient data, ingredient trend data, demographic data, and promotional data. The suggested beverage ingredient data can include limited time ingredient data.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

FIGS. 34A-34B are exemplary graphical user interfaces in accordance with various aspects of the invention.

Features and advantages of the embodiments will become more apparent from the detailed description set forth below when taken in conjunction with the drawings, in which like reference characters identify corresponding elements throughout.

DETAILED DESCRIPTION

Figure 1:
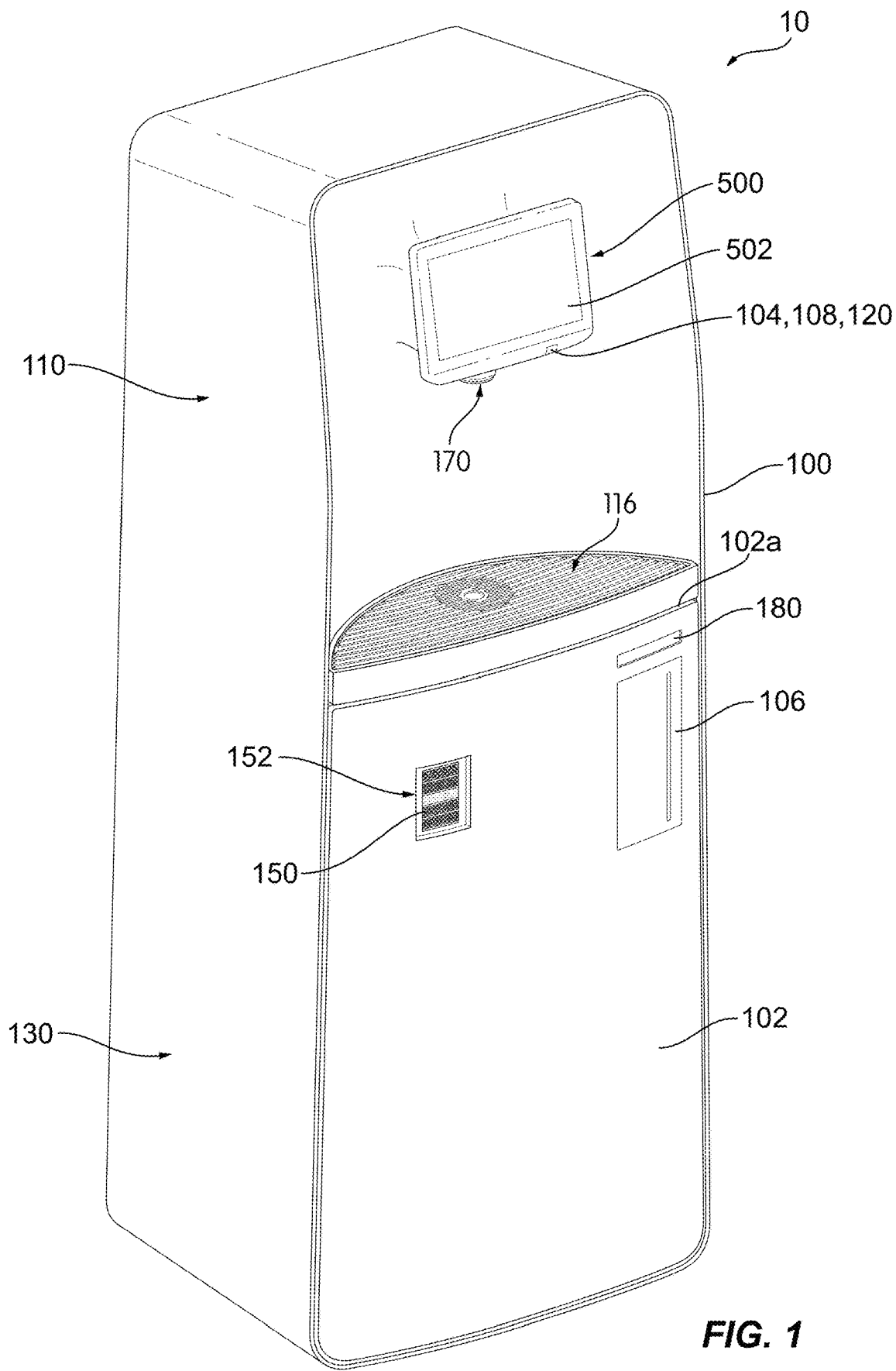
FIG. 1 is a perspective view of a beverage dispenser according to various aspects of the invention.

The present invention(s) will now be described in detail with reference to embodiments thereof as illustrated in the accompanying drawings. References to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

An aspect of the present invention will now be described with reference to FIGS. 1-5. FIGS. 1-5 illustrate beverage dispensing system 10 including a user interface 500 that includes user input selections that can be used as part of a user interface on user interface 500. Example user input selections on user interface 500 are discussed in greater detail below with respect to FIGS. 53-96.

Beverage dispensing system 10 can include an outer housing 100. In an aspect, beverage dispensing system 10 can be a free standing unit. Outer housing 100 can include an upper housing portion 110, a lower housing portion 130, and a door 102. Outer housing 100 can include a right housing panel 100*a*, a left housing panel 100*b*, a top panel 100*c*, a back panel 100*d*, and a front panel 100*e*. In an aspect, one or more of right housing panel 100*a*, left housing panel 100*b*, and back panel 100*d* can span upper housing portion 110 and lower housing portion 130. In an aspect, right housing panel 100*a*, a left housing panel 100*b*, a top panel 100*c*, a back panel 100*d*, and a front panel 100*e* can be a unitary housing. Upper housing portion 110 can be separated from lower housing portion 130 by a horizontal plane 130a that extends along the top edge 102a of door 102. In an aspect, each of the walls of outer housing 100 and door 102 can be insulated to prevent heat loss or gain through a respective wall.

In another aspect, door 102 can include a window 152 so that a user can view one or more available ingredients in beverage dispensing system 10 for use in making a customized beverage. Window 152 can be positioned at any location on housing 100.

In another aspect, door 102 can be transparent so that a user can view one or more available ingredients in beverage dispensing system 10.

In an aspect, window 152 can be a video screen that can display ingredients or images of ingredients utilized in beverage dispenser 10. In an aspect, the video screen can be utilized for product description, advertisement, promotional or other messaging purpose. For example, the video display may be customized for a particular product or may be customized to target a particular group of consumers or possible users of the products. In another aspect, the video screen can simulate one or more ingredients that can be added to a beverage.

In one aspect, door 102 can be opened in any suitable manner. For example, one side of door 102 can be hingedly attached to the beverage dispensing system 10 for door 200 to swing open to allow access to components and ingredients within. Door 200 can include a handle for opening door 200.

Beverage dispenser 10 can be controlled by an electronic control module that includes a programmable microprocessor that sends an electronic signal to initiate pumps 138 and open one or more of valves 140 to dispense a beverage. The electronic control module can provide intelligent control of the beverage system. The electronic control module can also monitor system status such as the fluid temperatures, number of drinks dispensed, and sensors that determine amounts of additive, flavoring, and mineral ingredients remaining in the beverage dispensing system. The electronic control module can also provide service diagnostics, and the ability to remotely poll the electronic status.

The electronic control module of beverage dispenser 10 can track ingredients and components to determine and/or predict when ingredients and components need to be replaced. For example, the electronic control module can track used amounts of gas, flavorings, additives, and minerals, filter status, and electrical usage. In addition, the electronic control module can suggest ingredient and component replenishment based on a used amount of gas, flavorings, additives, and/or minerals and filter status. In an aspect, the electronic control module can suggest ingredient and component replenishment based on upcoming events. For example, electronic control module can suggest ingredient and component replenishment based on the proximity of beverage dispensing system 10 to an upcoming public event, such as a sporting event.

Beverage dispensing system 10 can include a user interface 500 to facilitate selection and dispensing of a beverage. User interface 500 may include an electronic display screen 502 for displaying information to a customer (e.g., a liquid crystal display (LCD) or a light emitting diode (LED) display, which may be a touch screen display). In some embodiments, user interface 500 may include one or more actuators (e.g., buttons, levers, handles, or icons on a touch screen, which may or may not be integrated into display screen 502) for receiving commands from a customer. In some embodiments, actuator(s) of user interface 500 may be configured to initiate dispensing of a beverage from a dispensing nozzle 170 of beverage dispensing system 10.

In another aspect, beverage dispensing system 10 can include a lower control panel 180 (FIG. 5) to enable a user that is unable to physically reach user interface 500 to select and dispense a beverage. Lower control panel 180 can be positioned on an exterior surface of lower housing portion 130. In an aspect, lower control panel 180 can be positioned on an exterior surface of door 102. Lower control panel 180 can be positioned so as to comply with the requirements of the Americans with Disabilities act. For example, lower control panel 180 can be positioned approximately 36 inches from the floor. In aspects of beverage dispensing system 10 without lower control panel 180, lower housing portion 130 may include a false or dummy panel to cover the opening in lower housing portion 130 that would otherwise house lower control panel 180.

In some embodiments, lower control panel 180 may include one or more actuators (e.g., buttons, levers, handles, or icons on a touch screen, which may or may not be integrated into display screen 502) for receiving commands from a user. For example, lower control panel 180 can include an on button 188, a left directional button 182a, a right directional button 182b, a selection button 184, and a water button 186. In an aspect, a user that is physically unable to reach user interface 500 can select on button 188 to put machine into an alternate control mode. In this alternate control mode, the user can navigate through the graphical user interface on display 502 using left directional button 182a, right directional button 182b, and selection button 184 to customize and order a beverage. In an aspect, a user can dispense still water without requiring customer payment by pressing water button 186. In an aspect, lower control panel 180 may include elements designed to improve interactions with visually impaired users. For example, lower control panel 180 may include tactile elements such as raised features to represents actions or words (e.g. Braille) or the ability to interact with users using audio input and output.

User interface 500 can be positioned on an exterior surface of upper housing portion 110. User interface 500 can include a container spot light 114 positioned on a lower portion of the user interface housing. Container spot light 114 can provide container lighting 115 (FIG. 2) that shines downward and illuminates the dispensing area 116. Illumination of dispensing area 116 is aesthetically pleasing and makes it easier for a user to find and place their container into the appropriate position on container rest 116 to receive a beverage from nozzle 170. In another aspect, container spotlight 114 can be positioned on an exterior surface of upper housing portion 110.

In an aspect, user interface 500 can include perimeter lights 112 to project perimeter lighting 113 onto a front surface of front panel 100e. In an aspect, perimeter lighting 113 can be a series of lights that surrounds the perimeter of the housing of user interface 500. Perimeter lighting 113 is aesthetically pleasing and makes it easier for a user to find and utilize user interface 500.

In an aspect, beverage dispensing system 10 can include a proximity sensor 120. Proximity sensor 120 can determine when a user approaches beverage dispensing system 10. Upon determining that a user is approaching, beverage dispensing system 10 can illuminate one or more of container spotlight 114 and/or perimeter lights 112 in order to draw a user to user interface 500 and dispensing area 116. In an aspect, proximity sensor can be incorporated into the housing of user interface 500. In another aspect, proximity sensor 120 can be positioned on an exterior surface of upper housing 110.

Beverage dispensing system 10 can also include an ambient light sensor 108. Beverage dispensing system 10 can illuminate container spot light 114 and/or perimeter lights 112 based in part on the amount of ambient light sensed by ambient light sensor 108. For example, in a dim low light situation where the ambient light sensor 108 determines that the ambient light is below a threshold level, beverage dispensing system 10 can decrease the light intensity of perimeter lights 112 and/or container spotlight 114. Conversely, in a bright, high light situation where the ambient light sensor 108 determines that the ambient light is above a threshold level, beverage dispensing system 10 can increase the light intensity of perimeter lights 112 and/or container spotlight 114.

In an aspect, one or more dispensing nozzles 170 can be positioned directly below user interface 500. In an aspect, dispensing nozzle 170 can be positioned on an exterior portion of upper housing portion 110. In another aspect, dispensing nozzle 170 can be integrated with the housing for user interface 500. Ingredients chosen on user interface 500 can be mixed at dispensing nozzle 170 and in a user's container to create a customized beverage.

Beverage dispensing system 10 can authenticate a user in order to track user preferences and recipes, suggest custom beverages, and facilitate payment for a custom beverage. For example, a user can be authenticated via user input on the user interface 500 or via one or more sensors, readers, or scanners incorporated into beverage dispenser 10. In an aspect, a user can be authenticated as described in U.S. application Ser. No. 15/943,395, filed Apr. 2, 2018, which is incorporated herein by reference in its entirety.

In some embodiments, user interface 500 may allow a customer to input a user code (e.g., a user name or phone number) to authenticate a particular customer. In some embodiments, upper housing portion 110 can include an authentication sensor 104 positioned on an exterior surface. As discussed below with respect to FIGS. 11-16, authentication sensor 104 can be utilized to identify a user and/or user's container to enable custom beverage selection and dispensing and/or to sign in to a user account on beverage dispensing system 10. In an aspect, authentication sensor 104 can include one or more readers or scanners for reading a machine readable item for identifying a customer. Machine readable items may include, but are not limited to, a barcode, a magnetic strip, a quick response (QR) code, a radio frequency identification (RFID) tag, a Bluetooth-enabled device (e.g., a cell phone), a Bluetooth Low Energy (BLE) device, a sonic communication device, or an ultrasound communication device, (e.g., a device having LISNR® ultrasound technology). In an aspect, authentication sensor 104 can include one or more biometric sensors for identifying one or more biometric characteristics of a customer. Biometric sensor(s) may include, but are not limited to, a fingerprint reader, a finger vein scanner, a retinal scanner, an iris scanner, a camera (for taking a photo and/or recording a video), a face scanner, or a microphone. The biometric characteristic(s) of a customer may include a fingerprint, a finger vein pattern, a retinal profile, an iris profile, a face profile, and a voice profile.

In an aspect, authentication sensor 104 can be a video sensor and can identify a user and/or make available one or more ingredients by recognizing a series of user movements. For example, authentication sensor 104 can recognize a user's dance to identify the user and/or make available one or more ingredients. Authentication sensor 104 can recognize a user's exercise to identify the user and/or make available one or more ingredients. In an aspect, beverage dispenser 10 can provide a discounted beverage or discounted ingredient based on dance and/or exercise performed in front of beverage dispenser 10 and recognized by authentication sensor 104.

In some embodiments, beverage dispenser 10 can allow any user to dispense plain water, i.e., filtered water without any additional ingredients, additives, or flavorings, without identifying or authenticating the user. In such embodiments, user interface 500 of dispenser 10 can allow the user to select plain water, and beverage dispenser 10 can initiate dispensing without identifying or authenticating the customer. If a customer desires to dispense beverage(s) other than plain water, beverage dispenser 10 can require identification and authentication of the customer.

Lower housing portion 130 can contain portions of a refrigeration system 160, including, for example, an evaporator coil, an evaporator fan motor and fan, a compressor, a condenser coil, and a condenser fan motor and fan. In an aspect, refrigeration system 160 can reduce the temperature of the interior of one or both of lower housing portion 130 and upper housing portion 110. The refrigeration system 160 can operate on a conventional vapor compression cycle to maintain the fluid diluents and fluid concentrates at a desired temperature. In the vapor compression cycle, the refrigerant in the vapor phase is compressed in a compressor resulting in an increase in temperature and pressure. Next, the hot, high-pressure refrigerant is circulated through a heat exchanger—a condenser—where it is cooled by heat transfer to the surrounding air. Because of the heat transfer to the surrounding air, the refrigerant condenses back to a liquid from the gas phase. The refrigerant then passes through a throttling device that reduces the pressure and temperature of the refrigerant. The cold refrigerant leaves the throttling device and enters a second heat exchanger—an evaporator—that provides cooled air to the area to be refrigerated. Heat transfer between the evaporator and area to be refrigerated causes the refrigerant to evaporate or change from a saturated mixture of liquid and vapor into a superheated vapor. The vapor leaving the evaporator is then drawn back into the compressor to repeat the cycle.

In an aspect, refrigeration system 160 can include a cooler 162 to cool fluid within one or more of refrigerated sparkling diluent conduit 146*a* and refrigerated still diluent conduit 144*a*. The cooler 162 can be positioned within lower housing portion 130 or within upper housing portion 110. In an aspect, the cooler 162 can be a cold plate or a coil cooler. In another aspect, the cooler 162 can be a water bath 118 and a portion of refrigeration system 160 can generate an ice bank in water bath 118.

The refrigeration system 160 can use any suitable type of refrigerant to cool the interior of outer housing 100, including for example one or both of lower housing portion 130 and upper housing portion 110. For example, R134A (tetrafluoroethane), $CO_2$ (carbon dioxide), or hydrocarbons may be used. The refrigeration components of refrigeration system 160 can be placed within lower housing portion 130 and separated as necessary by insulating material. Alternatively, some of the refrigeration system 160 components may be placed in upper housing portion 110.

In an aspect, beverage dispenser 10 can include a heater 135 to rapidly heat fluid within one or more of heated sparkling diluent conduit 146*c* and heated still diluent conduit 144*c*. The heater can be positioned within lower housing portion 130 or within upper housing portion 110. In an aspect, the heater can include a boiler, an electrical heating element, a hot plate, a microwave, or other rapid heating means.

Lower housing portion 130 can also contain ingredients that can be used to create custom beverage recipes. As discussed herein, ingredients can include one or more of still water at ambient temperature, e.g., 76 degrees Fahrenheit; cooled still water at, e.g., 32 degrees Fahrenheit; heated still water at, e.g., 180 degrees Fahrenheit; sparkling water at ambient temperature, e.g., 76 degrees Fahrenheit; cooled sparkling water at, e.g., 32 degrees Fahrenheit; heated sparkling water at, e.g., 180 degrees Fahrenheit. The ingredients can include flavorings such as: branded beverage concentrate, plum, blueberry, mango, cherry, grape, kiwi, strawberry, lemon, lime, passion fruit, apple, melon, tangerine, raspberry, orange, pomegranate, pineapple, coconut, grapefruit, acai, watermelon, peach, or any combination thereof. Additionally, the flavorings can include herbs and spices or vegetables such as: mint, black tea, green tea, red tea, white tea, celery, chamomile, hibiscus, lavender, carrot, cucumber, verba mate, coca extract, ginger, chlorophyll, aloe, cinnamon, ginseng, or any combination thereof. In an aspect, one or more of the flavorings can include fresh ingredients that do not contain preservatives. Additionally, the ingredients can include minerals such as boron, phosphorus, titanium, chromium, manganese, iron, cobalt, nickel, copper, zinc, molybdenum, cadmium, aluminum. In an aspect, the mineral ingredients can simulate a taste profile of mineral water from a specific region. For example, the mineral ingredients can simulate a taste profile of water from the German Alps, the Italian Alps, or the French Alps. The ingredients can also include additives such as vitamins, electrolytes, energy, calm, protein, fiber, vitamins, antioxidants, sweeteners and other functional ingredients such as: calcium, sodium, potassium, bicarbonate, magnesium, caffeine, fiber, protein, taurine, ribose, omega 3, or any combination thereof.

As discussed herein, "sparkling" is defined as dissolved or infused gas bubbles. The infused gas can be carbon dioxide, nitrogen, or a mixed gas. For example, "sparking water" is water having infused gas bubbles.

Figure 2:
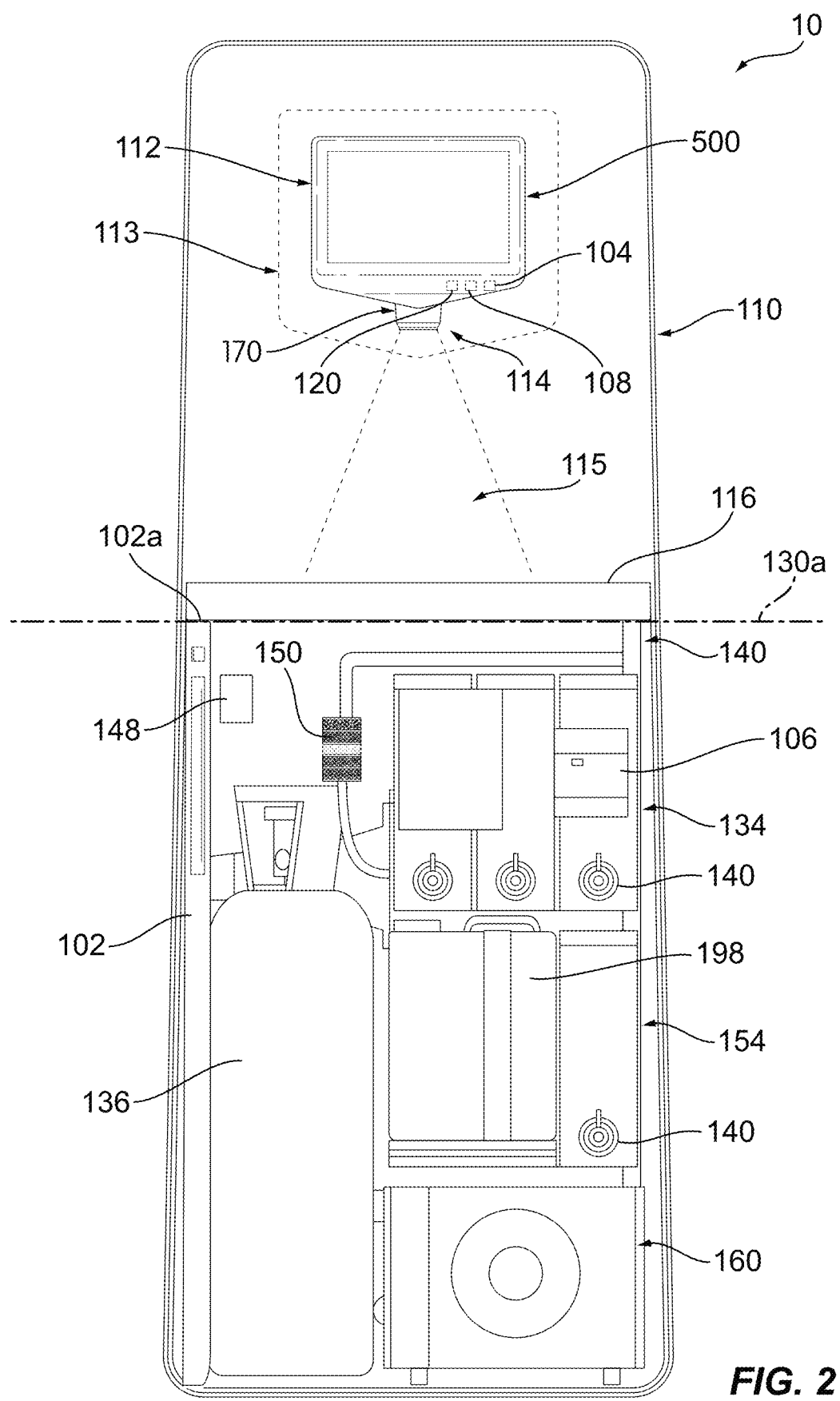
FIG. 2 is a front view of a beverage dispenser according to various aspects of the invention.
Figure 3:
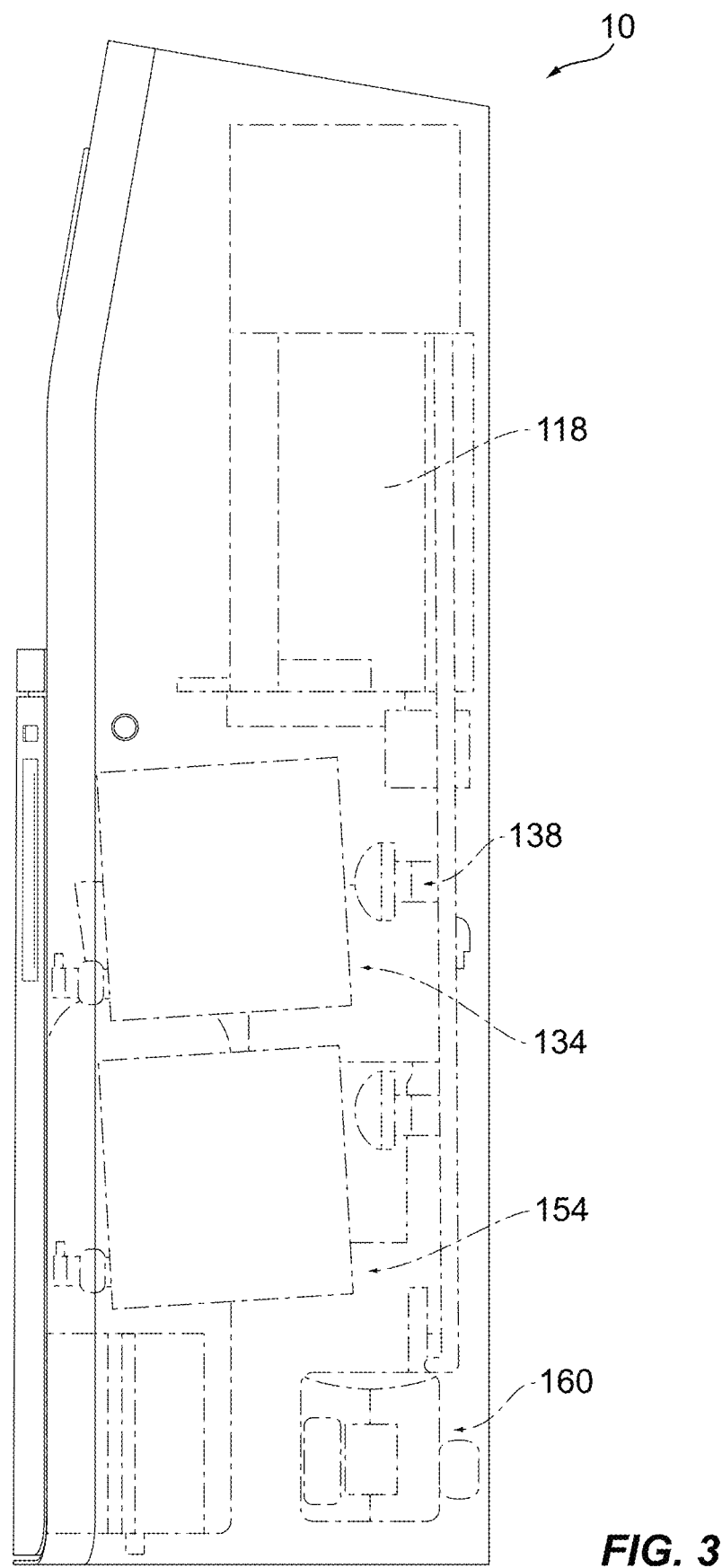
FIG. 3 is a side view of a beverage dispenser according to various aspects of the invention.
Figure 4:
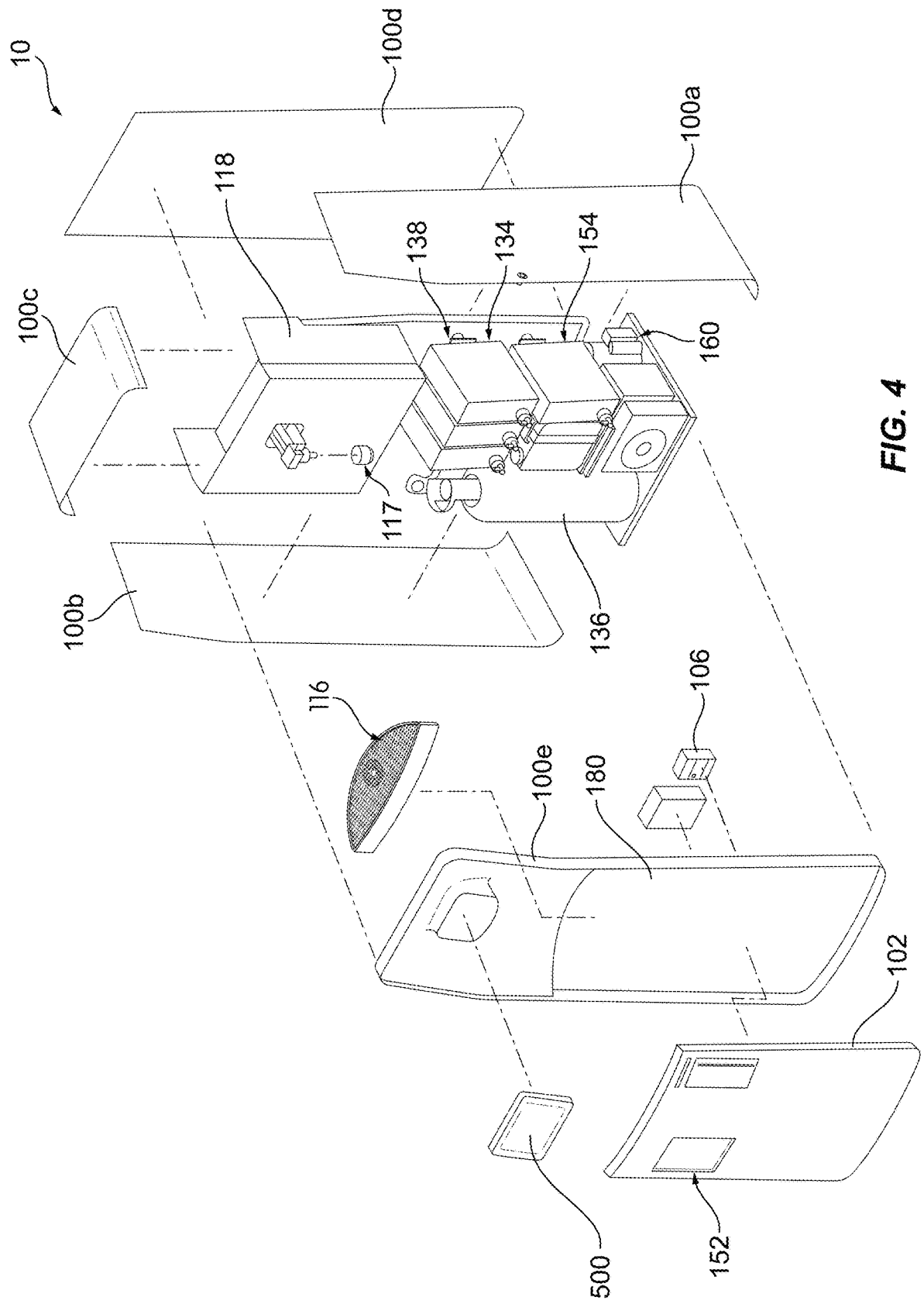
FIG. 4 is an assembly view of a beverage dispenser according to various aspects of the invention.
Figure 5:
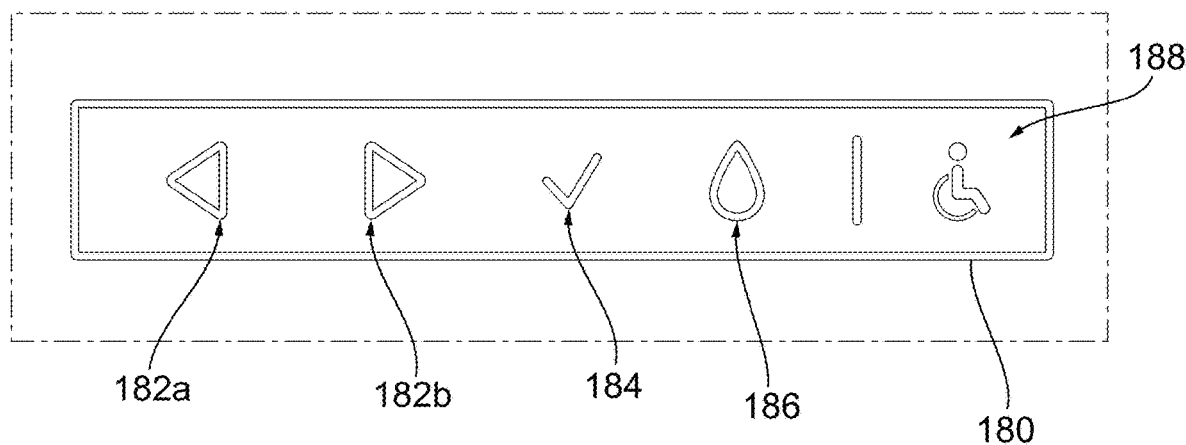
FIG. 5 is a front view of a beverage dispenser control panel according to various aspects of the invention.

As shown in FIGS. 2-3, lower housing portion 130 can contain a gas tank 136, one or more filters 154, additive sources 148, mineral sources 150, flavoring sources 134, pumps 138, and valves 140. As discussed in greater detail below, gas tank 136, filters 154, additive sources 148, mineral sources 150, and flavoring sources 134 can be utilized to provide one or more ingredients that can be combined to create a custom beverage. In an aspect, one or more of additive sources 148, mineral sources 150, and/or flavoring sources 134 can be positioned near window 152 so as to be viewable to a user of beverage dispenser 10.

Flavoring sources 134 can contain flavor concentrates for mixing with a diluent to create a beverage. Each of flavoring sources 134 can include a valve 140 for connection to the beverage dispensing system 10. For example, a flavoring conduit can be fluidly connected to each of flavoring sources 134 through concentrate source valves 140. Each of the respective flavoring conduits can be fluidly connected to dispensing nozzle 170. Flavoring pumps 138 can engage each of the concentrate conduits to move the flavoring concentrates through the flavoring conduits. Flavoring pumps 138 can be gas or electric powered diaphragm pumps. In another aspect, flavoring pumps 138 can be peristaltic pumps.

Peristaltic pumps require lower durometer tubing in order to move fluid through the respective conduits. Accordingly, when flavoring pumps 138 are peristaltic pumps, the lower durometer tubing may need to be replaced more frequently than typical beverage dispensing system tubing. In an aspect, flavoring sources 134 can include integrated tubing to make it easier for a user to replace the flavoring source and tubing in beverage dispenser 10. For example, a user can simply remove an empty flavoring source 134 including its integrated tubing and replace it with a full flavoring source 134 with new integrated tubing. A flavoring source 134 with integrated tubing also prevents flavor contamination when an empty flavoring source 134 is replaced with a new flavoring source. For example, when replacing an empty flavoring source 134 with a new flavoring source 134 of a different flavor, an end user might forget to flush the conduit and/or replace the tubing. Integrated tubing can prevent a user from such contamination.

In one aspect of the invention, one or more of flavoring sources 134 can be disposable containers that can be removed from beverage dispensing system 10 when empty, for example, after beverage flavoring has been fully dispensed. In another aspect, one or more of flavoring sources 134 can be reusable containers that can be refilled with flavorings on a regular basis or as needed. For example, one or more of flavoring sources 134 can be a container or cartridge that is emptied and re-filled with fresh ingredients daily. In an aspect, one or more of flavoring sources 134 can be a vacuum sealed cartridge that includes fresh ingredients.

The flavoring sources 134 can be a bag-in-box concentrate or a self-pressurized concentrate, such as a bag-on-valve concentrate source, for example, as described in U.S. Pat. No. 9,873,606, issued Jan. 23, 2018, which is incorporated herein by reference in its entirety. In an aspect, the flavoring sources 134 can be a non-pressurized bag-on-valve concentrate source. Because it is not pressurized, the non-pressurized bag-on-valve concentrate source can be shipped through the United States postal system and is particularly suitable for e-commerce sales.

In an aspect, one or more of flavoring sources 134 can include a quick connect coupling to connect the flavoring sources 134 to tubing within beverage dispenser 10.

Valve 140 can control the rate at which flavoring concentrate enters beverage dispensing system 10 and ultimately nozzle 170. In one aspect of the invention, valve 140 can restrict the flow of flavoring concentrate to approximately 0.1 ounces per second, thus creating a 46:1 capability. The flow rate of flavoring concentrate can be modified at valve 140 based on the concentration ratio of the flavoring concentrate in a respective flavoring source 134. The flavoring concentrate can be any concentration ratio. In one aspect of the invention, the flavoring concentrate can be up to approximately a 100:1 dilution ratio based on volume, allowing storage of a highly concentrated beverage within a relatively small space. In an alternate aspect of the invention, the flavoring concentrate can be up to approximately a 30:1 dilution ratio based on volume. In a further aspect of the invention, the flavoring concentrate can be up to approximately an 80:1 dilution ratio based on volume.

In an aspect, beverage dispensing system 10 can include a pressurized diluent source to supply diluent, e.g., water, to the beverage dispensing system 10. In one aspect, the diluent can be at typical domestic water pressures, e.g., approximately 50-300 pounds per square inch (psi). The diluent source can provide diluent to a pump that distributes the diluent through beverage dispensing system 10. In one aspect, the pump can be positioned in lower housing portion 130. The diluent can pass through filter 154 and into one or more diluent conduits. For example, beverage dispensing system 10 can include diluent conduits that pass into coil pack 118 in order to provide still water at ambient temperature; cooled still water; heated still water; sparkling water at ambient temperature; cooled sparkling water; and heated sparkling water. In an aspect, one or more of the diluents (still water at ambient temperature; cooled still water; heated still water; sparkling water at ambient temperature; cooled sparkling water; and heated sparkling water) can be mixed to dispense cold still water, cool still water, ambient temperature still water, warm still water, hot still water, cold sparkling water, cool sparkling water, ambient temperature sparkling water, warm sparkling water, and hot sparkling water, as requested by a user for a custom beverage recipe. The water can be mixed with one or more additives, one or more flavors, and/or one or more minerals to create a custom beverage.

Filter 154 may be any desired type of filter system. For example, filter 154 may include one or more particulate filters and a charcoal filter. In other aspects, filter 154 may include a reverse osmosis filtration system or may include a distillation system to produce distilled water as a diluent. In an aspect, beverage dispenser 10 can include a filter sensor system to determine when the filter 154 requires replacement. For example, the filter sensor system could include a pressure sensor on each of the upstream and downstream sides of filter 154. When the pressure differential between these pressure sensors exceeds a pre-set value, beverage dispenser can alter a system operator and/or prevent further dispensing until filter 154 is replaced.

Figure 18:
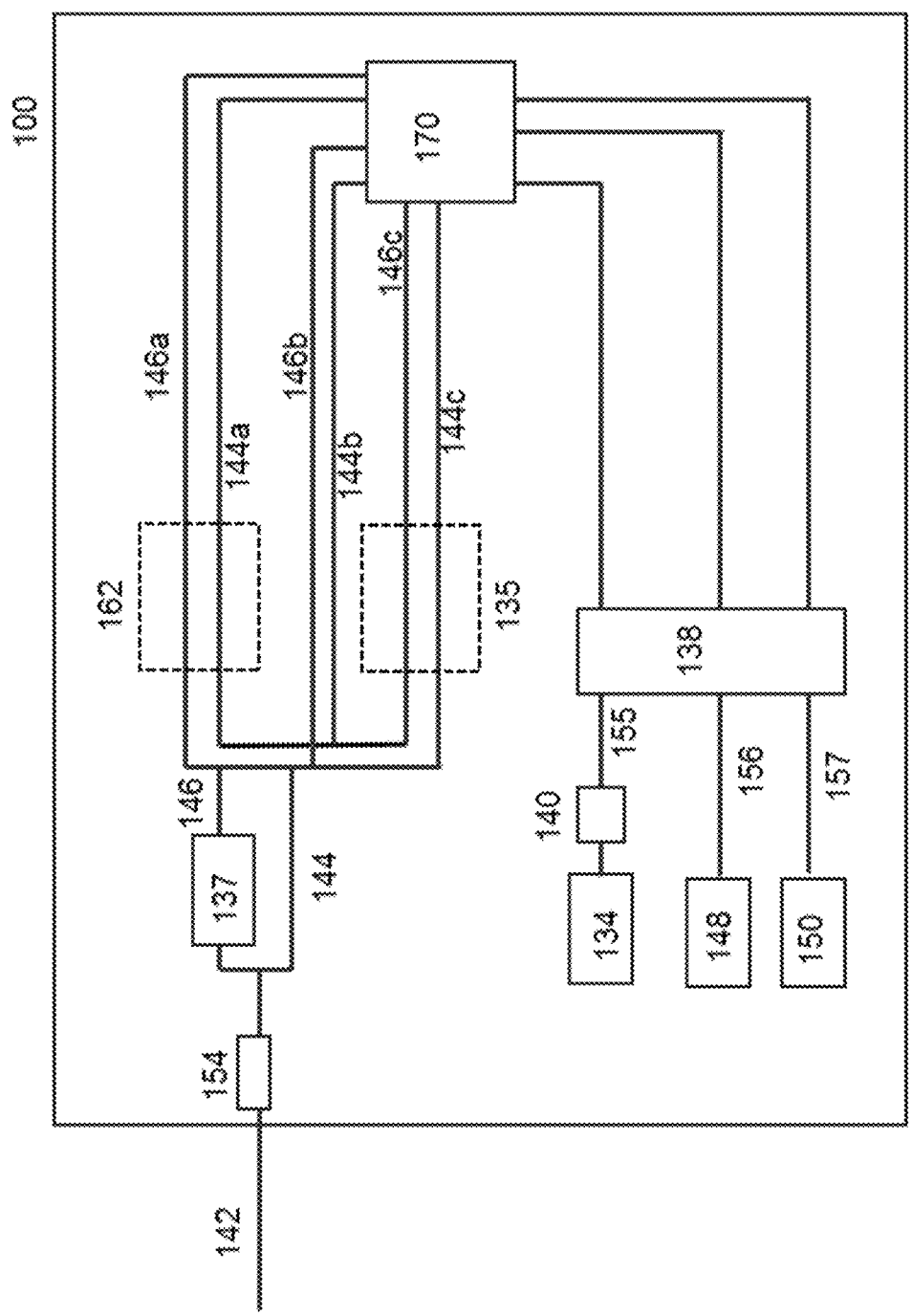
FIG. 18 is a schematic illustration of a beverage dispensing system according to various aspects of the invention.

In an aspect and as shown in FIG. 18, diluent passes through diluent source conduit 142 which connects to the components of beverage dispenser 10 within housing 100. Within housing 100, diluent source conduit 142 is fluidly connected to a filter 154 to clean diluent flowing therethrough. After filter 154, diluent conduit can split into two lines, still diluent conduit 144 and sparkling diluent conduit 146. In order to form sparkling water or soda, diluent (water) is mixed with pressurized gas. Sparkling diluent conduit 146 can be fluidly connected to gas mixing chamber 137, where pressurized gas is supplied to the diluent from gas tank 136. The resulting sparkling diluent exits the gas mixing chamber 137 into conduit 146.

In an aspect, gas tank 136 can be a carbon dioxide gas tank and carbon dioxide can be mixed into the diluent in gas mixing chamber 137.

In another aspect, gas tank 136 can be a nitrogen gas tank and nitrogen can be mixed into the diluent in gas mixing chamber 137. Nitrogen infused diluent can provide a silkier and sweeter beverage with or without additional additives and/or flavorings. In this aspect, nitrogen can be mixed into the diluent in gas mixing chamber 137 at a higher pressure than that required for carbon dioxide because nitrogen gas can be more difficult to dissolve in water. In an aspect, gas mixing chamber 137 and/or nozzle 170 can include a restrictor plate to squeeze the beverage through small holes to infuse the nitrogen gas in the diluent. Nozzle 170 can be a slow pour faucet designed to dispense the nitrogen infused diluent at a controlled rate to allow foam formation upon dispense and provide a unique flavor and appearance. Such a slow pour nozzle 170 can retain pressure necessary for mixing of the nitro-sparkling diluent.

In an aspect, gas mixing chamber 137 can include a liquid/gas contactor membrane unit including a cylindrical tube containing hollow fiber membranes. Diluent can be pumped into the space about the exterior of the hollow membranes. Nitrogen gas or nitrogen/carbon dioxide gas at a set pressure as determined by a supply regulator can be passed into the interior of the hollow fiber membrane from where it permeates through the membrane and the permeate nitrogen or nitrogen/carbon dioxide contacts the diluent on the exterior of the membrane and infuses into the diluent. In one aspect, nitrogen or nitrogen mixed gas can be passed through the hollow membranes while the diluent is passed through a fluid space surrounding the hollow fiber membranes. In another aspect, diluent can be passed through the hollow fiber membranes while passing the nitrogen or nitrogen mixed gas through a fluid space.

Variation and control of the gas pressure in the interior of the hollow fiber membrane relative to the pressure of the diluent on the exterior of the hollow fiber membrane allows for differing degrees of gas infusion into the water. The gas infused diluent (nitrogen-infused diluent) can be transported from the liquid, gas contactor membrane through a flow controlling needle valve or brix valve and then, for example, to nozzle 170.

In an aspect, gas tank 136 can include a flavored gas such that the flavored gas can alter the taste of the beverage. In another aspect, beverage dispenser 10 can include multiple gas tanks 136. In some aspects of beverage dispenser 10 with multiple gas tanks 136, each gas tank 136 may contain a flavored gas such that each gas can alter the taste of the beverage. In these aspects, each gas tank 136 may include a different flavored gas. Each gas tank 136 can include a respective gas mixing chamber 137 and respective sparkling conduits to mix at nozzle 170. In an aspect, the flavored gas can be emitted as an aroma to entice a user to order a beverage.

In another aspect, beverage dispenser 10 can utilize a tankless gas system. For example, beverage dispenser 10 can include a nitrogen membrane separator and can extract nitrogen from the surrounding air for infusion in the diluent.

In an aspect, beverage dispenser 10 can infuse gas into the diluent in-line without a gas mixing chamber 137. For example, beverage dispenser 10 can dispense gas directly into a diluent conduit. In an aspect, beverage dispenser 10 can utilize pulse width modulation to dispense gas directly into a diluent conduit at a specific ratio.

Sparkling diluent conduit 146 can split into multiple conduits. For example, sparkling diluent conduit 146 can split into a refrigerated sparkling diluent conduit 146*a* and an ambient sparkling diluent conduit 146*b*, to supply cool sparkling diluent and ambient temperature sparkling diluent to nozzle 170, respectively. In another aspect, sparkling diluent conduit 146 can split into a refrigerated sparkling diluent conduit 146*a*, an ambient sparkling diluent conduit 146*b*, and a heated sparkling diluent conduit 146*c*, to supply cool sparkling diluent, ambient temperature sparkling diluent, and hot sparkling diluent to nozzle 170, respectively. Refrigerated sparkling diluent conduit 146*a* can pass through water bath 118 to lower the temperature of the diluent within refrigerated sparkling diluent conduit 146*a*. Heated sparkling diluent conduit 146*c* can pass through a portion of heater 135 to raise the temperature of the diluent within heated sparkling diluent conduit 146*c*. In an aspect, ambient sparkling diluent conduit 146*b* does not pass through water bath 118 or a portion of heater 135, so diluent within ambient sparkling diluent conduit 146*b* can be at ambient temperature.

Still diluent conduit 144 can split into multiple conduits. For example, still diluent conduit 144 can split into a refrigerated still diluent conduit 146*a* and an ambient still diluent conduit 144*b*, to supply cool non-sparkling diluent and ambient temperature non-sparkling diluent to nozzle 170, respectively. In another aspect, still diluent conduit 144 can split into a refrigerated still diluent conduit 144*a*, an ambient still diluent conduit 144*b*, and a heated still diluent conduit 144*c*, to supply cool non-sparkling diluent, ambient temperature non-sparkling diluent, and hot non-sparkling diluent to nozzle 170, respectively. Refrigerated still diluent conduit 146a can pass through water bath 118 to lower the temperature of the diluent within refrigerated still diluent conduit 144a. Heated still diluent conduit 144c can pass through a portion of heater 135 to raise the temperature of the diluent within heated still diluent conduit 144c. In an aspect, ambient still diluent conduit 144b does not pass through water bath 118 or a portion of heater 135, so diluent within ambient still diluent conduit 144b can be at ambient temperature.

Flavoring sources 134 can be fluidly connected to nozzle 170 via flavoring conduits 155 so that the respective flavorings can be dispensed with a non-sparkling diluent or a sparkling diluent into a user's container, cup, or pitcher to dispense a beverage. Flavoring conduits 155 can also be connected to valves 140 and engage pumps 138.

In an aspect, one or more of refrigerated sparkling conduit 146a, ambient sparkling conduit 146b, heated sparkling conduit 146c, refrigerated non-sparkling conduit 144a, ambient non-sparkling conduit 144b, and/or heated non-sparkling conduit 144c can pass through one or more of flavoring sources 134 so that one or more flavorings are added to the respective diluent prior to nozzle 170. In another aspect, beverage dispensing system 10 can include a flavoring source 134 conduit bypass. For example, one or more of still diluent conduits 144a, 144b, or 144c or sparkling diluent conduits 146a, 146b, or 146c can connect to a valve so that when the valve is activated, the respective diluent can be directed into a flavoring conduit 155 and through one or more flavoring sources 134 so that one or more flavorings are added to the respective diluent prior to nozzle 170.

Additive sources 148 can be fluidly connected to nozzle 170 via additive conduits 156 so that the respective additives can be dispensed with a non-sparkling diluent or a sparkling diluent into a user's container, cup, or pitcher to dispense a beverage. Additive conduits 156 can engage pumps 138.

In an aspect, one or more of refrigerated sparkling conduit 146a, ambient sparkling conduit 146b, heated sparkling conduit 146c, refrigerated still conduit 144a, ambient still conduit 144b, and/or heated still conduit 144c can pass through mineral source 150 so that minerals are added to the respective diluent prior to nozzle 170. In another aspect, beverage dispensing system 10 can include a mineral source 150 conduit bypass. For example, one or more of still diluent conduits 144a, 144b, or 144c or sparkling diluent conduits 146a, 146b, or 146c can connect to a valve so that when the valve is activated, the respective diluent can be directed into a mineral conduit 157 and through mineral source 150 so that minerals are added to the respective diluent prior to nozzle 170.

In another aspect, mineral source 150 can be fluidly connected to nozzle 170 via mineral conduits 157 so that the respective minerals can be dispensed with a non-sparkling diluent or a sparkling diluent into a user's container, cup, or pitcher to dispense a beverage. Mineral conduits 157 can engage pumps 138. In an aspect, beverage dispensing system 10 can include a pressure transducer to pressure condition the diluent through one or more of still diluent conduits 144, 144a, 144b, and 144c to the valves and nozzle 170 for appropriate water flow management.

In an aspect, refrigerated sparkling diluent conduit 146a and refrigerated still diluent conduit 144a can pass through water bath 118 and a coil pack positioned in water bath 118, where the respective sparkling and non-sparkling diluents are cooled to a reduced temperature, for example, approximately 32 degrees Fahrenheit. In one aspect, refrigerated sparkling diluent conduit 146a and refrigerated still diluent conduit 144a can have a number of tightly spaced turns within the coil pack to increase the volume of sparkling and non-sparkling diluents within the coil pack. Refrigerated sparkling diluent conduit 146a and refrigerated still diluent conduit 144a can exit coil pack 118 and can deliver cooled diluent to nozzles 170 so that the sparkling and/or non-sparkling diluent can be dispensed into a user's container, cup, or pitcher to dispense a beverage. In some aspects, refrigerated still diluent conduit 144a may be connected to a diluent storage tank 139 after it exits water bath 118. Diluent storage tank 139 may be configured to store chilled diluent and maintain it at a desired temperature prior to dispensing. This enables beverage dispensing system 10 to dispense larger volumes of chilled diluent during times of peak demand. In some aspects, diluent storage tank 139 may be connected to both still diluent conduit 144a and sparkling diluent conduit 146a, and may be configured to separately store both still and sparkling diluent that has passed through water bath 118.

Because the dissolved gas level is dependent on the water temperature and gas pressure, the lower the water temperature, the more effectively the gas is entrained and maintained in the diluent. In an aspect, a portion of sparkling diluent conduit 146 can be positioned in a coil pack in water bath 118 prior to connecting to gas mixing chamber 137. Sparkling diluent conduit 146 can have a number of tightly spaced turns within the coil pack to increase the volume of diluent within the coil pack. Chilled diluent can exit water bath 118 and enter gas mixing chamber 137. The coils in the coil pack can ensure that the diluent entering gas mixing chamber 137 is at the desired temperature, approximately 35 degrees Fahrenheit.

Water bath 118 can include an ice bank. In an aspect, water bath 118 can be filled with water such that the water has a level above the top of an evaporator coil positioned in water bath 118.

Figure 6:
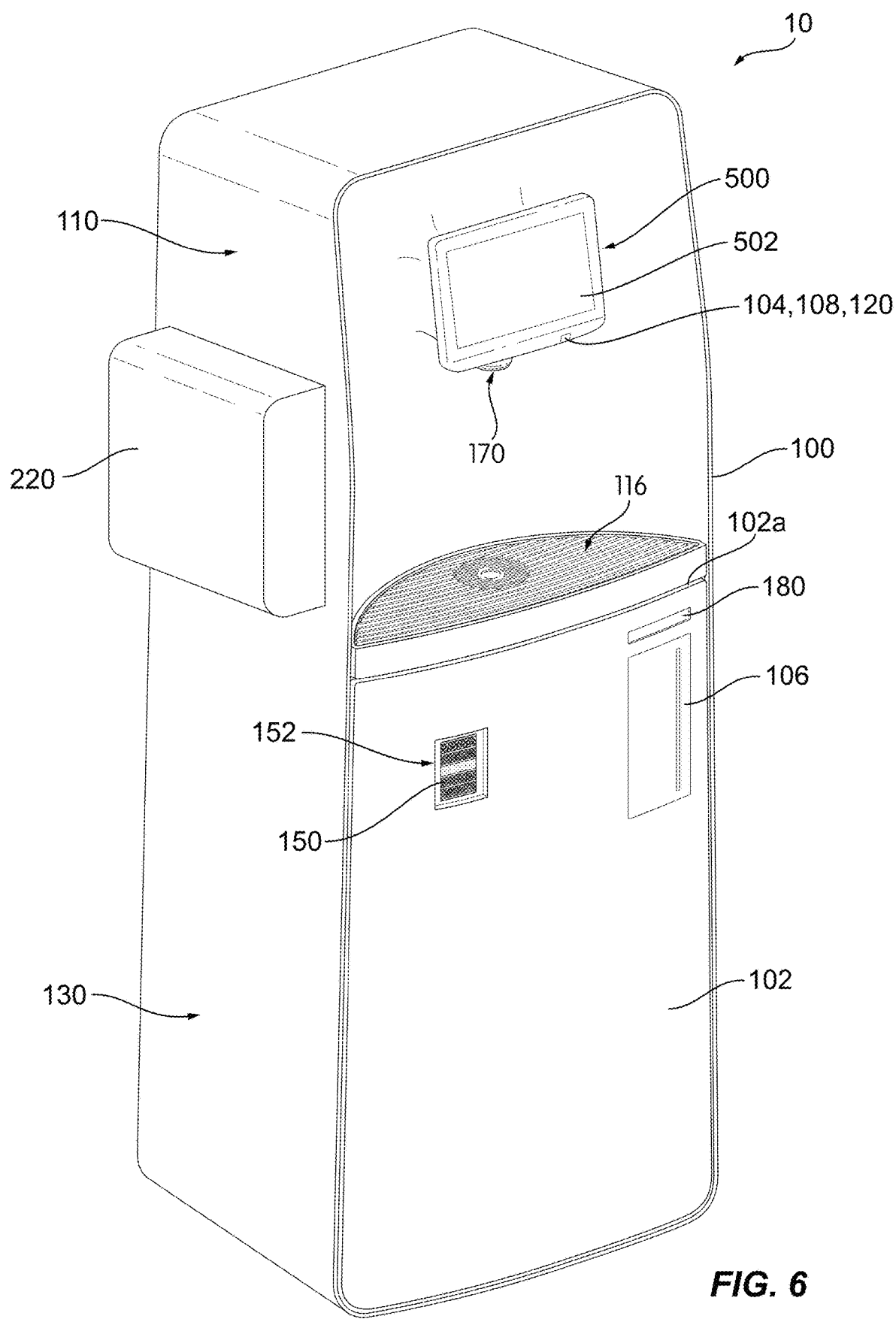
FIG. 6 is a perspective view of a beverage dispenser according to various aspects of the invention.
Figure 7:
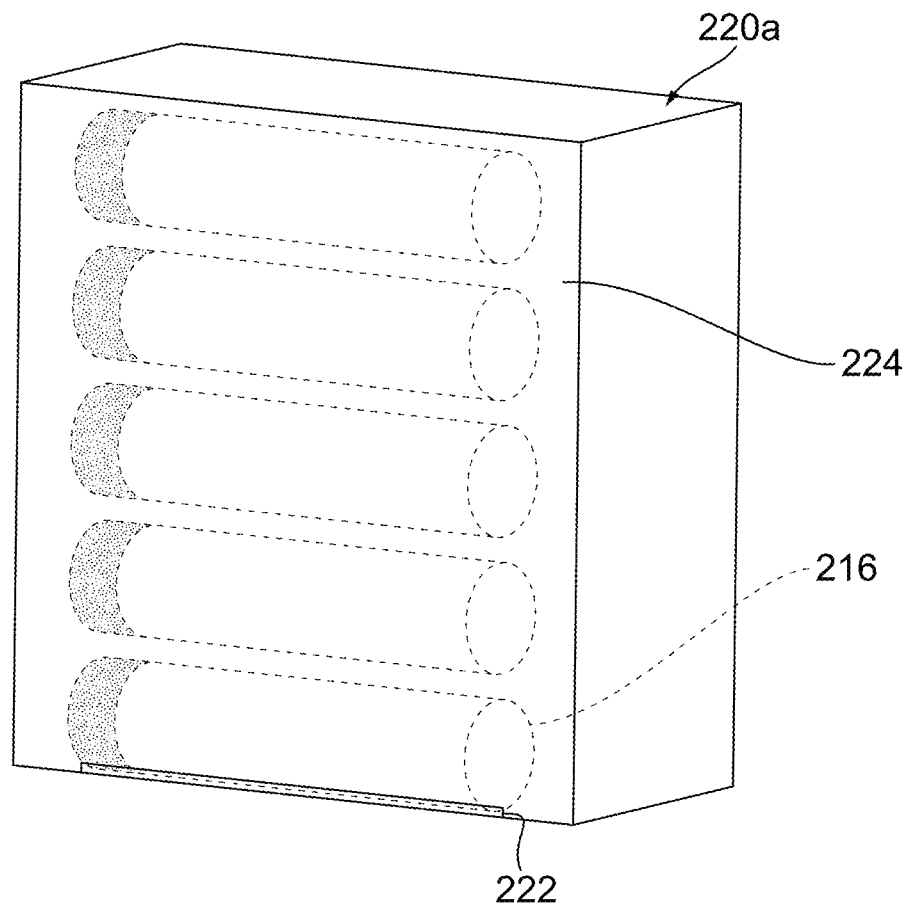
FIG. 7 is a front view of side housing of the beverage dispenser of FIG. 6 according to various aspects of the invention.
Figure 8:
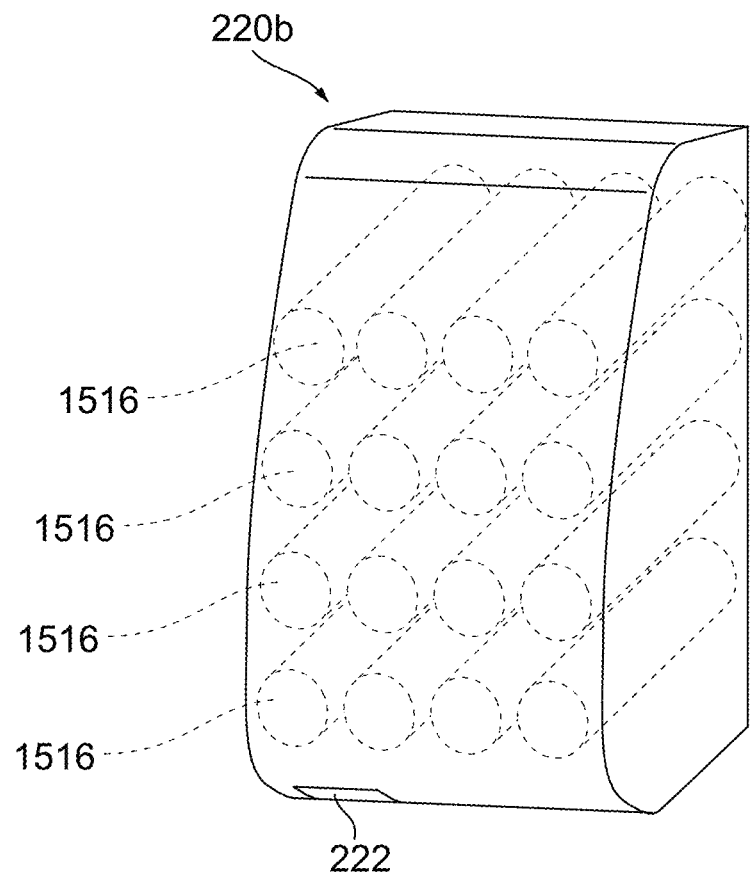
FIG. 8 is a front view of side housing of the beverage dispenser of FIG. 6 according to various aspects of the invention.
Figure 9:
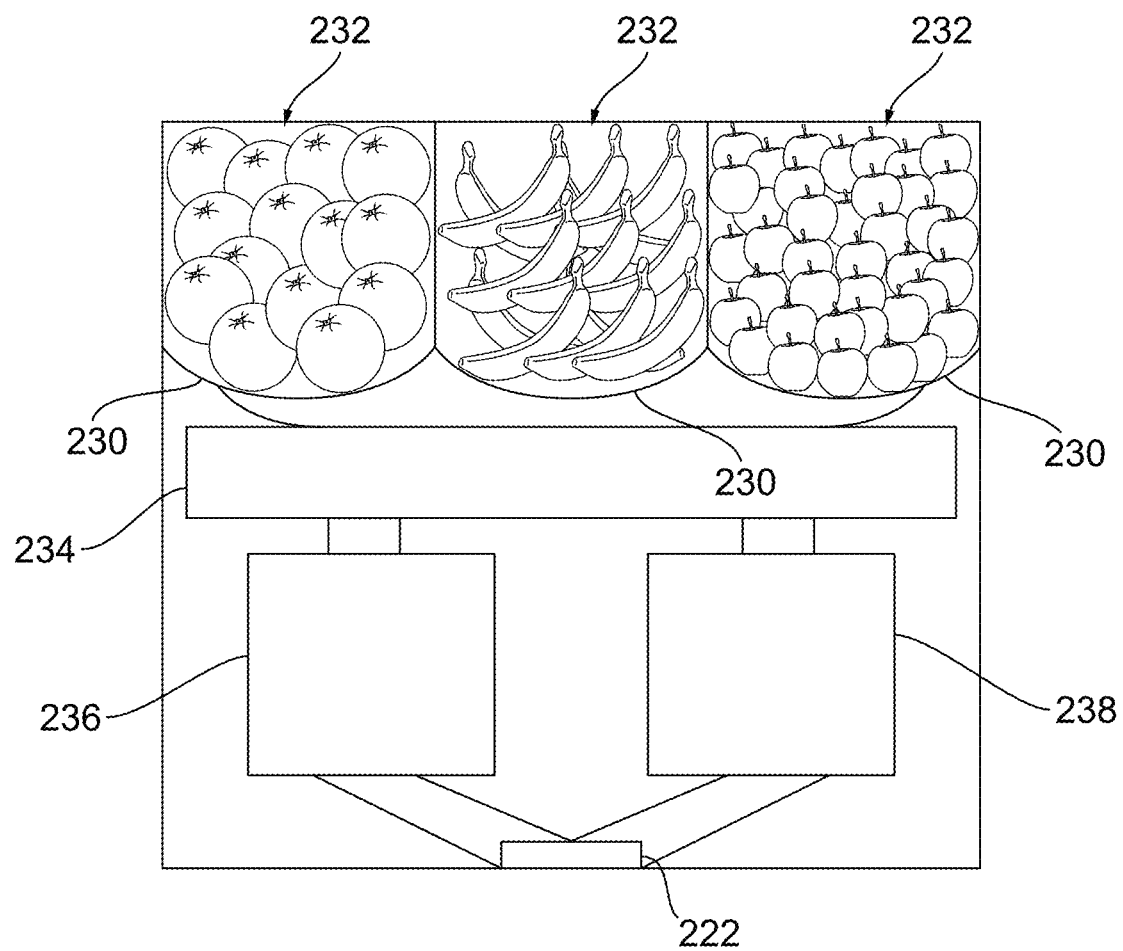
FIG. 9 is a front view of side housing of the beverage dispenser of FIG. 6 according to various aspects of the invention.

As shown in FIG. 6, beverage dispenser 10 can include a side housing 220. Side housing 220 can be integrated with housing 100 or can be an add-on unit that is mounted to an exterior surface of housing 100. In an aspect, side housing 220 can include an identification sticker dispenser to dispense pre-printed identification stickers to be placed on a user's beverage container. In another aspect, side housing 220 can include a printer to print an identification sticker on demand. As shown and discussed with respect to FIGS. 7-10 side housing 220 can also include one or more of a container dispenser 220a, a cartridge dispenser 220b, a garnish dispenser 220c, and/or a bottle cleaner 220d.

Side housing 220 can include a container dispenser 220a to dispense a container 216 to a user. For example, a user desiring to dispense a beverage from beverage dispenser 10 might first need a beverage container. Container dispenser 220a can include containers 216 that can be purchased from a user's account and/or through user interface 500 on beverage dispenser 10. After purchase, a container 216 can pass through dispensing slot 222 to the user. In an aspect, container dispenser 220a can include a transparent front 224 to make visible containers 216 within container dispenser 220a. In an aspect, container dispenser 220a can dispense reusable containers 216 such as plastic, metal, or glass containers 216. In an aspect, container dispenser 220a can dispense biodegradable containers 216, such as paper containers 216.

Side housing 220 can include a cartridge dispenser 220b to dispense ingredient cartridges 1516, such as are described in U.S. Pat. No. 9,272,827, issued Mar. 1, 2016, which is incorporated herein by reference in its entirety. Cartridge dispenser 220b can contain numerous cartridges 1516 each containing a different beverage flavor or ingredient giving the consumer additional choices for a beverage. The cartridge 1516 can include one or more beverage ingredients, wherein the beverage ingredients may be selected from the list comprising: syrup, paste, powder, granules, or other compositions. Additionally, the cartridges 1516 can hold other ingredients or flavors, such as nutrients or vitamins. In another aspect, the cartridges 1516 can include different liquid flavors/ingredients. The liquid flavors/ingredients may be created by condensed liquids that pack the essence of a beverage with the full power of healthy ingredients and nutrients. The liquid flavors/ingredients may include a fruit and/or flavor base such as: plum, blueberry, mango, cherry, grape, kiwi, strawberry, lemon, lime, passion fruit, apple, melon, tangerine, raspberry, orange, pomegranate, pineapple, coconut, grapefruit, acai, watermelon, peach, or any combination thereof. Additionally, the liquid flavors/ingredients may include a functional ingredient that includes herbs and spices or vegetables such as: mint, black tea, green tea, red tea, white tea, celery, chamomile, hibiscus, lavender, carrot, cucumber, verba mate, coca extract, ginger, chlorophyll, aloe, cinnamon, ginseng, or any combination thereof. Additionally, the liquid flavors/ingredients may include a functional ingredient that includes minerals, vitamins, electrolytes, energy, calm, protein, fiber, vitamins, antioxidants, sweeteners and other functional ingredients such as: calcium, sodium, potassium, bicarbonate, magnesium, caffeine, fiber, protein, taurine, ribose, omega 3, or any combination thereof. Additionally, without departing from the invention, the liquid flavors/ingredients may include any combination of fruit or flavor base, functional ingredients with herbs and spices or vegetables, or functional ingredients with minerals and/or vitamins.

In an aspect, the cartridges 1516 may be positioned in an array with the product information relating to the cartridge readily visible to the consumer, the array creating an aesthetically pleasing consumer impression. The cartridge dispenser 220b can contain various eye-catching colors and advertisements to attract the attention of the consumers.

Side housing 220 can include a garnish dispenser 220c. Garnish dispenser 220c can include one or more receptacles 230 to hold fresh ingredients 232. For example, fresh ingredients 232 can include oranges, bananas, and limes. When a garnish is selected by a user on user interface 500, mechanism 234 can transport one or more fresh ingredients 232 to slicer 236 or juicer 238 to be dispensed through dispensing slot 222 at the bottom of garnish dispenser 220c. Garnish dispenser 220c can include a transparent front surface so that fresh ingredients 232 are visible to a user.

Side housing 220 can include a bottle cleaner 220d. In an aspect, bottle cleaner 220d can include a nozzle 244 to dispense a sanitizing fluid into a user's bottle for washing. For example, a user can pass their bottle into bottle cleaner 220 and can orient the bottle onto nozzle 244. In an aspect, nozzle 244 can dispense a sanitizing gas such as air containing ozone. In this aspect, bottle cleaner 220d can include a door 240 to retain the sanitizing gas within bottle cleaner 220d. In another aspect, nozzle 244 can dispense hot water with or without soap. In another aspect, nozzle 244 can dispense water containing ozone or chlorine. After contacting the user's bottle, water from nozzle 244 can exit bottle cleaner 220d through drain 242. In an aspect, drain 242 can include a disposal unit to grind up food waste without clogging drain 242.

Bottle cleaner 220d can also include one or more ultraviolet lights 246 to sanitize the user's bottle oriented within bottle cleaner 220d. Ultraviolet lights 246 can be utilized for bottle cleaning along with or in place of nozzle 244.

In an aspect, bottle cleaner 220 and/or beverage dispense system 10 can include a sanitation system such as is described in U.S. Pat. No. 9,107,538, issued Aug. 18, 2015, which is incorporated herein by reference in its entirety.

Figure 11:
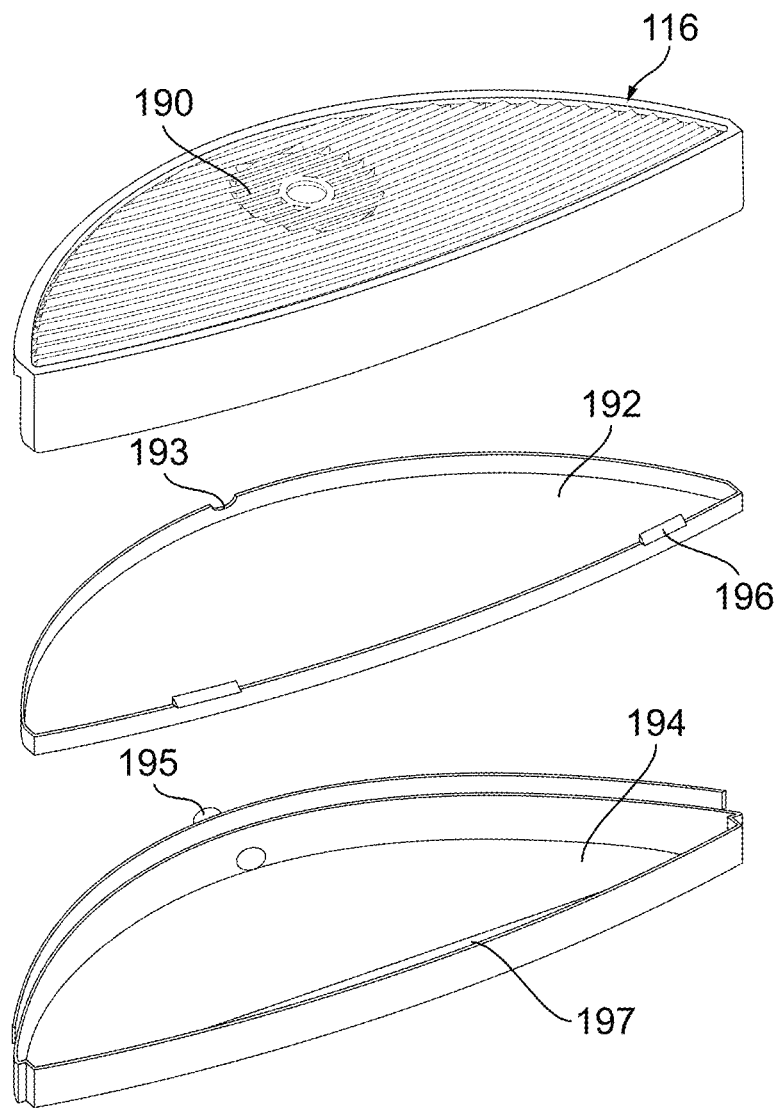
FIG. 11 is an assembly view of a dispensing area according to various aspects of the invention.
Figure 12:
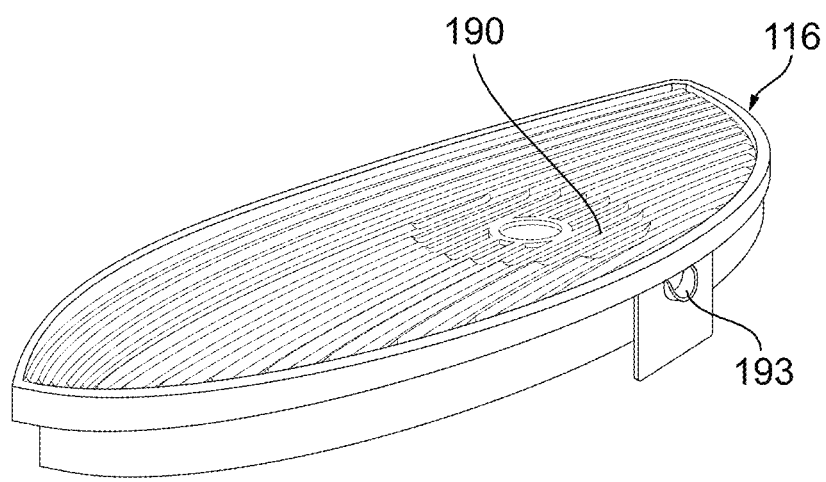
FIG. 12 is a perspective view of a dispensing area according to various aspects of the invention.

As shown in FIGS. 11-12, dispensing area 116 can include a cup rest 190, a drip tray 192, and a drain pan 194. In an aspect, drain pan 194 can be sized to retain a significant amount of liquid, such as 65 ounces. Cup rest 190 can include a number of openings to allow fluid to flow through cup rest 190 and into drip tray 192. In some aspects, cup rest 190 may include a vessel centering system 191 that is configured to assist the user in centering their beverage vessel under dispensing nozzle 170. For example, vessel center system 191 may include physical features designed to mate with the bottom of a vessel, including grooves, depressions, or raised protrusions. In other aspects vessel centering system 191 may include a magnet that is configured to attract corresponding magnetic material in the center of the bottom of the user's vessel. The position of the magnet and resulting attraction to the user's vessel centers the vessel under dispensing nozzle 170. Cup rest 190 and drip tray 192 can snap together for simply emptying by removing a single unit from beverage dispenser 10. Rear spout 193 on drip tray 192 can provide a controlled spill into drain pan 194 and a controlled way to empty drip tray 192 into a drain or sink. Drip tray 192 can include one or more clips 196 that engage edge 197 of drain pan 194.

In an aspect, beverage dispenser 10 can be hooked up to a drain such that waste fluid in drip tray 192 drains into the drain. In another aspect, beverage dispenser 10 can include a waste container 198 (FIG. 1) such that waste fluid in drip tray 192 drains into waste container 198. In an aspect, beverage dispenser 10 can include a sensor in waste container 198 to determine when waste container 198 is full and needs to be emptied.

In an aspect, beverage dispenser 10 can emit an aroma to attract a user. For example, beverage dispenser 10 can emit a coffee or tea aroma to entice a user to order a beverage. In another aspect, beverage dispenser 10 can emit a fruit aroma to entice a user to order a beverage.

Figure 13:
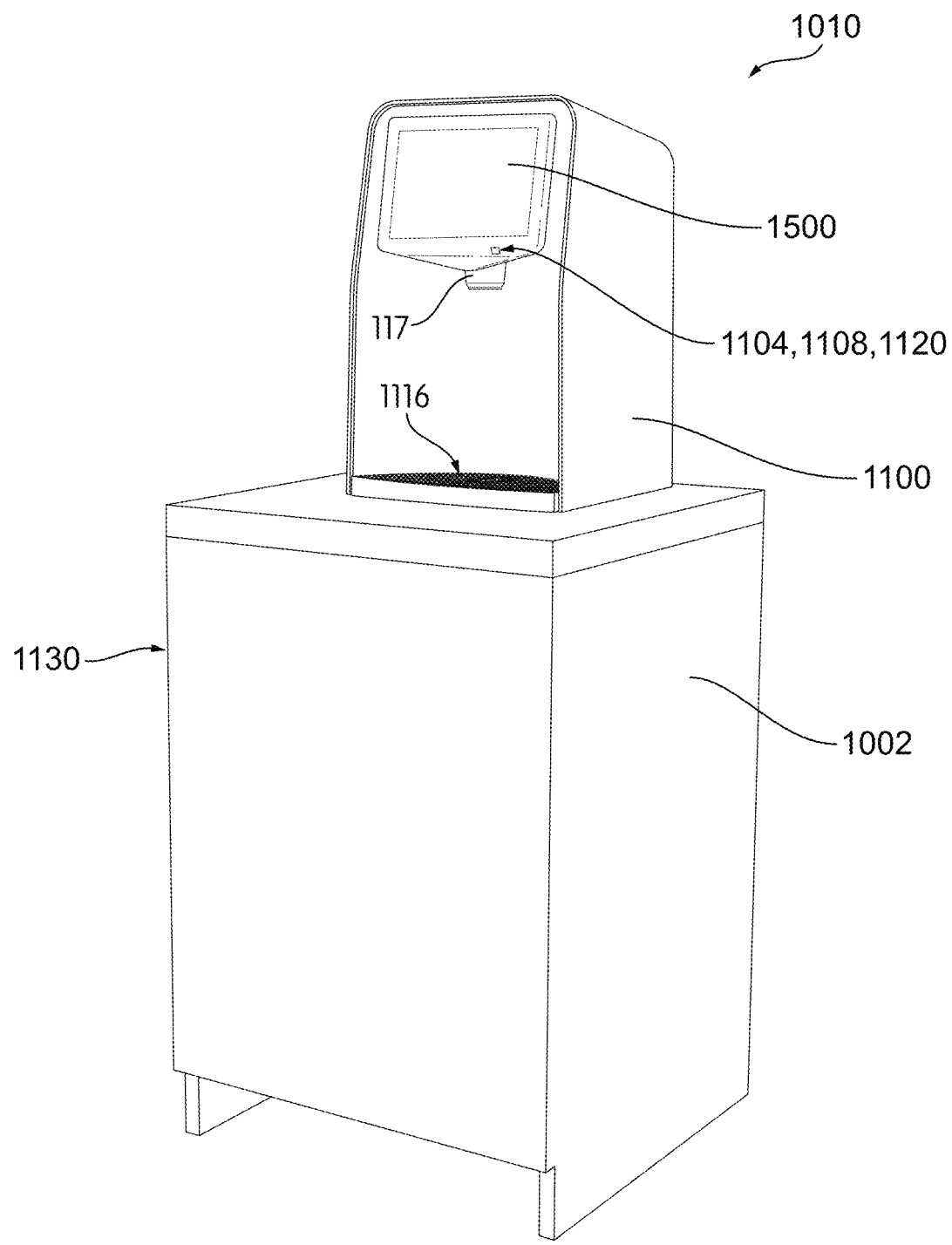
FIG. 13 is a perspective view of a beverage dispenser according to various aspects of the invention.
Figure 14:
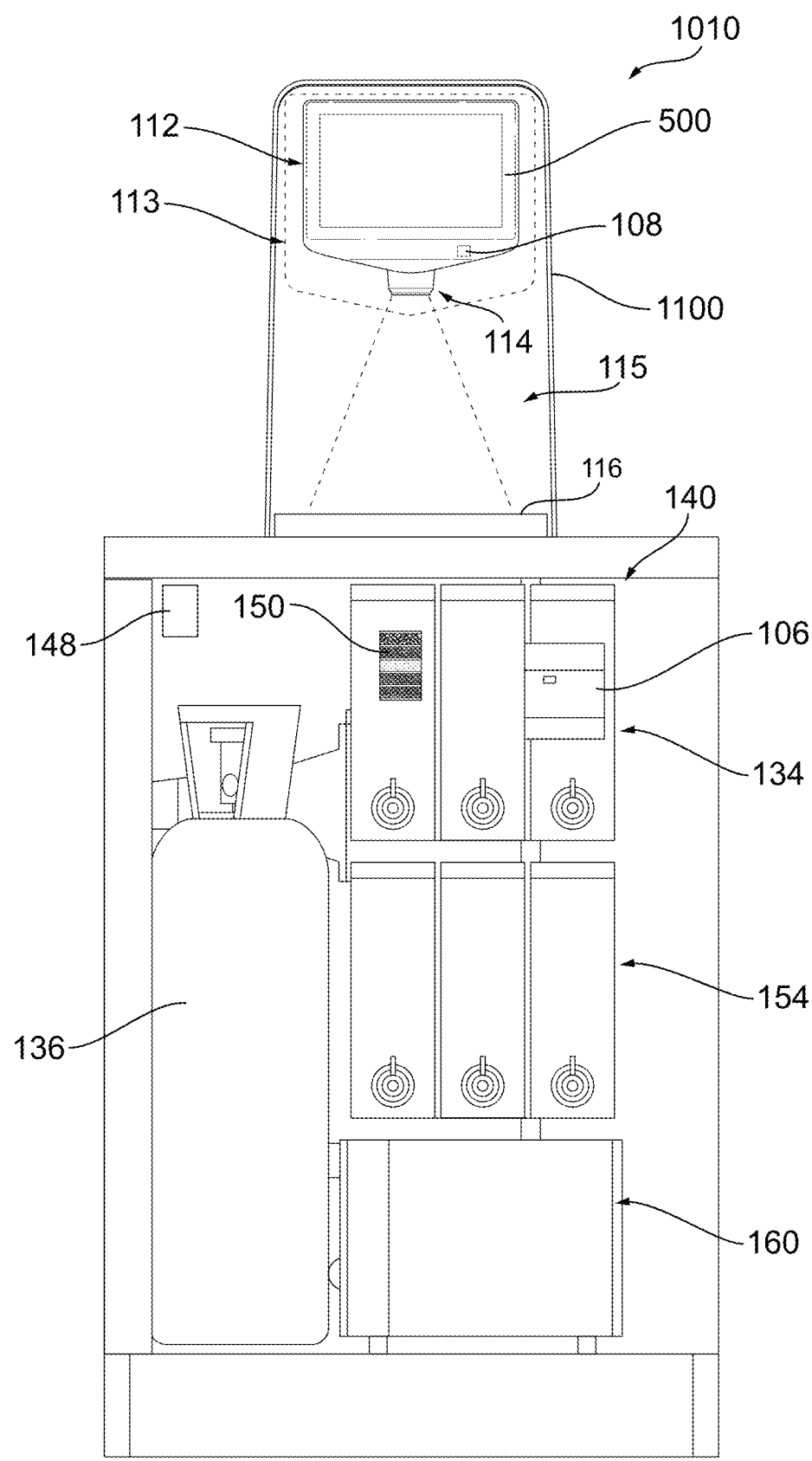
FIG. 14 is a front view of a beverage dispenser according to various aspects of the invention.
Figure 15:
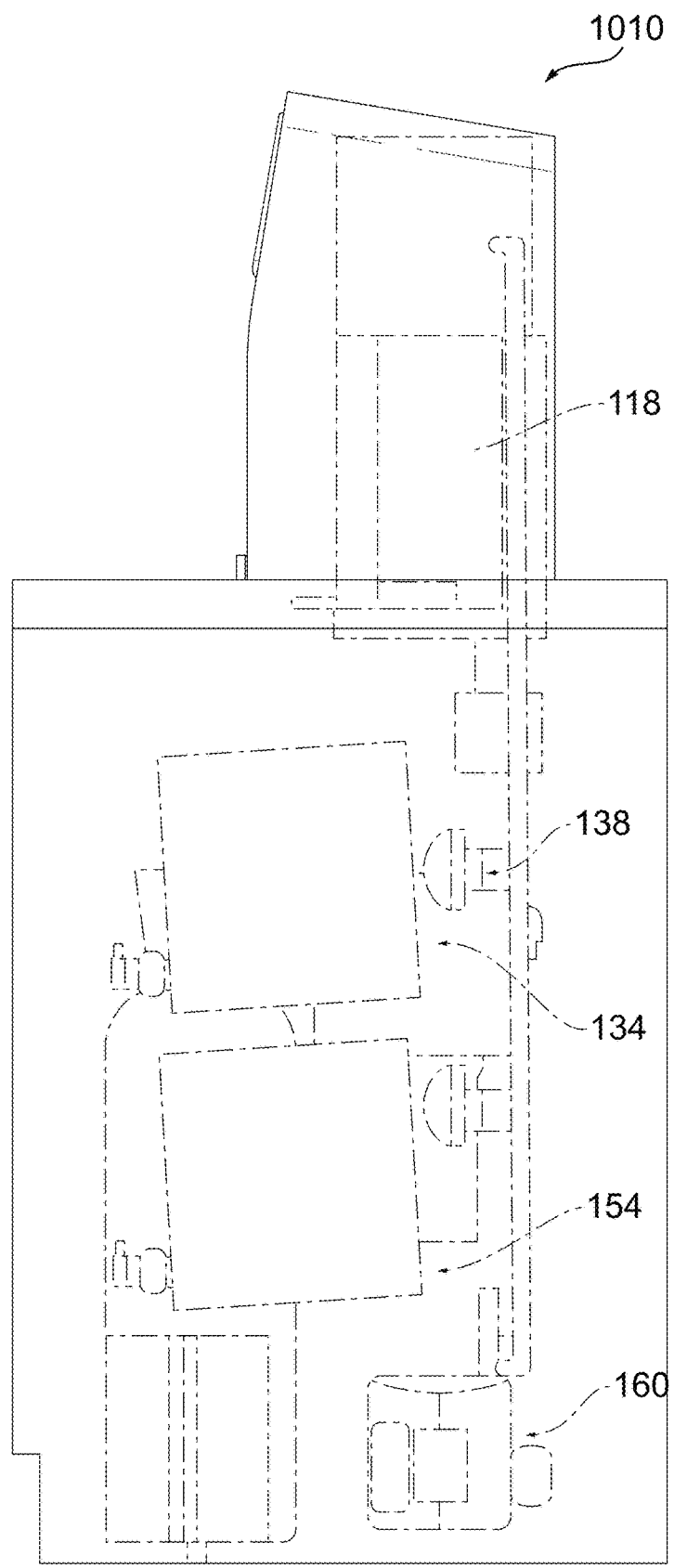
FIG. 15 is a side view of a beverage dispenser according to various aspects of the invention.

FIGS. 13-15 show beverage dispenser 1010. Beverage dispenser 1010 includes all the features and components as beverage dispenser 10, as discussed above. However, while beverage dispenser 10 can be a stand-alone unit, beverage dispenser 1010 can be a countertop unit. For example, beverage dispenser 1010 includes an outer housing 1100. Outer housing 1100 is positioned on counter 2. In an aspect, outer housing 1100 can include all the components and features of upper housing portion 110, discussed above. Cabinet 2 can include all the components and features of lower housing portion 130, discussed above.

Figure 102:
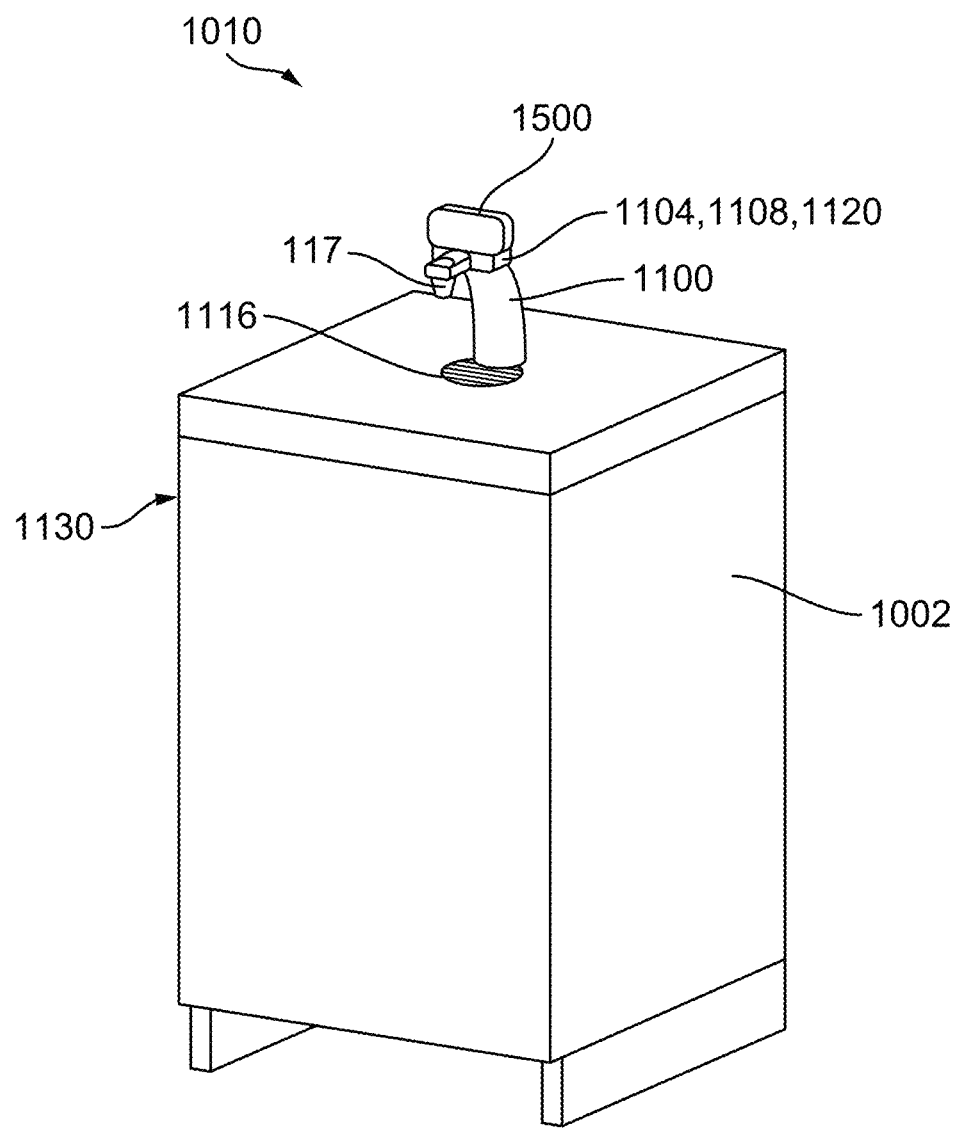
FIG. 102 is a perspective view of a beverage dispenser according to various aspects of the invention.

In aspects of beverage dispenser 1010 that position all the components and features below the countertop in cabinet 2, outer housing 1100 may be configured to include only dispensing nozzle 170 and user interface 500 in a compact, minimal form factor that maximizes the available countertop space. For example, as shown in FIG. 102, outer housing 1100 may be formed as a dispensing tower that supports dispensing nozzle 170 and user interface 500. These aspects of beverage dispenser 1010 may be otherwise functionally similar to aspects off beverage dispenser 1010 discussed above.

The countertop aspects of beverage dispenser 1010 may be configured to be modular units that can be easily installed. For example, cabinet 2 may be sized to fit into a standard sized opening found in a countertop in a manner similar to the sizing of kitchen appliances such as dishwashers or ovens. Accordingly, cabinet 2 may have the appropriate width, depth, and height to seamlessly integrate with an existing opening. This allows beverage dispenser 1010 to be placed into the opening without any need for complex installation procedures. After placement, beverage dispenser 1010 can be connected to the necessary external supplies of power and diluent and placed into operation. These aspects of beverage dispenser 1010 allow for rapid deployment of beverage dispenser 1010.

Beverage dispenser 1010 can be controlled by an electronic control module that includes a programmable microprocessor that sends an electronic signal to initiate pumps 138 and open one or more of valves 140 to dispense a beverage. The electronic control module can provide intelligent control of the beverage system. The electronic control module can also monitor system status such as the fluid temperatures, number of drinks dispensed, and sensors that determine amounts of additive, flavoring, and mineral ingredients remaining in the beverage dispensing system. The electronic control module can also provide service diagnostics, and the ability to remotely poll the electronic status.

Beverage dispensing system 1010 can include a user interface 500 to facilitate selection and dispensing of a beverage. User interface 500 may include an electronic display screen 502 for displaying information to a customer (e.g., a liquid crystal display (LCD) or a light emitting diode (LED) display, which may be a touch screen display). In some embodiments, user interface 500 may include one or more actuators (e.g., buttons, levers, handles, or icons on a touch screen, which may or may not be integrated into display screen 502) for receiving commands from a customer. In some embodiments, actuator(s) of user interface 500 may be configured to initiate dispensing of a beverage from a dispensing nozzle 170 of beverage dispensing system 1010.

In another aspect, beverage dispensing system 1010 can include a lower control panel 180 (FIG. 5) to enable a user that is unable to physically reach user interface 500 to select and dispense a beverage. Lower control panel 180 can be positioned on an exterior surface of lower housing portion 130. In an aspect, lower control panel 180 can be positioned on an exterior surface of door 102. Lower control panel 180 can be positioned so as to comply with the requirements of the Americans with Disabilities act. For example, lower control panel 180 can be positioned approximately 36 inches from the floor.

In some embodiments, lower control panel 180 may include one or more actuators (e.g., buttons, levers, handles, or icons on a touch screen, which may or may not be integrated into display screen 502) for receiving commands from a user. For example, lower control panel 180 can include an on button 188, a left directional button 182a, a right directional button 182b, a selection button 184, and a water button 186. In an aspect, a user that is physically unable to reach user interface 500 can select on button 188 to put machine into an alternate control mode. In this alternate control mode, the user can navigate through the graphical user interface on display 502 using left directional button 182a, right directional button 182b, and selection button 184 to customize and order a beverage. In an aspect, a user can dispense still water without requiring customer payment by pressing water button 186. In an aspect, lower control panel 180 may include elements designed to improve interactions with visually impaired users. For example, lower control panel 180 may include tactile elements such as raised features to represents actions or words (e.g. Braille) or the ability to interact with users using audio input and output.

Beverage dispensing system 1010 can authenticate a user in order to track user preferences and recipes, suggest custom beverages, and facilitate payment for a custom beverage. For example, a user can be authenticated via user input on the user interface 500 or via one or more sensors, readers, or scanners incorporated into beverage dispenser 1010. In an aspect, a user can be authenticated as described in U.S. application Ser. No. 15/943,395, filed Apr. 2, 2018, which is incorporated herein by reference in its entirety.

In some embodiments, user interface 500 may allow a customer to input a user code (e.g., a user name or phone number) to authenticate a particular customer. In some embodiments, upper housing portion 110 can include an authentication sensor 104 positioned on an exterior surface. As discussed below with respect to FIGS. 1-12, authentication sensor 104 can be utilized to identify a user and/or user's container to enable custom beverage selection and dispensing and/or to sign in to a user account on beverage dispensing system 10. In an aspect, authentication sensor 104 can include one or more readers or scanners for reading a machine readable item for identifying a customer. Machine readable items may include, but are not limited to, a barcode, a magnetic strip, a quick response (QR) code, a radio frequency identification (RFID) tag, a Bluetooth-enabled device (e.g., a cell phone), a Bluetooth Low Energy (BLE) device, or an ultrasound communication device, (e.g., a device having LISNR® ultrasound technology). In an aspect, authentication sensor 104 can include one or more biometric sensors for identifying one or more biometric characteristics of a customer. Biometric sensor(s) may include, but are not limited to, a fingerprint reader, a finger vein scanner, a retinal scanner, an iris scanner, a camera (for taking a photo and/or recording a video), or a microphone. The biometric characteristic(s) of a customer may include a fingerprint, a finger vein pattern, a retinal profile, an iris profile, a face profile, and a voice profile.

Cabinet 2 can contain portions of a refrigeration system 160, including, for example, an evaporator coil, an evaporator fan motor and fan, a compressor, a condenser coil, and a condenser fan motor and fan. In an aspect, refrigeration system 160 can reduce the temperature of the interior of cabinet 2. The refrigeration system 160 can operate on a conventional vapor compression cycle to maintain the fluids at a desired temperature. In an aspect, refrigeration system 160 can cool a water bath 118 and can generate an ice bank in water bath 118.

Cabinet 2 can also contain ingredients that can be used to create custom beverage recipes. As discussed herein, ingredients can include one or more of still water at ambient temperature; cooled still water; heated still water; sparkling water at ambient temperature; cooled sparkling water; heated sparkling water; flavorings such as: branded beverage concentrate, plum, blueberry, mango, cherry, grape, kiwi, strawberry, lemon, lime, passion fruit, apple, melon, tangerine, raspberry, orange, pomegranate, pineapple, coconut, grapefruit, acai, watermelon, peach, or any combination thereof. Additionally, the flavorings can include herbs and spices or vegetables such as: mint, black tea, green tea, red tea, white tea, celery, chamomile, hibiscus, lavender, carrot, cucumber, verba mate, coca extract, ginger, chlorophyll, aloe, cinnamon, ginseng, or any combination thereof. In an aspect, one or more of the flavorings can include fresh ingredients that do not contain preservatives. Additionally, the ingredients can include minerals such as boron, phosphorus, titanium, chromium, manganese, iron, cobalt, nickel, copper, zinc, molybdenum, cadmium, aluminum. In an aspect, the mineral ingredients can simulate a taste profile of mineral water from a specific region. For example, the mineral ingredients can simulate a taste profile of water from the German Alps, the Italian Alps, or the French Alps. The ingredients can also include additives such as vitamins, electrolytes, energy, calm, protein, fiber, vitamins, antioxidants, sweeteners and other functional ingredients such as: calcium, sodium, potassium, bicarbonate, magnesium, caffeine, fiber, protein, taurine, ribose, omega 3, or any combination thereof.

As shown in FIGS. 13-15, cabinet 2 can contain a gas tank 136, one or more filters 154, additive sources 148, mineral sources 150, flavoring sources 134, pumps 138, and valves 140. As discussed in greater detail below, gas tank 136, filters 154, additive sources 148, mineral sources 150, and flavoring sources 134 can be utilized to provide one or more ingredients that can be combined to create a custom beverage. In an aspect, one or more of additive sources 148, mineral sources 150, and/or flavoring sources 134 can be positioned near window 152 so as to be viewable to a user of beverage dispenser 10.

Like beverage dispensing system 10, beverage dispensing system 1010 can include a pressurized diluent source to supply diluent, e.g., water, to the beverage dispensing system 1010. In one aspect, the diluent can be at typical domestic water pressures, e.g., approximately 50-300 pounds per square inch (psi). The diluent source can provide diluent to a pump that distributes the diluent through beverage dispensing system 1010. In one aspect, the pump can be positioned in lower housing portion 130. The diluent can pass through filter 154 and into one or more diluent conduits. For example, beverage dispensing system 1010 can include diluent conduits that pass into coil pack 118 in order to provide still water at ambient temperature; cooled still water; heated still water; sparkling water at ambient temperature; cooled sparkling water; and heated sparkling water. In an aspect, one or more of the diluents (still water at ambient temperature; cooled still water; heated still water; sparkling water at ambient temperature; cooled sparkling water; and heated sparkling water) can be mixed to dispense a cold still water, cool still water, ambient temperature still water, warm still water, hot still water, cold sparkling water, cool sparkling water, ambient temperature sparkling water, warm sparkling water, and hot sparkling water, as requested by a user for a custom beverage recipe. The water can be mixed with one or more additives, one or more flavors, and/or one or more minerals to create a custom beverage.

Figure 10:
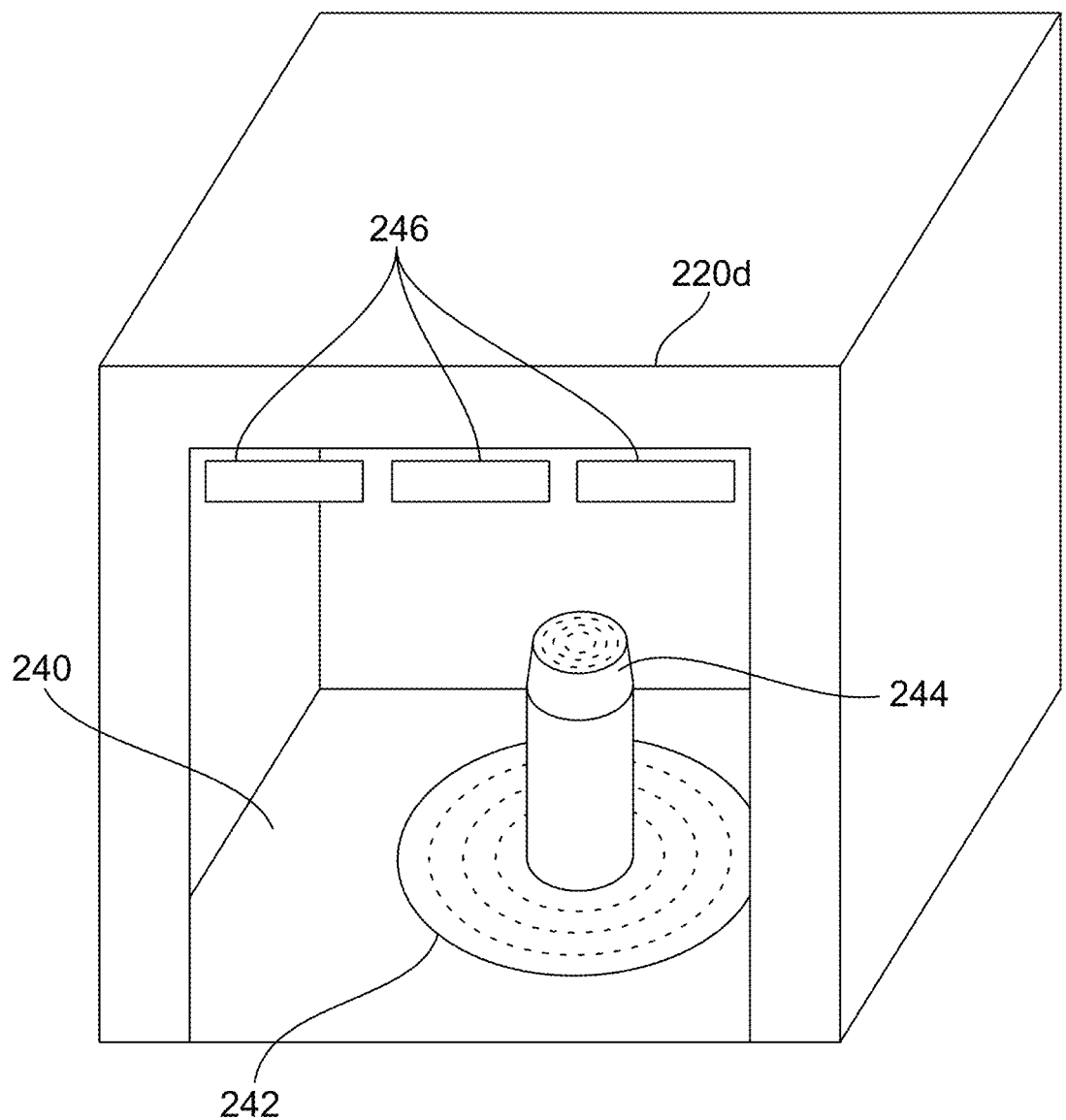
FIG. 10 is a front view of side housing of the beverage dispenser of FIG. 6 according to various aspects of the invention.

The conduits of beverage dispensing system 1010 can be identical to that of beverage dispensing system 10, as depicted in FIG. 10. Diluent passes through diluent source conduit 142 which connects to the components of beverage dispenser 1010 within housing 1100 and cabinet 2. Within cabinet 2, diluent source conduit 142 is fluidly connected to a filter 154 to clean diluent flowing there through. After filter 154, diluent conduit can split into two lines, still diluent conduit 144 and sparkling diluent conduit 146. In order to form sparkling water or soda, diluent (water) is mixed with pressurized gas. Sparkling diluent conduit 146 can be fluidly connected to gas mixing chamber 137, where pressurized gas is supplied to the diluent from gas tank 136. The resulting sparkling diluent exits the gas mixing chamber 137 into conduit 146.

Sparkling diluent conduit 146 can split into multiple conduits. For example, sparkling diluent conduit 146 can split into a refrigerated sparking diluent conduit 146a and an ambient sparkling diluent conduit 146b, to supply cool sparkling diluent and ambient temperature sparkling diluent to nozzle 170, respectively. In another aspect, sparkling diluent conduit 146 can split into a refrigerated sparkling diluent conduit 146a, an ambient sparkling diluent conduit 146b, and a heated sparkling diluent conduit 146c, to supply cool sparkling diluent, ambient temperature sparkling diluent, and hot sparkling diluent to nozzle 170, respectively. Refrigerated sparkling diluent conduit 146a can pass through water bath 118 to lower the temperature of the diluent within refrigerated sparkling diluent conduit 146a. Heated sparkling diluent conduit 146c can pass through a portion of heater 135 to raise the temperature of the diluent within heated sparkling diluent conduit 146c. In an aspect, ambient sparkling diluent conduit 146b does not pass through water bath 118 or a portion of heater 135, so diluent within ambient sparkling diluent conduit 146b can be at ambient temperature.

Still diluent conduit 144 can split into multiple conduits. For example, still diluent conduit 144 can split into a refrigerated still diluent conduit 146a and an ambient still diluent conduit 144b, to supply cool non-sparkling diluent and ambient temperature non-sparkling diluent to nozzle 170, respectively. In another aspect, still diluent conduit 144 can split into a refrigerated still diluent conduit 144a, an ambient still diluent conduit 144b, and a heated still diluent conduit 144c, to supply cool non-sparkling diluent, ambient temperature non-sparkling diluent, and hot non-sparkling diluent to nozzle 170, respectively. Refrigerated still diluent conduit 146a can pass through water bath 118 to lower the temperature of the diluent within refrigerated still diluent conduit 144a. Heated still diluent conduit 144c can pass through a portion of heater 135 to raise the temperature of the diluent within heated still diluent conduit 144c. In an aspect, ambient still diluent conduit 144b does not pass through water bath 118 or a portion of heater 135, so diluent within ambient still diluent conduit 144b can be at ambient temperature.

Flavoring sources 134 can be fluidly connected to nozzle 170 via flavoring conduits 155 so that the respective flavorings can be dispensed with a non-sparkling diluent or a sparkling diluent into a user's container, cup, or pitcher to dispense a beverage. Flavoring conduits 155 can also be connected to valves 140 and engage pumps 138.

In an aspect, one or more of refrigerated sparkling conduit 146a, ambient sparkling conduit 146b, heated sparkling conduit 146c, refrigerated non-sparkling conduit 144a, ambient non-sparkling conduit 144b, and/or heated non-sparkling conduit 144c can pass through one or more of flavoring sources 134 so that one or more flavorings are added to the respective diluent prior to nozzle 170. In another aspect, beverage dispensing system 10 can include a flavoring source 134 conduit bypass. For example, one or more of still diluent conduits 144a, 144b, or 144c or sparkling diluent conduits 146a, 146b, or 146c can connect to a valve so that when the valve is activated, the respective diluent can be directed into a flavoring conduit 155 and through one or more flavoring sources 134 so that one or more flavorings are added to the respective diluent prior to nozzle 170.

Additive sources 148 can be fluidly connected to nozzle 170 via additive conduits 156 so that the respective additives can be dispensed with a non-sparkling diluent or a sparkling diluent into a user's container, cup, or pitcher to dispense a beverage. Additive conduits 156 can engage pumps 138.

In an aspect, one or more of refrigerated sparkling conduit 146a, ambient sparkling conduit 146b, heated sparkling conduit 146c, refrigerated still conduit 144a, ambient still conduit 144b, and/or heated still conduit 144c can pass through mineral source 150 so that minerals are added to the respective diluent prior to nozzle 170. In another aspect, beverage dispensing system 10 can include a mineral source 150 conduit bypass. For example, one or more of still diluent conduits 144a, 144b, or 144c or sparkling diluent conduits 146a, 146b, or 146c can connect to a valve so that when the valve is activated, the respective diluent can be directed into a mineral conduit 157 and through mineral source 150 so that minerals are added to the respective diluent prior to nozzle 170. In another aspect, mineral source 150 can be fluidly connected to nozzle 170 via mineral conduits 157 so that the respective minerals can be dispensed with a non-sparkling diluent or a sparkling diluent into a user's container, cup, or pitcher to dispense a beverage. Mineral conduits 157 can engage pumps 138.

In an aspect, beverage dispensing system 1010 can include a pressure transducer to pressure condition the diluent through one or more of still diluent conduits 144, 144a, 144b, and 144c to the valves and nozzle 170 for appropriate water flow management.

In an aspect, refrigerated sparkling diluent conduit 146a and refrigerated still diluent conduit 144a can pass through water bath 118 and a coil pack positioned in water bath 118, where the respective sparkling and non-sparkling diluents are cooled to a reduced temperature, for example, approximately 32 degrees Fahrenheit. In one aspect, refrigerated sparkling diluent conduit 146a and refrigerated still diluent conduit 144a can have a number of tightly spaced turns within the coil pack to increase the volume of sparkling and non-sparkling diluents within the coil pack. Refrigerated sparkling diluent conduit 146a and refrigerated still diluent conduit 144a can exit coil pack 118 and can deliver cooled diluent to nozzles 170 so that the sparkling and/or non-sparkling diluent can be dispensed into a user's container, cup, or pitcher to dispense a beverage.

In an aspect, a portion of sparkling diluent conduit 146 can be positioned in a coil pack in water bath 118 prior to connecting to gas mixing chamber 137. Sparkling diluent conduit 146 can have a number of tightly spaced turns within the coil pack to increase the volume of diluent within the coil pack. Chilled diluent can exit water bath 118 and enter gas mixing chamber 137. The coils in the coil pack can ensure that the diluent entering gas mixing chamber 137 is at the desired temperature, approximately 35 degrees Fahrenheit.

Water bath 118 can include an ice bank. In an aspect, water bath 118 can be filled with water such that the water has a level above the top of an evaporator coil positioned in water bath 118.

In an aspect, beverage dispensing system 1010 can be a dispenser tower that includes user interface 500 and a dispensing nozzle 170. In this aspect, water bath 1118 can be positioned in cabinet 2 and fluids that are cooled within the water bath 1118 can be provided to the dispenser tower through a python connection.

Figure 16:
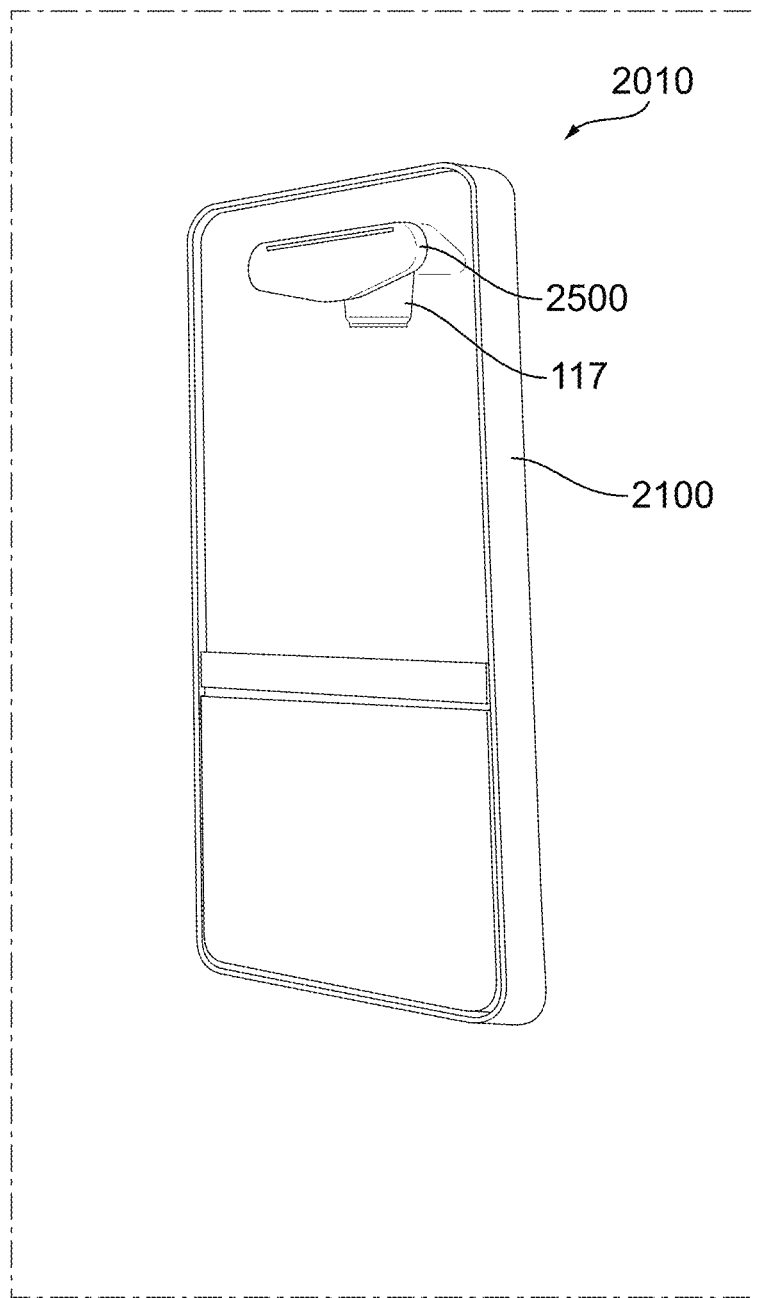
FIG. 16 is a perspective view of a beverage dispenser according to various aspects of the invention.

As shown in FIG. 16, in an aspect beverage dispensing system 2010 can be attached to a wall. Beverage dispensing system 2010 can include a user interface 2500 and a dispensing nozzle 170. Beverage dispenser 2010 can includes all the features and components as beverage dispenser 10, as discussed above. However, while beverage dispenser 10 can be a stand-alone unit, beverage dispenser 2010 can be a wall unit.

In an aspect, user interface 2500 does not include a display screen. In another aspect, beverage dispensing system 2010 can dispense water or sparkling water. In another aspect, a user can select a custom beverage from beverage dispensing system 2010 using an application on a mobile phone.

Figure 17:
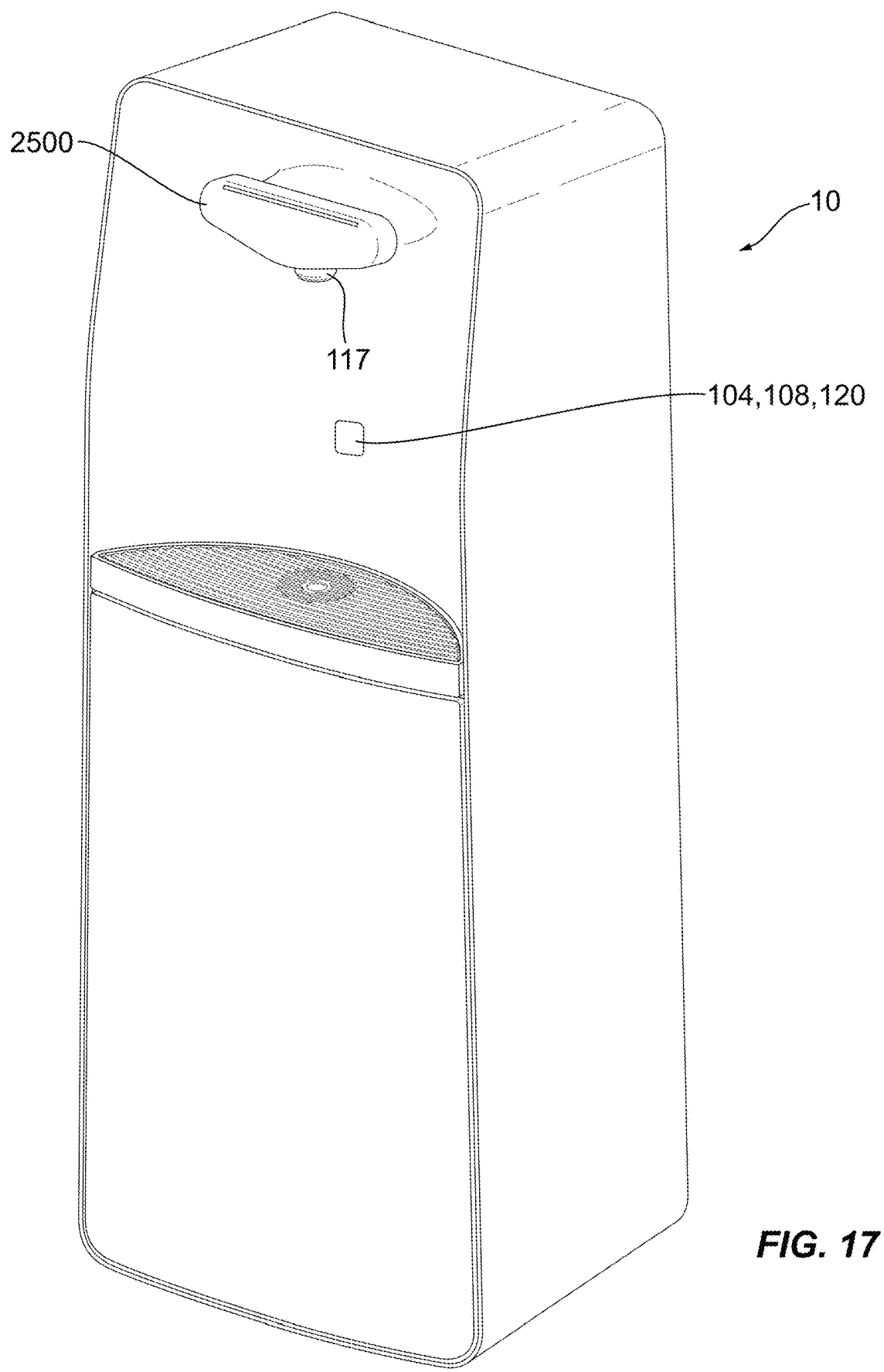
FIG. 17 is a perspective view of a beverage dispenser according to various aspects of the invention.

As shown in FIG. 17, in an aspect beverage dispensing system 10 can include a user interface 2500 and a dispensing nozzle 170. In an aspect, user interface 2500 does not include a display screen. In an aspect, user interface 2500 can interact with a user's mobile device to utilize the screen. In another aspect, beverage dispensing system 2010 can dispense water or sparkling water. In another aspect, a user can select a custom beverage from beverage dispensing system 2010 using an application on a mobile phone.

This section will give a brief overview of the various functionality of a beverage management system with reference to FIGS. 19-22. Subsequent sections will describe various aspects of the beverage management systems in greater detail.

Figure 19:
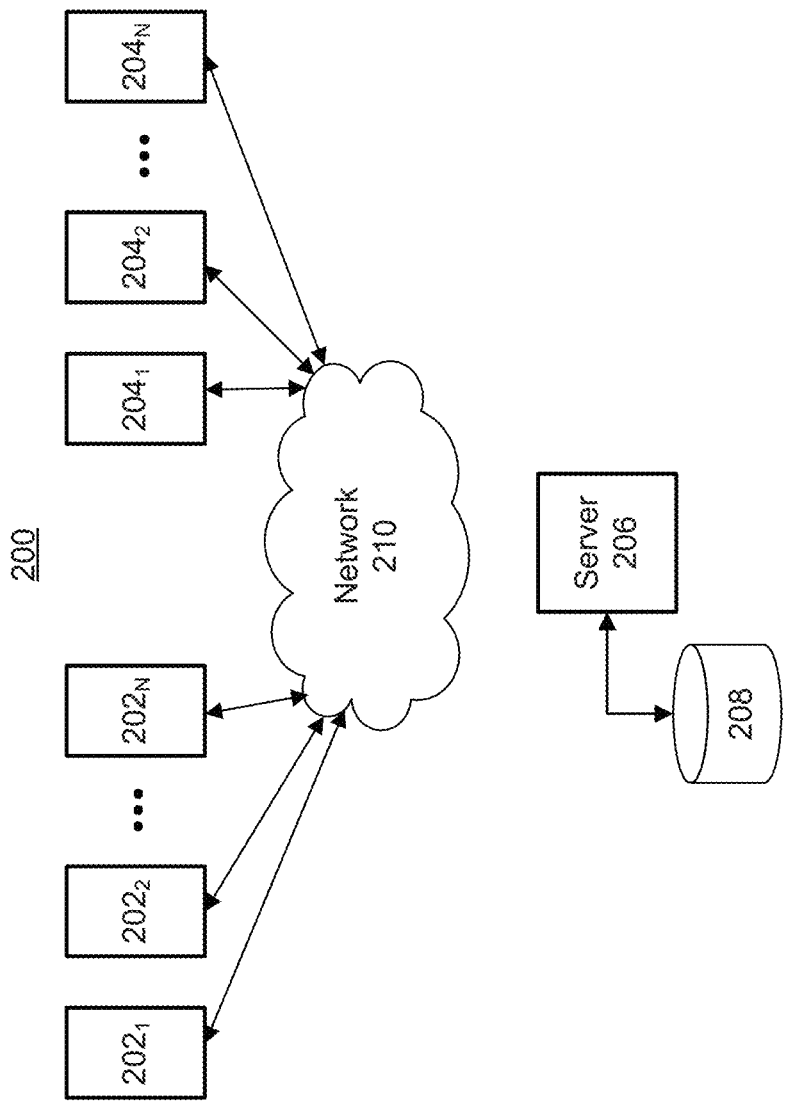
FIG. 19 is a functional block diagram depicting a logical system according to various aspects of the invention.

FIG. 19 is a functional block diagram depicting a beverage management system 200 according to various embodiments. The beverage management system 200 may include a plurality of customer devices $202_1$, $202_2$, ..., and $202_N$ (collectively and generically referred to as "customer device 202"). According to embodiments, the customer devices 202 may comprise mobile electronic devices (e.g., cell phones, tablet computers, laptop computers), personal computers, or the like and may be configured to connect to a communication network 210.

The beverage management system 200 may also include a plurality of beverage dispensers $204_1$, $204_2$, ... and $204_N$ (collectively and generically referred to as "beverage dispenser 204"). According to embodiments, the beverage dispensers 204 may be post-mix beverage dispensers, and may also be configured to connect to the communication network 210.

The beverage management system 200 may also include a control system 206 connected to communication network 210. The control system may comprise one or more computer systems (e.g., a computer system such as the one described with reference to FIG. 16, below), and may also be communicatively coupled to a data store element 208. The data store element may comprise a conventional database system according to some embodiments. Alternatively, the data store element 208 may comprise a portion of the control system 206 and be integral to it.

In some embodiments, the data store element 208 may contain user account information including beverage purchase history, beverage ratings, beverage preferences, usage statistics, payment information, and bottle information. For instance, data store 208 may contain the number and types of beverages purchased, including the ingredients of those beverages. In an aspect, the user account information can include user data from other sources. For example, the user account information can include user physiological data such as exercise data and/or hydration data. In some aspects, purchase history may be stored in data store element 208 separate from a user account. In these aspects, a user may be identified by a set of characteristics, and their purchase history associated with these characteristics. These characteristics may include, for example, user age, gender, physical attributes, demographic information, and other characteristics. Beverage dispensers 10, 1010, and 2010 may be configured to identify a user based on one or more of these characteristics and recall the purchase history associated with that user. In this way, a user may review their purchase history without requiring access to a user account.

In some embodiments, customer device 202 with a mobile device application stored thereon may be used to access data store element 208 and track the user's dispensing at a beverage dispenser such as beverage dispensers 10, 1010, and 2010. In such embodiments, a customer may open the mobile device application and select ingredients to create a customized beverage. Then, after creating the customized beverage recipe, the customer may identify a particular beverage dispenser from which to dispense beverage.

The communication network 210 may comprise any suitable communication network. For instance, according to some embodiments, the communication network may comprise an Internet, WiFi, LAN, WLAN, WAN, PAN, etc.

In an aspect, users may be associated together in groups according to common characteristics of the users. For example, users that work for the same organization or attend the same school may be grouped together. In some aspects, groups of users may compete against each other in various games related to beverage dispensers 10, 1010, and 2010. For example, groups of users may compete to save the highest number of plastic bottles by using reusable containers with beverage dispensers 10, 1010, and 2010 in a set period of time. In another example, groups may compete to maintain the highest average hydration level. These games may occur using beverage dispensers 10, 1010, and 2010 that are located remotely from each other through the use of communication network 210, thus allowing users in a group to compete even if they are not physically located in the same place. The results of these competitions may be displayed by beverage dispensers 10, 1010, and 2010 and/or on customer devices 202 in any desirable format, such as a "leader board" format. In some aspects, individual users may also compete against other individual users in the same manner described above.

In some aspects, users may be able to gift a beverage to other users. For example, users may be able to purchase a beverage using beverage dispensers 10, 1010, and 2010 and then transmit the beverage as a gift to another user using beverage dispensers 10, 1010, and 2010. The other user may receive a notification that they have a gifted beverage on customer device 202. The gifted beverage can then be redeemed for a beverage on any beverage dispenser 10, 1010, and 2010 regardless of the physical location of beverage dispenser 10, 1010, and 2010. In some aspects, a user can gift a beverage to another user solely through customer device 202, without needing to interact with beverage dispenser 10, 1010, and 2010. For example, a user could send a link to a QR code containing a gifted beverage to another user by email or text message. In some aspects, a user can gift a beverage to another user by purchasing the gift and then placing the gift on a machine readable item, such as a QR code. This allows the user to physically transfer the gift, for example by emailing or texting the QR code, without requiring the user receiving the gift to be connected to a network. This method of gifting beverages also allows gifted beverages to be given to groups of users at events, for example, as part of a promotion at a sporting event. In some aspects, gifted beverages may also be associated with an existing item. For example, a user may purchase a ticket to a sporting event that may also be used to receive a gifted beverage from beverage dispensers 10, 1010, and 2010.

In some aspects, a user account may also be associated with a rewards account. The rewards account may track user consumption of beverages and may provide rewards associated with the beverages. For example, after a certain number of beverages purchased, a user may receive a free beverage redeemable at beverage dispensers 10, 1010, and 2010. The rewards account may also give users exclusive or early access to exclusive beverage flavors or special beverage additives. In some aspects, the rewards account may be integrated with other applications or systems that track a user's physical health. For example, a user may integrate a calorie counting application with the rewards account, where they may receive rewards for accomplishing goals in the calorie counting application, such as only consuming a certain amount of calories in a set time period.

In some aspects, a separate item may be affiliated with beverage dispensers 10, 1010, and 2010. Examples of such items include sporting event tickets, airplane boarding pass, movie tickets, or consumer apparel. These items may include a machine readable item that can be scanned by beverage dispensers 10, 1010, and 2010 or customer device 202. For example, as discussed above, a sporting event ticket may include a scannable element that gives a user a free beverage.

In one embodiment, an airplane boarding pass may be scanned by the user at beverage dispensers 10, 1010, and 2010 located in an airport terminal to give a user access to special beverage flavors or additives. In embodiments, a user account associated with beverage dispensers 10, 1010, and 2010 may also be associated with an airline loyalty program. The item with the scannable element may also be add beverage credit to a user account when scanned. In some embodiments, users may purchase the item and then receive beverage credit equivalent to the purchase price of the item in their user account.

In some aspects, a user may invite other users to download an application on their customer device 202 that enables the users to interact with beverage dispensers 10, 1010, and 2010.

In some aspects, beverage dispensers 10, 1010, and 2010 may be configured to receive information from a machine readable item on a replacement part that is being used to repair or refill beverage dispensers 10, 1010, and 2010. For example, when beverage dispensers 10, 1010, and 2010 run out of a flavoring, a service technician will replace flavoring source 134 corresponding to that flavoring. During the replacement process, a machine readable item on the replacement flavoring source 134 may be scanned by beverage dispensers 10, 1010, and 2010, which will then verify that the empty flavoring source 134 is being replaced by a full flavoring source 134. This can make service and repair of beverage dispensers 10, 1010, and 2010 more efficient and reduce service errors by verifying that the replacement part is being used properly.

In some aspects, as discussed above beverage dispenser 10, 1010, or 2010 may be configured to monitor system status and report this status using network 210. System status may include, for example, the levels of various consumables in the system, such as gas tank 136, filters 154, additive sources 148, mineral sources 150, and flavoring sources 134. When these consumables need replacement, beverage dispenser 10, 1010, or 2010 may be configured to automatically send an alert to an operator. In some aspects, beverage dispenser 10, 1010, or 2010 may be configured to automatically order replacement consumables using network 210. System status may also include monitoring of the system for faults and reporting of faults to an operator using network 210. In some aspects, beverage dispenser 10, 1010, or 2010 are configured to automatically order service to remedy the fault using network 210.

Figure 20:
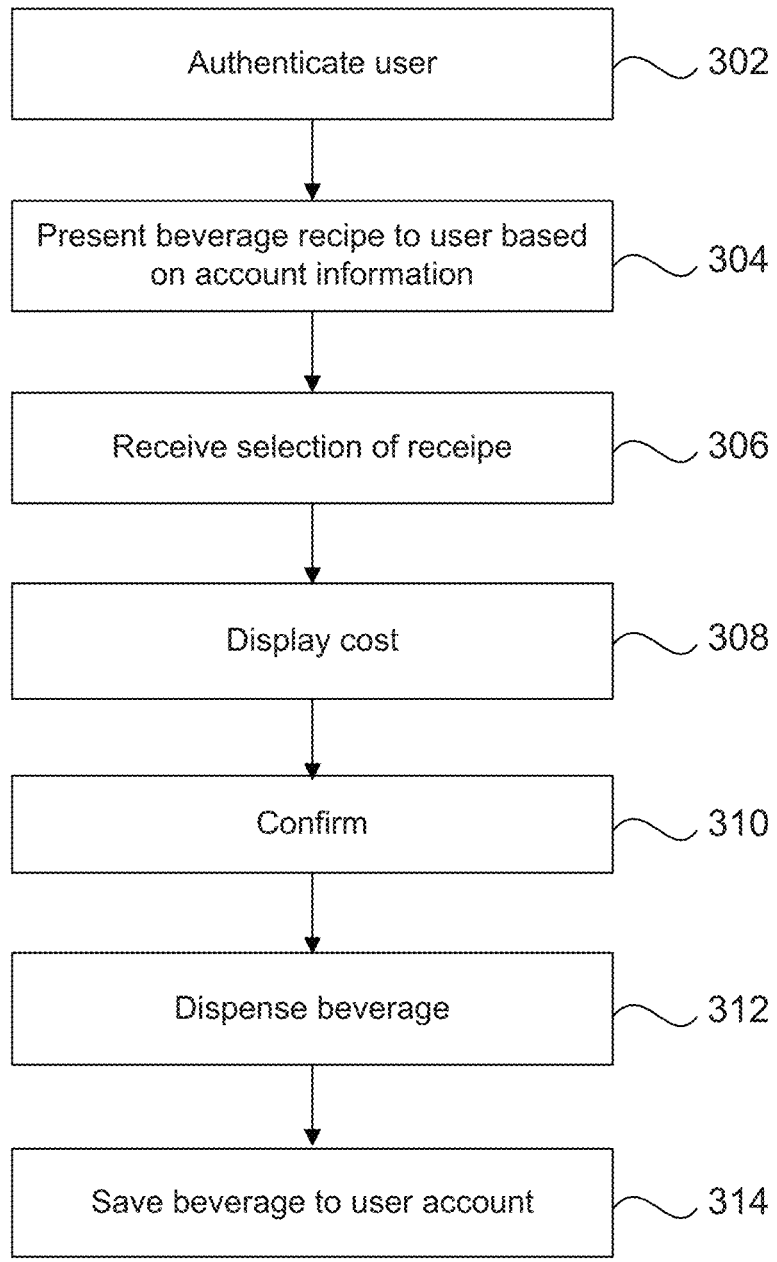
FIG. 20 is a process flow diagram of an example method for dispensing a beverage according to various aspects of the invention.
Figure 21:
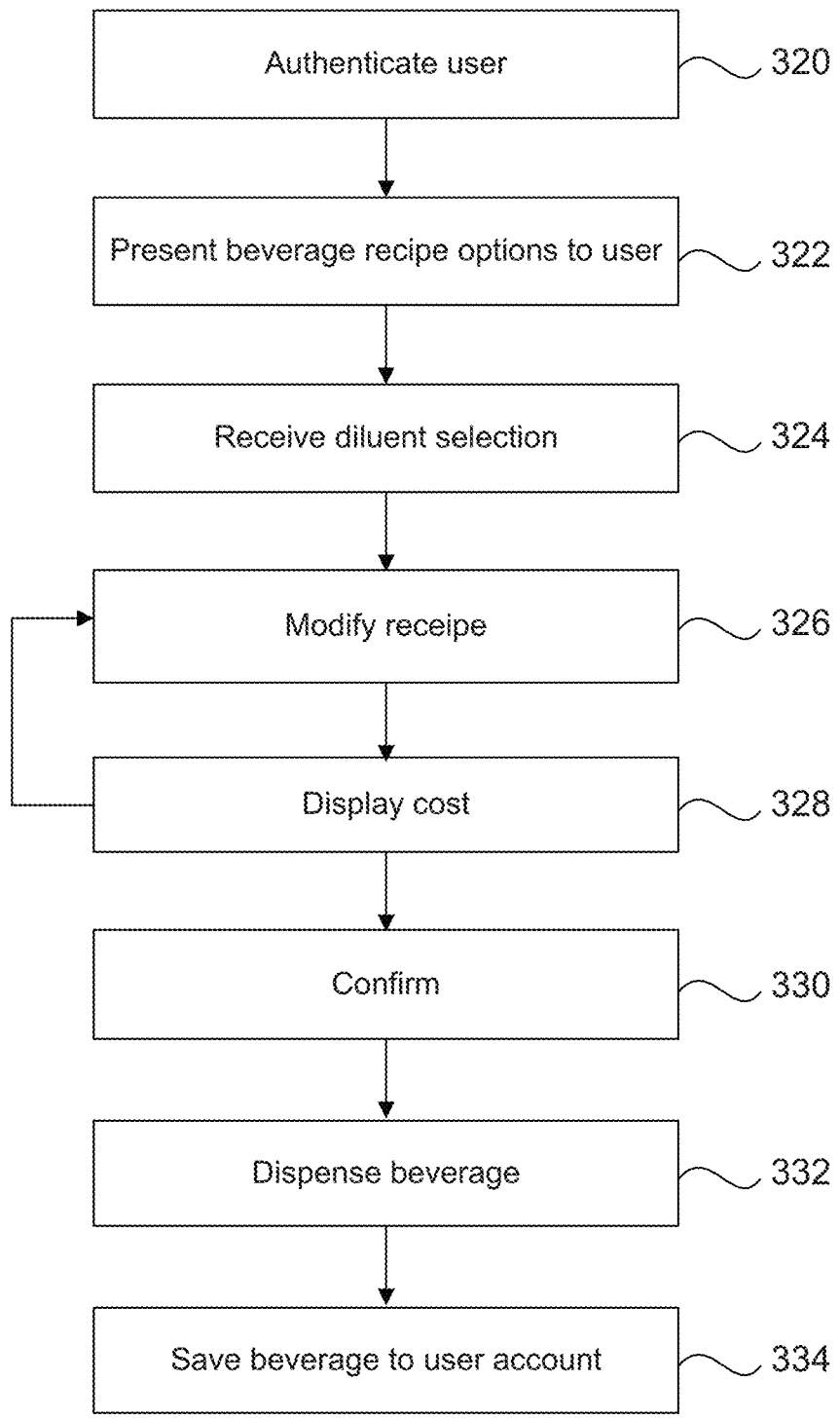
FIG. 21 is a process flow diagram of an example method for dispensing a beverage according to various aspects of the invention.
Figure 22:
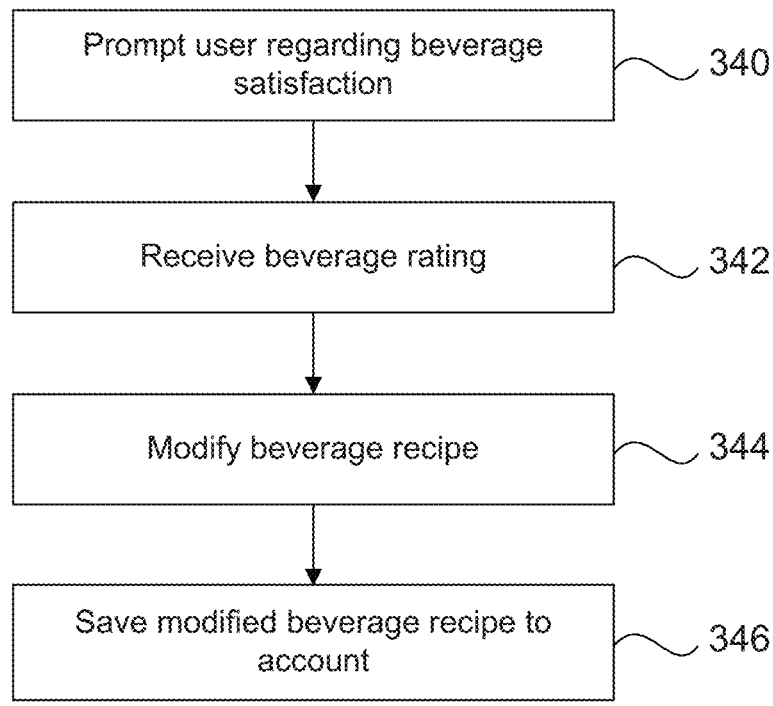
FIG. 22 is a process flow diagram of an example method for dispensing a beverage according to various aspects of the invention.
Figure 25:
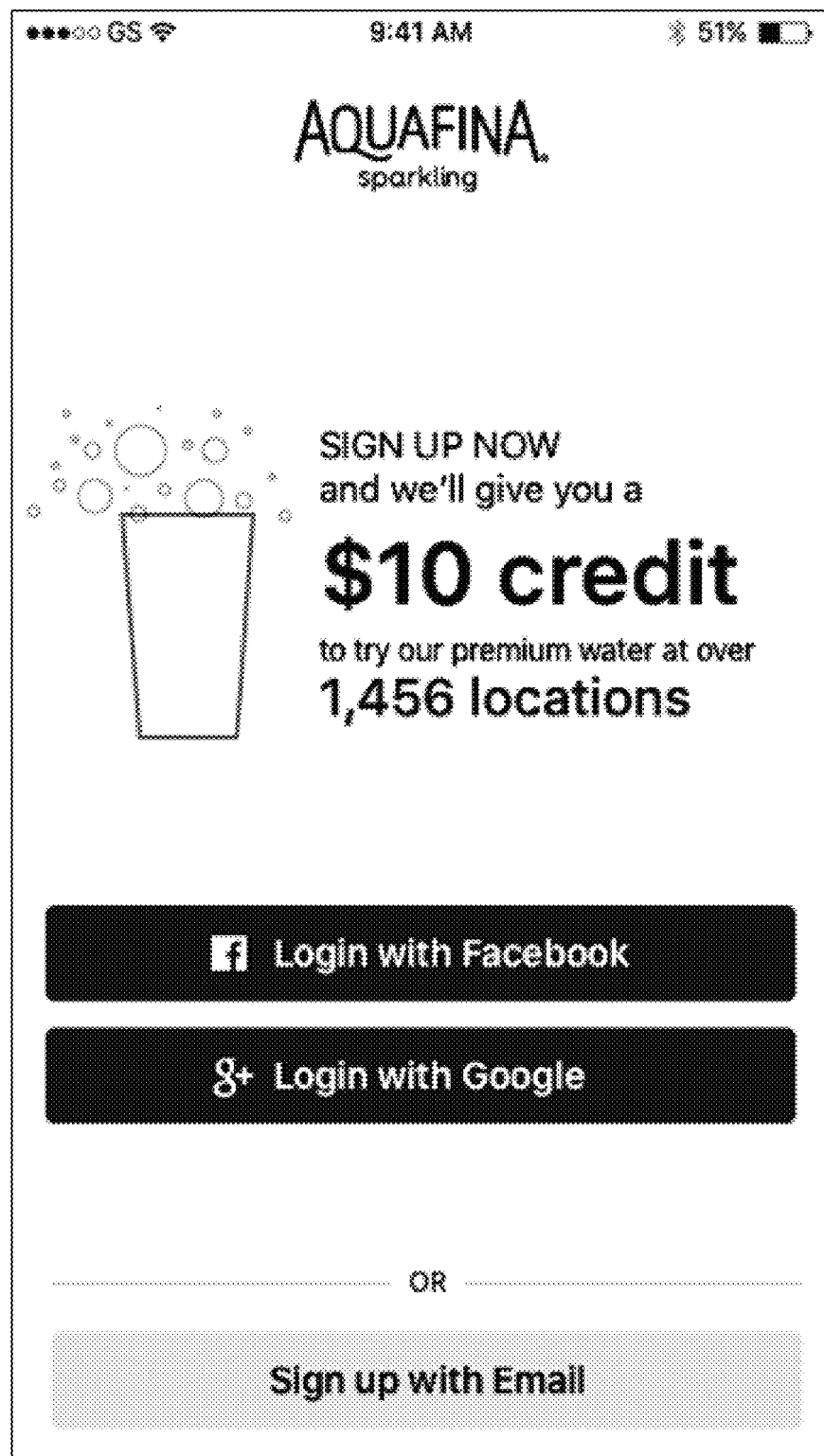
FIG. 25 is an exemplary graphical user interface in accordance with various aspects of the invention.
Figure 101:
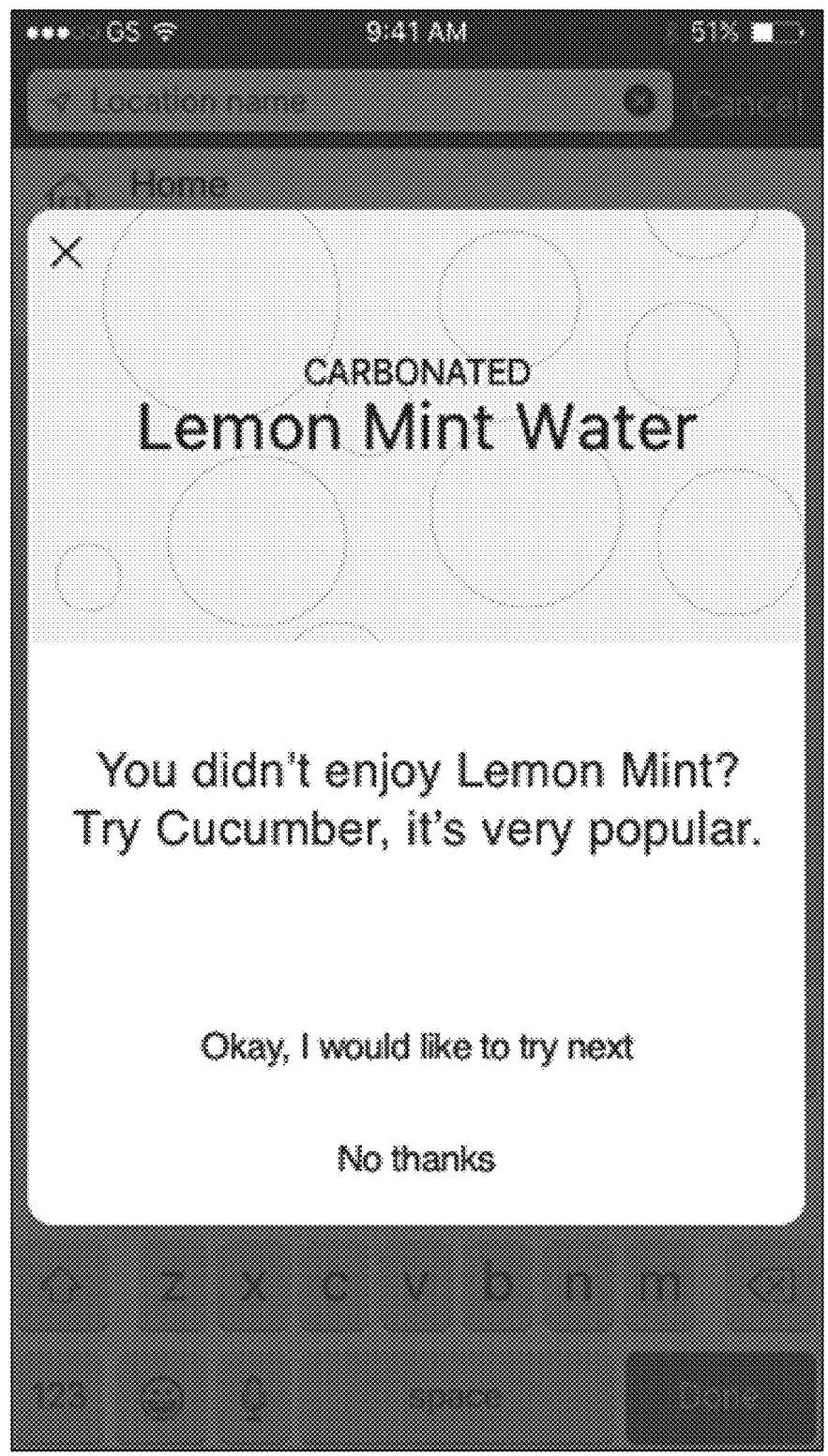
FIG. 101 is an exemplary graphical user interface in accordance with various aspects of the invention.

Using the various components of the beverage management system 200, beverage recipes and user account information can be managed. FIGS. 20-22 are flow charts illustrating various ways the components of beverage management system 200 can work together to create and dispense a desired beverage. The flow charts of FIG. 20-22 will be described with reference to FIG. 19, but it should be understood that this is for explanatory purposes only and that the principles outlined in FIGS. 20-22 are not so limited to the specific embodiment of FIG. 19. In addition, FIGS. 25-101 depict various user interface icons on customer devices 202 and/or beverage dispensers 204.

The manner in which a user engages the interface of the beverage dispensing system to select and/or dispense a beverage can vary. FIG. 20 illustrates an example method for dispensing an available product according to one aspect of the invention.

Figure 53:
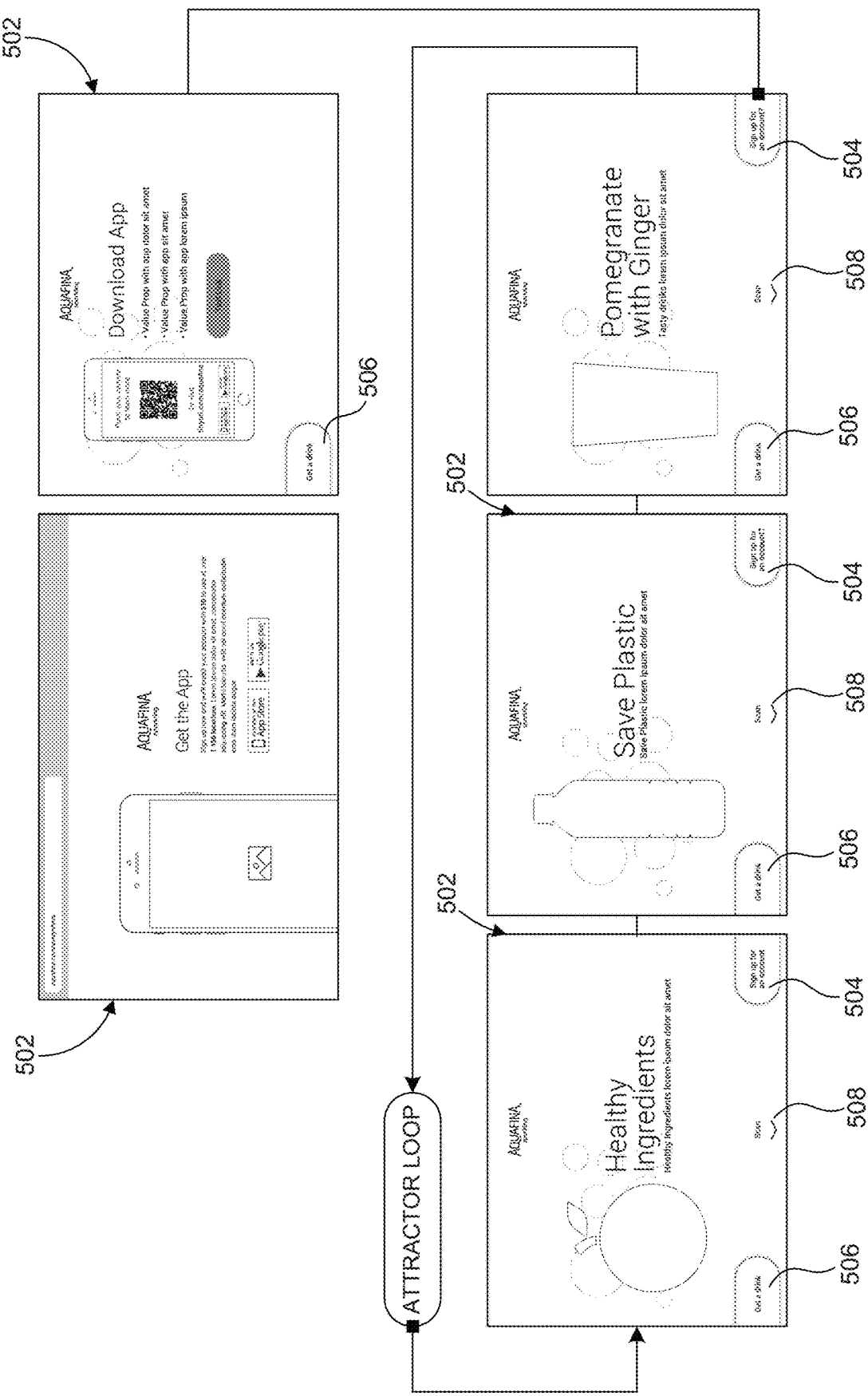
FIG. 53 is an exemplary graphical user interface in accordance with various aspects of the invention.

At step 302, a beverage dispenser, such as beverage dispenser 10, 1010, and/or 2010 can authenticate a user. This could include scanning a user's QR code, such as a QR code attached to a beverage container or displayed on a customer device 202. In an aspect, the beverage dispenser can authenticate a user as described in U.S. application Ser. No. 15/943,395, filed Apr. 2, 2018, which is incorporated herein by reference in its entirety. In aspects, proximity sensor 120 may include a camera that is configured to scan the QR code. In these aspects, user interface 500 is configured to display the view from the camera of proximity sensor 120 once the user brings the QR code in proximity to beverage dispenser 10, 1010, or 2010 to facilitate the scanning of the QR code. In this manner, in embodiments proximity sensor 120 may be configured to sense or display object at two different distances. As shown in FIG. 53, display screen 502 can display one or more screens to attract a user to the beverage dispenser. The attractor screens can display initial user input selections such as "Sign up for an account" icon 504 and "Get a drink" icon 506.

At step 304, the beverage dispenser can present beverage recipe options to the user based on user account information associated with the authenticated user. For example, the user account information can include a history of beverages ordered by the user, favorite beverage recipes, and promotional beverage recipes. In another aspect, the beverage dispenser can present beverage recipe options to the user based on user account information and other predictive factors. These predictive factors can include one or more of the location of the beverage dispenser, the time of day, user exercise history, outside weather, the amount of fluid consumed by the user during that day, the average amount of fluid consumed by a user during the day, the amount of calories consumed by the user during the day, user nutrient or electrolyte deficiencies, recorded user exercise, and recorded user sleep. For example, at step 304 the beverage dispenser can present the user's most frequently selected beverage recipe as the primary icon on display 502. If a user has a most frequently selected morning beverage recipe that is different from a most frequently selected afternoon beverage recipe, the beverage dispenser can present the user's most frequently selected morning beverage recipe as the primary icon on display 502 in the morning and the user's most frequently selected afternoon beverage recipe as the primary icon on display 502 in the afternoon. If the beverage dispenser receives information that the outside weather is hot, the beverage dispenser can present the user with a beverage recipe having a cold temperature.

At step 306, the beverage dispenser can receive a selection of the presented beverage recipe.

At step 308, the beverage dispenser can display the cost of the selected beverage on display 502. In an aspect, the cost can be displayed as a cost per ounce. In another aspect, the cost can be displayed as a cost for a fixed beverage volume.

At step 310, the beverage dispenser can receive confirmation that the user wishes to proceed with dispensing the beverage at the displayed cost. For example, a command to dispense the custom beverage may be received via input from the user to confirm the beverage selection. For example, a user may select user input selection 28 (e.g., a pour icon) to confirm the custom beverage.

At step 312, the interface can send electronic signals to the valves to cause the dispenser to dispense the custom beverage according to the selected recipe from step 306. A predetermined volume of the beverage may be dispensed or the beverage may be dispensed as long as the user activates a user input (e.g. a pour icon). The predetermined volume may correspond to a known volume of a vessel that may be stored in the user's account. In some embodiments, the use of a predetermined fill volume may enable the user to confirm dispensing of the beverage at step 310, and then wait while their container is automatically filled according to the predetermined volume. In some embodiments, beverage dispenser 10, 1010, or 2010 may also automatically determine whether one or more ingredients in the beverage will cause foaming, and take steps to ensure that the beverage is poured to the proper volume while minimizing overflow due to foaming. For example, beverage dispenser 10, 1010, or 2010 may determine that the selected beverage will foam because it includes a predetermined beverage ingredient that causes foaming, and will then fill the container in several stages with pauses between each stage to allow any foam to subside. In some other embodiments, beverage dispenser 10, 1010, or 2010 may include one or more sensors that can automatically detect the amount of beverage in the container and automatically fill the container without knowing the predetermined volume. These sensors may include, for example, optical sensors configured to visually detect the level of beverage in the container or audio sensors that can detect the sound of the beverage being poured and thus determine when the beverage is near the top of the container.

At step 314, the beverage dispenser can save the dispensed beverage to the user account. The updated user account information can be saved, for example, in data store element 208.

Although the example method of FIG. 20 shows a particular order of steps, the exact order of the above steps could change (e.g., step 308 could occur prior to step 306), and the dispenser could receive additional input from the user before, after, and in between particular steps of the above example method. The order of the steps and/or what input is received during the course of a user's interaction with a dispenser may be dependent on the organization of the user interface.

In an aspect, the example method of FIG. 20 can be streamlined for minimal user interaction. For example, step 310 "confirm beverage" could occur immediately after step 302 "authenticate user." For example, a user could enable a setting on their user account to allow the beverage dispenser to dispense a favorite or pre-selected beverage without requiring the user to select the custom beverage recipe.

In an aspect, the example method of FIG. 20 can be streamlined for minimal user interaction. For example, step 312 "dispense beverage" could occur immediately after step 302 "authenticate user." For example, a user could enable a setting on their user account to allow the beverage dispenser to dispense a favorite or pre-selected beverage without requiring the user to select the custom beverage recipe or confirm the custom beverage recipe. In this aspect, after authentication the beverage dispenser could begin dispensing the beverage once it recognizes the user's beverage container is positioned below nozzle 170, for example, using a sensor. In another aspect, after authentication the beverage dispenser could begin dispensing a beverage after a fixed amount of time, such as five seconds, to allow a user to position their beverage dispenser below nozzle 170.

The manner in which a user engages the interface of the beverage dispensing system to select and/or dispense a beverage can vary. FIG. 22 illustrates an example method for modifying a customized beverage recipe after dispensing a beverage.

At step 340, a beverage dispenser, such as beverage dispenser 10, 1010, and/or 2010 can authenticate a user. This could include scanning a user's QR code, such as a QR code attached to a beverage container or displayed on a customer device 202. In an aspect, the beverage dispenser can authenticate a user as described in U.S. application Ser. No. 15/943,395, filed Apr. 2, 2018, which is incorporated herein by reference in its entirety.

At step 322, the beverage dispenser can present beverage recipe options to the user based on user account information associated with the authenticated user. For example, the user account information can include a history of beverages ordered by the user, favorite beverage recipes, and promotional beverage recipes. In another aspect, the beverage dispenser can present beverage recipe options to the user based on user account information and other predictive factors. These predictive factors can include one or more of the location of the beverage dispenser, the time of day, user exercise history, outside weather, the amount of fluid consumed by the user during that day, the average amount of fluid consumed by a user during the day, the amount of calories consumed by the user during the day, user nutrient or electrolyte deficiencies, recorded user exercise, and recorded user sleep. For example, at step 322 the beverage dispenser can present the user's most frequently selected beverage recipe as the primary icon on display 502. These recipes may be known as "soft favorites" because they are "favorite" recipes that are selected by the system based on, for example, frequency of purchase of the beverage. If a user has a most frequently selected morning beverage recipe that is different from a most frequently selected afternoon beverage recipe, the beverage dispenser can present the user's most frequently selected morning beverage recipe as the primary icon on display 502 in the morning and the user's most frequently selected afternoon beverage recipe as the primary icon on display 502 in the afternoon. If the beverage dispenser receives information that the outside weather is hot, the beverage dispenser can present the user with a beverage recipe having a cold temperature.

At step 324, the beverage dispenser can receive a diluent selection for a new custom recipe. For example, the beverage dispenser can receive a diluent selection of still water or sparkling water.

At step 326, a selection of one or more custom ingredients to a beverage may be received via input from the user. Custom ingredients can include, for example, one or more of still water at ambient temperature; cooled still water; heated still water; sparkling water at ambient temperature; cooled sparkling water; heated sparkling water; flavorings such as: branded beverage concentrate, plum, blueberry, mango, cherry, grape, kiwi, strawberry, lemon, lime, passion fruit, apple, melon, tangerine, raspberry, orange, pomegranate, pineapple, coconut, grapefruit, acai, watermelon, peach, or any combination thereof. Additionally, the flavorings can include herbs and spices or vegetables such as: mint, black tea, green tea, red tea, white tea, celery, chamomile, hibiscus, lavender, carrot, cucumber, verba mate, coca extract, ginger, chlorophyll, aloe, cinnamon, ginseng, or any combination thereof. In an aspect, one or more of the flavorings can include fresh ingredients that do not contain preservatives. Additionally, the ingredients can include minerals such as boron, phosphorus, titanium, chromium, manganese, iron, cobalt, nickel, copper, zinc, molybdenum, cadmium, aluminum. In an aspect, the mineral ingredients can simulate a taste profile of mineral water from a specific region. For example, the mineral ingredients can simulate a taste profile of water from the German Alps, the Italian Alps, or the French Alps. The ingredients can also include additives such as vitamins, electrolytes, energy, calm, protein, fiber, vitamins, antioxidants, sweeteners and other functional ingredients such as: calcium, sodium, potassium, bicarbonate, magnesium, caffeine, fiber, protein, taurine, ribose, omega 3, or any combination thereof.

Figure 57:
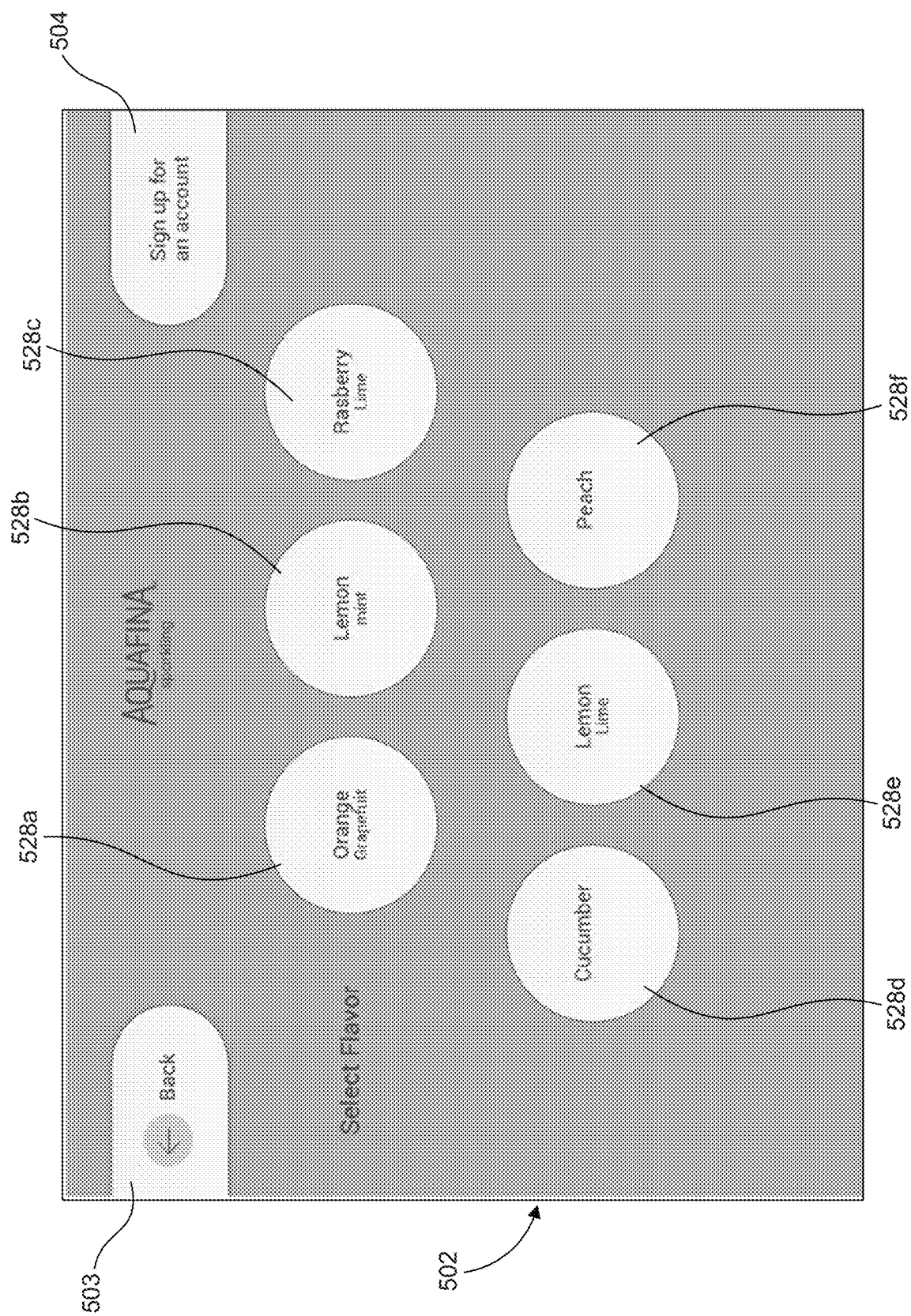
FIG. 57 is an exemplary graphical user interface in accordance with various aspects of the invention.
Figure 58:
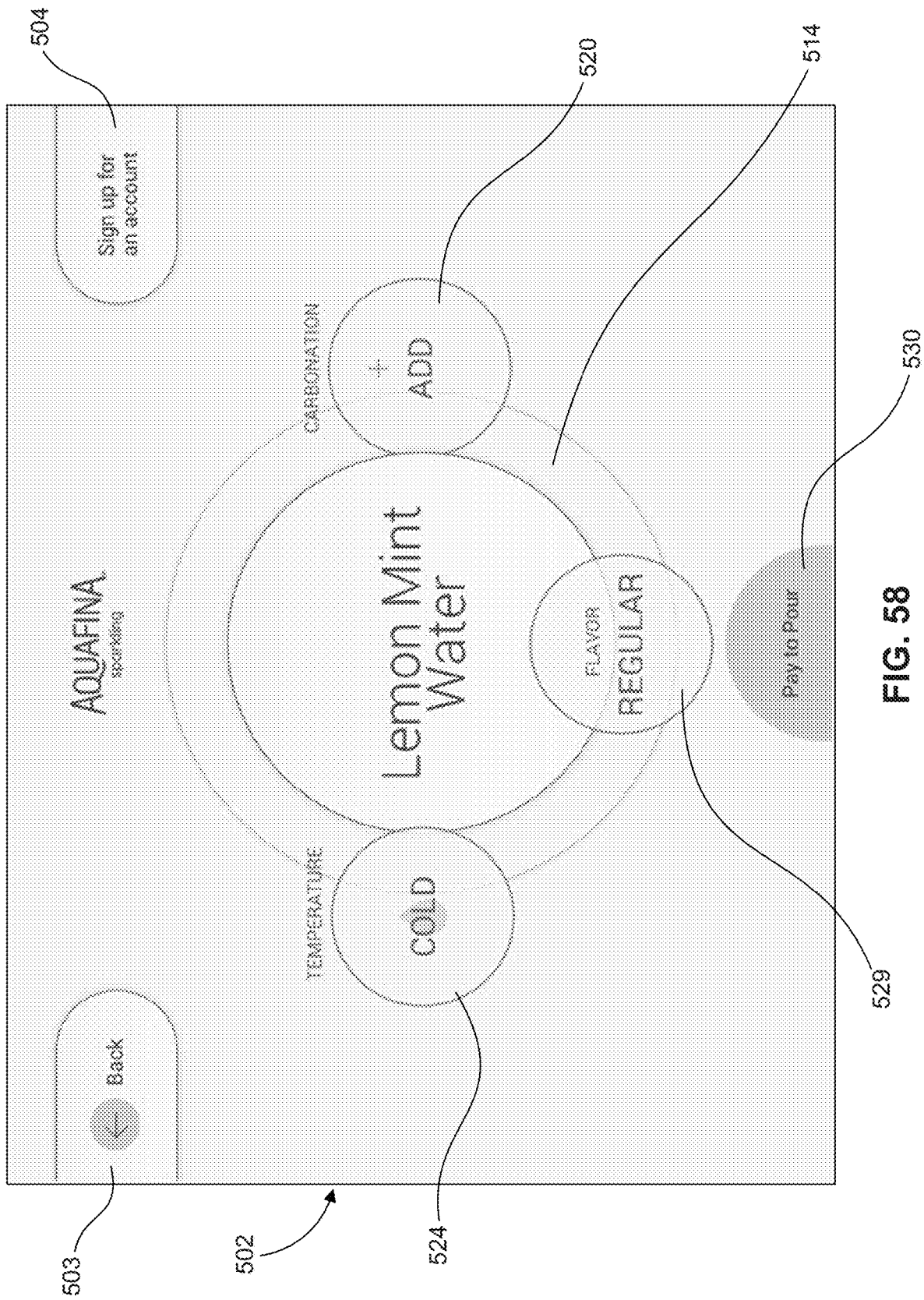
FIG. 58 is an exemplary graphical user interface in accordance with various aspects of the invention.

In an aspect shown in FIG. 57, a user may select flavoring by pressing one or more of user input selections 528. A user can select orange grapefruit flavoring by selecting user input selection 528a, a user can select lemon mint flavoring by selecting user input selection 528b, a user can select raspberry lime flavoring by selecting user input selection 528c, a user can select cucumber flavoring by selecting user input selection 528d, a user can select lemon lime flavoring by selecting user input selection 528e, a user can select peach flavoring by selecting 528f. In response to a selection, the interface can highlight the selected icon to indicate the selected flavoring to be added. After selecting the flavoring, the user may select the intensity of the flavoring. For example, a user can select user input selection 528aa for light flavoring, user input selection 528bb for regular flavoring, or user input selection 528cc for strong flavoring. When a user selects light flavoring, beverage dispenser dispenses less flavoring concentrate than when the user selects regular flavoring. When a user selects strong flavoring, beverage dispenser dispenses more flavoring concentrate than when the user selects regular flavoring.

Figure 88:
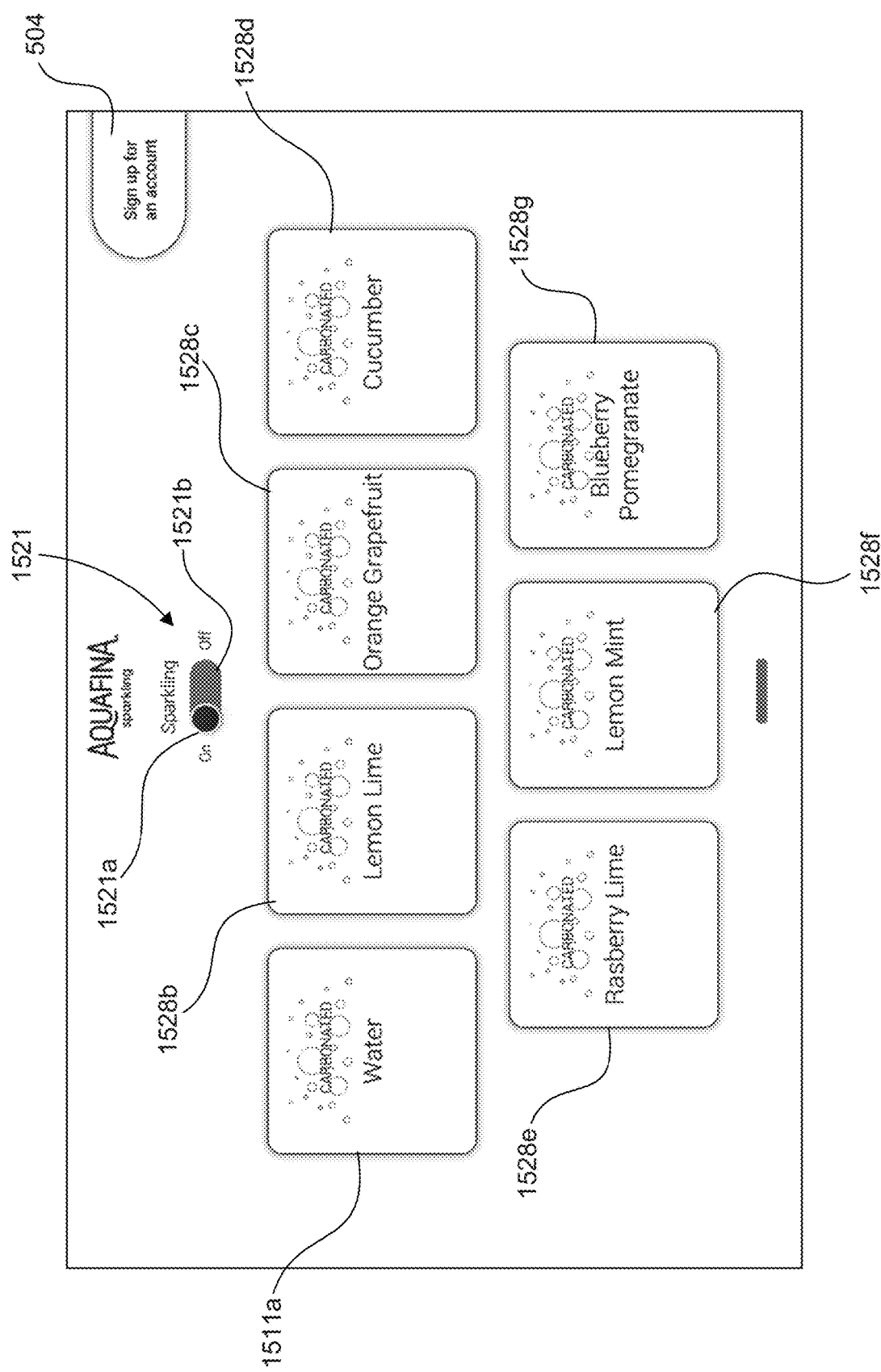
FIG. 88 is an exemplary graphical user interface in accordance with various aspects of the invention.
Figure 89:
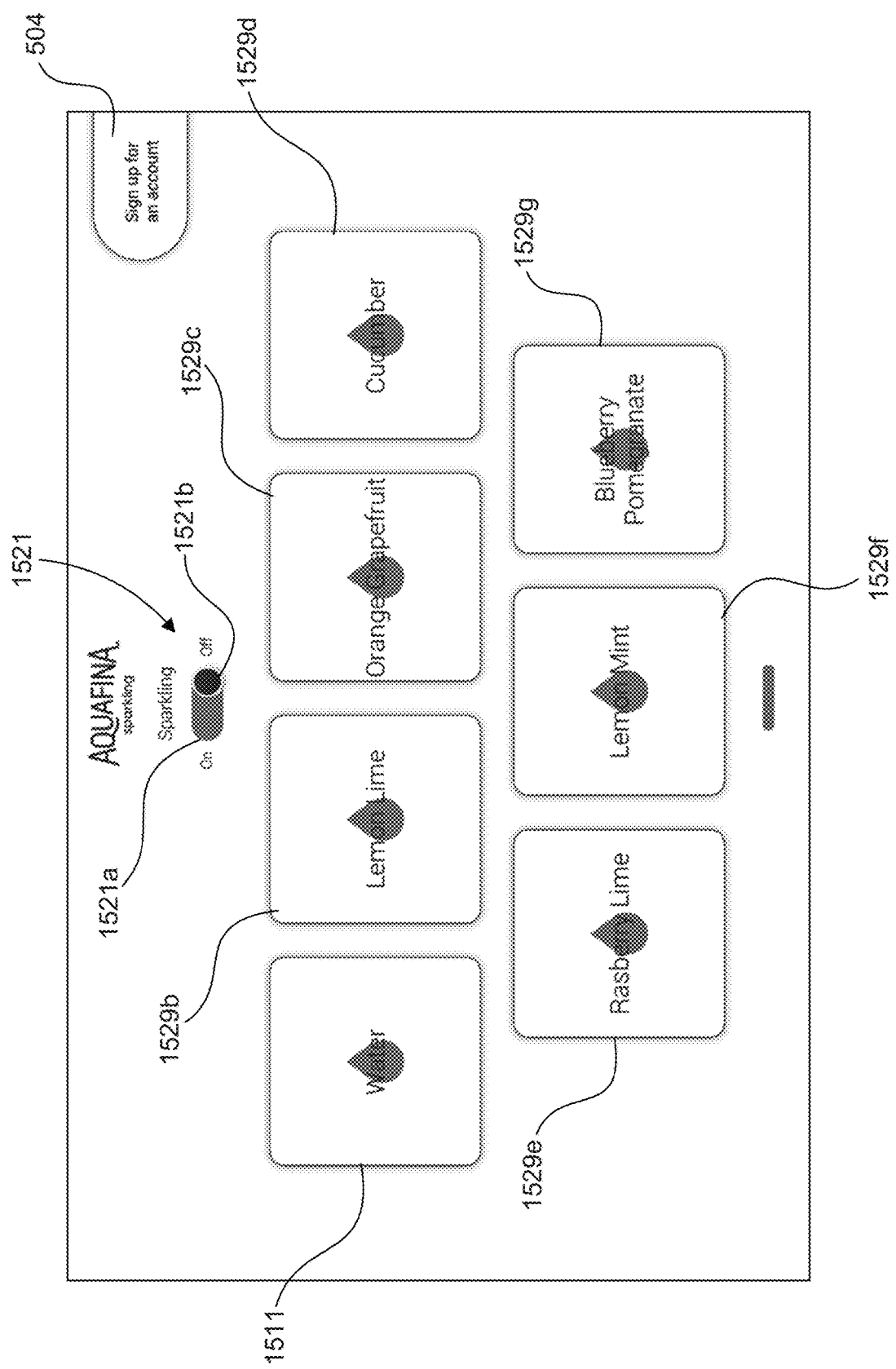
FIG. 89 is an exemplary graphical user interface in accordance with various aspects of the invention.
Figure 90:
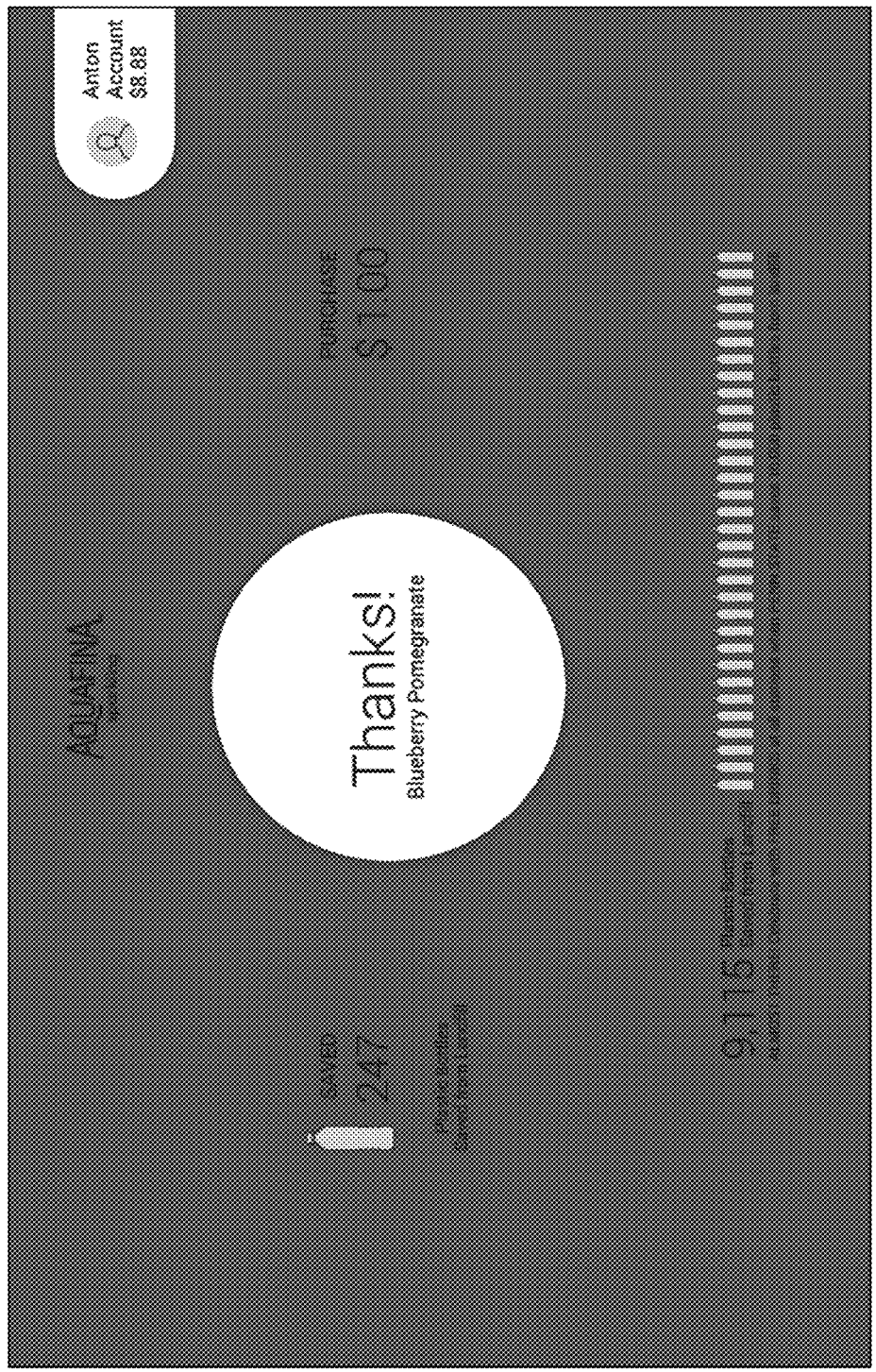
FIG. 90 is an exemplary graphical user interface in accordance with various aspects of the invention.
Figure 91:
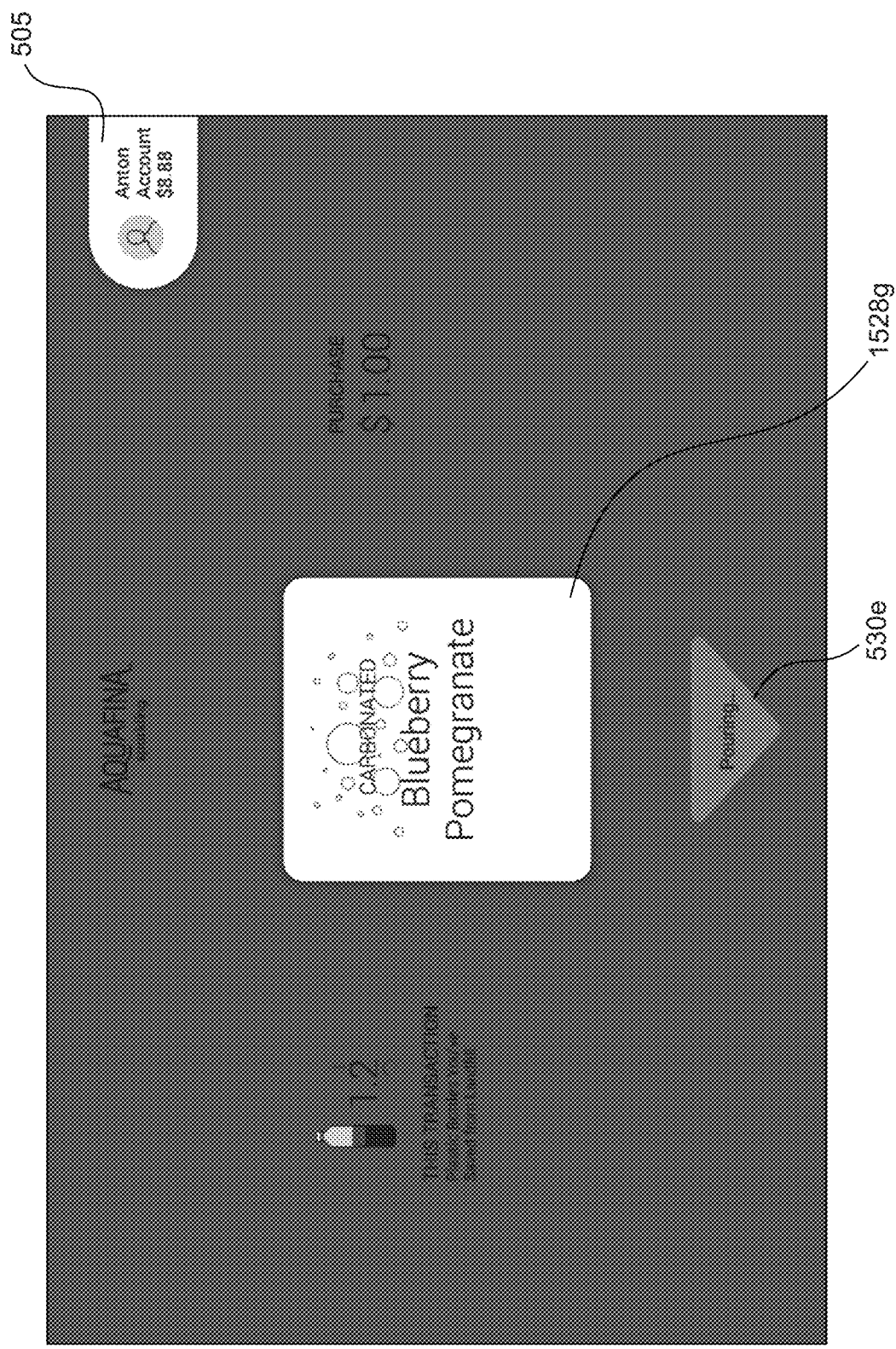
FIG. 91 is an exemplary graphical user interface in accordance with various aspects of the invention.
Figure 92:
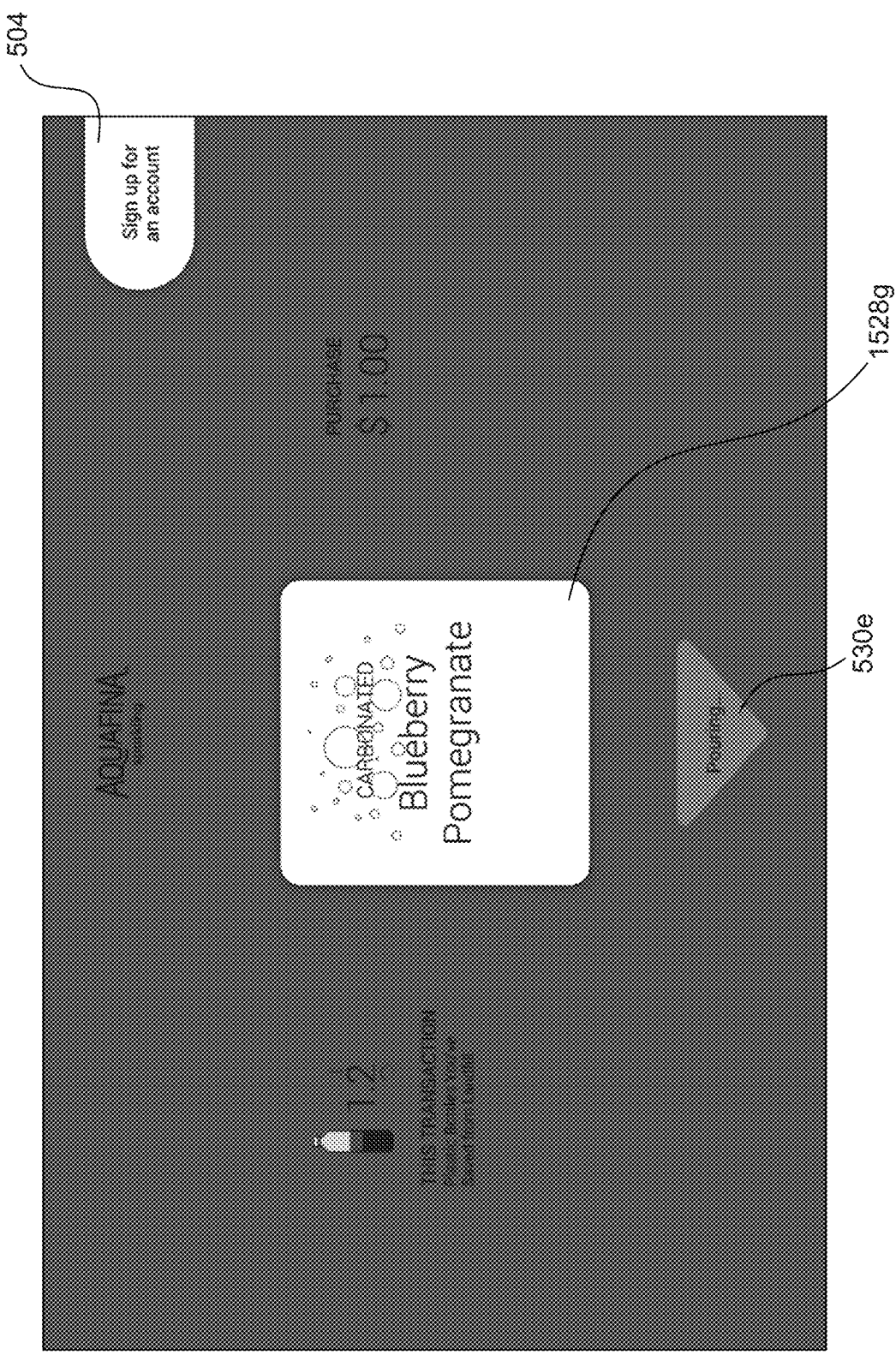
FIG. 92 is an exemplary graphical user interface in accordance with various aspects of the invention.
Figure 93:
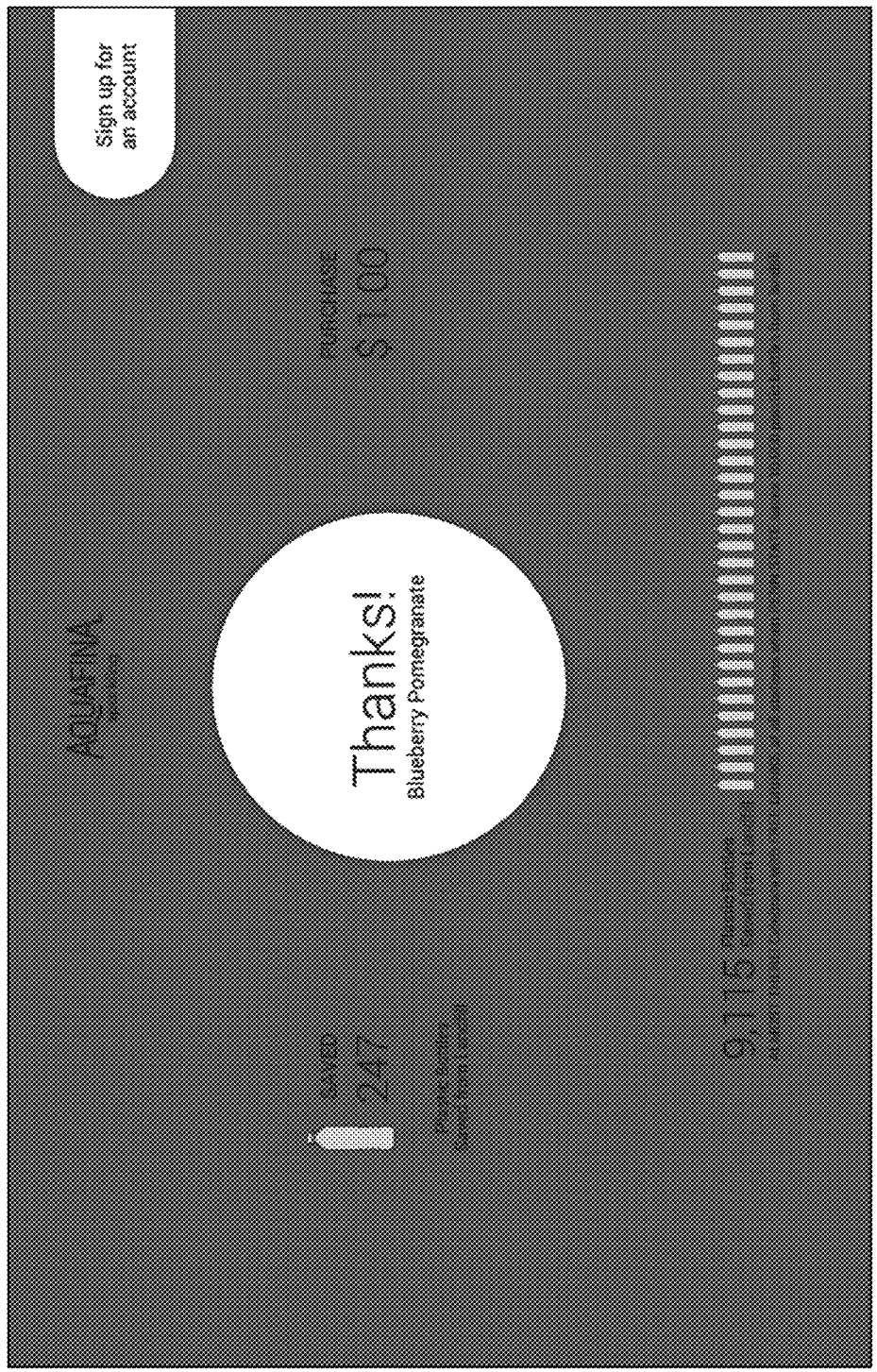
FIG. 93 is an exemplary graphical user interface in accordance with various aspects of the invention.
Figure 94:
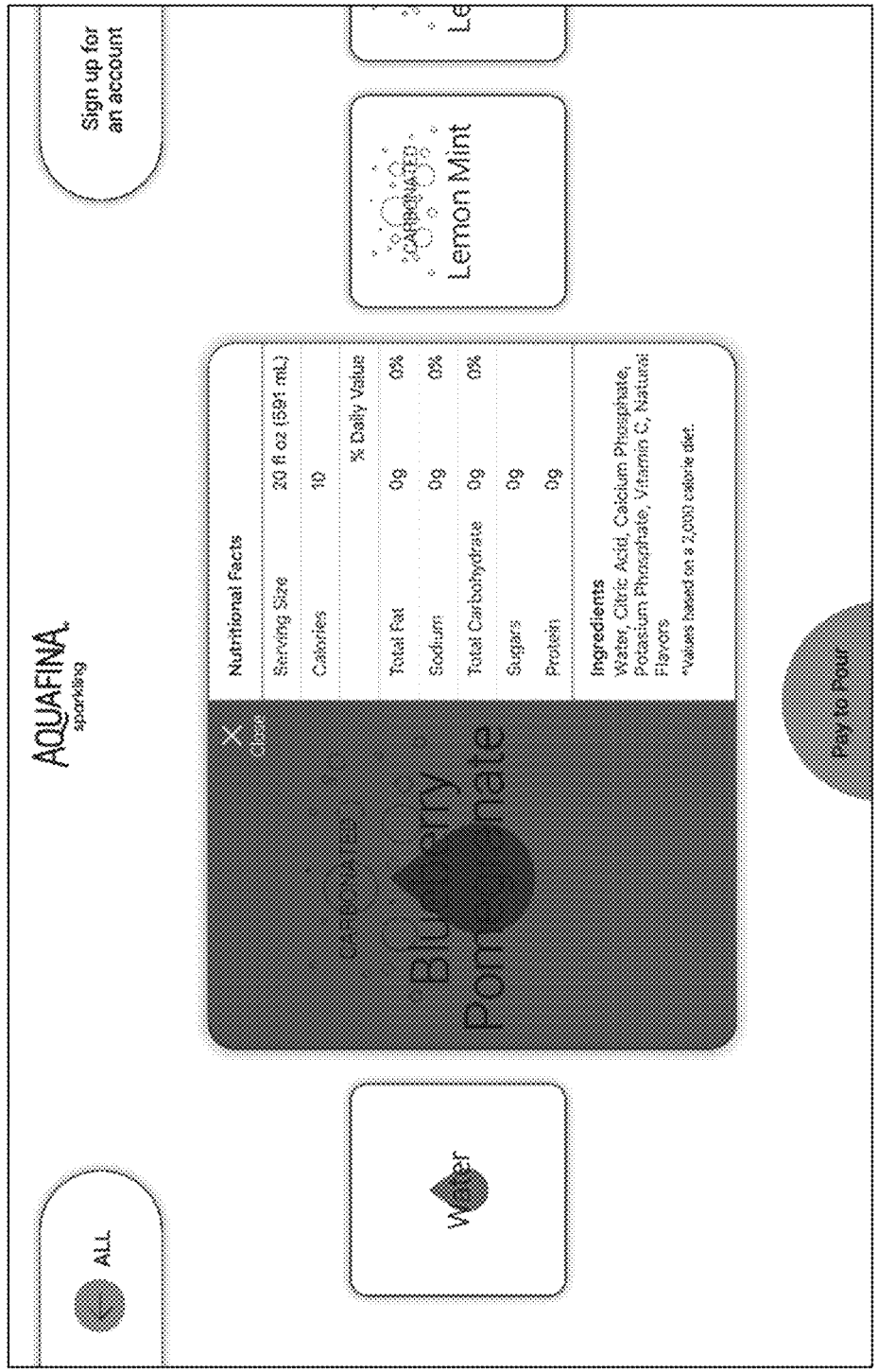
FIG. 94 is an exemplary graphical user interface in accordance with various aspects of the invention.
Figure 95:
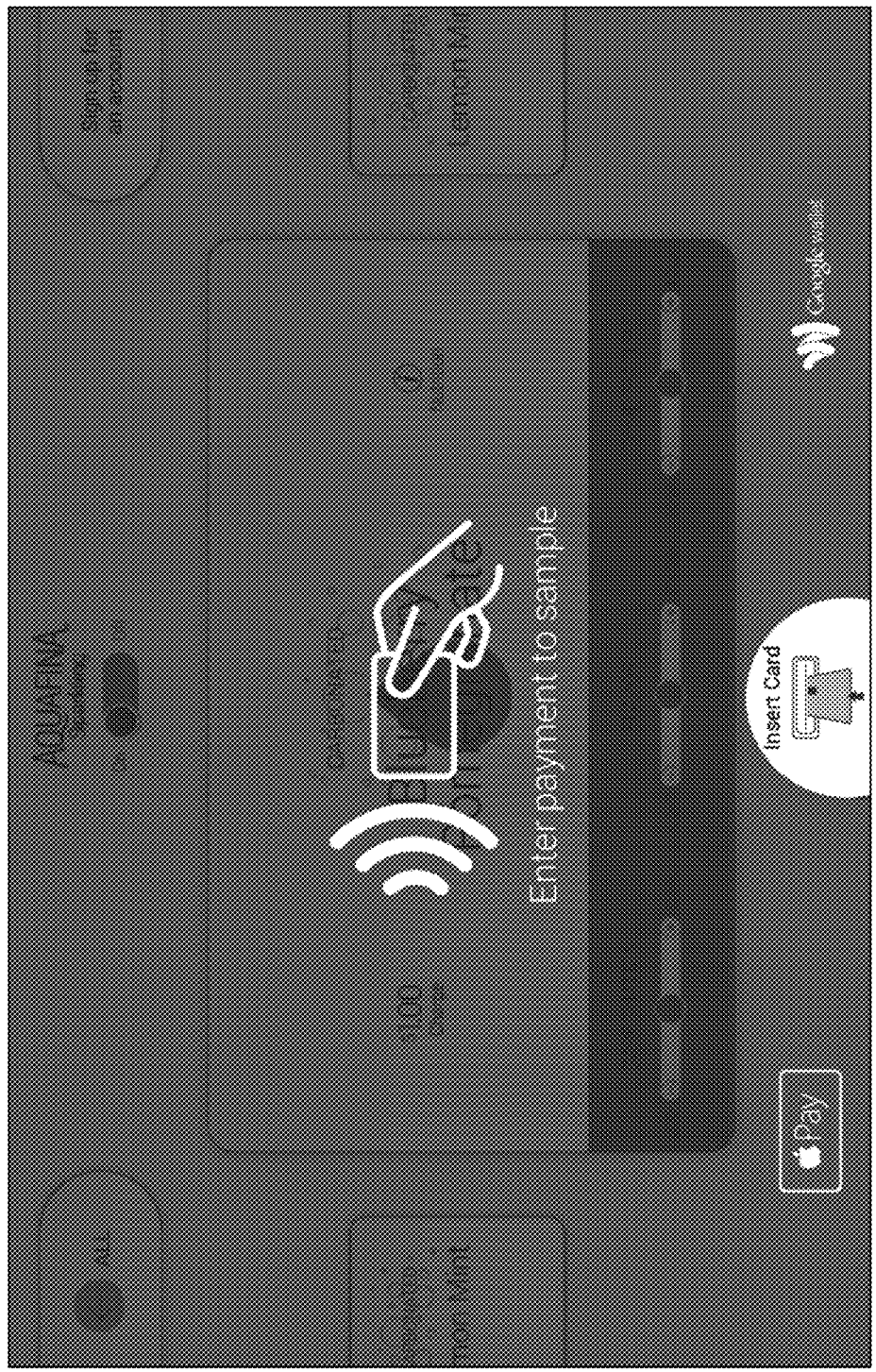
FIG. 95 is an exemplary graphical user interface in accordance with various aspects of the invention.
Figure 96:
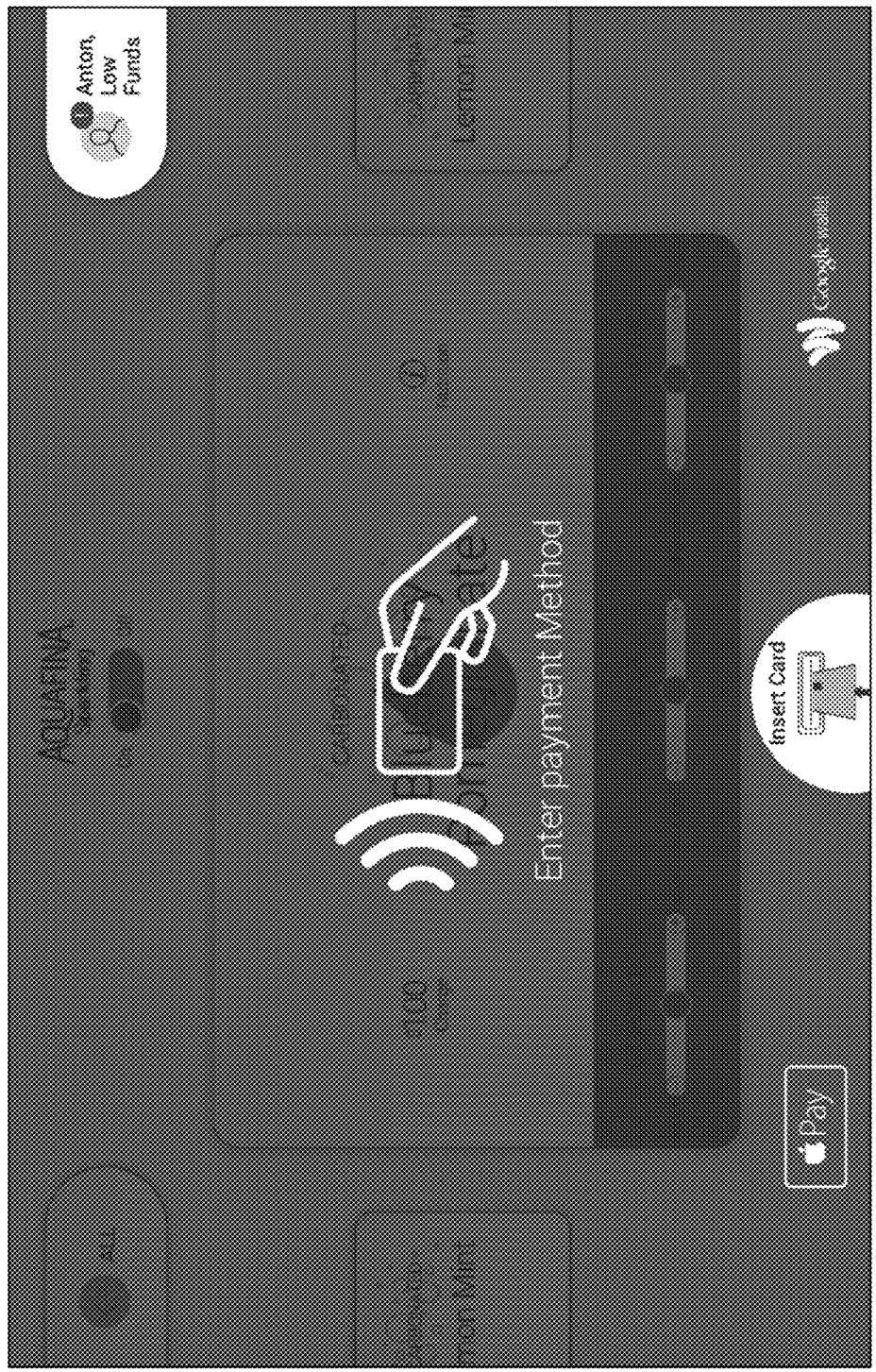
FIG. 96 is an exemplary graphical user interface in accordance with various aspects of the invention.
Figure 97:
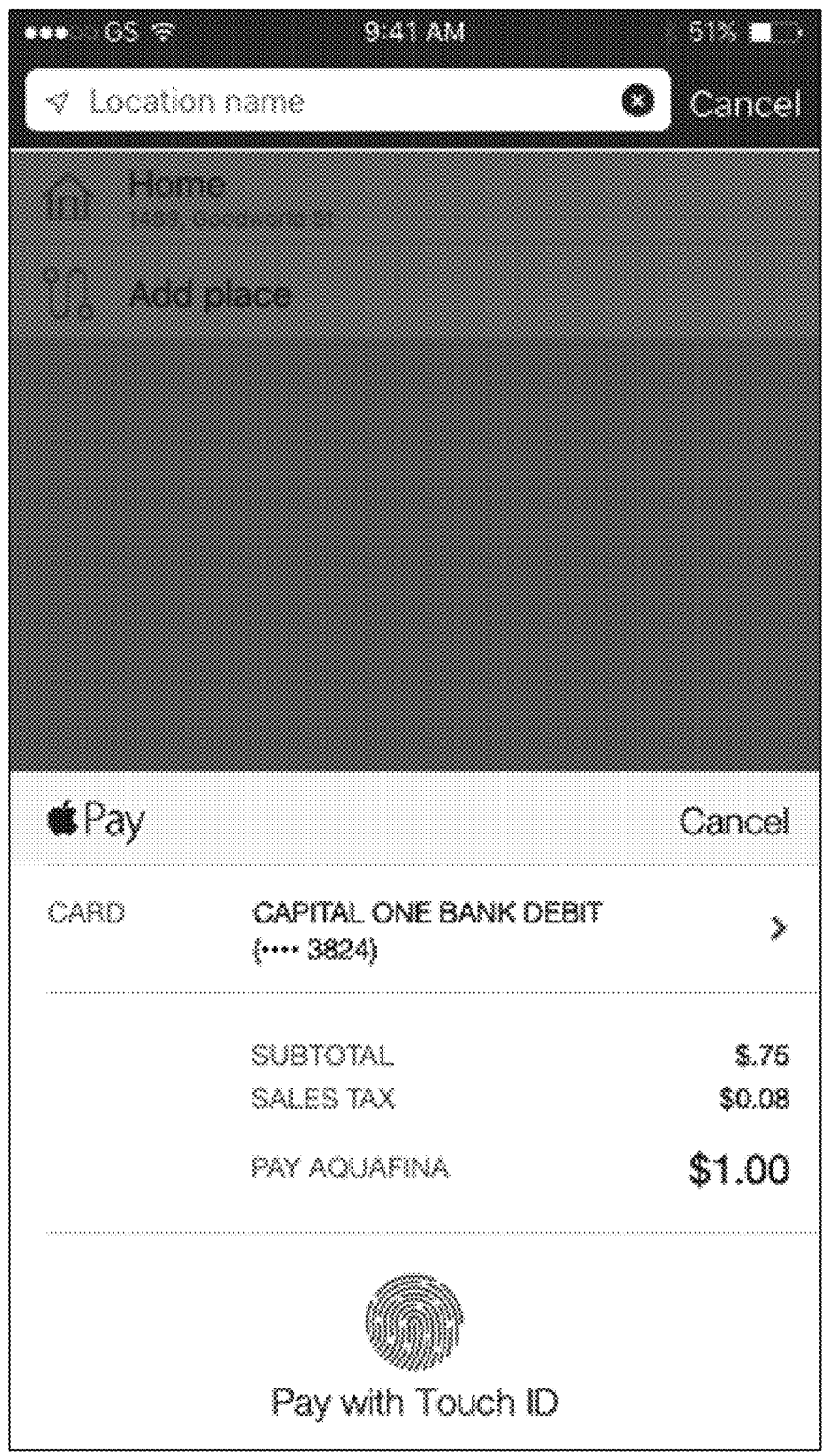
FIG. 97 is an exemplary graphical user interface in accordance with various aspects of the invention.
Figure 98:
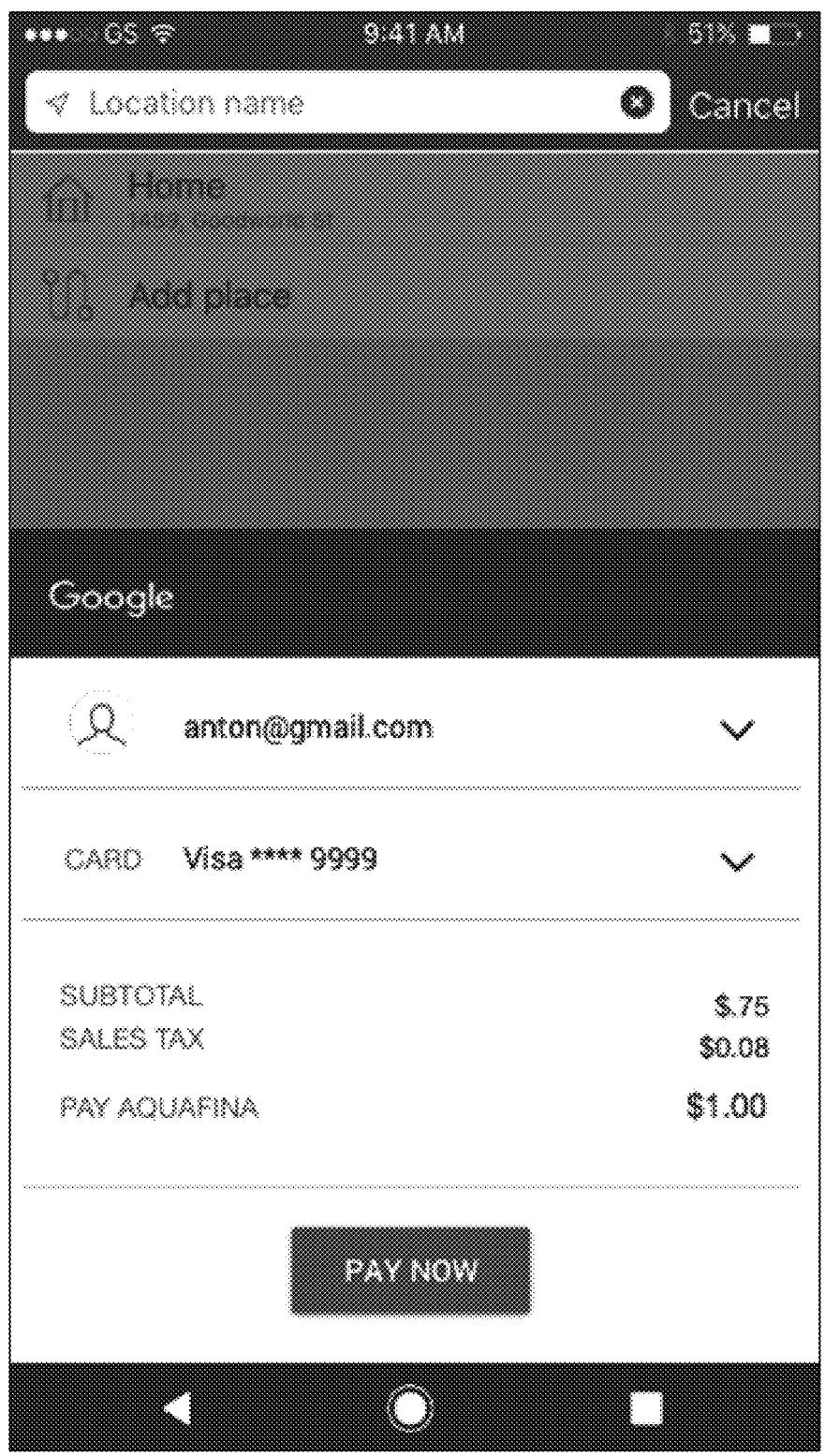
FIG. 98 is an exemplary graphical user interface in accordance with various aspects of the invention.
Figure 99:
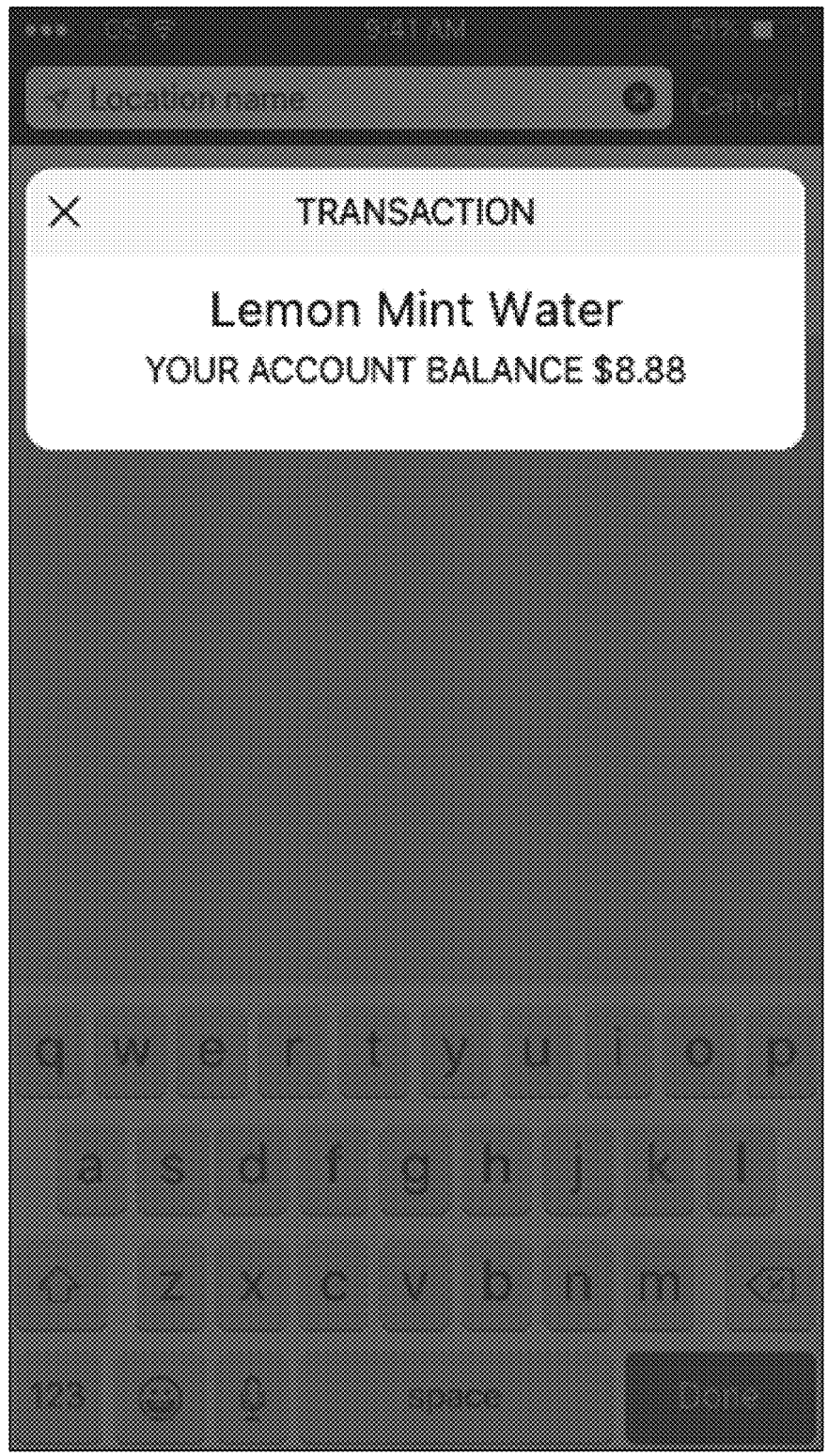
FIG. 99 is an exemplary graphical user interface in accordance with various aspects of the invention.
Figure 100:
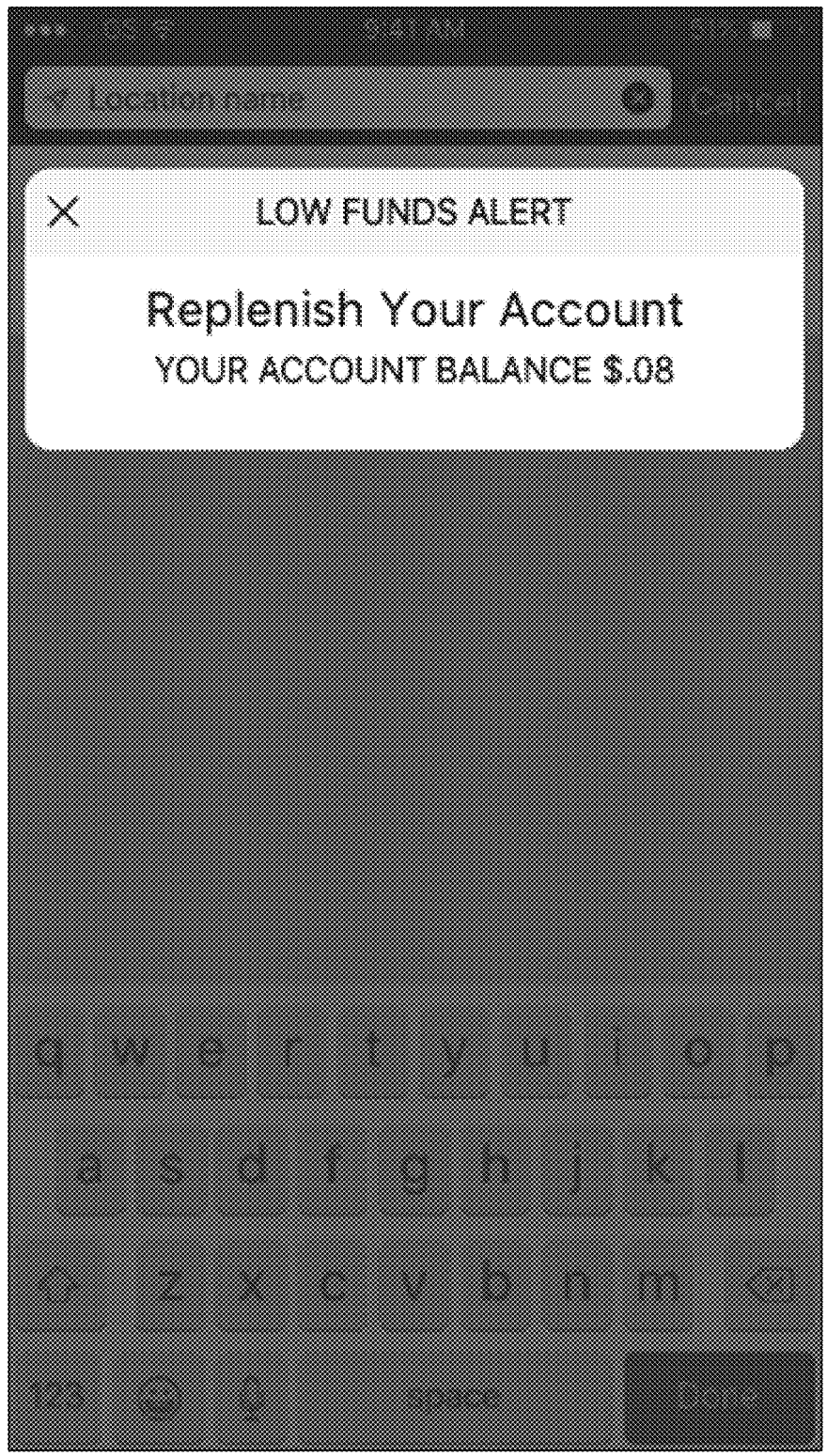
FIG. 100 is an exemplary graphical user interface in accordance with various aspects of the invention.

In an aspect shown in FIGS. 88-89, a user may select flavoring by pressing one or more of user input selections 1528. A user can select user input selection 1511a "carbonated water", user input selection 1528b "carbonated lemon lime," user input selection 1528c "carbonated orange grapefruit," user input selection 1528d "carbonated cucumber," user input selection 1528e "carbonated raspberry lime," user input selection 1528f "carbonated lemon mint," and user input selection 1528g "carbonated blueberry pomegranate." A user can select user input selection 1511 "water", user input selection 1529b "lemon lime," user input selection 1529c "orange grapefruit," user input selection 1529d "cucumber," user input selection 1529e "raspberry lime," user input selection 1529f "lemon mint," and user input selection 1529g "blueberry pomegranate." In response to a selection, the beverage dispenser 204 can highlight the selected icon to indicate the selected flavoring to be added.

Figure 59:
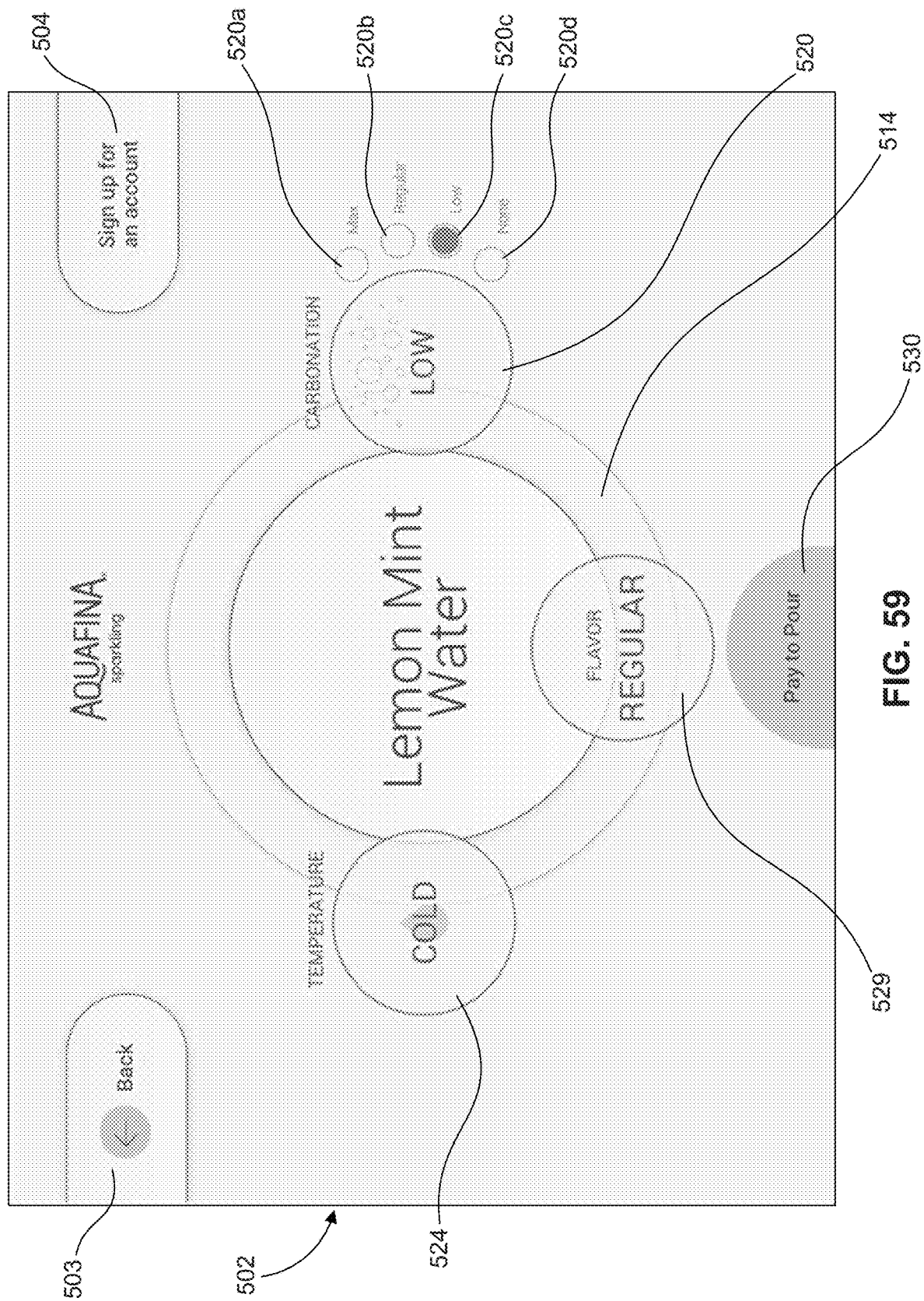
FIG. 59 is an exemplary graphical user interface in accordance with various aspects of the invention.

In an aspect shown in FIG. 59, a user can select the amount of carbonation by pressing one of user input selections 520. A user can select no carbonation by selecting user input selection 520d, a user can select low carbonation by selecting user input selection 520c, a user can select regular carbonation by selecting user input selection 520*b*, and a user can select maximum carbonation by selecting user input selection 520*a*.

Figure 82:
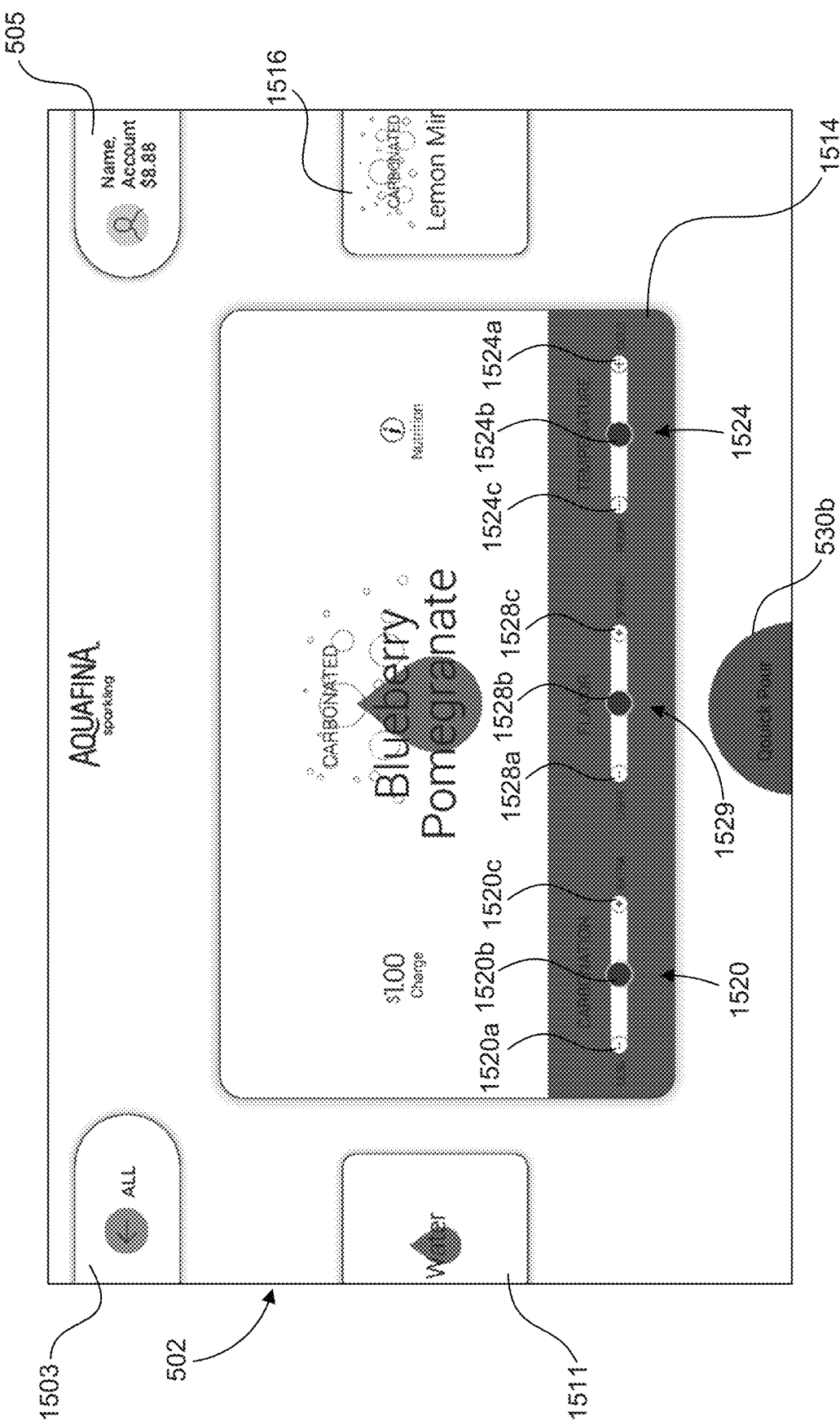
FIG. 82 is an exemplary graphical user interface in accordance with various aspects of the invention.

In an aspect shown in FIG. 82, a user can select the amount of carbonation by pressing one of user input selections 1520. A user can select no carbonation by selecting user input selection 1520*d*, a user can select low carbonation by selecting user input selection 1520*c*, a user can select regular carbonation by selecting user input selection 1520*b*, and a user can select maximum carbonation by selecting user input selection 1520*a*.

Figure 67:
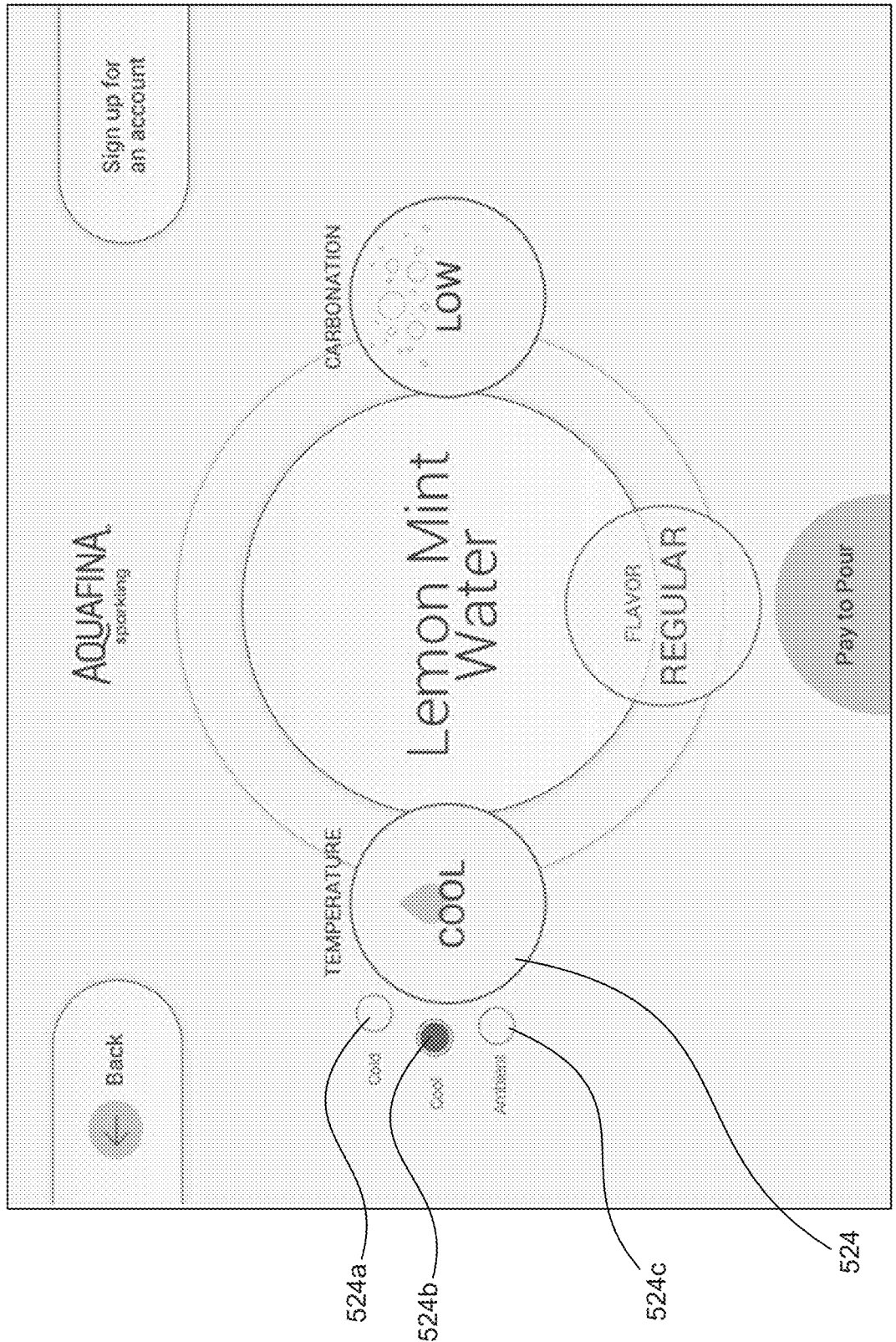
FIG. 67 is an exemplary graphical user interface in accordance with various aspects of the invention.
Figure 68:
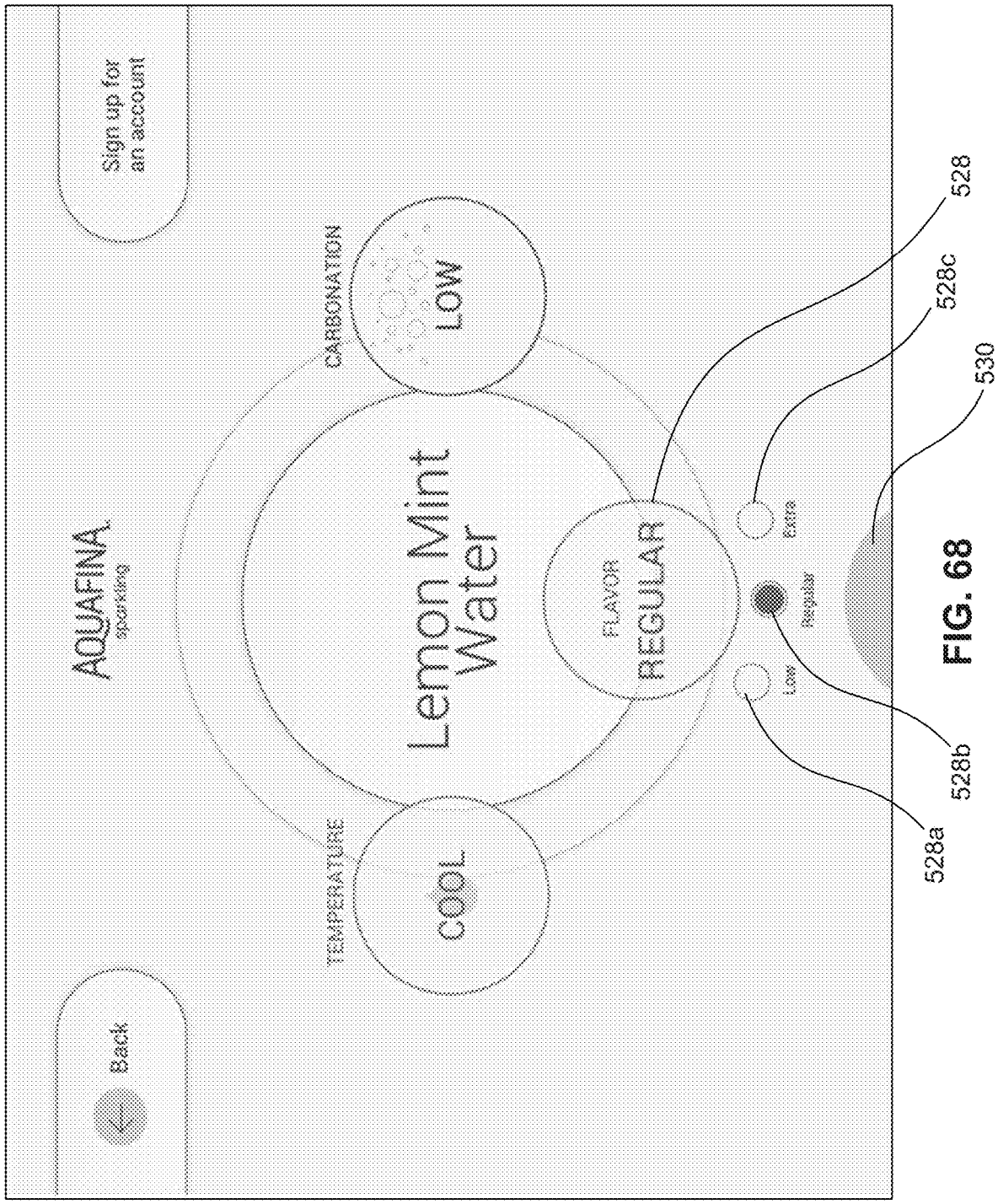
FIG. 68 is an exemplary graphical user interface in accordance with various aspects of the invention.
Figure 69:
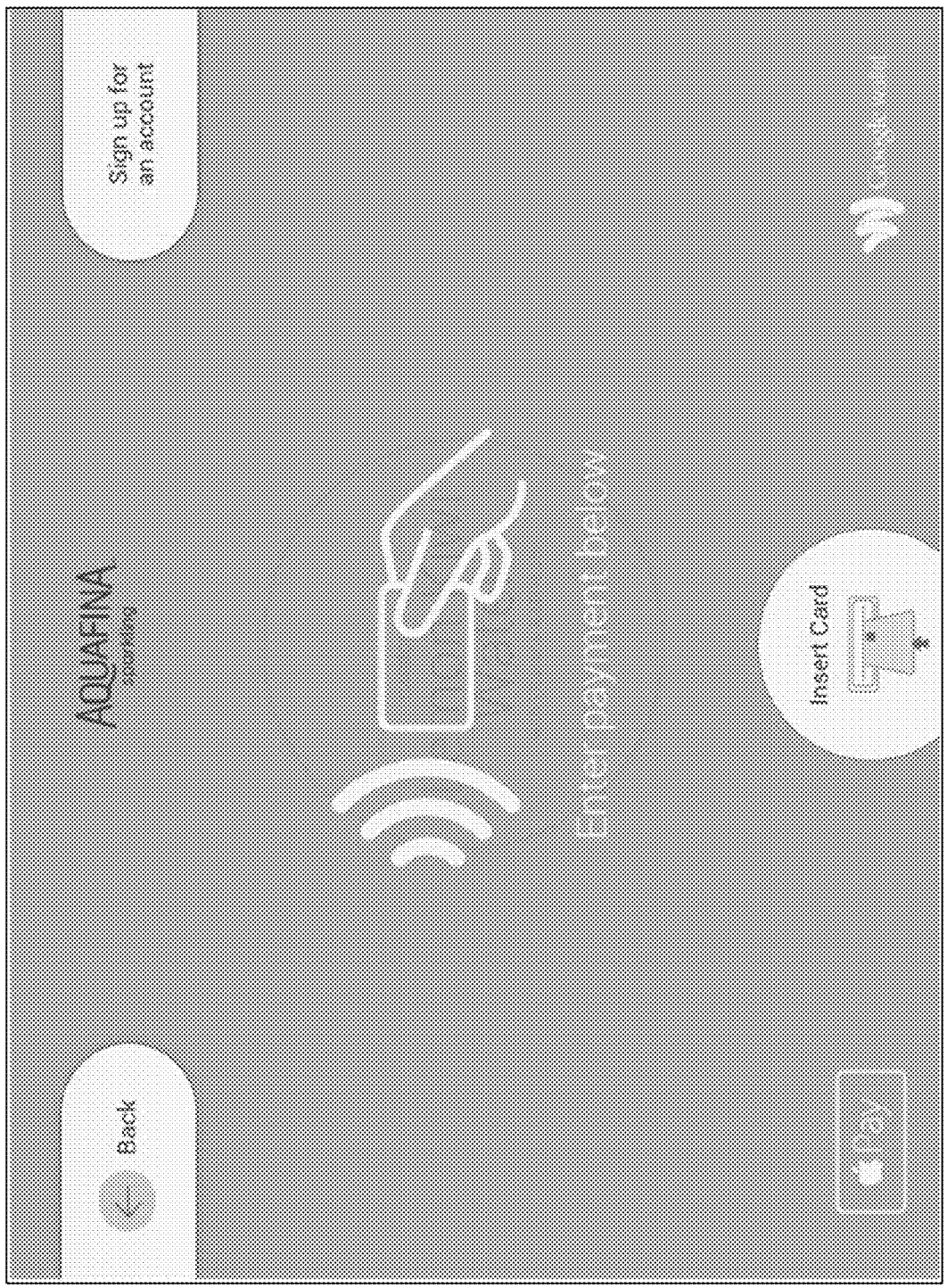
FIG. 69 is an exemplary graphical user interface in accordance with various aspects of the invention.
Figure 70:
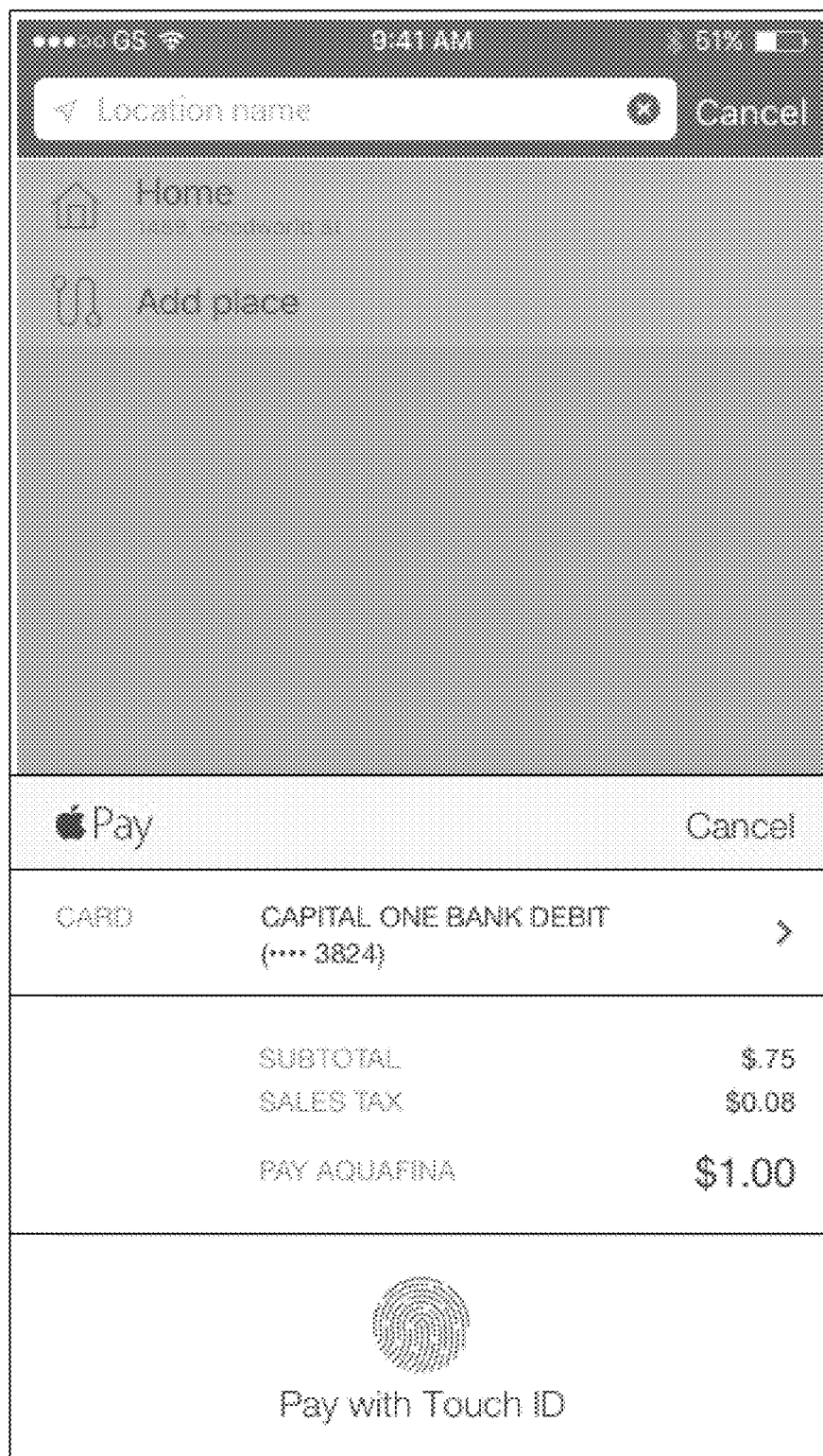
FIG. 70 is an exemplary graphical user interface in accordance with various aspects of the invention.
Figure 71:
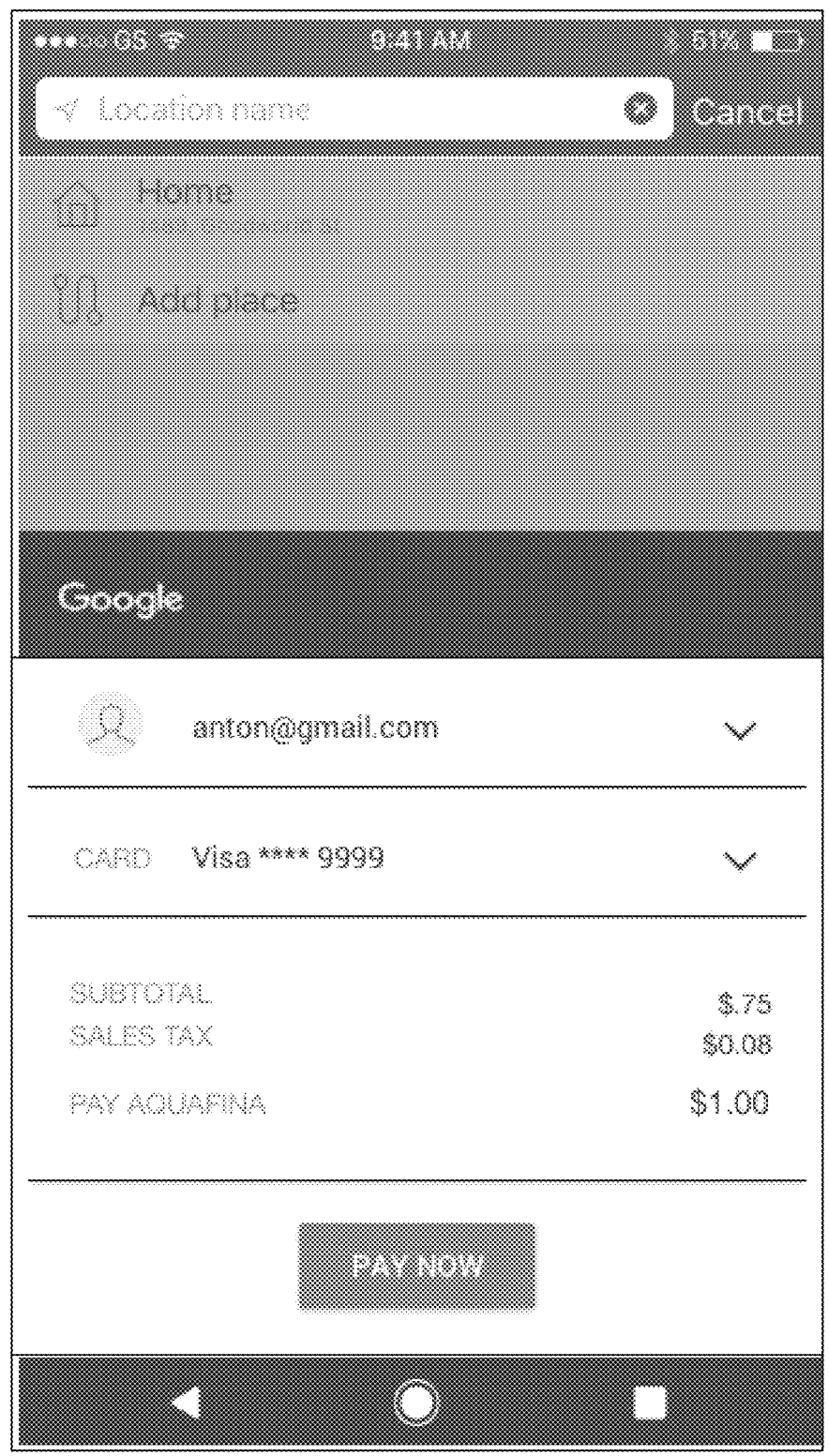
FIG. 71 is an exemplary graphical user interface in accordance with various aspects of the invention.
Figure 72:
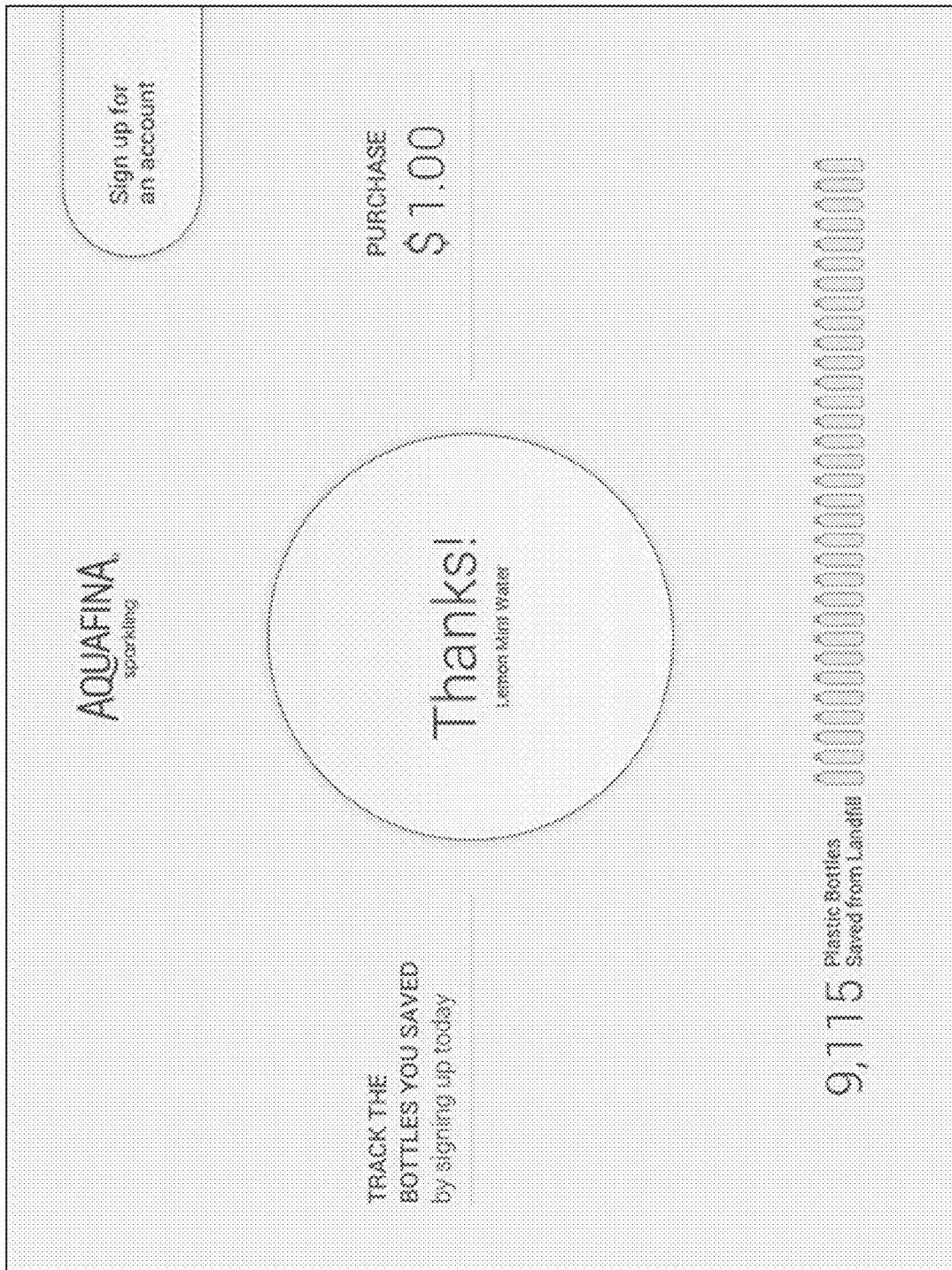
FIG. 72 is an exemplary graphical user interface in accordance with various aspects of the invention.
Figure 73:
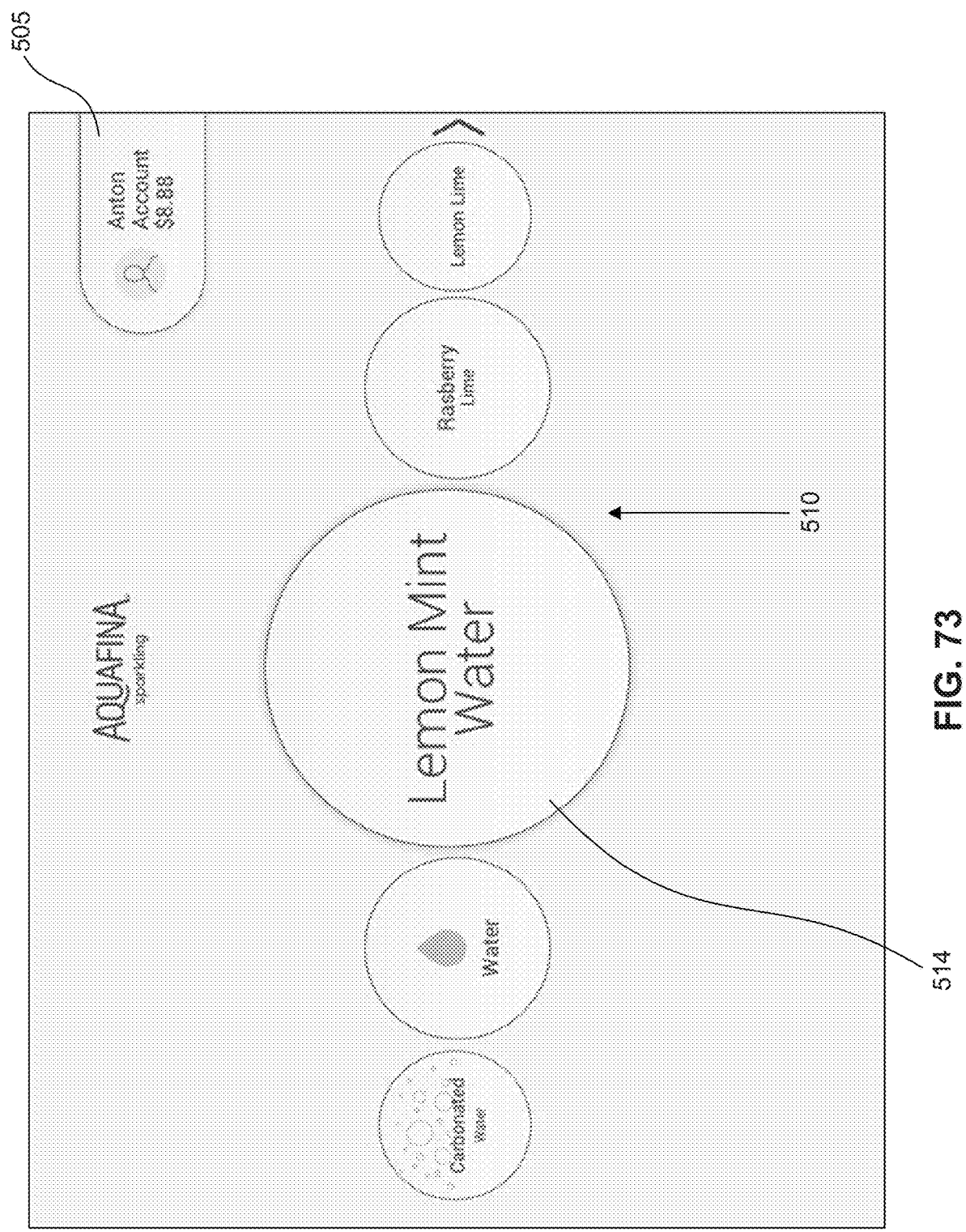
FIG. 73 is an exemplary graphical user interface in accordance with various aspects of the invention.
Figure 74:
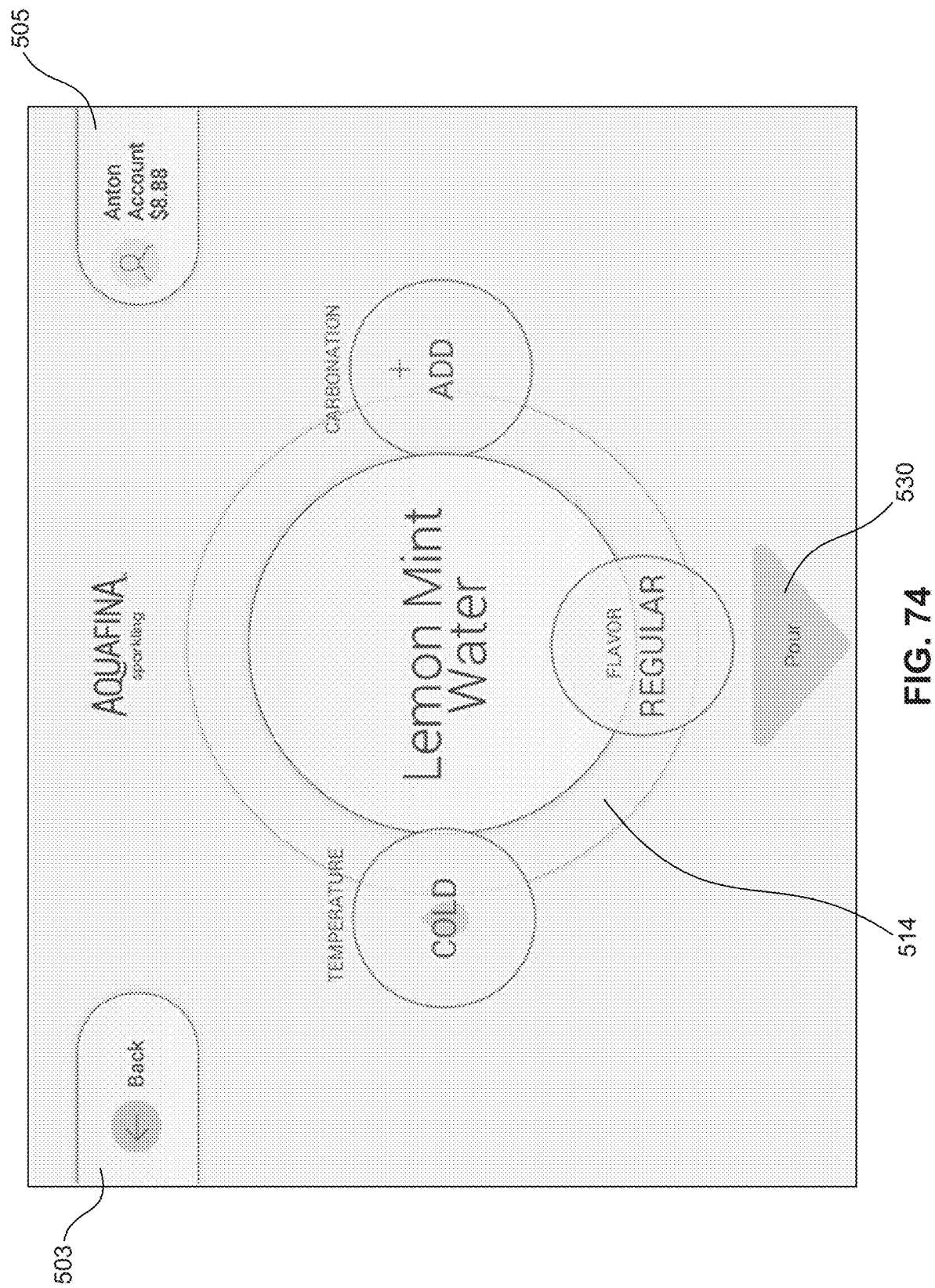
FIG. 74 is an exemplary graphical user interface in accordance with various aspects of the invention.
Figure 75:
FIG. 75 is an exemplary graphical user interface in accordance with various aspects of the invention.
Figure 76:
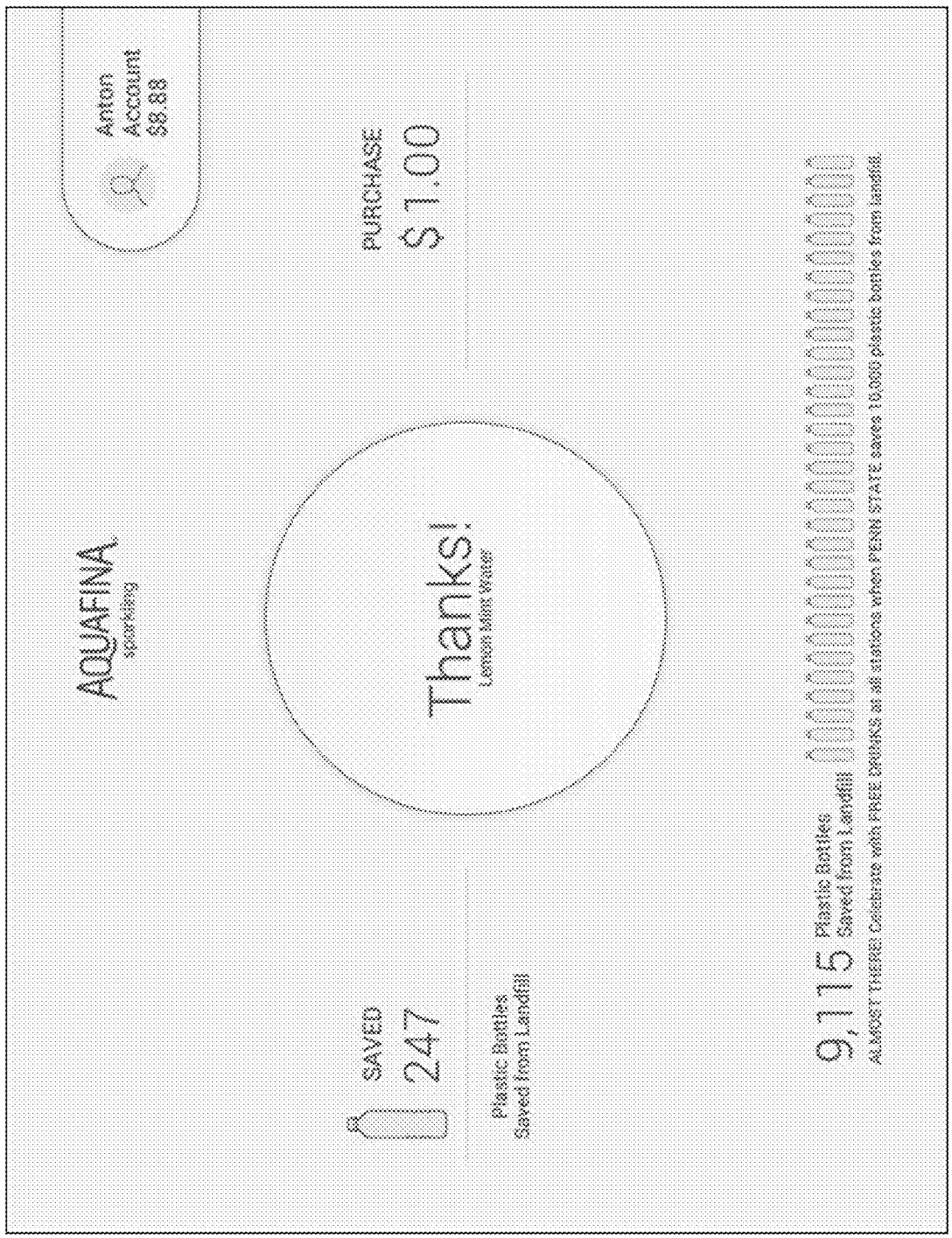
FIG. 76 is an exemplary graphical user interface in accordance with various aspects of the invention.
Figure 77:
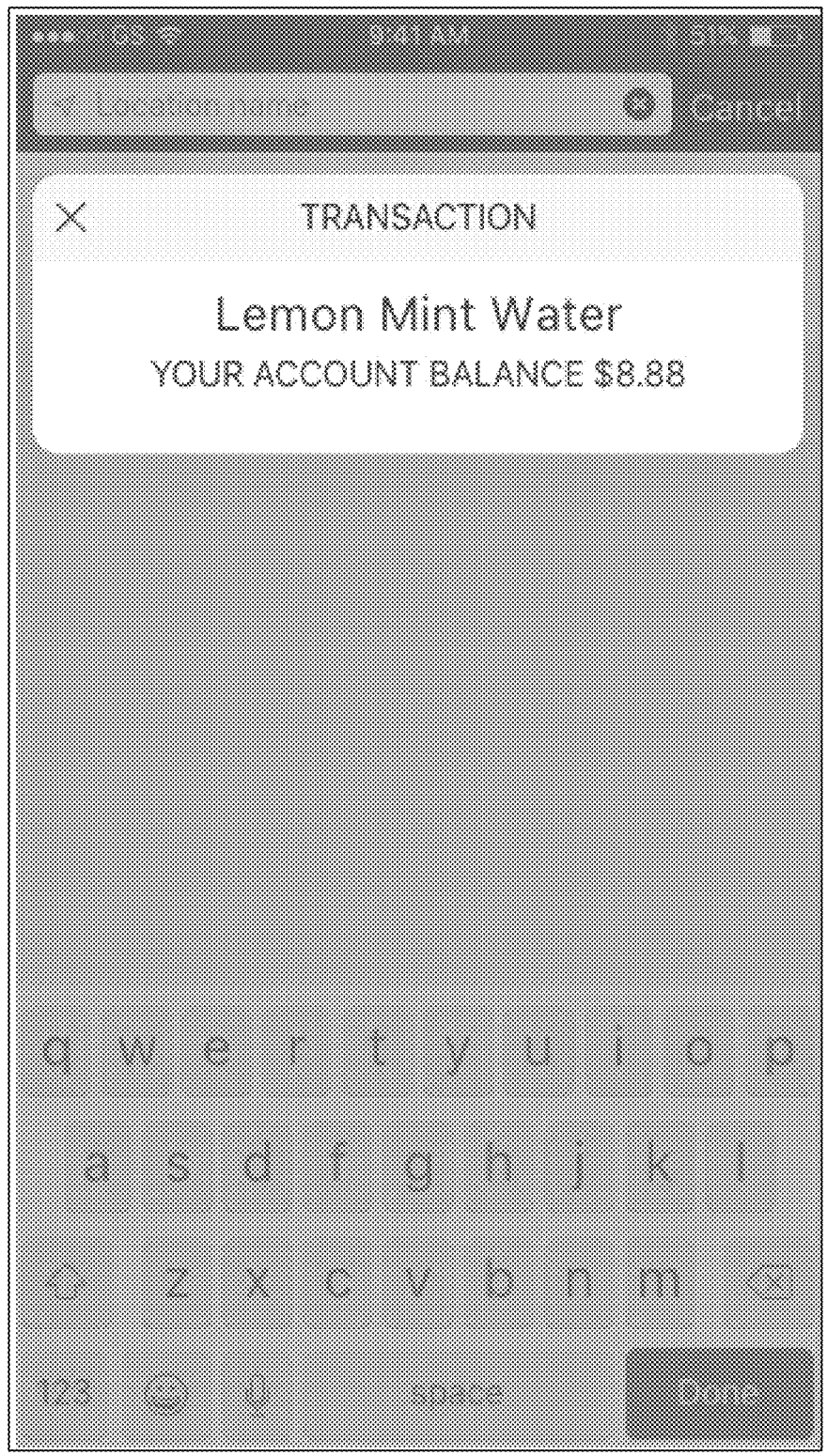
FIG. 77 is an exemplary graphical user interface in accordance with various aspects of the invention.

In an aspect shown in FIG. 67, a user can select the beverage temperature by pressing one of user input selections 524. A user can select cold water by selecting user input selection 524*a*, a user can select cool water by selecting user input selection 524*b*, and a user can select ambient temperature water by selecting user input selection 524*c*.

In an aspect shown in FIG. 82, a user can select the beverage temperature by pressing one of user input selections 1524. A user can select cold water by selecting user input selection 1524*a*, a user can select cool water by selecting user input selection 1524*b*, and a user can select ambient temperature water by selecting user input selection 1524*c*.

In an aspect shown in FIG. 82, a user can select the amount of flavor by pressing one of user input selections 1529. A user can select light flavor by selecting user input selection 1528*aa*, a user can select regular flavor by selecting user input selection 1528*bb*, and a user can select strong flavor by selecting user input selection 1528*cc*. When a user selects light flavoring, beverage dispenser dispenses less flavoring concentrate than when the user selects regular flavoring. When a user selects strong flavoring, beverage dispenser dispenses more flavoring concentrate than when the user selects regular flavoring.

At step 328, the beverage dispenser can display the cost of the selected beverage on display 502. The cost can be continually updated as ingredients are added to the custom beverage recipe or subtracted from the custom beverage recipe. In an aspect, the cost can be displayed as a cost per ounce. In another aspect, the cost can be displayed as a cost for a fixed beverage volume.

At step 330, once the user if finished modifying the ingredients in the custom beverage recipe, the beverage dispenser can receive confirmation that the user wishes to proceed with dispensing the custom beverage at the displayed cost. For example, a command to dispense the custom beverage may be received via input from the user to confirm the beverage selection. For example, a user may select user input selection 28 (e.g., a pour icon) to confirm the custom beverage.

At step 332, the interface can send electronic signals to the valves to cause the dispenser to dispense the custom beverage according to the selected recipe from step 306.

At step 334, the beverage dispenser can save the dispensed beverage to the user account. The updated user account information can be saved, for example, in data store element 208.

Although the example method of FIG. 21 shows a particular order of steps, the exact order of the above steps could change (e.g., step 328 could occur prior to or at the same time as step 326), and the dispenser could receive additional input from the user before, after, and in between particular steps of the above example method. The order of the steps and/or what input is received during the course of a user's interaction with a dispenser may be dependent on the organization of the user interface.

The manner in which a user engages the interface of the beverage dispensing system to select and/or dispense a beverage can vary. FIG. 22 illustrates an example method for modifying a customized beverage recipe after dispensing a beverage.

Figure 46:
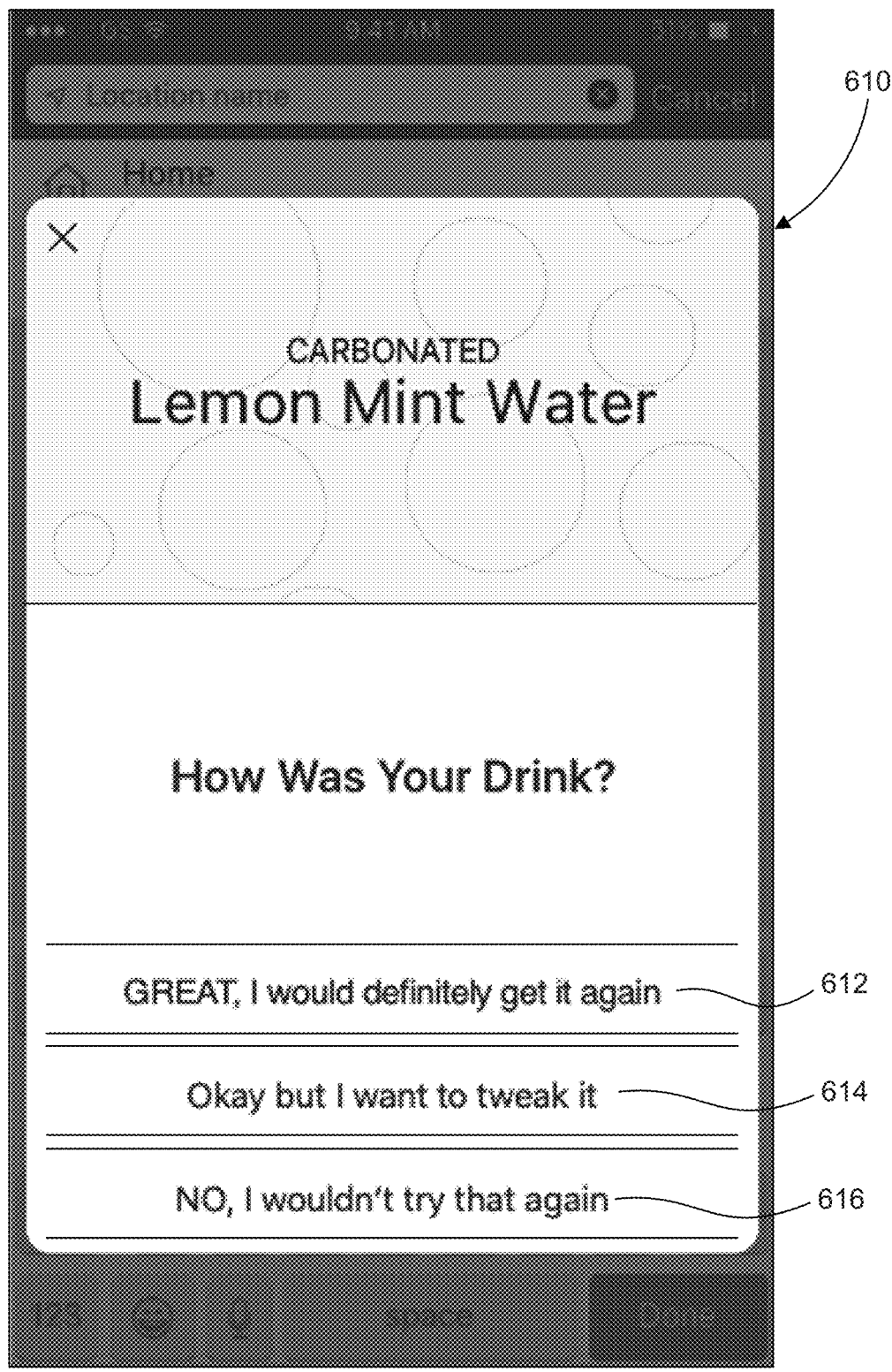
FIG. 46 is an exemplary graphical user interface in accordance with various aspects of the invention.

At step 340, beverage dispensing system can prompt a user regarding their beverage satisfaction. For example, the beverage dispensing system can prompt a user on a customer device 202 after dispensing a beverage, as shown in FIG. 46. The beverage dispensing system can display a feedback popup 610 on custom device 202 that can include a description of the dispensed beverage along with an inquiry, e.g., "How Was Your Drink." The beverage dispensing system can display feedback icons to the user such as a positive icon 612 which can be labeled "Great" or "GREAT, I would definitely get it again;" an adjustment icon 614 which can be labeled "Adjust" or "Okay but I want to tweak it;" and negative icon 616 which can be labeled "Bad" or "NO, I wouldn't try that again."

At step 342, the beverage dispensing system can receive a selection of one of positive icon 612, adjustment icon 614, or negative icon 616 via input from the user. In an aspect, if the user selects positive icon 612, customer device 202 can also display a "Liked" popup 632. "Liked" popup 632 can include an add to favorites button 634 such as "Add to favorites for quick access," a share button 636 such as "Share this flavor," and a decline button 638 "no thanks" to return to the previous screen. In another aspect, if the beverage dispensing system receives a selection of positive icon 612 or negative icon 616, beverage dispensing system can skip step 344 and proceed directly to step 346. If the beverage dispensing system receives a selection of adjustment icon 614 indicating a user's desire to modify the custom beverage, the beverage dispensing system can proceed to step 344.

At step 344, a modification of one or more custom ingredients to a beverage may be received via input from the user. Custom ingredients can include, for example, one or more of still water at ambient temperature; cooled still water; heated still water; sparkling water at ambient temperature; cooled sparkling water; heated sparkling water; flavorings such as: branded beverage concentrate, plum, blueberry, mango, cherry, grape, kiwi, strawberry, lemon, lime, passion fruit, apple, melon, tangerine, raspberry, orange, pomegranate, pineapple, coconut, grapefruit, acai, watermelon, peach, or any combination thereof. Additionally, the flavorings can include herbs and spices or vegetables such as: mint, black tea, green tea, red tea, white tea, celery, chamomile, hibiscus, lavender, carrot, cucumber, verba mate, coca extract, ginger, chlorophyll, aloe, cinnamon, ginseng, or any combination thereof. In an aspect, one or more of the flavorings can include fresh ingredients that do not contain preservatives. Additionally, the ingredients can include minerals such as boron, phosphorus, titanium, chromium, manganese, iron, cobalt, nickel, copper, zinc, molybdenum, cadmium, aluminum. In an aspect, the mineral ingredients can simulate a taste profile of mineral water from a specific region. For example, the mineral ingredients can simulate a taste profile of water from the German Alps, the Italian Alps, or the French Alps. The ingredients can also include additives such as vitamins, electrolytes, energy, calm, protein, fiber, vitamins, antioxidants, sweeteners and other functional ingredients such as: calcium, sodium, potassium, bicarbonate, magnesium, caffeine, fiber, protein, taurine, ribose, omega 3, or any combination thereof. In an aspect, at step 344 a user can modify the temperature, flavor and or flavor intensity, and/or carbonation level of the custom beverage.

Figure 47:
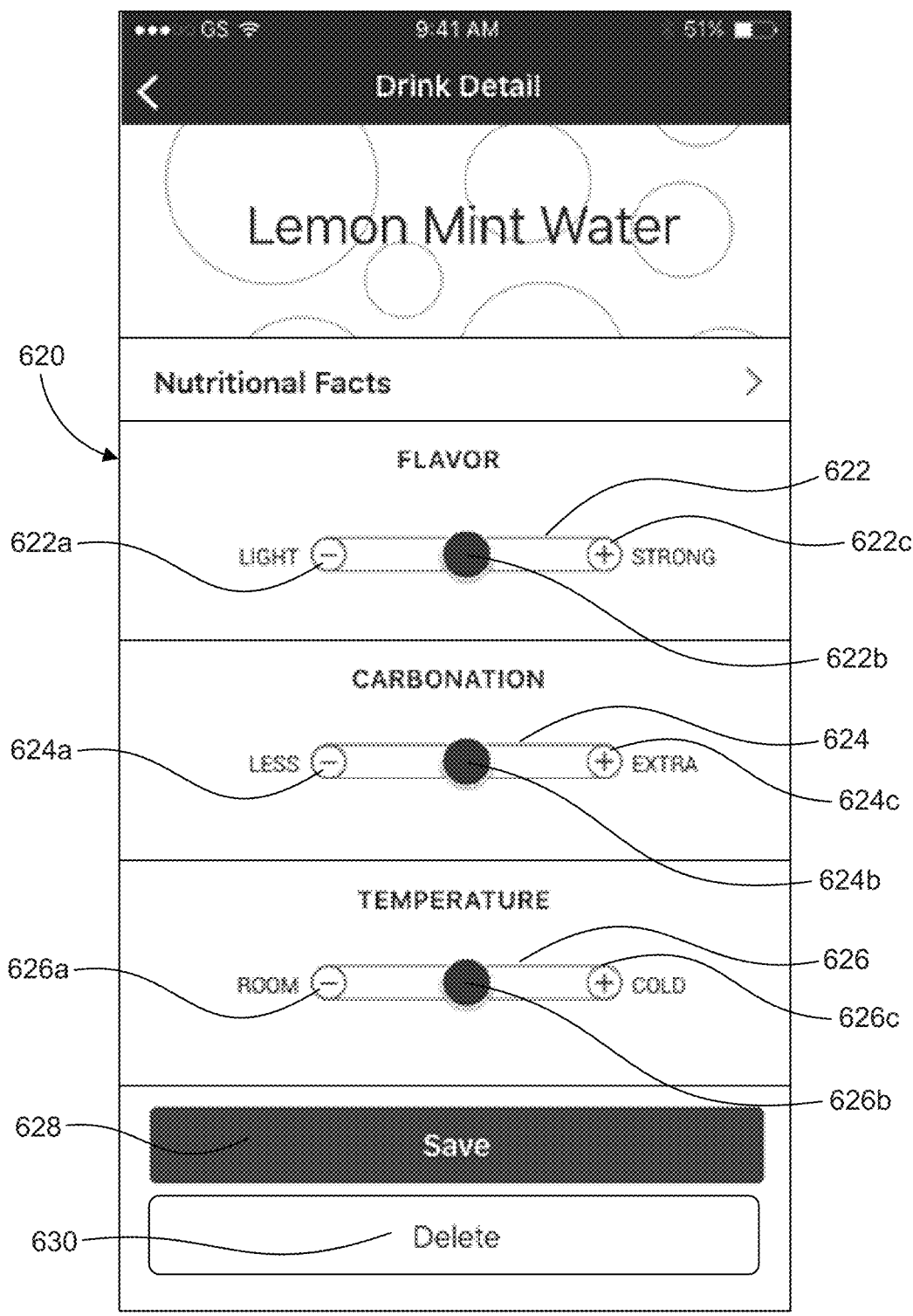
FIG. 47 is an exemplary graphical user interface in accordance with various aspects of the invention.
Figure 48:
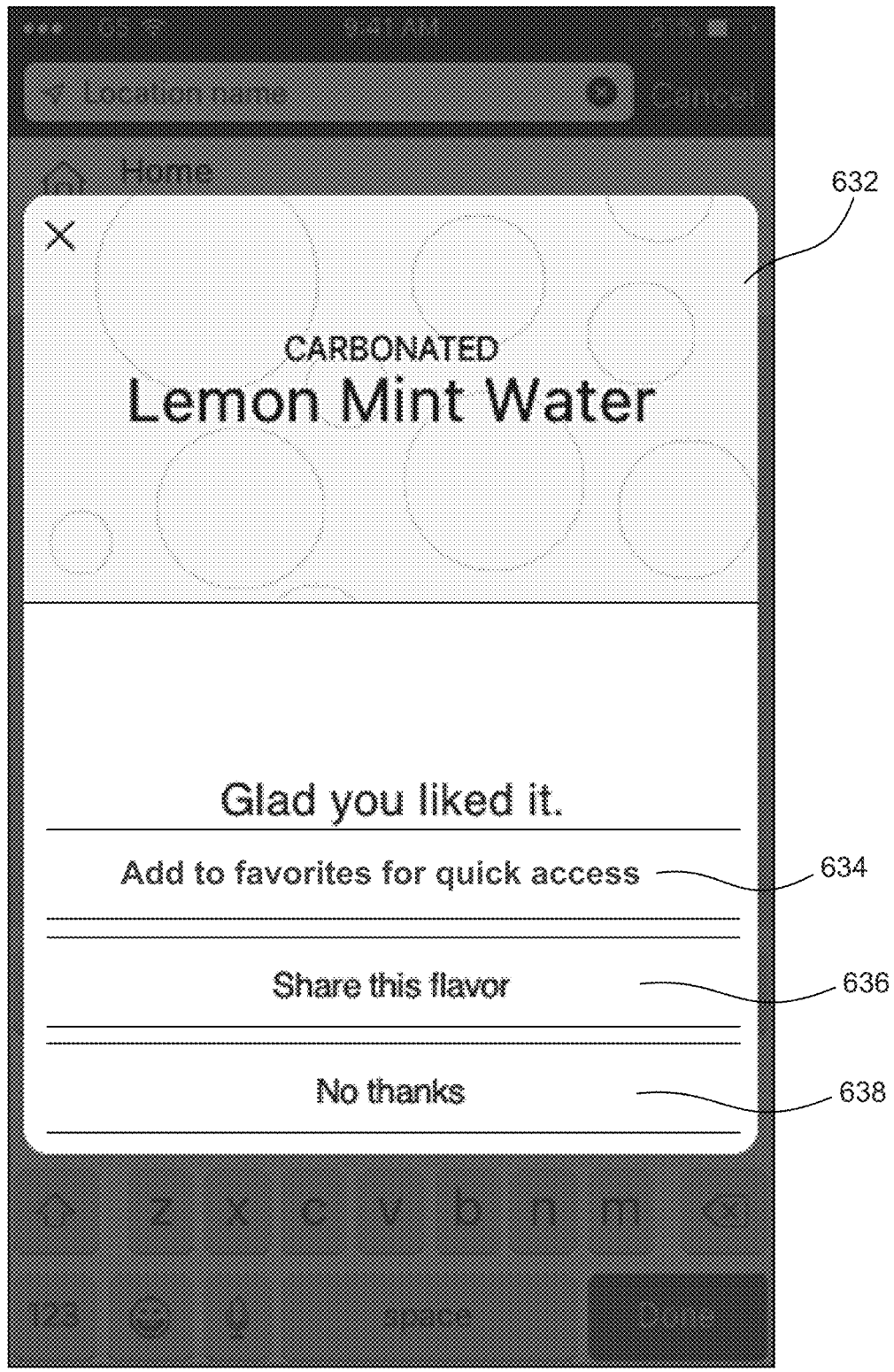
FIG. 48 is an exemplary graphical user interface in accordance with various aspects of the invention.
Figure 49:
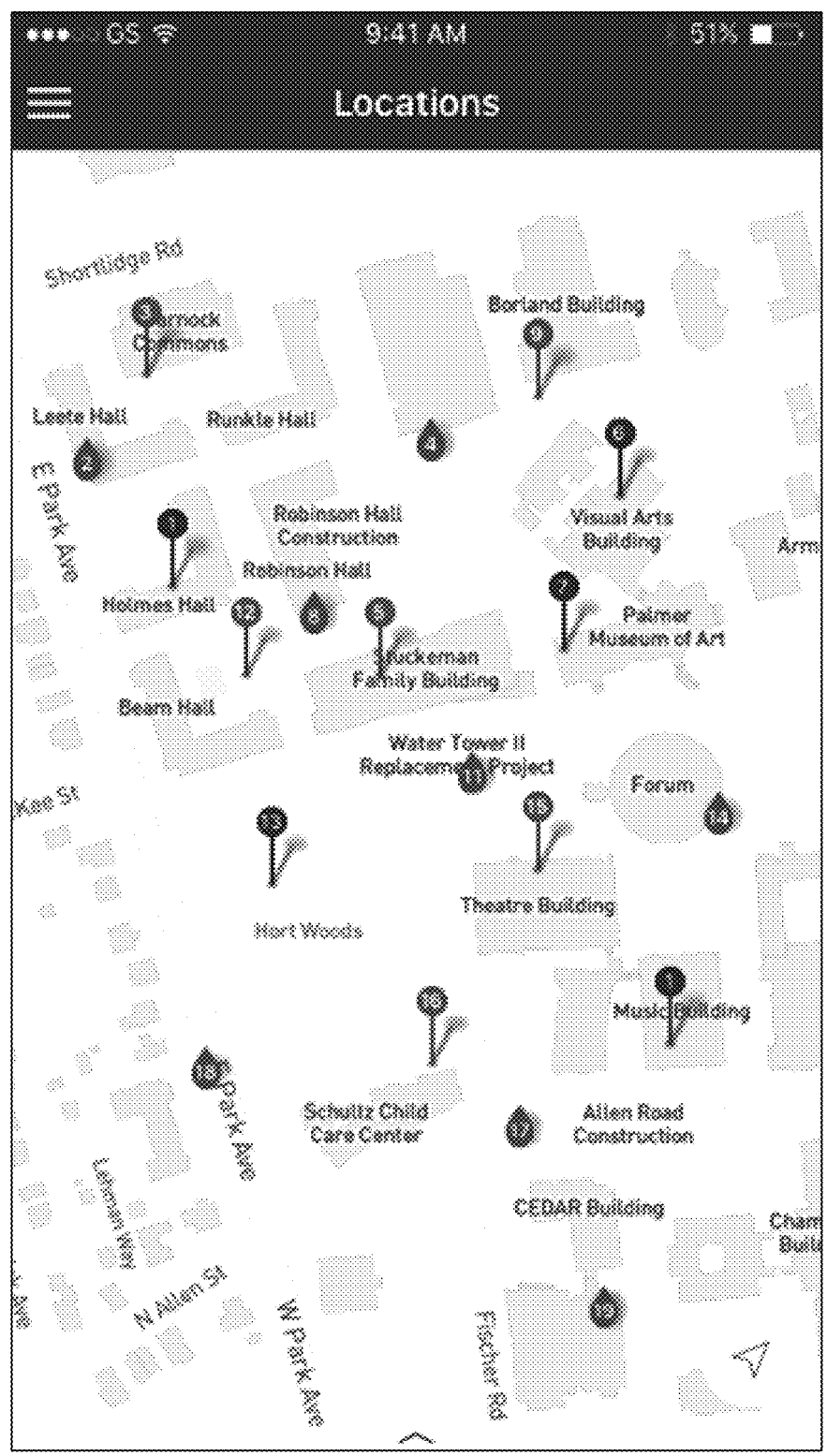
FIG. 49 is an exemplary graphical user interface in accordance with various aspects of the invention.

In an aspect shown in FIG. 47, a user can modify the custom beverage flavoring intensity by pressing one or more of user input selections 622. User input selections 622 can be a slider icon. A user can select a reduced amount of flavor or "light" flavor by selecting user input selection 622a, a user can select a regular amount of flavor by selecting user input selection 622b, a user can select an increased amount of flavor or "strong" flavor by selecting user input selection 622c. When a user selects light flavoring, beverage dispenser dispenses less flavoring concentrate than when the user selects regular flavoring. When a user selects strong flavoring, beverage dispenser dispenses more flavoring concentrate than when the user selects regular flavoring.

A user can modify the amount of carbonation by pressing one of user input selections 624. A user can select a reduced amount of carbonation or "less" carbonation by selecting user input selection 624a, a user can select regular carbonation by selecting user input selection 624b, and a user can select an increased amount of carbonation or "extra" carbonation by selecting user input selection 624c.

A user can modify the beverage temperature by pressing one of user input selections 626. A user can select ambient temperature water or "room" temperature by selecting user input selection 626a, a user can select cool water by selecting user input selection 626b, and a user can select cold water by selecting user input selection 626c.

At step 346, the beverage dispensing system can save the dispensed beverage rating and/or the modified custom recipe to the user account. The dispensed beverage rating and modified custom recipe can be saved, for example, in data store element 208. A user can select "save" icon 628 to save the modified custom recipe to the user account. If the user changes their mind and does not wish to save the modified custom recipe, the user can select the delete icon 630.

Figure 87:
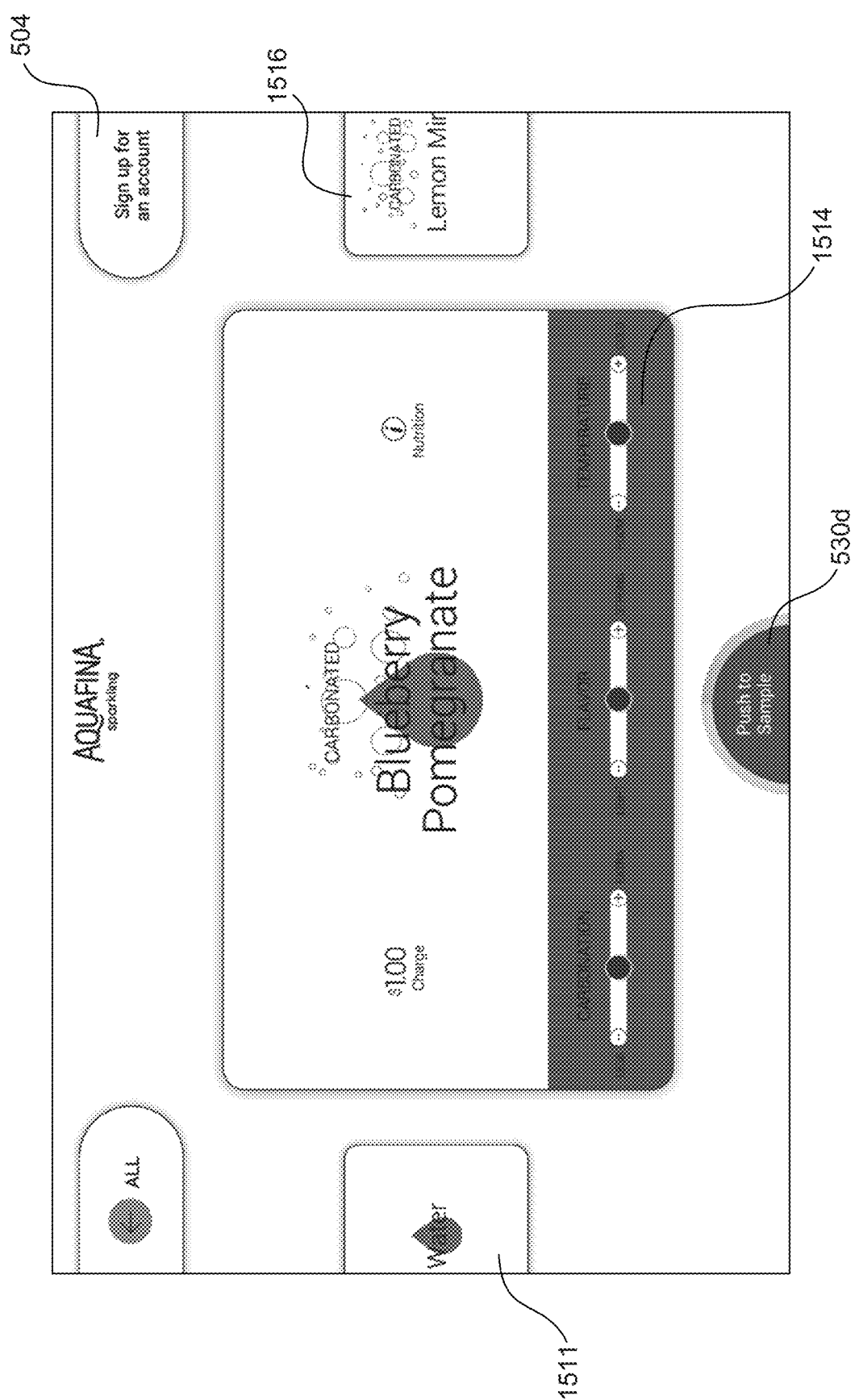
FIG. 87 is an exemplary graphical user interface in accordance with various aspects of the invention.

In an aspect, the beverage dispensing system can prompt a user on a beverage dispenser 204 to modify a customized beverage recipe after dispensing a custom beverage, such as a sample beverage. FIG. 87 shows a graphical user interface where a user can pour a sample of their beverage recipe. In an aspect, the beverage dispenser can show on display 502 the custom recipe and user input selections to modify the custom beverage before, during, or after dispensing a sample custom beverage. A user can modify the flavoring intensity by pressing one or more of user input selections 1529 (FIG. 82). User input selections 1529 can be a slider icon. A user can select a reduced amount of flavor or "light" flavor by selecting user input selection 1528aa, a user can select a regular amount of flavor by selecting user input selection 1528bb, a user can select an increased amount of flavor or "strong" flavor by selecting user input selection 1528cc. When a user selects light flavoring, beverage dispenser dispenses less flavoring concentrate than when the user selects regular flavoring. When a user selects strong flavoring, beverage dispenser dispenses more flavoring concentrate than when the user selects regular flavoring.

A user can modify the amount of carbonation by pressing one of user input selections 1520 (FIG. 82). A user can select a reduced amount of carbonation or "less" carbonation by selecting user input selection 1520a, a user can select regular carbonation by selecting user input selection 1520b, and a user can select an increased amount of carbonation or "extra" carbonation by selecting user input selection 1520c.

A user can modify the beverage temperature by pressing one of user input selections 1524 (FIG. 82). A user can select ambient temperature water or "room" temperature by selecting user input selection 1524a, a user can select cool water by selecting user input selection 1524b, and a user can select cold water by selecting user input selection 1524c.

FIGS. 25-101 show different displays for an example embodiment of a graphical user interface displayed on display screen customer device 202 or beverage dispenser 204. A user may make desired selections, such as selections of beverage ingredients that can be used for a custom beverage. Display screen 502 can present all information required to select and dispense a custom beverage to a user. While some of the graphical user interface icons are discussed with respect to carbonation, other infused gases, such as nitrogen, could also be utilized. For example, the graphical user interface could utilize "nitrogenated" instead of "carbonated" and "nitrogenation" instead of "carbonation."

FIGS. 25-32 show exemplary graphical user interfaces that allow a user to create a user account for use with one or more of beverage dispensing systems 10, 1010, and 2010. The user account can allow a user to create and save custom recipes, dispense beverages, locate beverage dispensers, receive beverage promotions, track beverage consumption, and share favorite beverages with other users. In an aspect, a user can interact with one or more icons in the graphical user interfaces shown in FIGS. 25-32 on customer device 202.

Figure 26:
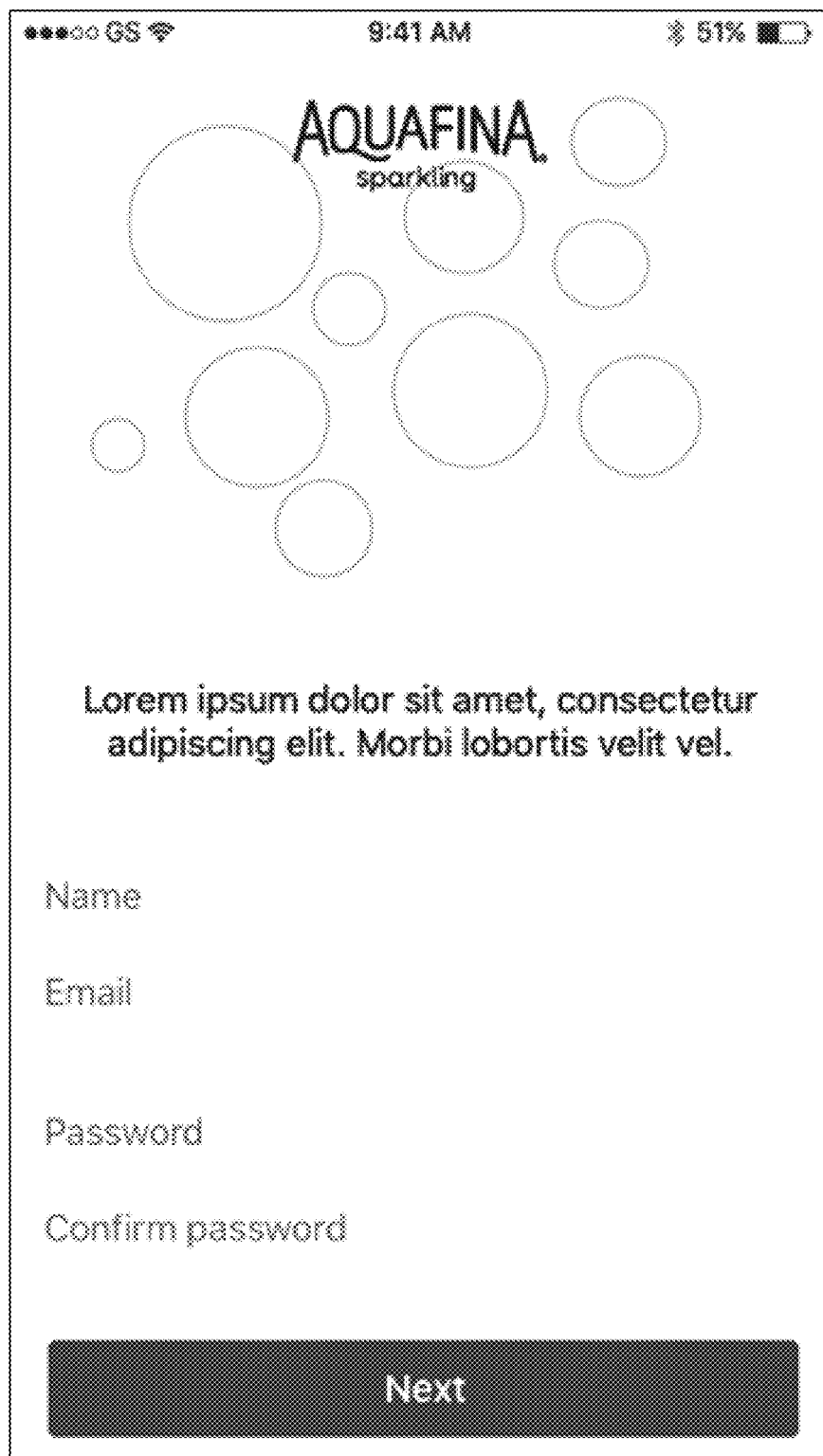
FIG. 26 is an exemplary graphical user interface in accordance with various aspects of the invention.

As shown in FIG. 25, customer device 202 can present a user with an initial login screen that can include icons to "Login with Facebook," "Login with Google," or create a new account, e.g., "Sign up with Email." Customer device 202 can also present a user with an initial promotion for a beverage credit to encourage the user to create an account and use the beverage dispensers, such as "SIGN UP NOW and we'll give you a $10 credit to try our premium water at over 1,456 locations." If the user selects the icon to "Sign up with Email," customer device 202 can present the user with the signup screen shown in FIG. 26. The user can enter their name, email, and an account password onto customer device. The user can select the next icon to progress to the next screen.

Figure 27:
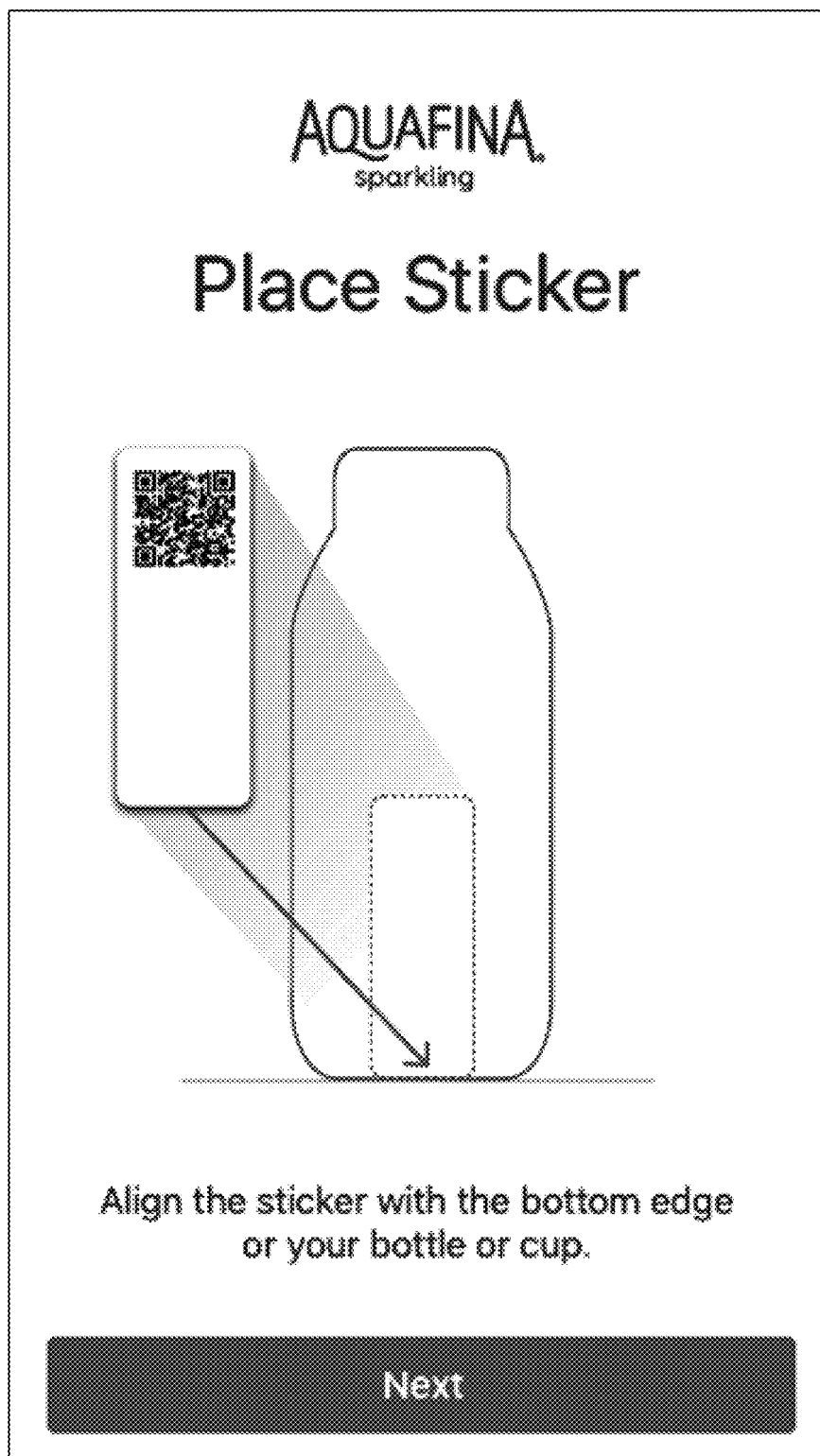
FIG. 27 is an exemplary graphical user interface in accordance with various aspects of the invention.

As shown in FIG. 27, customer device 202 can show an instructional screen to explain how the user should attach identification information to a user container. For example, customer device 202 can instruct a user to "Align the sticker with the bottom edge of your bottle or cup." In an aspect, the identification information can include a QR code. Stickers including identification information can be available at or near beverage dispensers 10, 1010, and 2010. In an aspect, beverage dispensers 10, 1010, and 2010 can include a printer to print an identification sticker for a user to attach to their beverage container. In an aspect, side unit 220 (FIG. 6) can include an identification sticker dispenser to dispense pre-printed identification stickers. In another aspect, side unit 220 can include a printer to print an identification sticker on demand. Alternatively, beverage dispensers 10, 1010, and 2010 can include a slot or holder to dispense identification stickers for customer use. Once a user has attached the identification sticker to their beverage container as shown in FIG. 27, the user can select the next icon to progress to the next screen. The sticker may also be attached to other items, such as security badges, jewelry, employee identification, identification cards, lanyard, or other convenient items. These items may also have a QR code that is configured to be scanned by beverage dispensers 10, 1010, and 2010. This allows a user to purchase beverages using an item they already possess. For example, a student identification card may include a QR code that can be linked to the student's account and scanned by beverage dispensers 10, 1010, and 2010. QR codes may also be incorporated into specific beverage containers that can then be used to purchase beverages from beverage dispensers 10, 1010, and 2010. In some aspects, these items may be associated with a user account associated with an organization. For example, a company may provide its employees with beverage containers with QR codes linked to a corporate account, thus enabling the employees to receive beverages from beverage dispensers 10, 1010, and 2010 without having to use their own user account. In an embodiment, the identification information may comprise a temporary tattoo of a QR code indicative of the user account.

Figure 28:
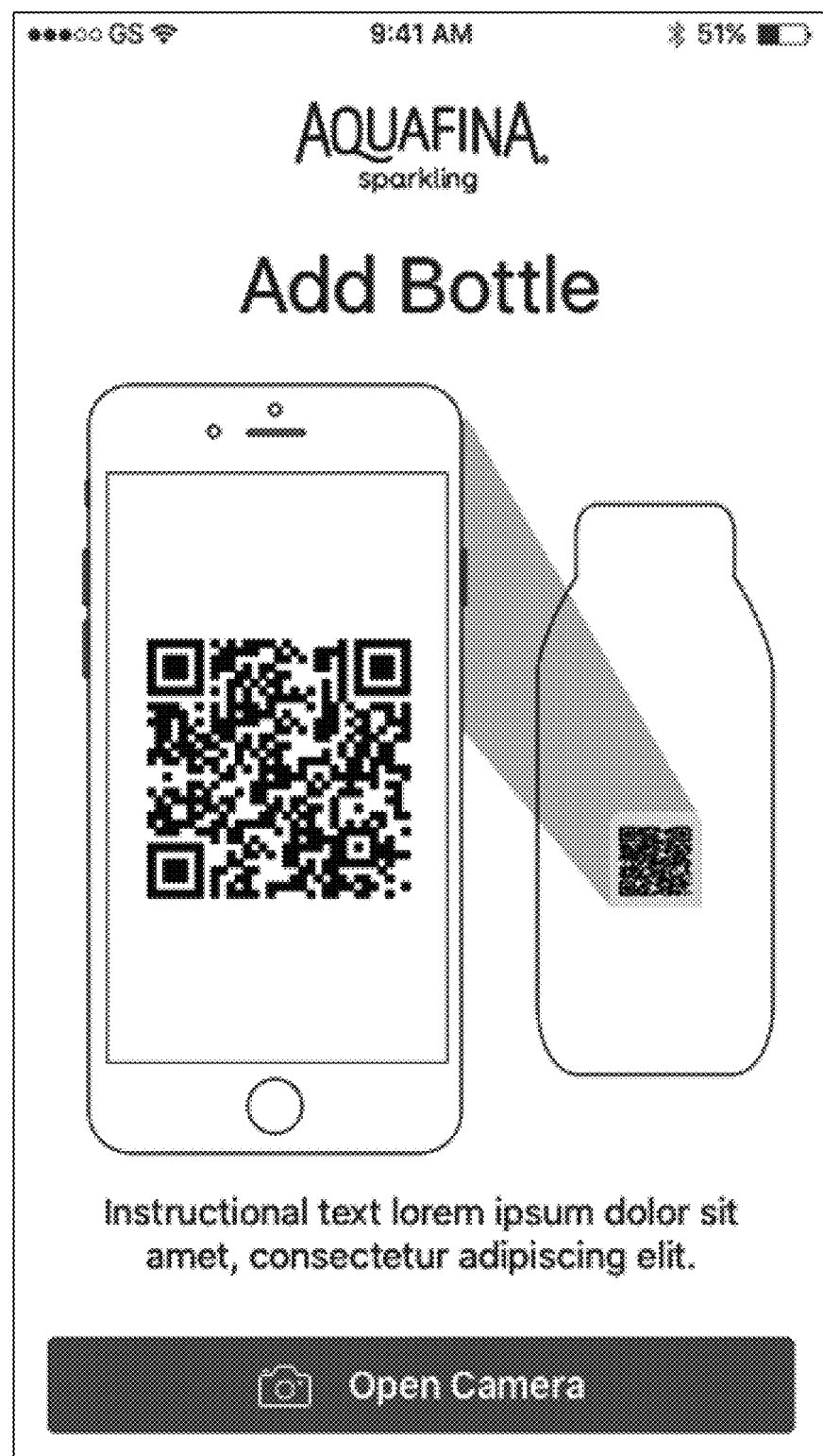
FIG. 28 is an exemplary graphical user interface in accordance with various aspects of the invention.

As shown in FIG. 28, customer device 202 can show an instructional screen to explain how the user should add their beverage container to their user account "Add Bottle," for example, by scanning the identification information on the identification sticker they attached to their beverage container. In an aspect, customer device 202 can show the user how to scan a QR code on the beverage container. When ready, the user can select an "Open Camera" icon to activate a camera on customer device 202.

Figure 29:
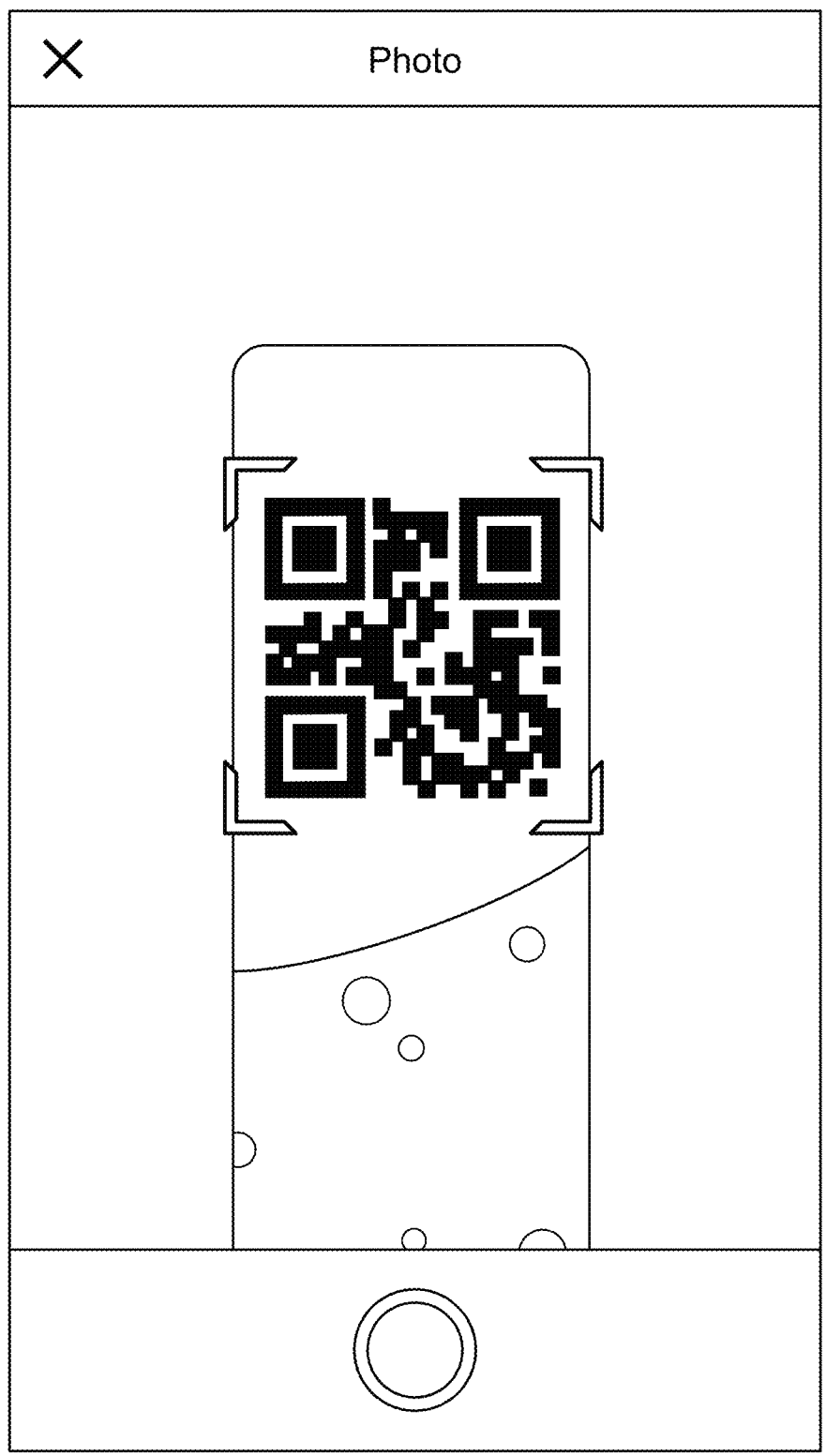
FIG. 29 is an exemplary graphical user interface in accordance with various aspects of the invention.

As shown in FIG. 29, customer device 202 can recognize and capture the identification information on the identification sticker attached to the beverage container. For example, customer device 202 can scan a QR code on the beverage container.

Figure 30:
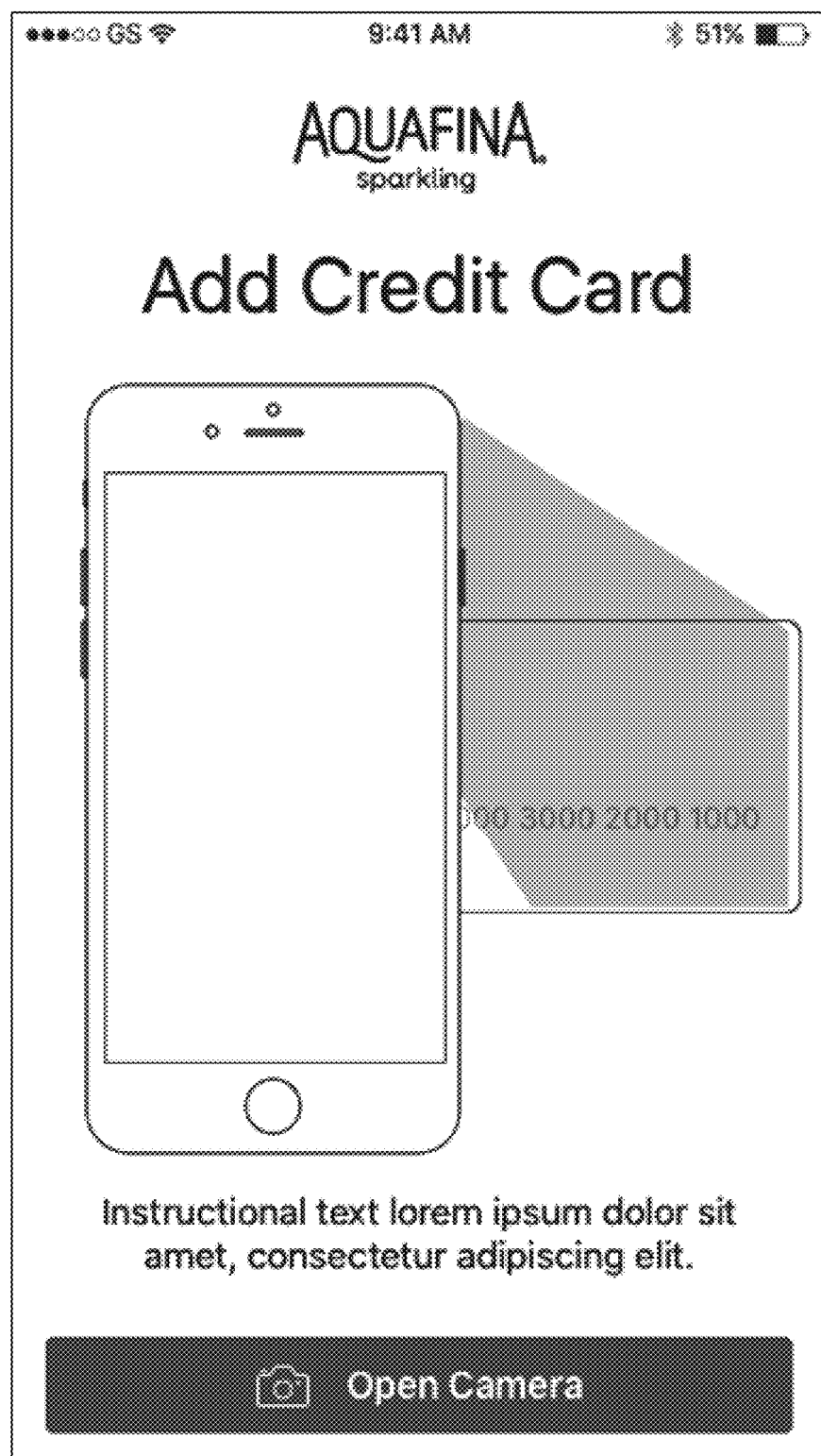
FIG. 30 is an exemplary graphical user interface in accordance with various aspects of the invention.

As shown in FIG. 30, customer device 20 can show an instructional screen to explain how the user should add payment information to their user account "Add Credit Card," for example, by scanning a user credit card. When ready, the user can select an "Open Camera" icon to activate a camera on customer device 202.

Figure 31:
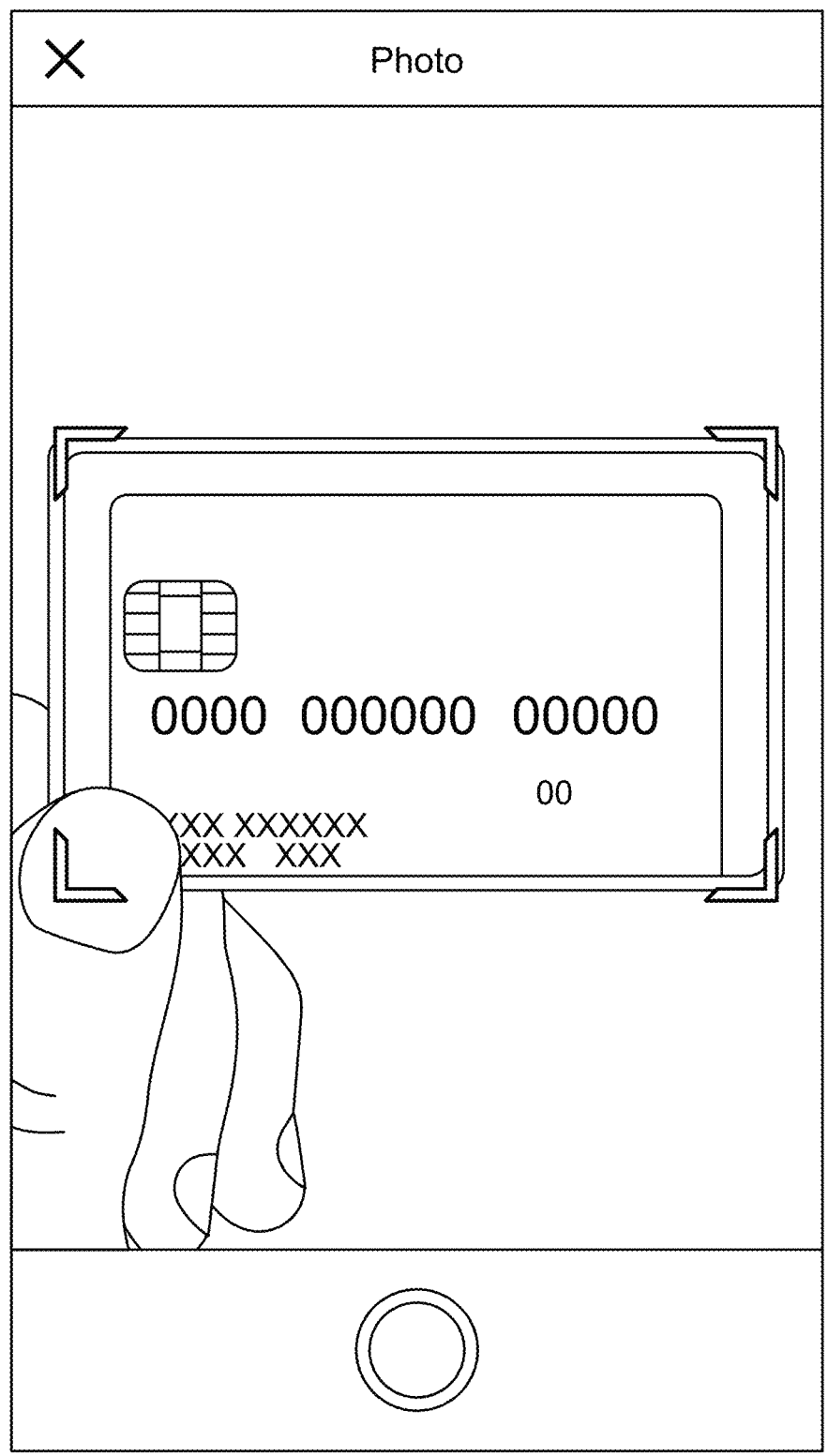
FIG. 31 is an exemplary graphical user interface in accordance with various aspects of the invention.

As shown in FIG. 31, customer device 202 can recognize and capture credit card information.

Figure 32:
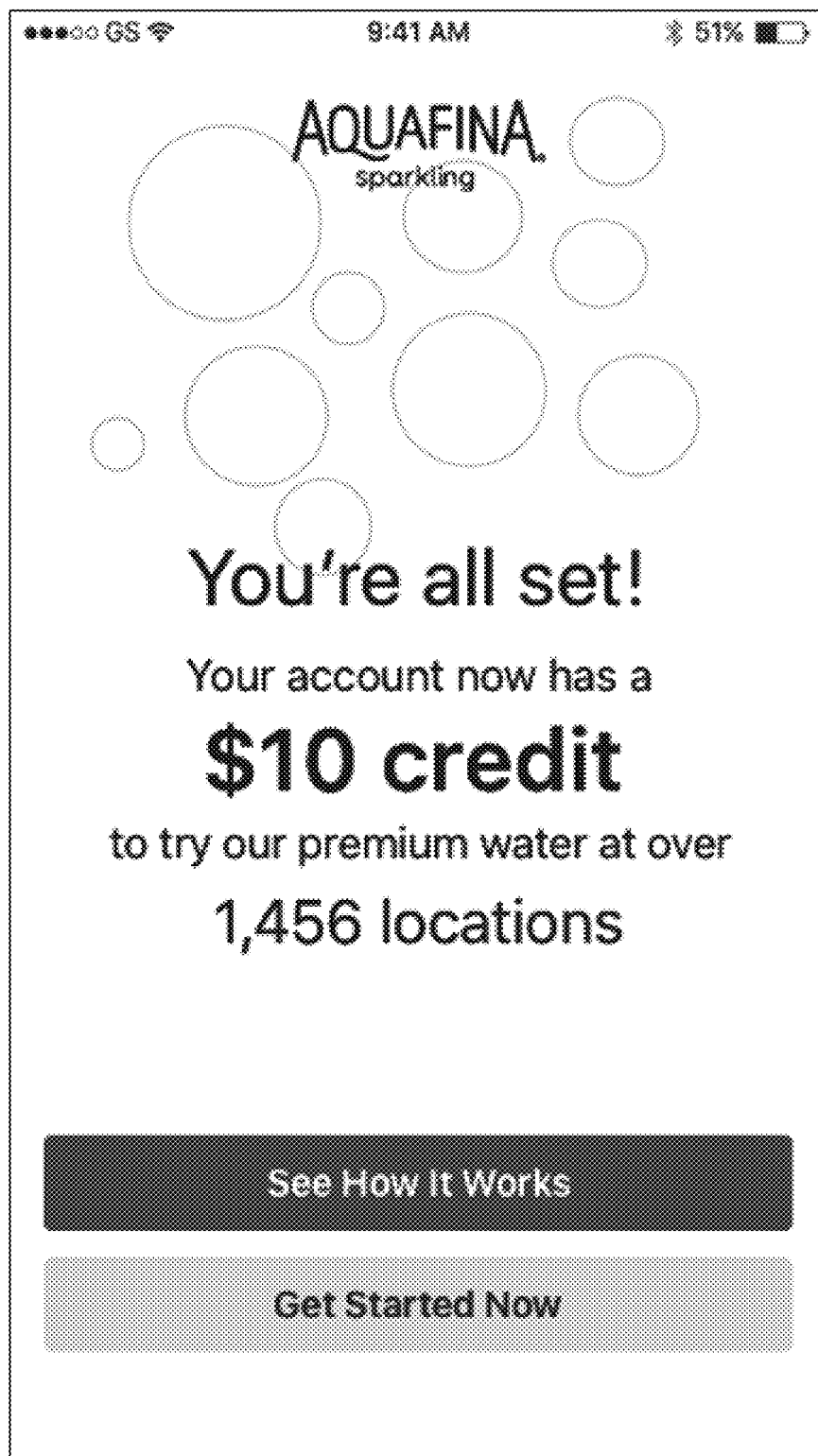
FIG. 32 is an exemplary graphical user interface in accordance with various aspects of the invention.

As shown in FIG. 32, customer device can present a user with an account confirmation screen and can display text such as, "You're all set! Your account now has a $10 credit to try our premium water at over 1,456 locations." Customer device 202 can present an icon to allow a user to receive additional information on the beverage dispensing system and beverage dispensers 10, 1010, and 2010, such as "See How It Works" icon. Customer device 202 can also present an icon to allow a user to begin customizing beverage recipes and/or dispensing beverages, such as "Get Started Now" icon.

Figure 33A:
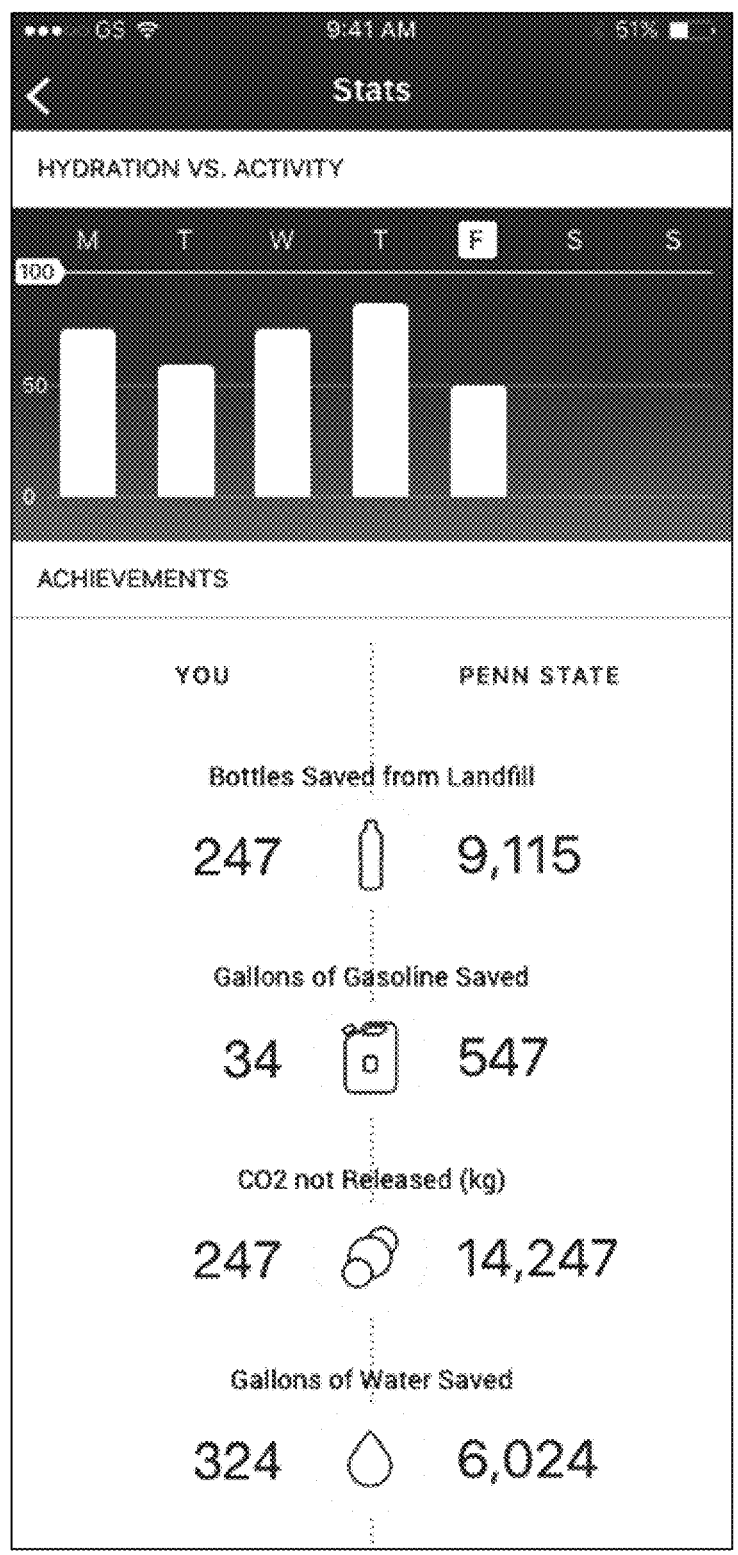
FIGS. 33A-33B are exemplary graphical user interfaces in accordance with various aspects of the invention.
Figure 33B:
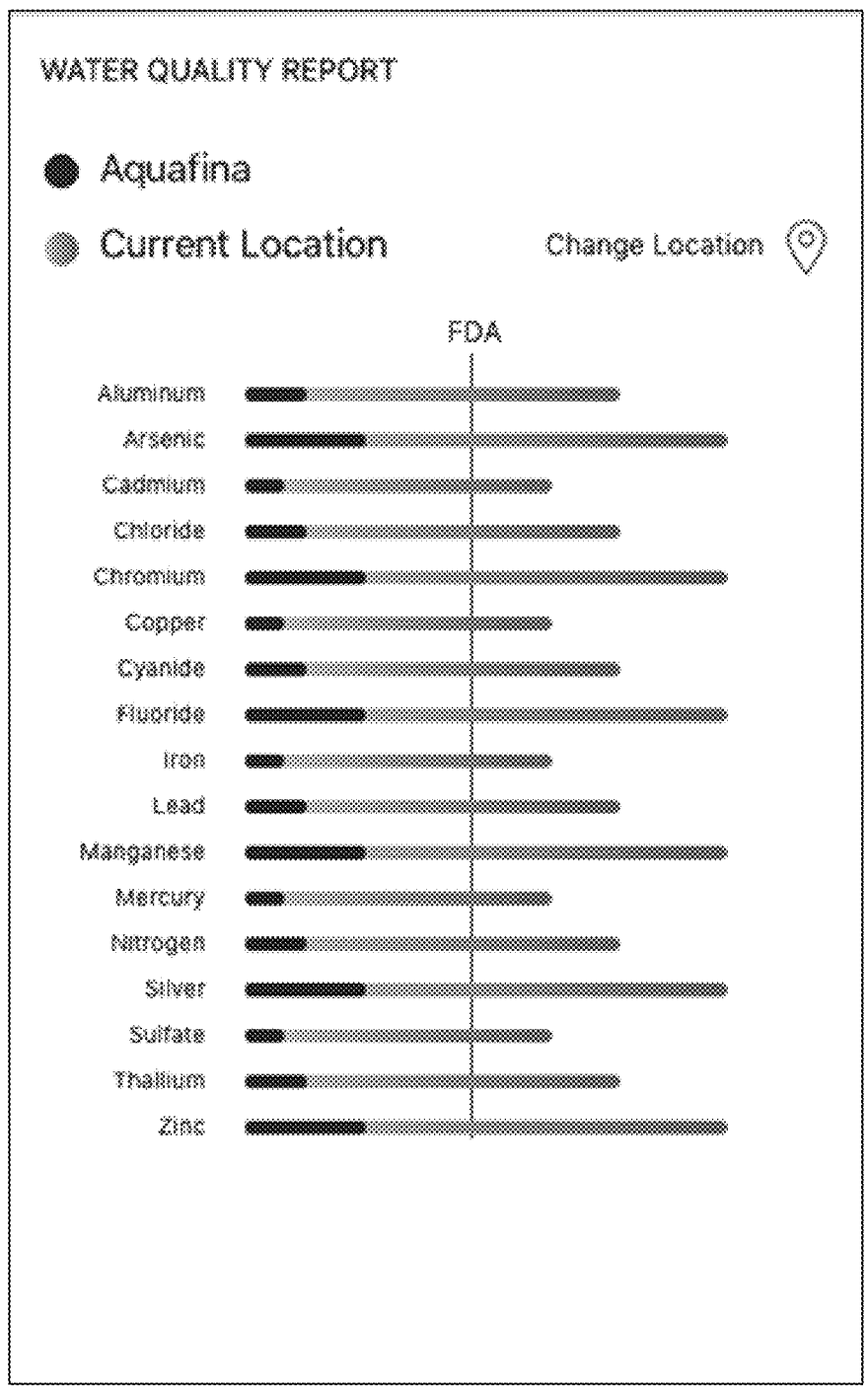

After a user account is created, customer device 202 can provide information regarding to beverage consumption to the user. For example, customer device 202 can provide a "Stats" screen, as shown in FIGS. 33A-B. Customer device 202 can display a comparison of a user's hydration as compared to their activity level. Hydration information can be determined by tracking the users' dispensed beverages using beverage dispensers 10, 1010, and 2010 or can be input by a user into customer device 202. Customer device 202 can display environmental information such as one or more of "Bottles Saved from Landfill," "Gallons of Gasoline Saved," "CO2 not Released (kg)," and "Gallons of Water saved." Customer device 202 can display environmental information for the user and/or for a group of users. Customer device 202 can allow a user to share their environmental information, such as with other beverage dispensing system users having user accounts or via social media such as Twitter, Facebook, Instagram, Snapchat, etc. Customer device 202 can also display water quality information for a particular area, such as the amounts of one or more of aluminum, arsenic, cadmium, chloride, chromium, copper, cyanide, fluoride, iron, lead, manganese, mercury, nitrogen, silver, sulfate, thallium, and zinc contained in the water.

Figure 34A:
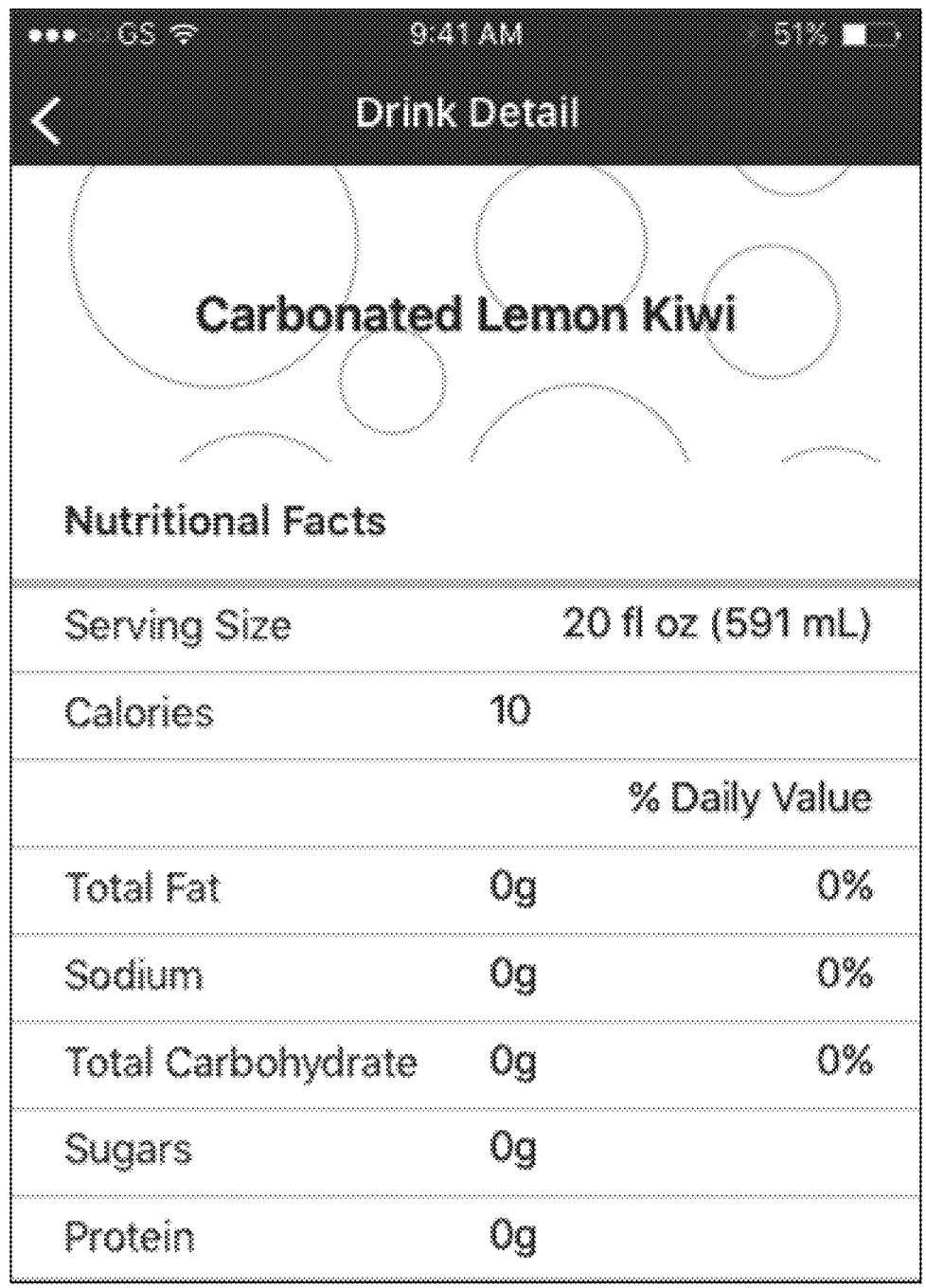

As shown in FIGS. 34A-34B, customer device 202 can provide nutritional information for a selected beverage recipe and or a dispensed beverage. The nutritional information can automatically update based on the selected ingredients and amount of the dispensed beverage.

Figure 35:
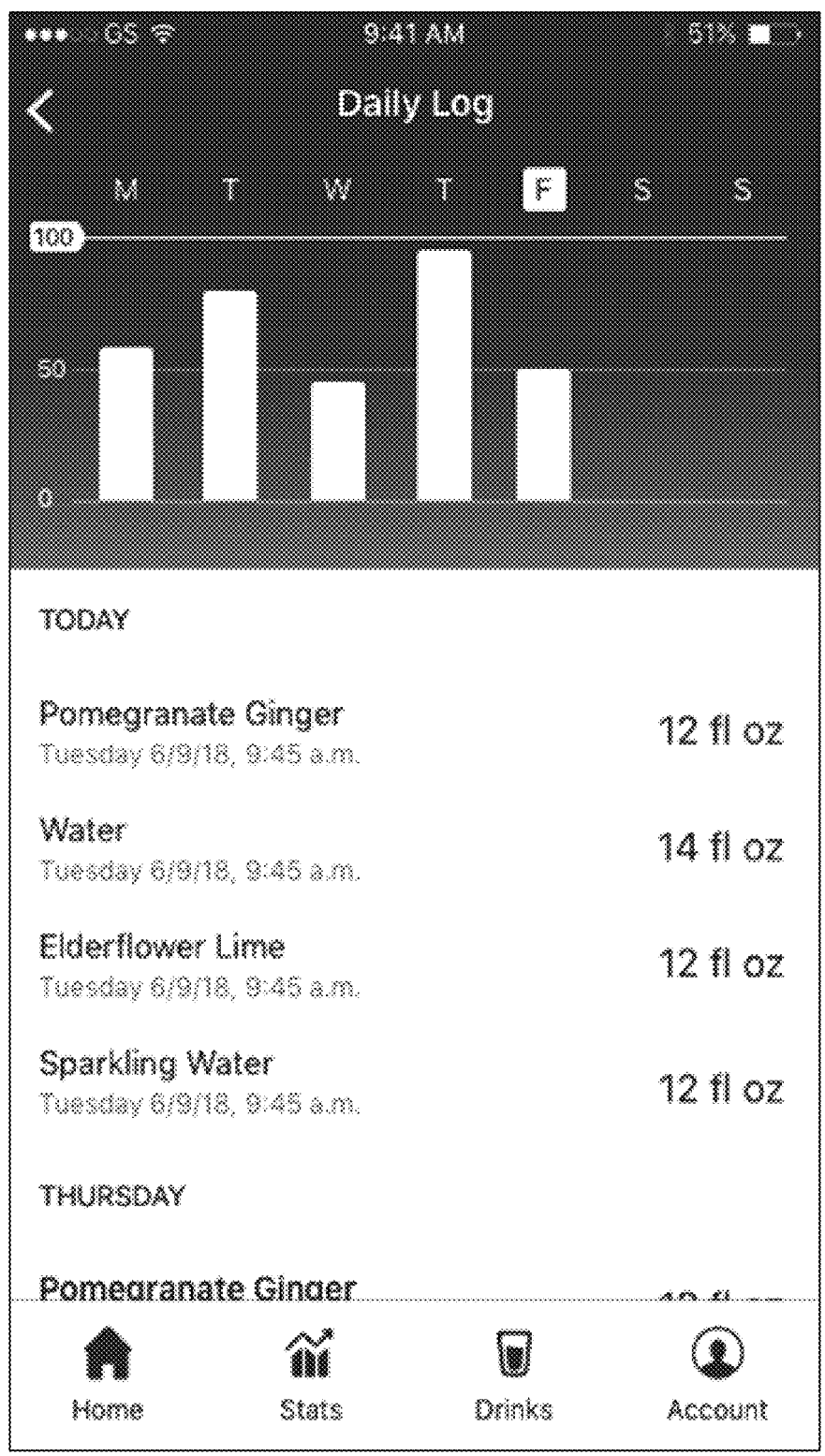
FIG. 35 is an exemplary graphical user interface in accordance with various aspects of the invention.

As shown in FIG. 35, customer device 202 can track and display a user's beverage consumption, for example, in a "Daily Log." Customer device 202 can display the dispensed beverages from one or more of beverage dispensers 10, 1010, and 2010, including one or more of the ingredients, beverage amount dispensed, and the time the beverage was dispensed.

Figure 36:
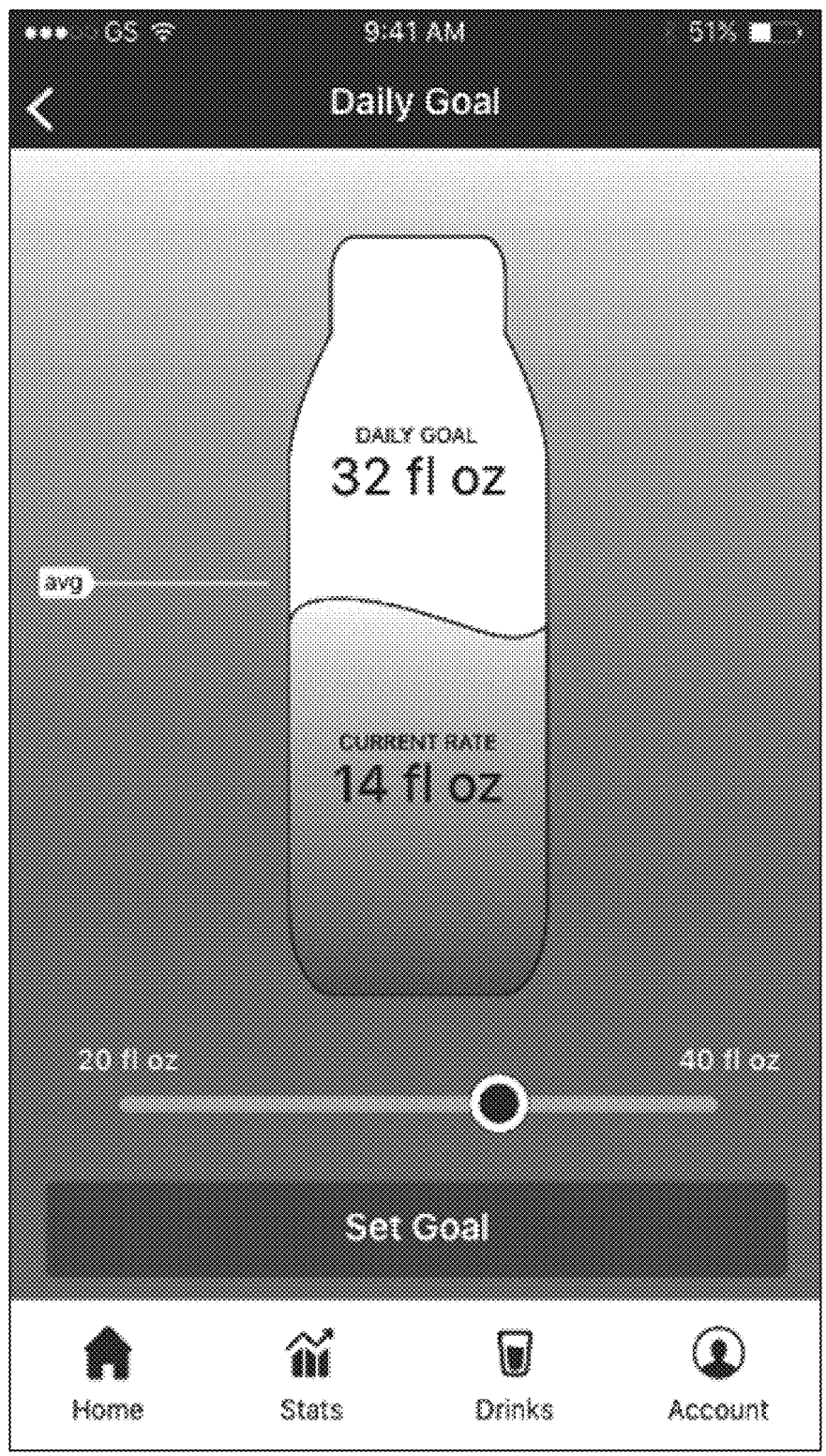
FIG. 36 is an exemplary graphical user interface in accordance with various aspects of the invention.

As shown in FIG. 36, customer device 202 can track and display a user's daily beverage consumption goal, for example, in a "Daily Goal." Customer device 202 can display the amount of dispensed beverages from one or more of beverage dispensers 10, 1010, and 2010 and can compare the amount of dispensed beverages with a daily goal set by the user. Customer device 202 can provide a goal screen that can include a goal icon and/or a goal slider button. The goal icon can be a beverage container and can increase the amount of fluid shown in the goal icon based on the amount of beverages dispensed. A user can move the goal slider button to increase or decrease the user's daily goal.

Figure 37:
FIG. 37 is an exemplary graphical user interface in accordance with various aspects of the invention.

As shown in FIG. 37, customer device 202 can display a summary menu screen that can include for example, a goal summary button such as "50 fl oz left," an environmental summary button such as "125 bottles saved," a container summary button such as "ID your bottles," and a payment summary button such as "$12.50 remaining balance." In an aspect a user can select the goal summary button, the environmental summary button, the container summary button, or the payment summary button to be taken to a new screen related to that button.

Figure 38:
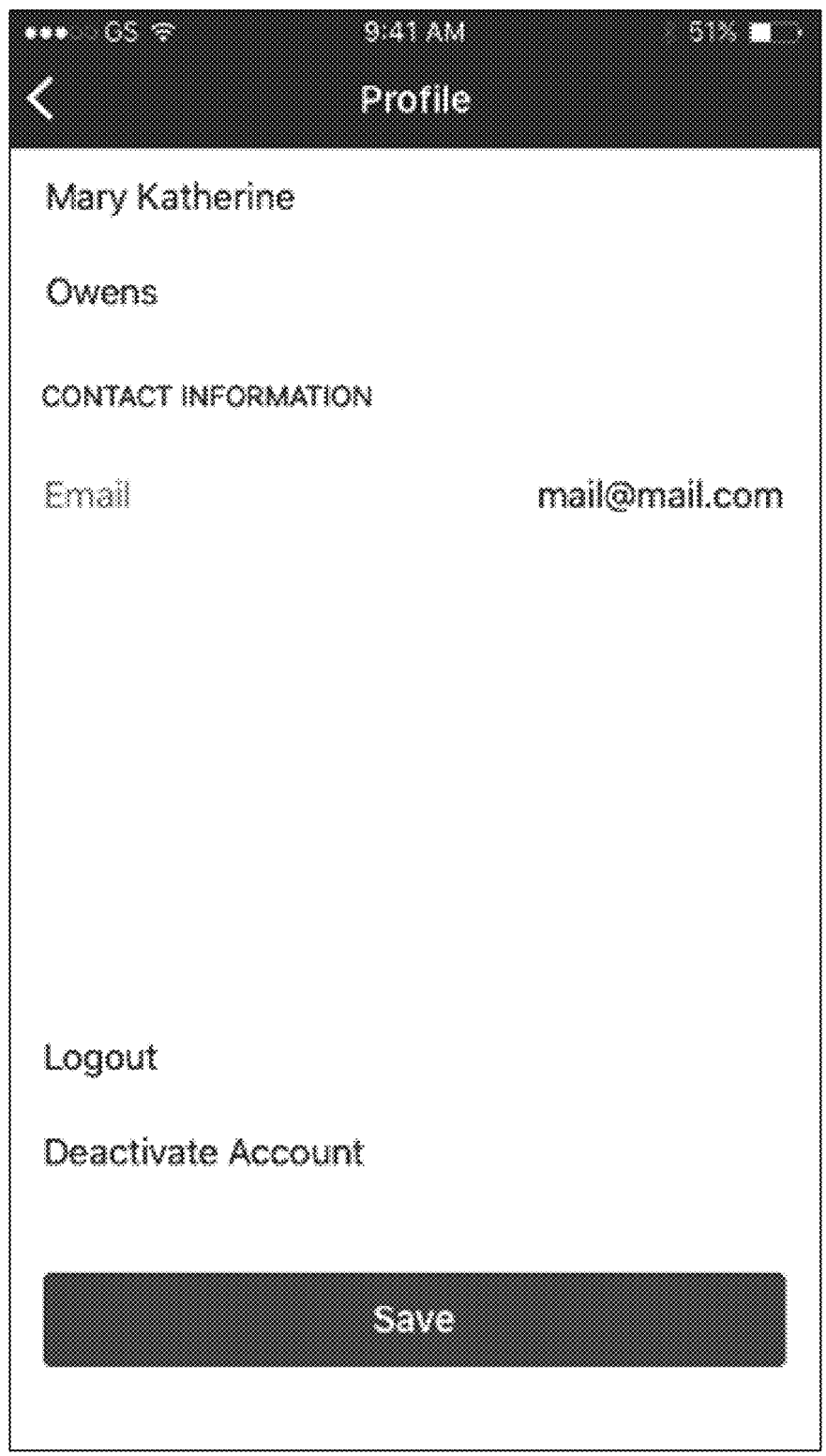
FIG. 38 is an exemplary graphical user interface in accordance with various aspects of the invention.

As shown in FIG. 38, customer device 202 can display an edit user account or "profile" screen. The user can edit their name or email contact information and can save changes to the user account by selecting the save button. The user can also log out of the user account on a customer device 202 by selecting the "Logout" button. The user can also deactivate their user account by selecting the "Deactivate Account" button.

Figure 39:
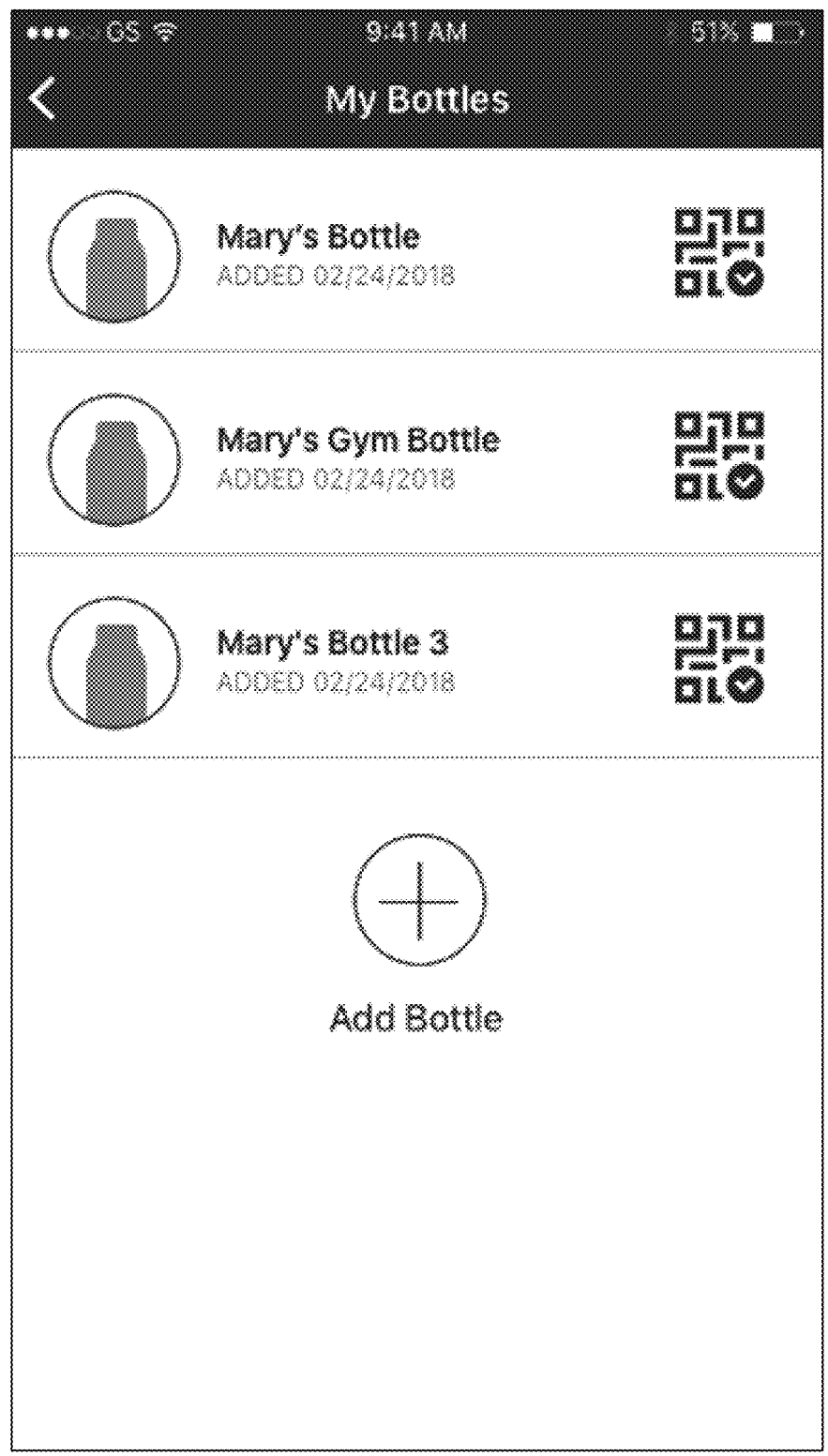
FIG. 39 is an exemplary graphical user interface in accordance with various aspects of the invention.

As shown in FIG. 39, customer device 202 can display the user's beverage containers that are linked to the user's account. A user can select one of the linked beverage containers shown on customer device 202 and customer device 202 can display identification information for the selected beverage container, such as a QR code (FIG. 40).

Figure 40:
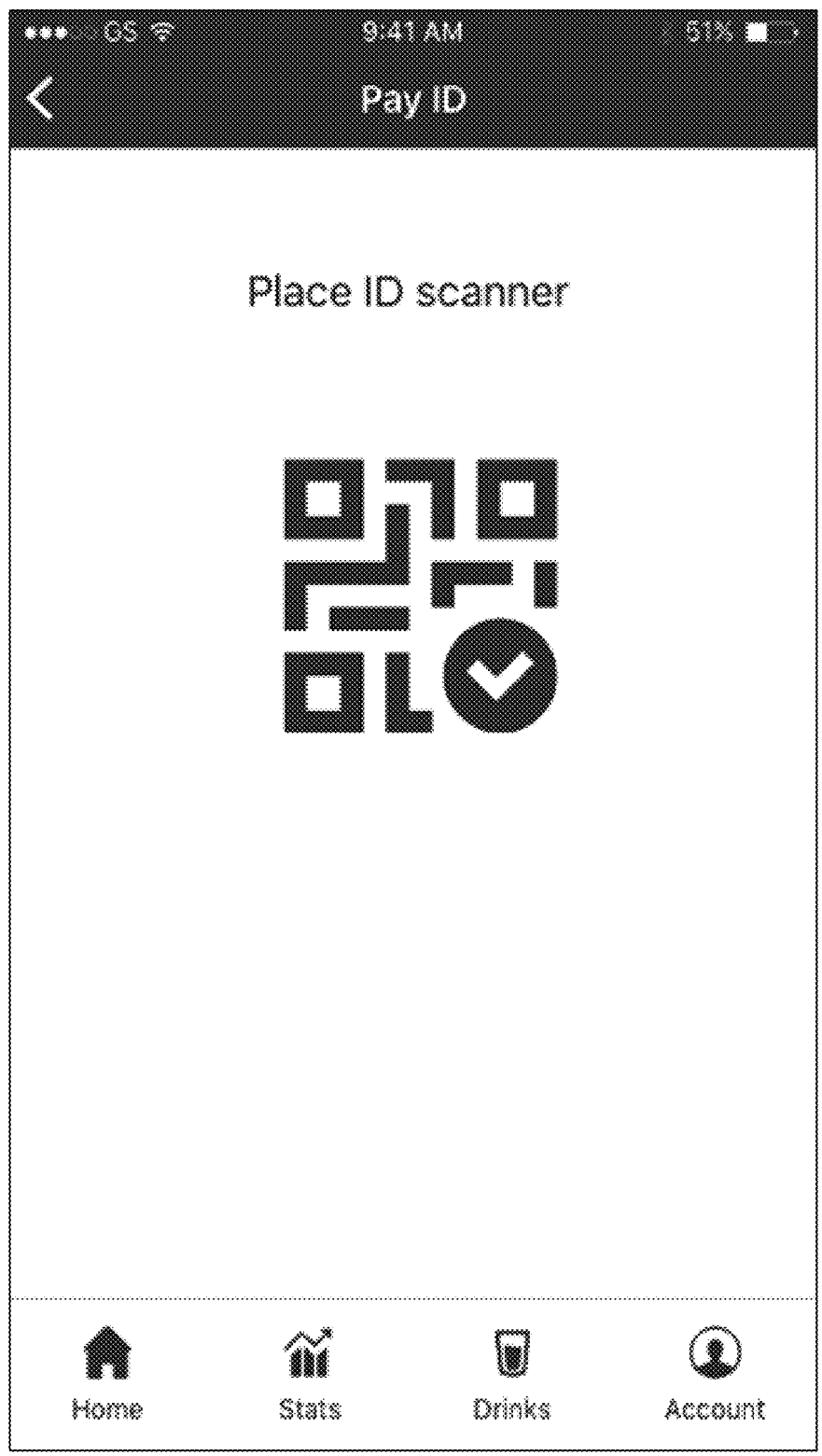
FIG. 40 is an exemplary graphical user interface in accordance with various aspects of the invention.

As shown in FIG. 40, customer device 202 can display identification information for a selected beverage container, such as a QR code. In some aspects, the QR code displayed by customer device 202 may be a dynamic QR code. This means that the QR code may be modified to change the information encoded in the QR code by customer device 202. This can allow customer device 202 to transmit customized information about the user to beverage dispensers 10, 1010, and 2010. For example, the dynamic QR code may include the user's identification number, the user's name, and one or more customizable beverage recipes. For example, these recipes may be the user's top three favorite beverages, the last three beverages poured by the user, or any other beverage recipes selected as desired. The QR code may be updated to reflect changes in these recipes, for example, if the user customizes the ingredients of one or more of the recipes.

Figure 41:
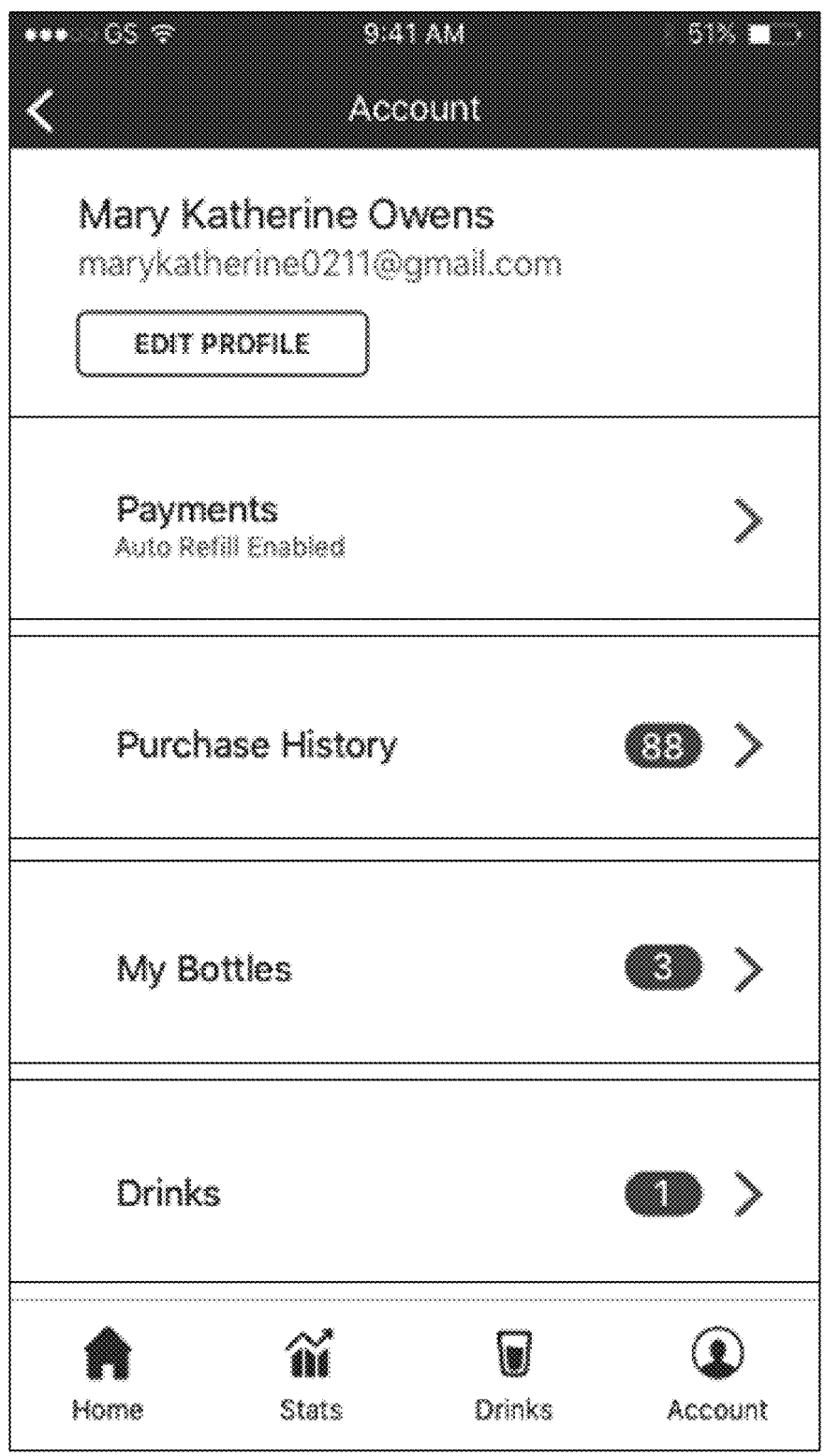
FIG. 41 is an exemplary graphical user interface in accordance with various aspects of the invention.
Figure 42:
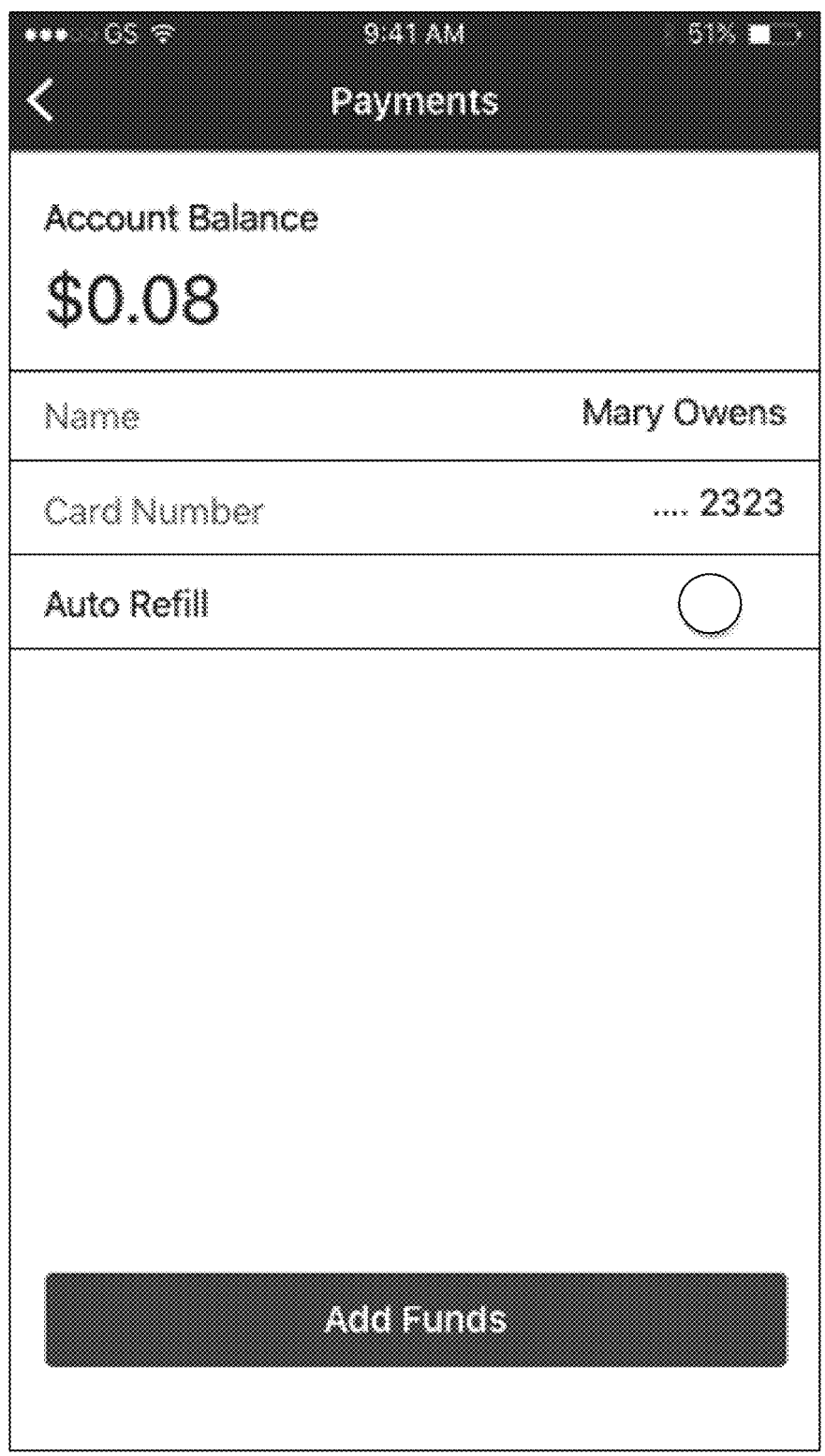
FIG. 42 is an exemplary graphical user interface in accordance with various aspects of the invention.
Figure 43:
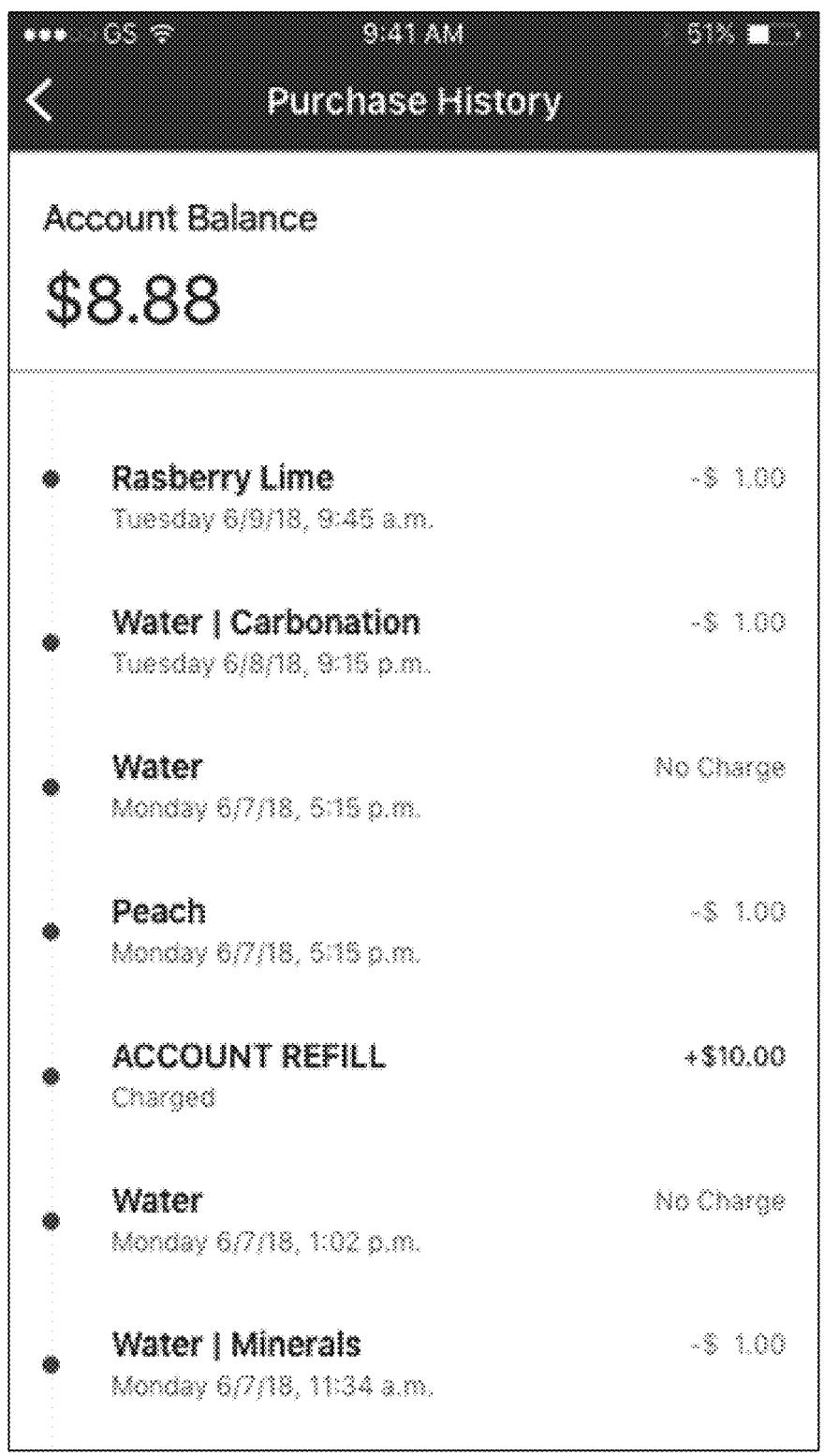
FIG. 43 is an exemplary graphical user interface in accordance with various aspects of the invention.

As shown in FIG. 41, customer device 202 can display an account summary or "Account" screen." The user can select the "Edit Profile" button to edit their user account (e.g., FIG. 38). The user can select the "Payments" button to edit the payment method(s) associated with the user account (FIG. 42). These payment methods may include paying for a single beverage directly at the time of dispensing the beverage using a credit card or another suitable digital payment account. This single-beverage payment may be linked to a set volume of beverage, for example, 12 ounces of beverage for a set fee. A user account may also be linked to a subscription model that enables a limited or unlimited number of beverages to be poured in a set time period. For example, a user may pay a flat fee to receive unlimited beverages for any desired time period, such as one month or one year. The subscription model may also be linked to outside events, such as unlimited beverages for the duration of a sporting event or unlimited beverages for an academic semester or school year. The user can select the "Purchase History" button to view their dispensed beverages (e.g., FIG. 43). The user can select the "My Bottles" button to view the beverage containers associated with the user's account (e.g., FIG. 39). The user can select the "Drinks" button to view one or more favorite customized beverage recipes (e.g., FIG. 44).

Figure 44:
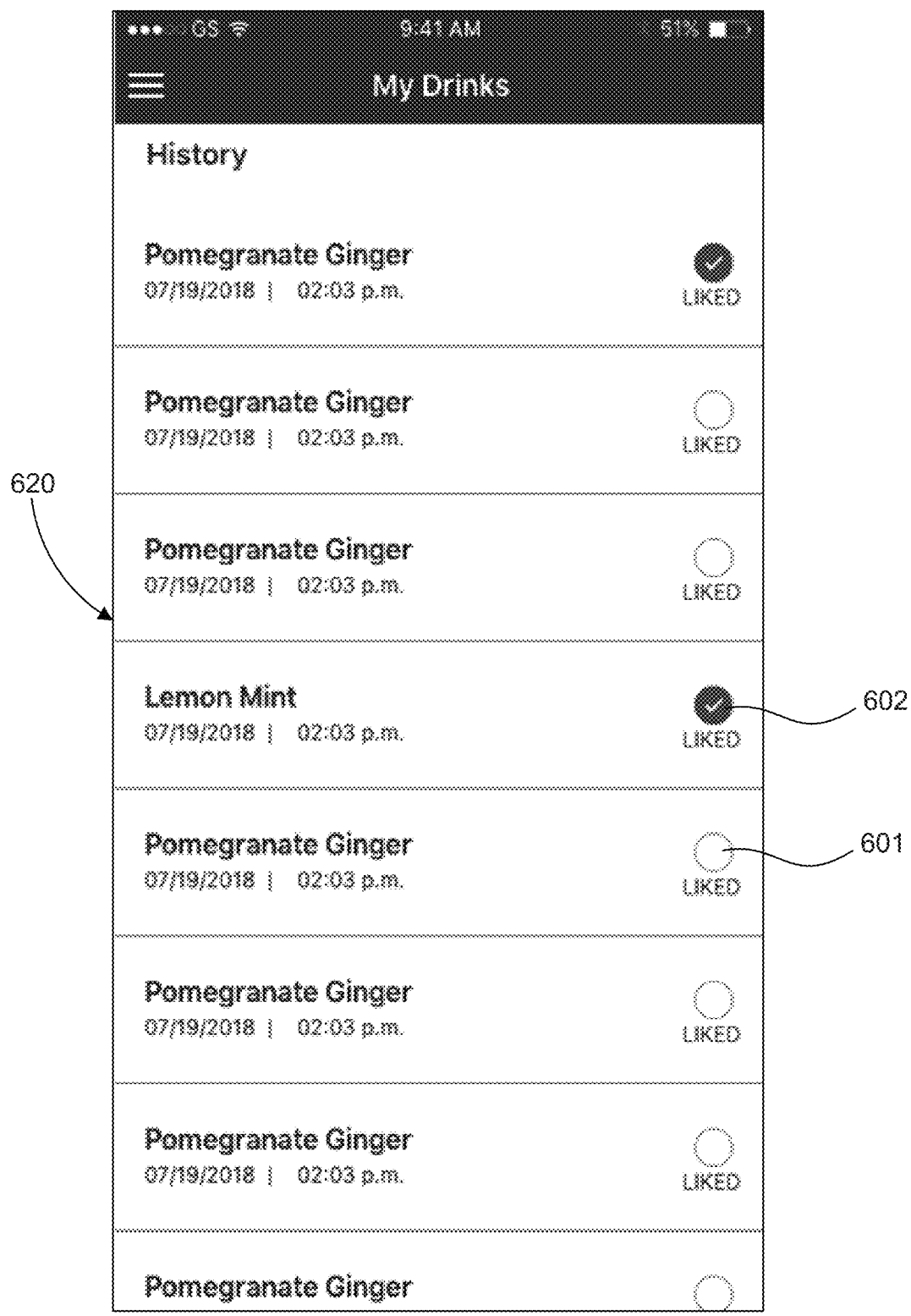
FIG. 44 is an exemplary graphical user interface in accordance with various aspects of the invention.

As shown in FIG. 44, customer device 202 can display a "My Drinks" screen 620 that shows the user's favorite beverage recipes. A user can select "Liked" button 601 to indicate whether the user liked the dispensed beverage and wishes to order it again in the future. If the user selects "Liked" button 601, customer device can display icon 602 in "Liked" button 601. If user selects "Liked" button 601, customer device 202 can also display a "Liked" popup 632. "Liked" popup 632 can include an add to favorites button 634 such as "Add to favorites for quick access," a share button 636 such as "Share this flavor," and a decline button 638 "no thanks" to return to the previous screen.

Figure 45:
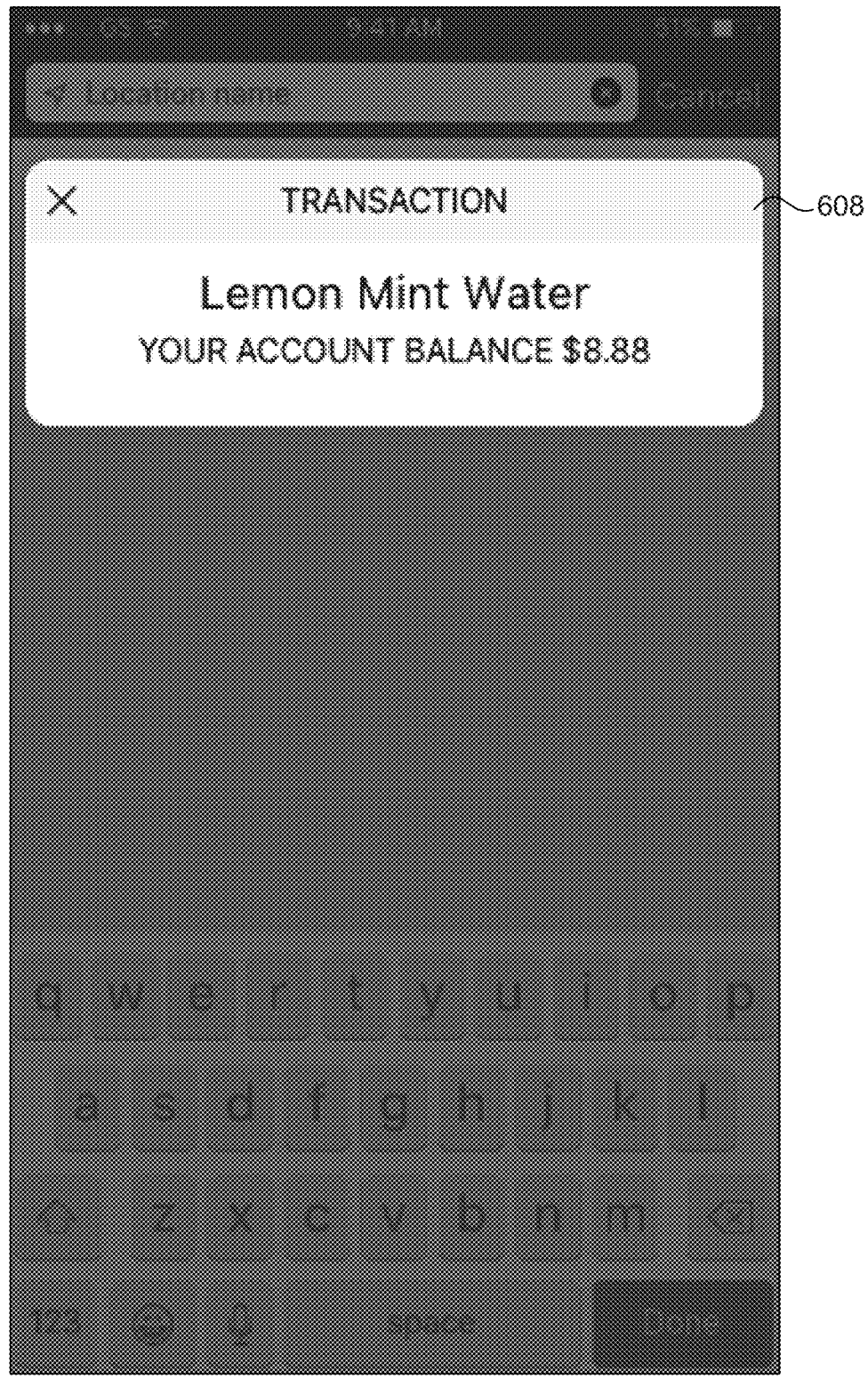
FIG. 45 is an exemplary graphical user interface in accordance with various aspects of the invention.

As shown in FIG. 45, customer device 202 can display a transaction pop up 608 to show the custom beverage ingredients dispensed such as "Lemon Mint Water," and the user account balance such as "YOUR ACCOUNT BALANCE $8.88."

Figure 50:
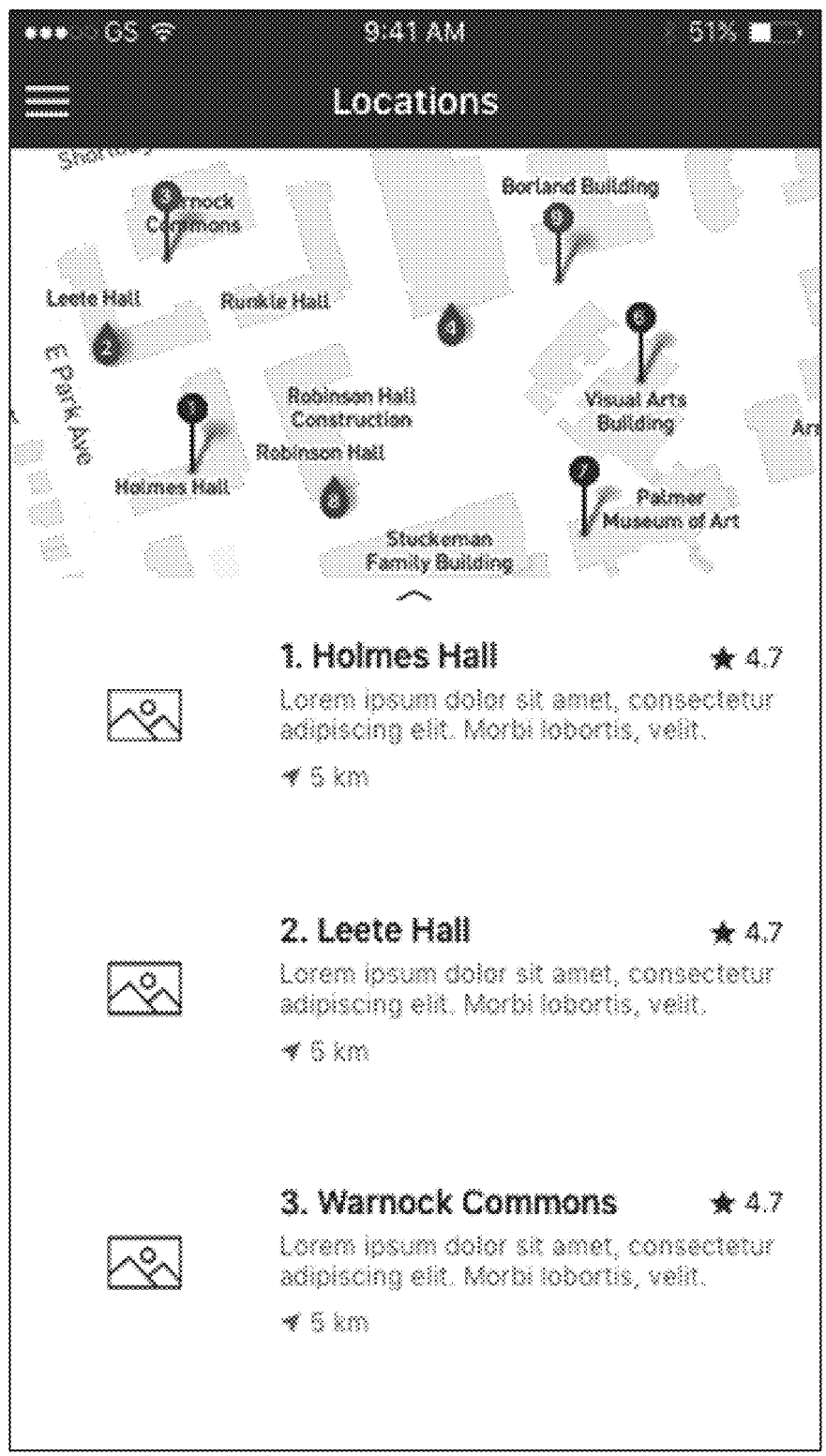
FIG. 50 is an exemplary graphical user interface in accordance with various aspects of the invention.
Figure 51:
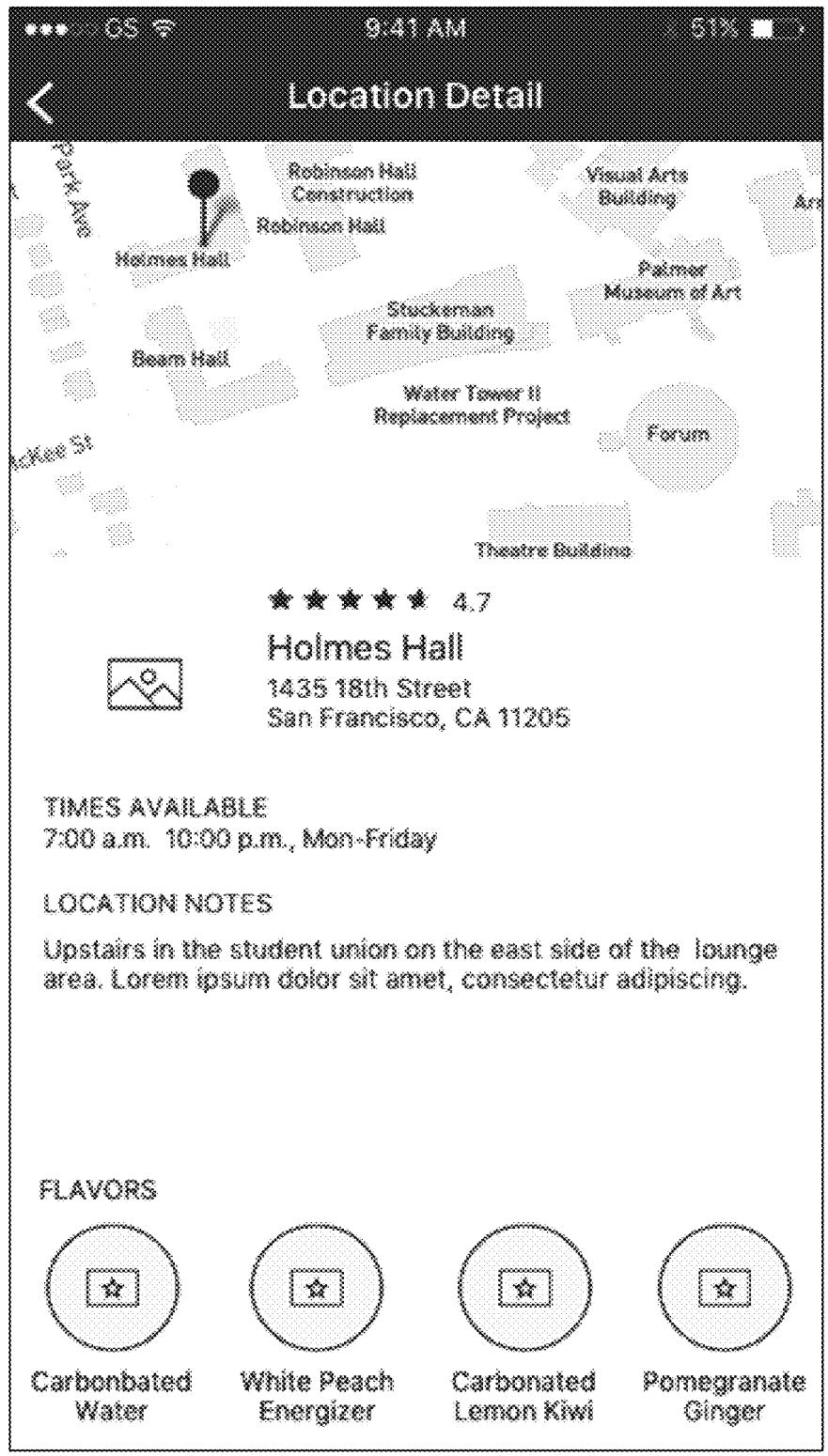
FIG. 51 is an exemplary graphical user interface in accordance with various aspects of the invention.
Figure 52:
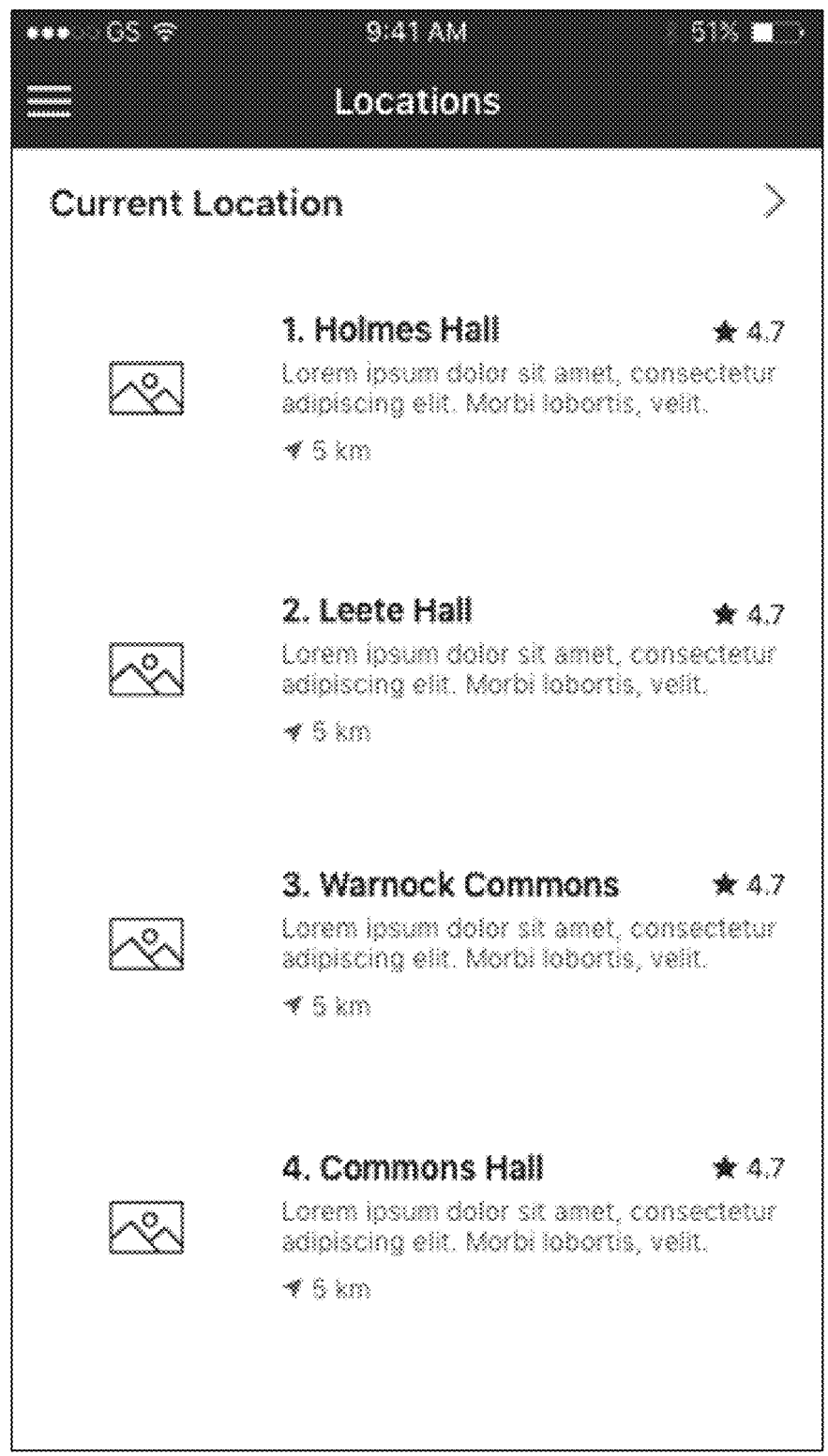
FIG. 52 is an exemplary graphical user interface in accordance with various aspects of the invention.

As shown in FIGS. 49-52, customer device 202 can display a beverage dispenser locations screen "Locations" to show the physical location of one or more beverage dispensers 204. A user can select one or more of the beverage dispenser pins to display additional location information, beverage dispenser ratings, and/or flavorings, additives, and energizers that are available at the selected beverage dispenser. (FIGS. 50-51). Customer device 202 may be configured to display the locations of the closest one or more beverage dispensers 204. In some aspects, beverage dispenser 204 may be configured to transmit its location to customer device 202 using network 210 or directly to customer device 202 using an appropriate transmission device, such as a wireless transmitter. In some aspects, beverage dispenser 204 may be configured to send a notification to a user's customer device 202 when the user is within a certain distance of beverage dispenser 204.

As shown in FIG. 53, beverage dispenser 204 can display one or more screens to attract a user to the beverage dispenser. The attractor screens can display initial user input selections such as "Sign up for an account" button 504 and "Get a drink" button 506.

Figure 54:
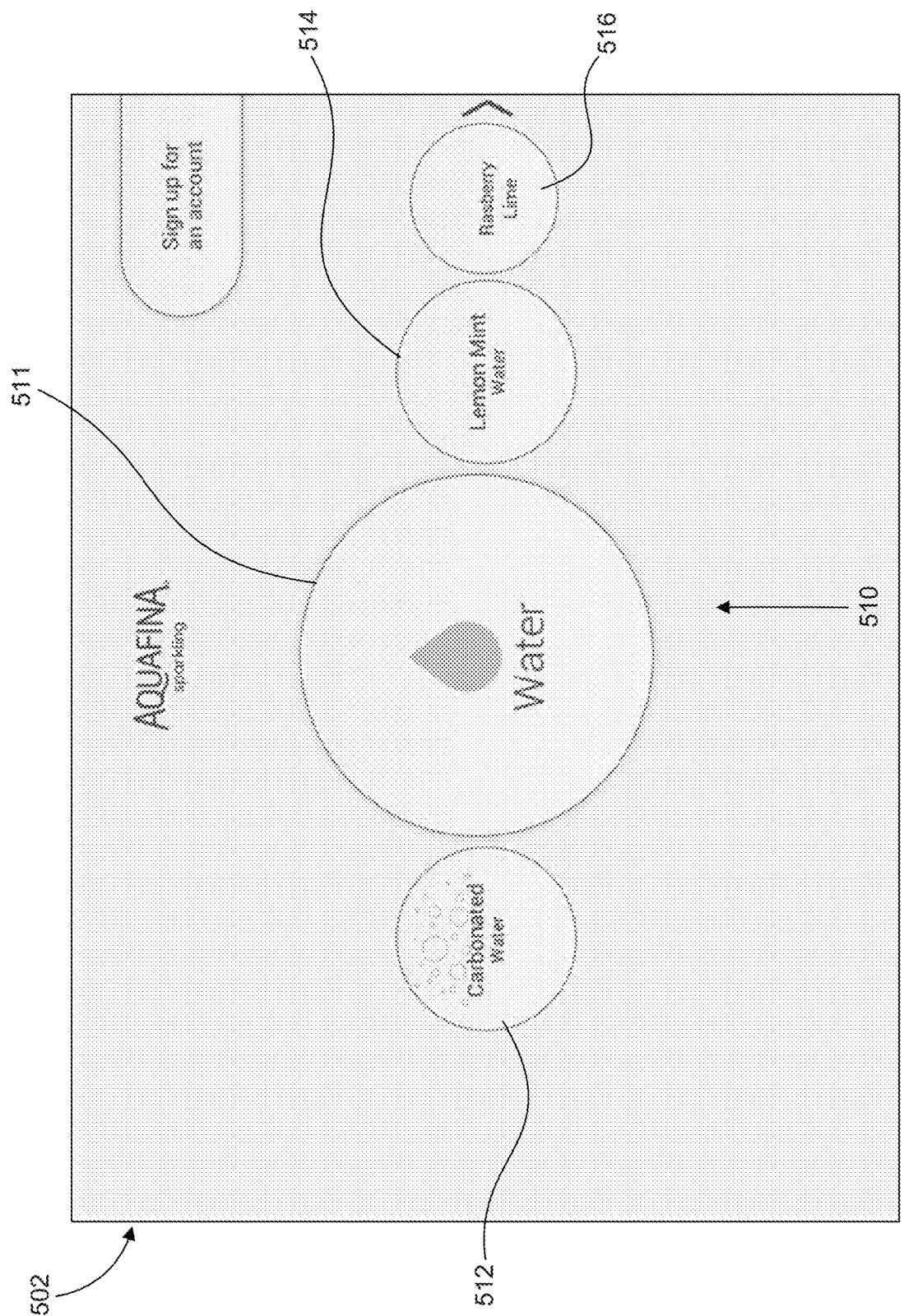
FIG. 54 is an exemplary graphical user interface in accordance with various aspects of the invention.
Figure 55:
FIG. 55 is an exemplary graphical user interface in accordance with various aspects of the invention.
Figure 56:
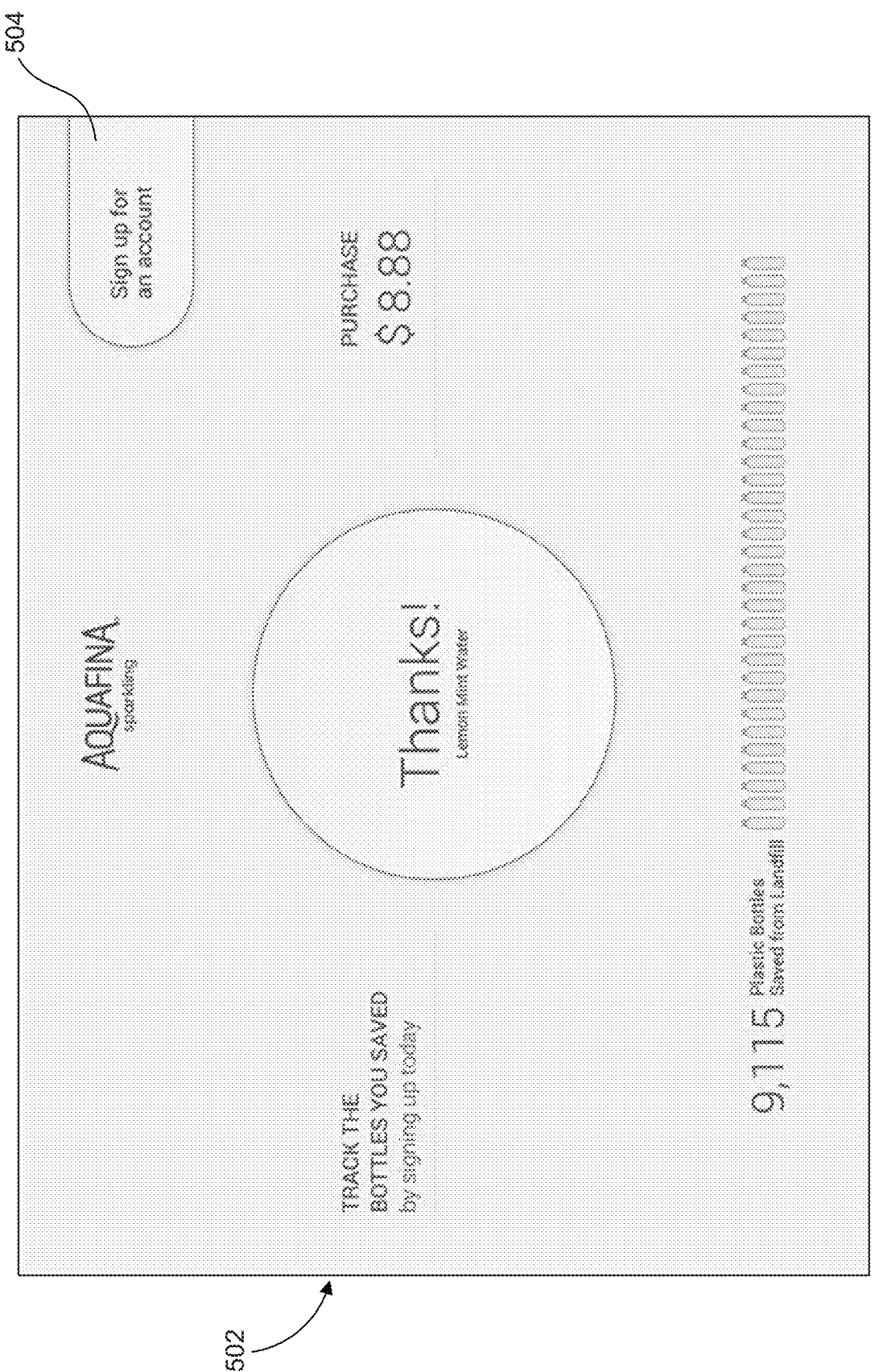
FIG. 56 is an exemplary graphical user interface in accordance with various aspects of the invention.

As shown in FIG. 54, beverage dispenser 204 can display recipe buttons for a user to select. Recipe button can include, for example, non-sparkling water button 511, sparkling water button 512, custom recipe button 514 such as "Lemon Mint Water," and custom recipe button 516 such as "Raspberry Lime." In an aspect, beverage dispenser 204 can increase the size of one of the one or more recipe buttons to indicate that the enlarged button is a selected recipe button 510.

After a user selects a recipe button, beverage dispenser 204 can display customization screens, as shown in FIGS. 55, 57-60, 67, 68, 74, 82, 87, 88, 89. Beverage dispenser 204 can display a carbonation button 520, a temperature button 524, a flavor button 528, and a pour button 530. If the user does not wish to customize the selected beverage recipe, the user can select a pour button 530 without pressing any of carbonation button 520, temperature button 524, or flavor button 528.

Figure 60:
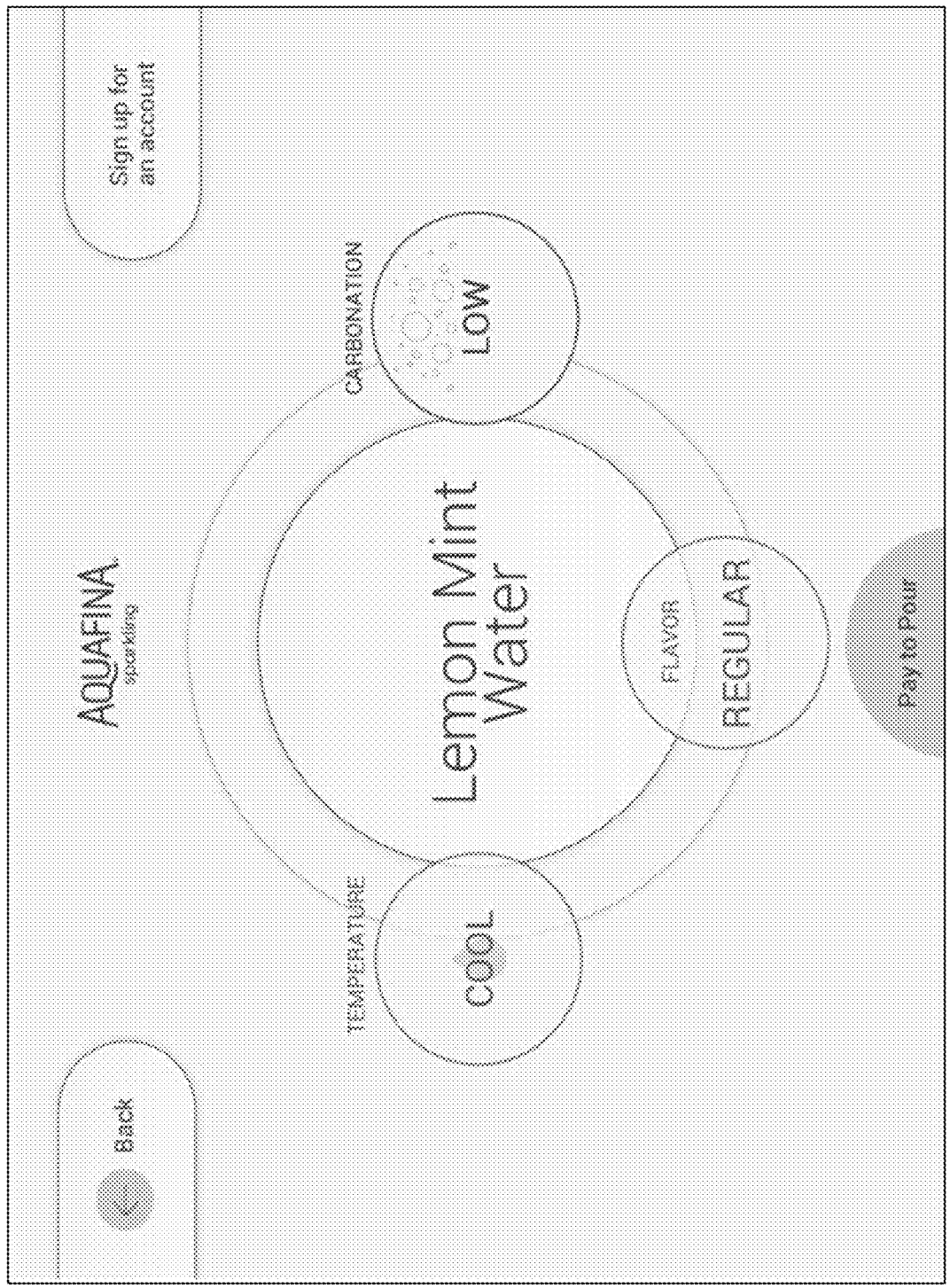
FIG. 60 is an exemplary graphical user interface in accordance with various aspects of the invention.
Figure 61:
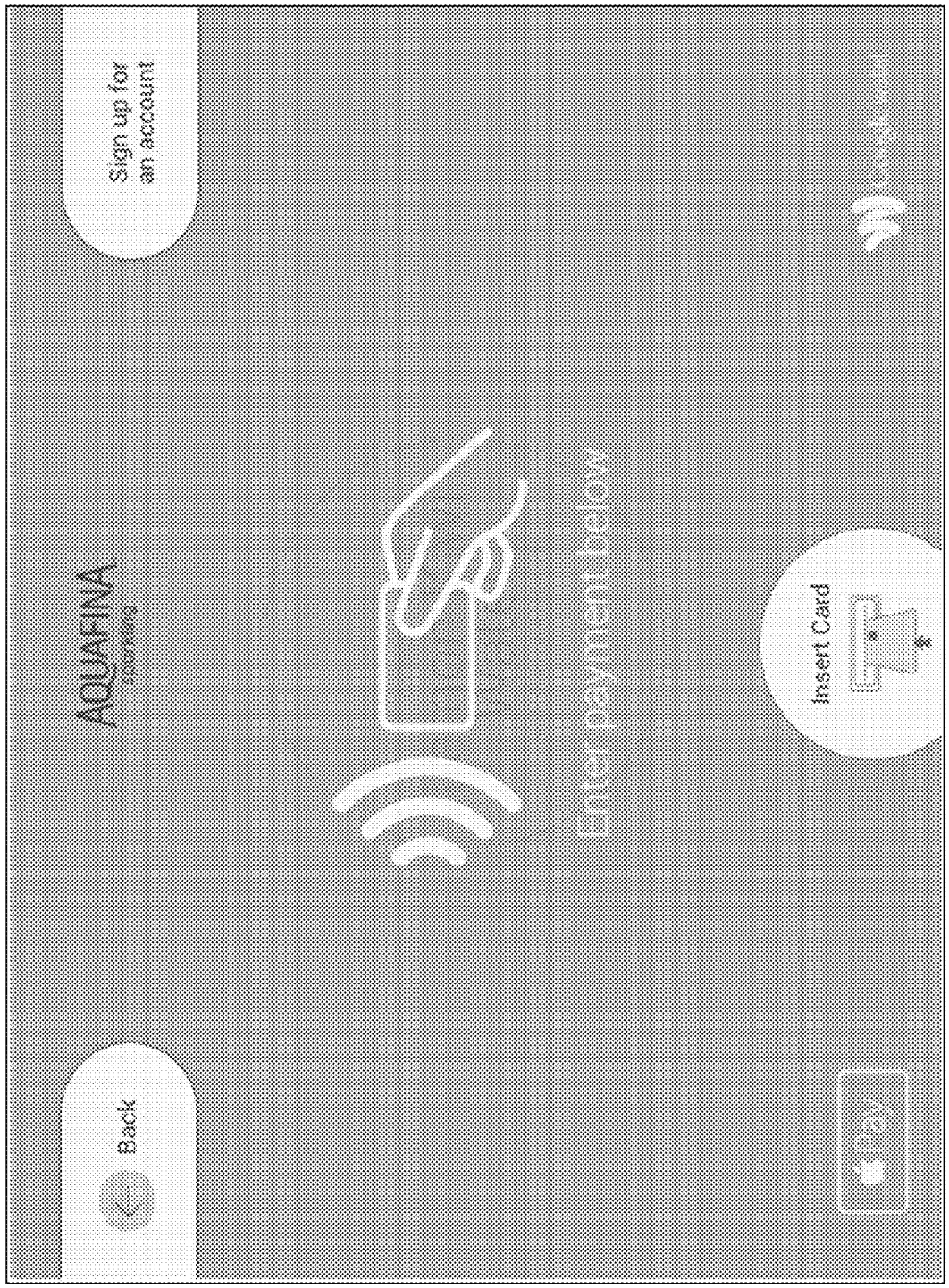
FIG. 61 is an exemplary graphical user interface in accordance with various aspects of the invention.
Figure 62:
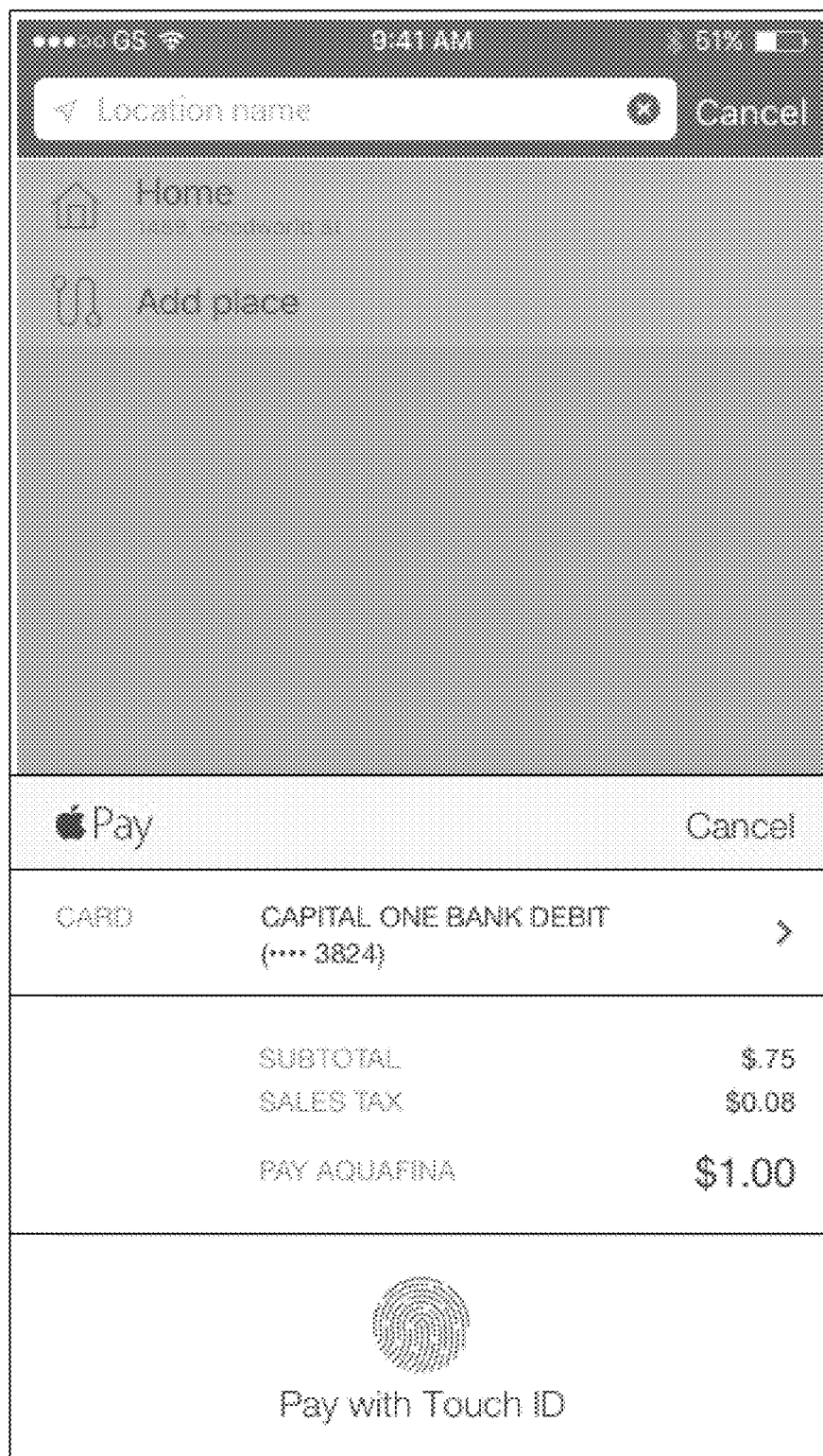
FIG. 62 is an exemplary graphical user interface in accordance with various aspects of the invention.
Figure 63:
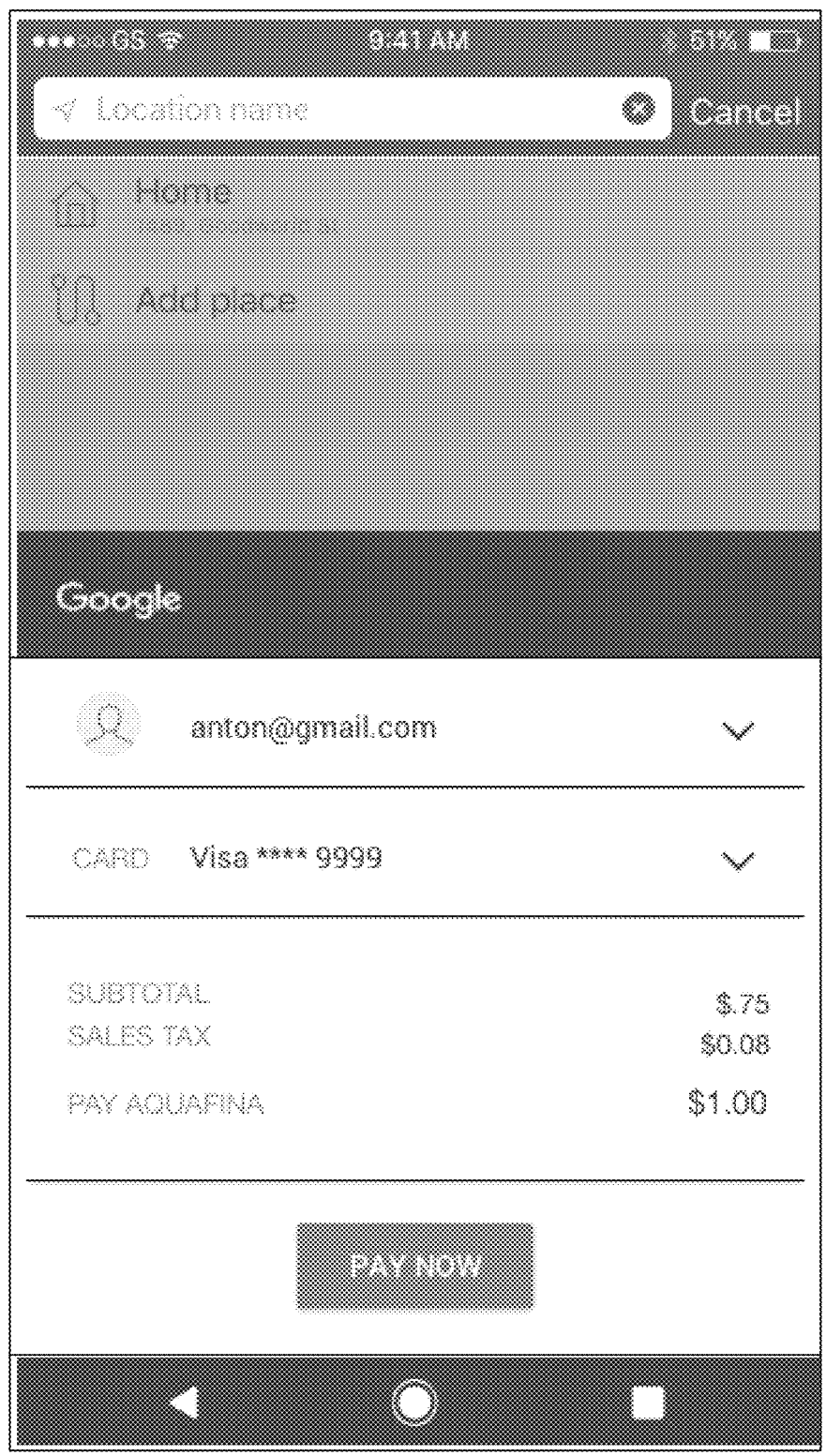
FIG. 63 is an exemplary graphical user interface in accordance with various aspects of the invention.
Figure 64:
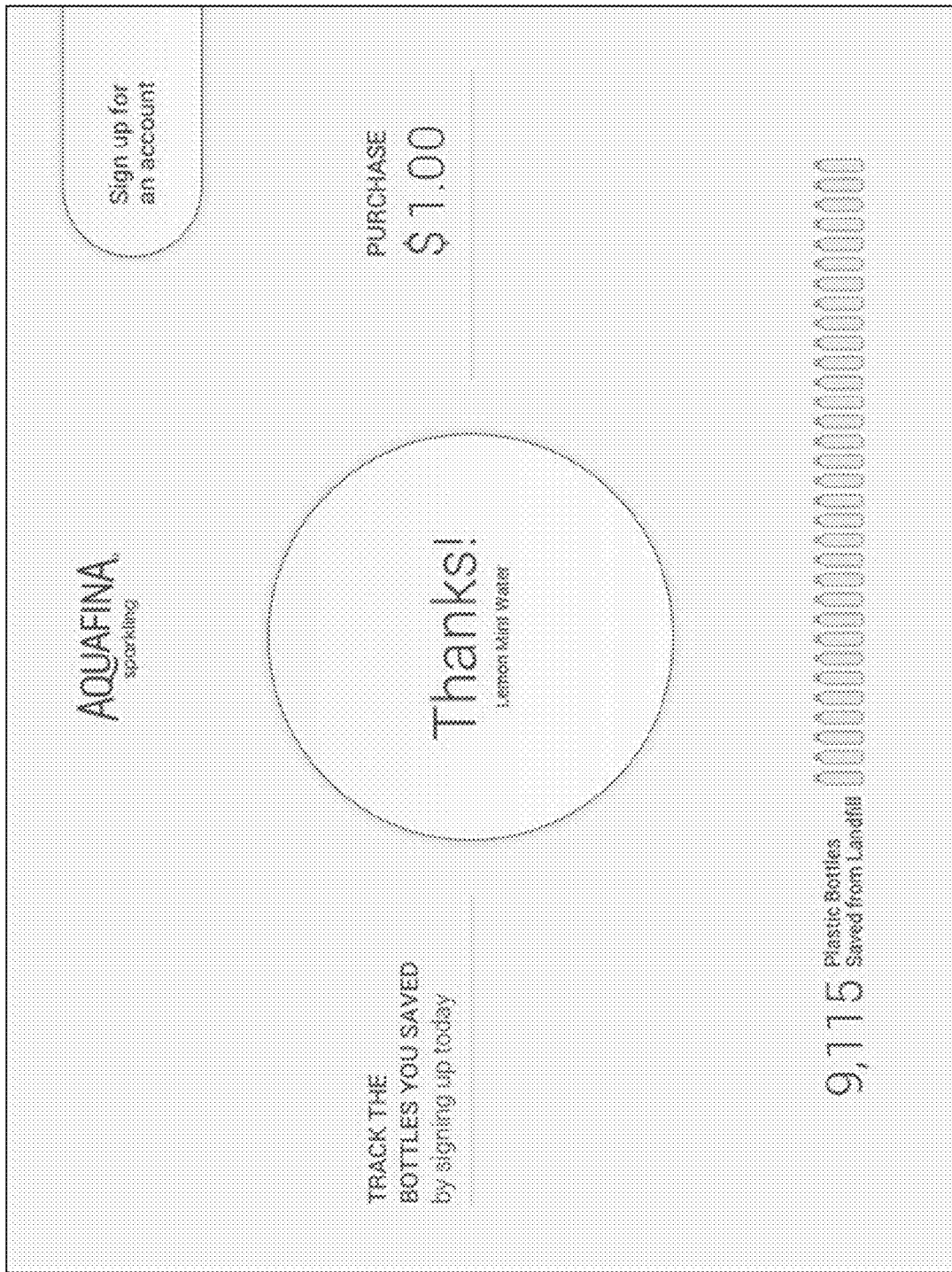
FIG. 64 is an exemplary graphical user interface in accordance with various aspects of the invention.
Figure 65:
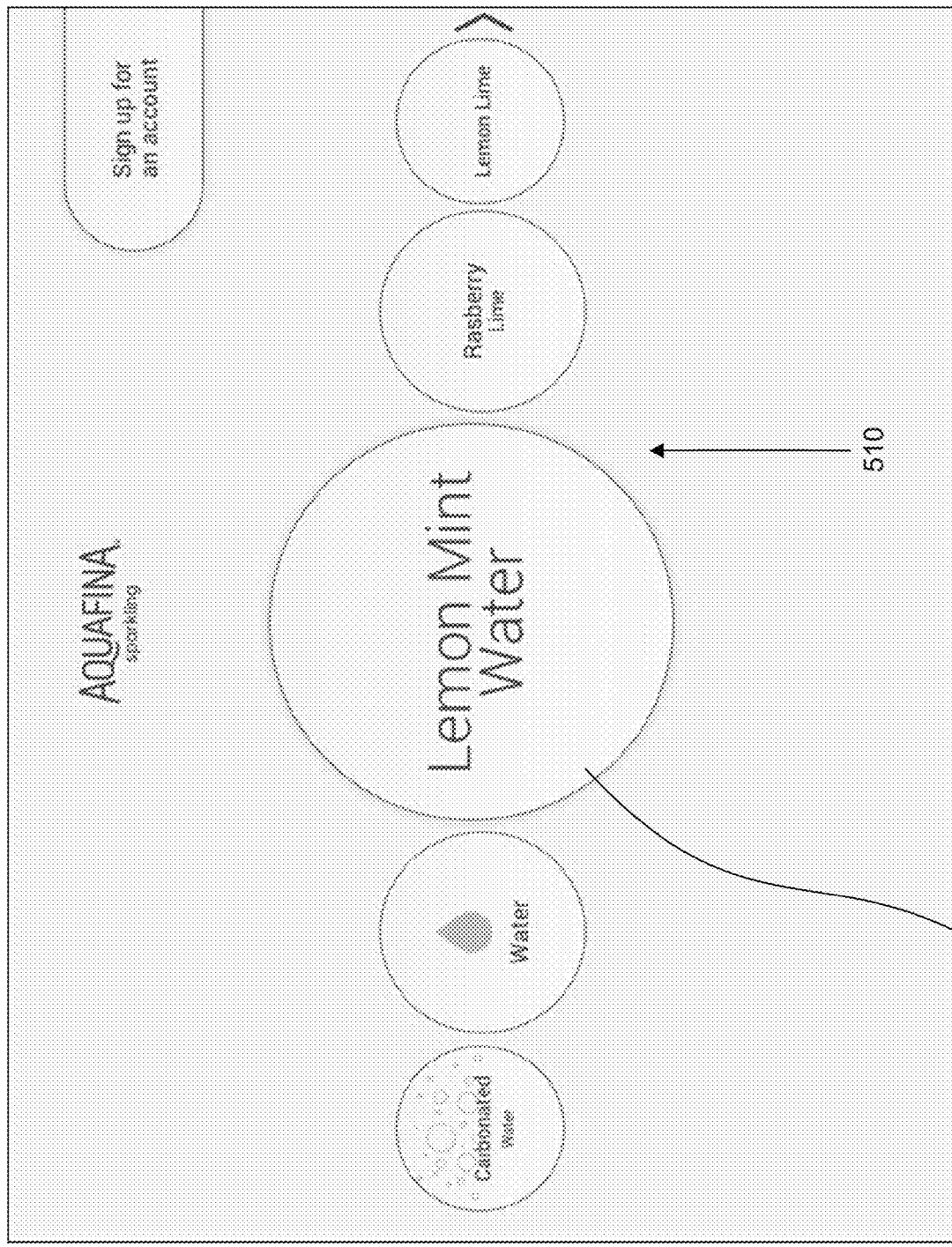
FIG. 65 is an exemplary graphical user interface in accordance with various aspects of the invention.
Figure 66:
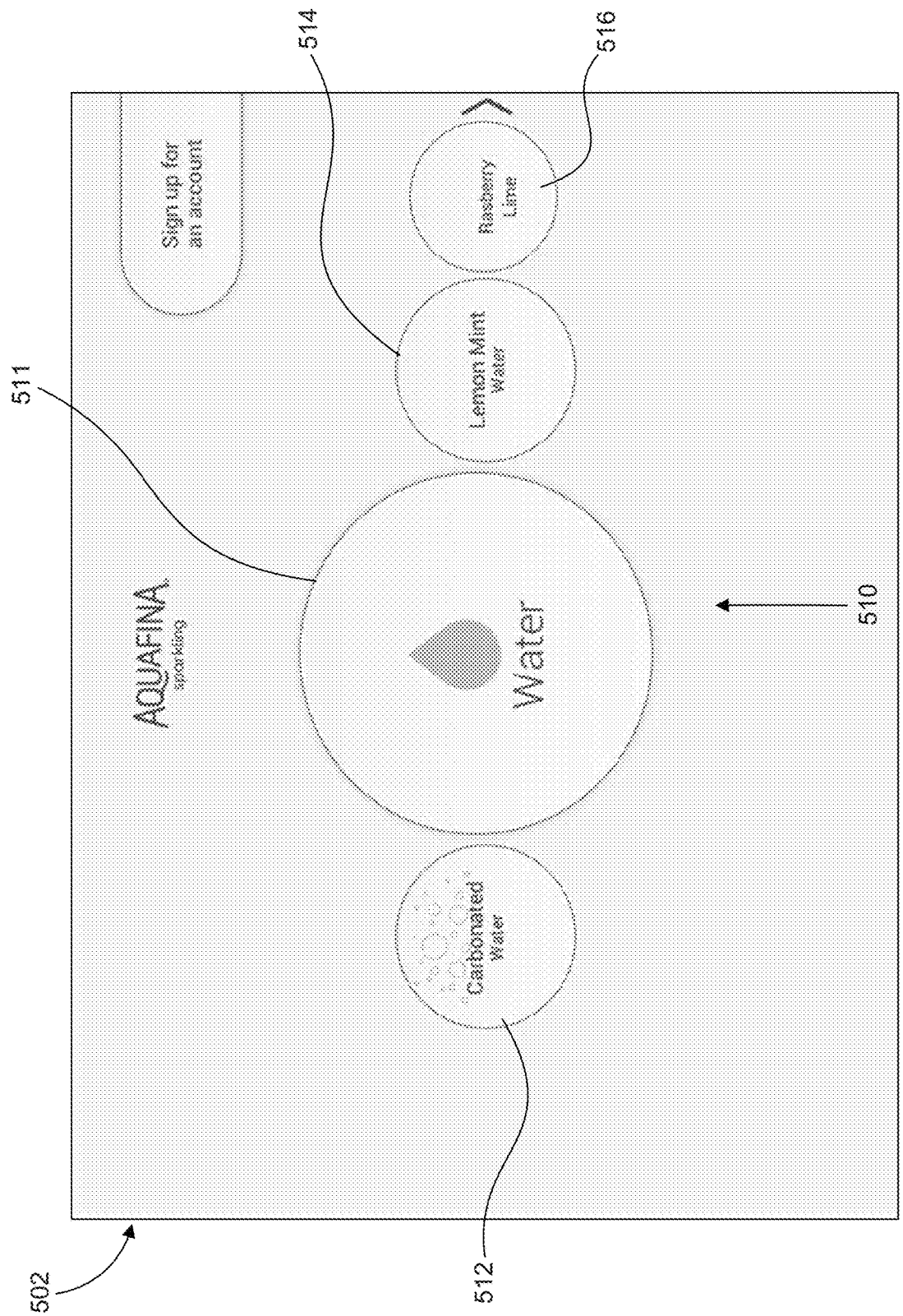
FIG. 66 is an exemplary graphical user interface in accordance with various aspects of the invention.

In an aspect shown in FIG. 57, after receiving a selection of flavor button 528, beverage dispenser 204 can display user input selection 528a "orange grapefruit," user input selection 528b "lemon mint," user input selection 528c "raspberry lime," user input selection 528d "cucumber," user input selection 528e "lemon lime," user input selection 528f "peach." In response to a selection, the beverage dispenser 204 can highlight the selected icon to indicate the selected flavoring to be added. After selecting the flavoring, beverage dispenser 204 can display flavor intensity buttons to permit a user to adjust the intensity of the flavoring (FIG. 60). For example, beverage dispenser 204 can display user input selection 528a for light flavoring, user input selection 528b for regular flavoring, or user input selection 528c for strong flavoring.

In an aspect shown in FIG. 59, after receiving a selection of carbonation button 520, beverage dispenser 204 can display user input selection 520d "no carbonation," user input selection 520c "low carbonation," user input selection 520b "regular carbonation," and user input selection 520a "maximum carbonation."

In an aspect shown in FIG. 67, after receiving a selection of temperature button 524, beverage dispenser 204 can display user input selection 524a "cold water," user input selection 524b "cool water," and user input selection 524c "room" temperature.

Figure 78:
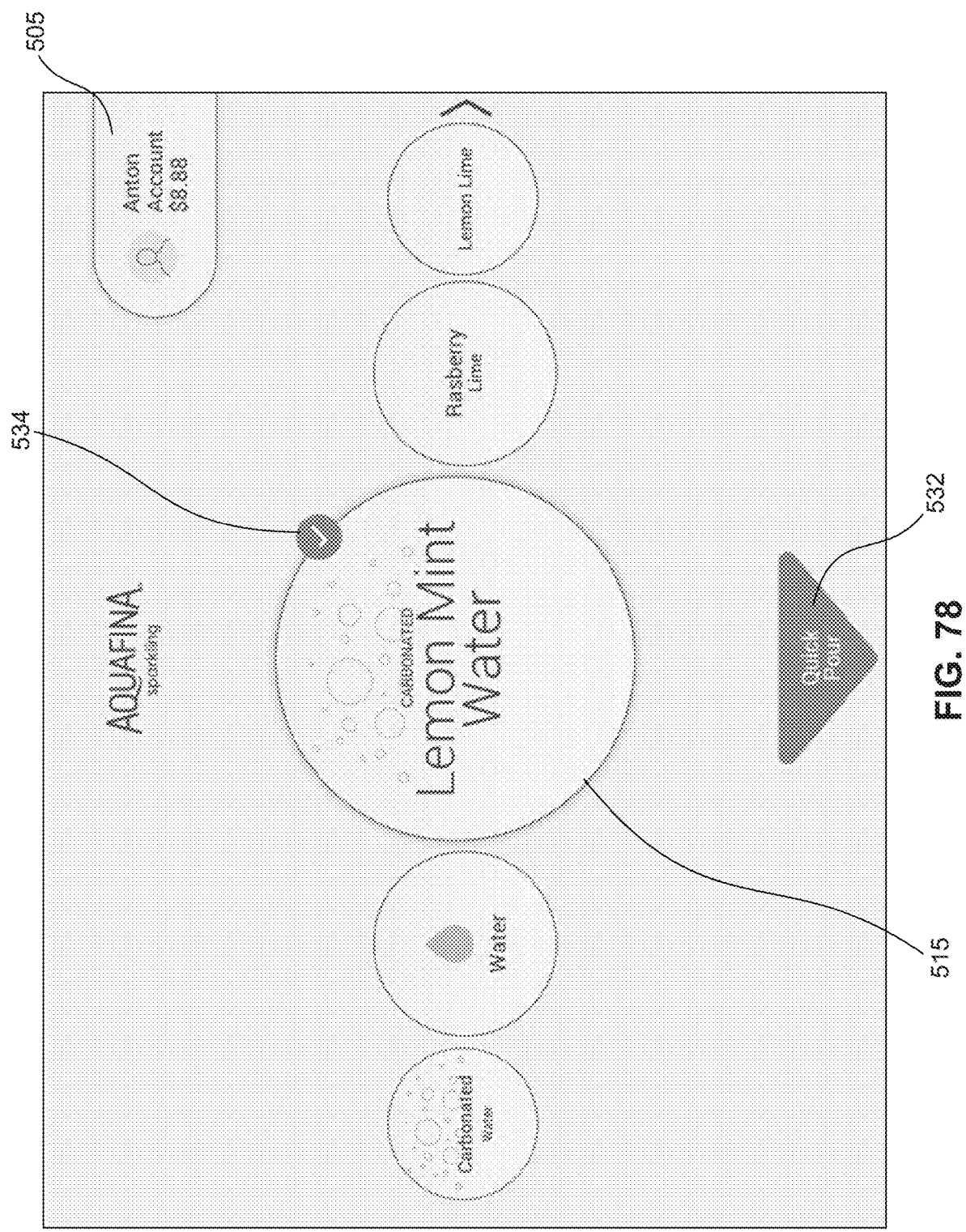
FIG. 78 is an exemplary graphical user interface in accordance with various aspects of the invention.
Figure 79:
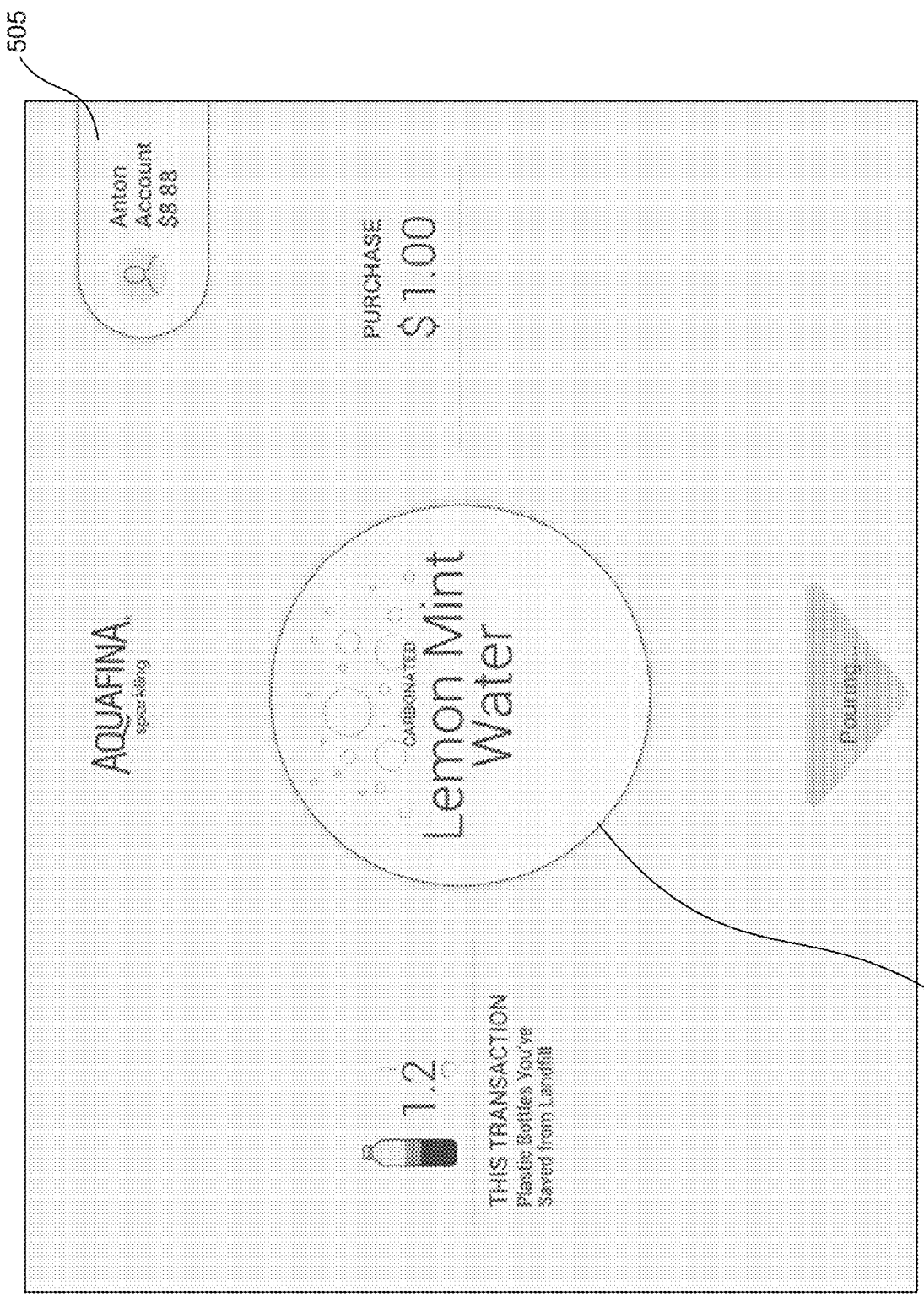
FIG. 79 is an exemplary graphical user interface in accordance with various aspects of the invention.
Figure 80:
FIG. 80 is an exemplary graphical user interface in accordance with various aspects of the invention.
Figure 81:
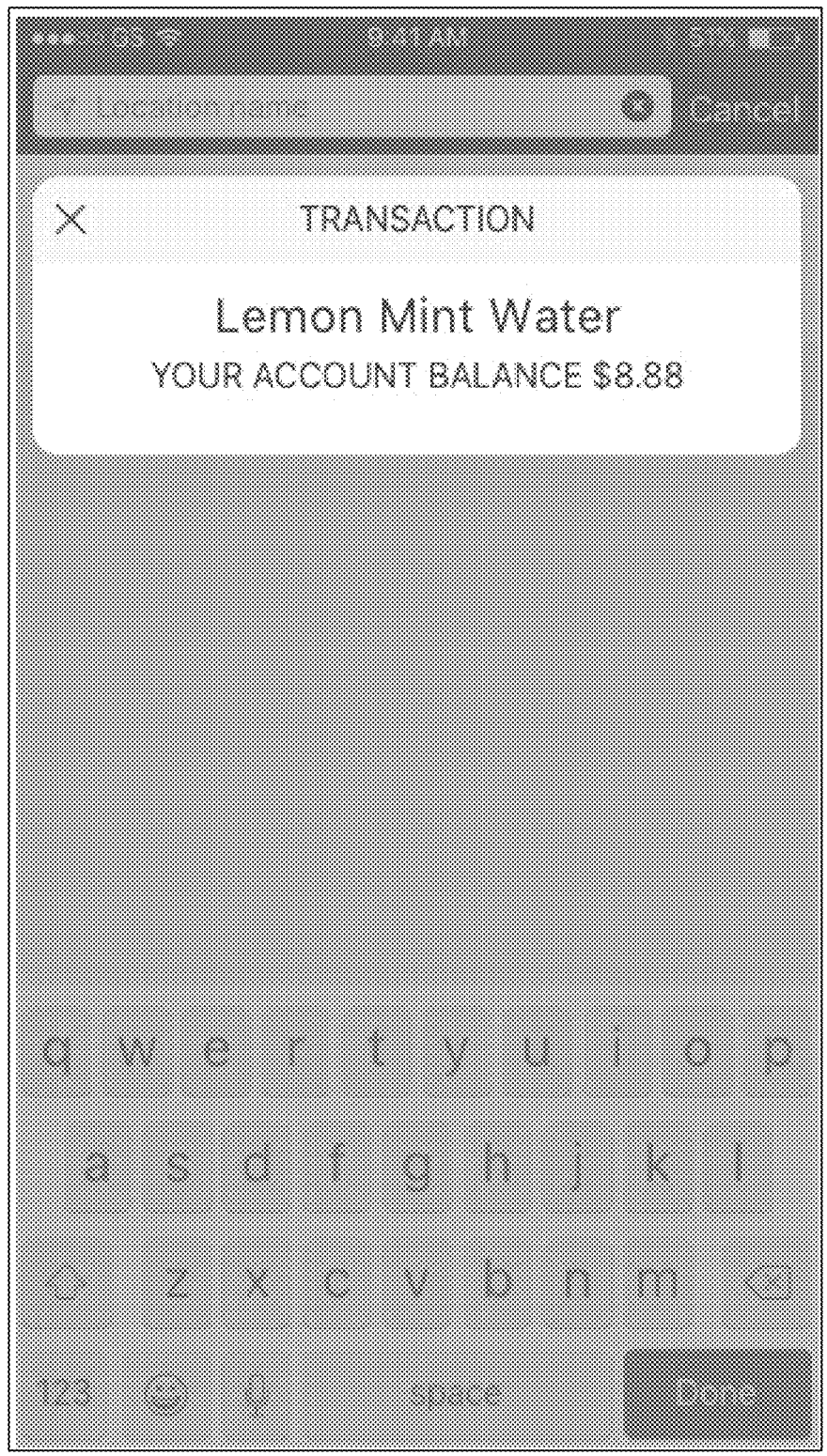
FIG. 81 is an exemplary graphical user interface in accordance with various aspects of the invention.

As shown in FIG. 78, beverage dispenser 204 can display a suggested custom beverage recipe 515 such as "Carbonated Lemon Mint Water." Suggested custom beverage recipe 515 can be a favorite or frequently selected beverage recipe and include a favorite icon 534. Beverage dispenser 204 can display a quick pour button 532 so that a user can dispense the suggested custom beverage recipe 515 without requiring further user interaction and ingredient selection. In another aspect, beverage dispenser 204 can suggest a food item or food flavor to accompany the suggested custom beverage recipe 515.

Figure 83:
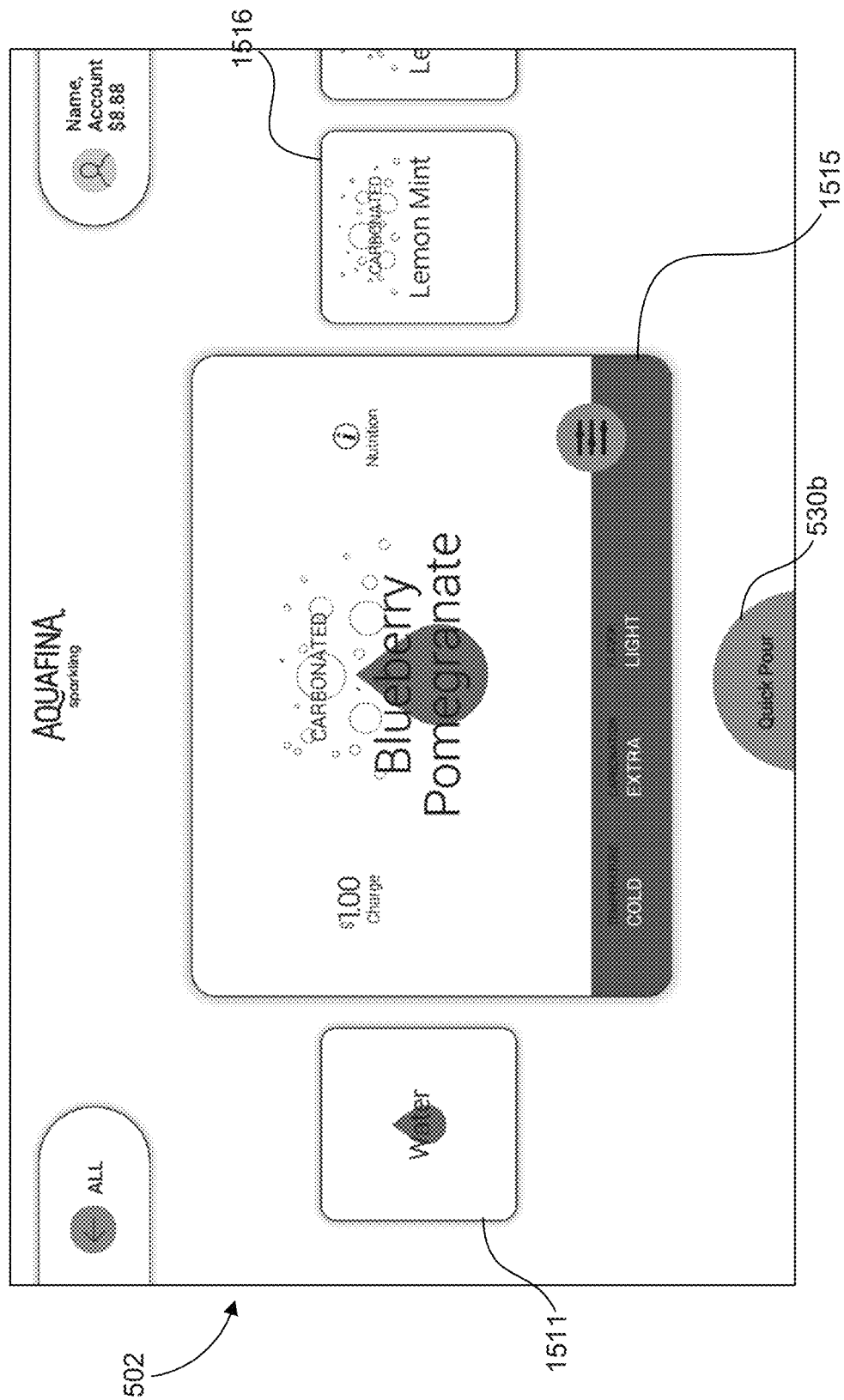
FIG. 83 is an exemplary graphical user interface in accordance with various aspects of the invention.
Figure 84:
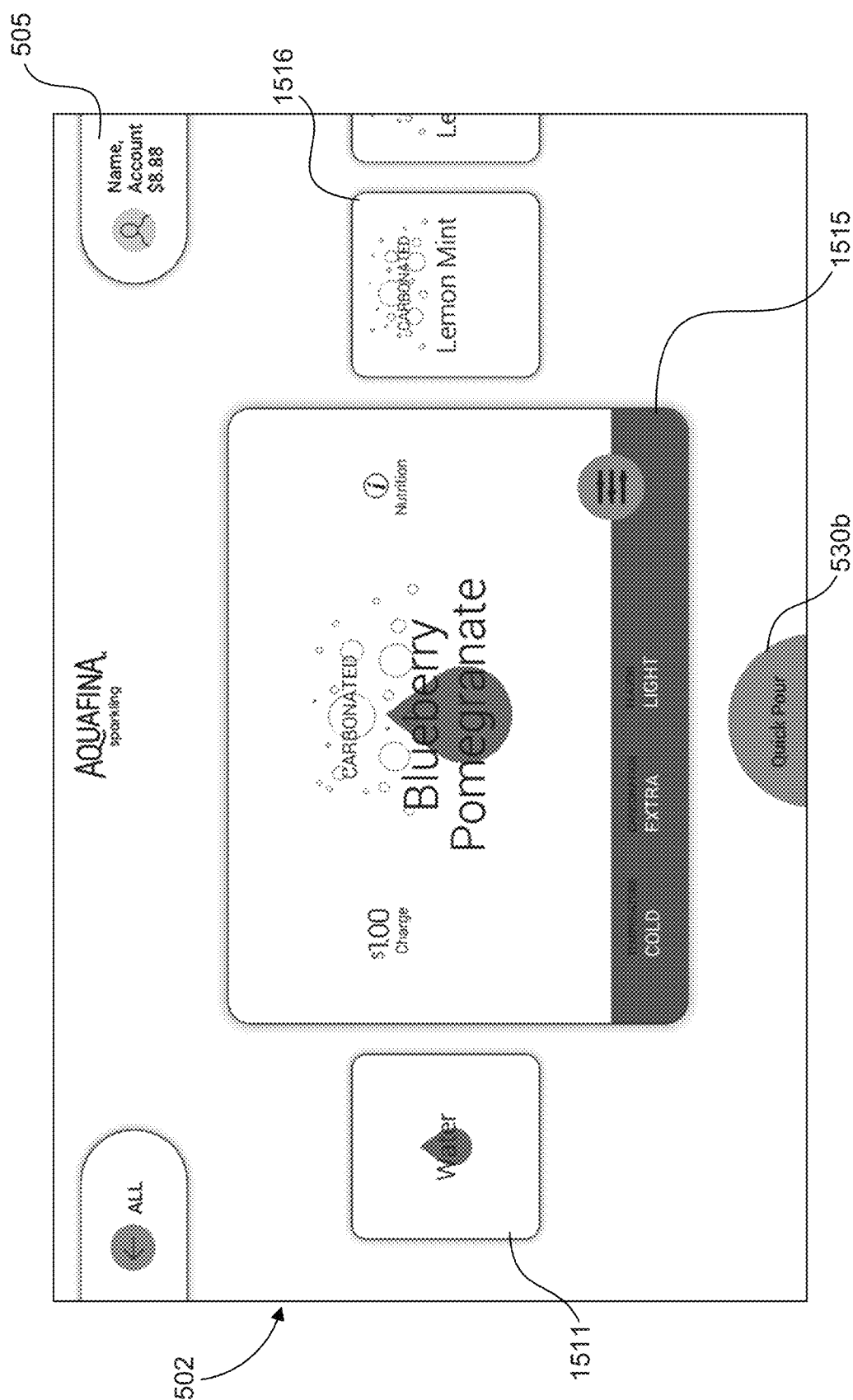
FIG. 84 is an exemplary graphical user interface in accordance with various aspects of the invention.
Figure 85:
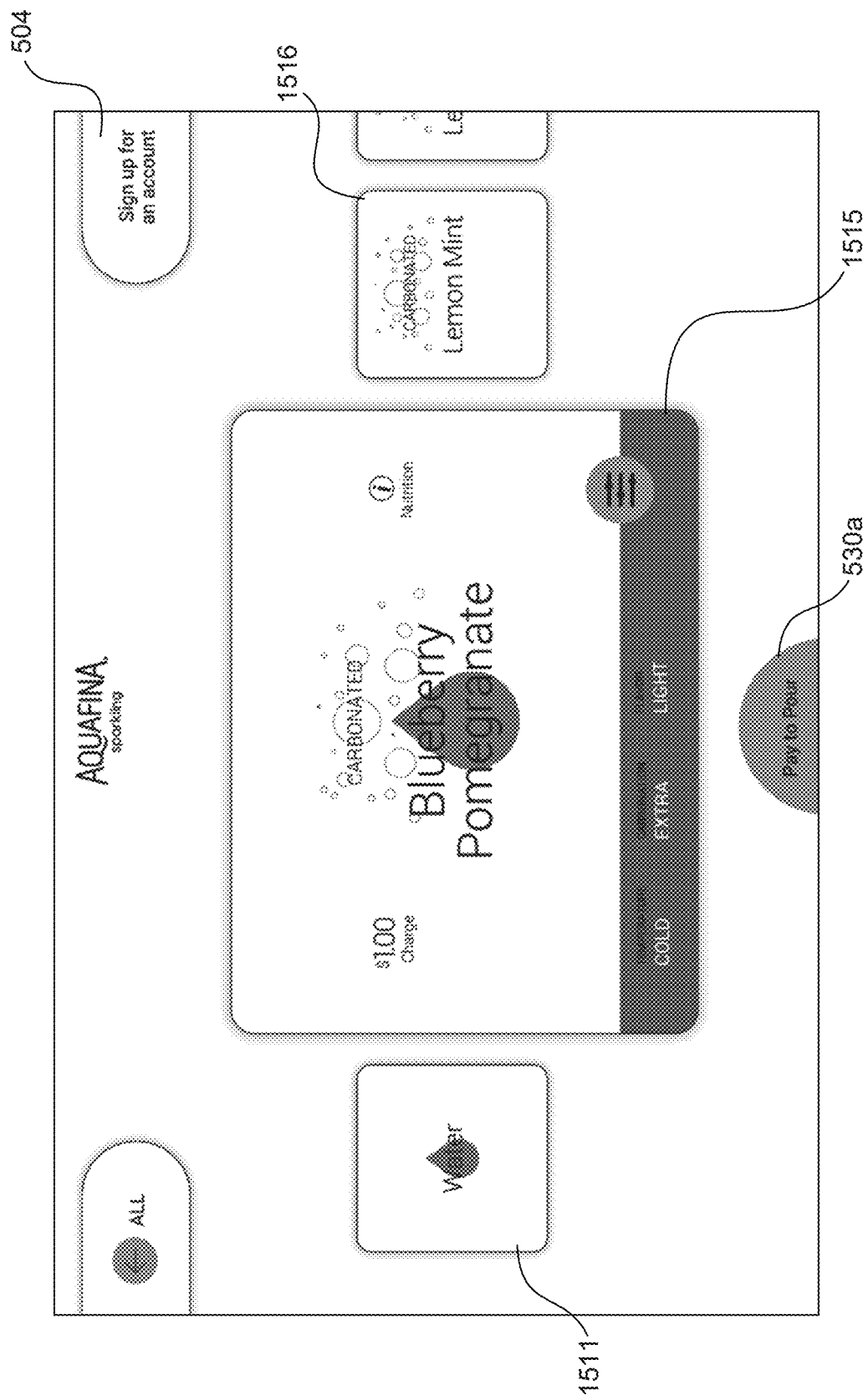
FIG. 85 is an exemplary graphical user interface in accordance with various aspects of the invention.
Figure 86:
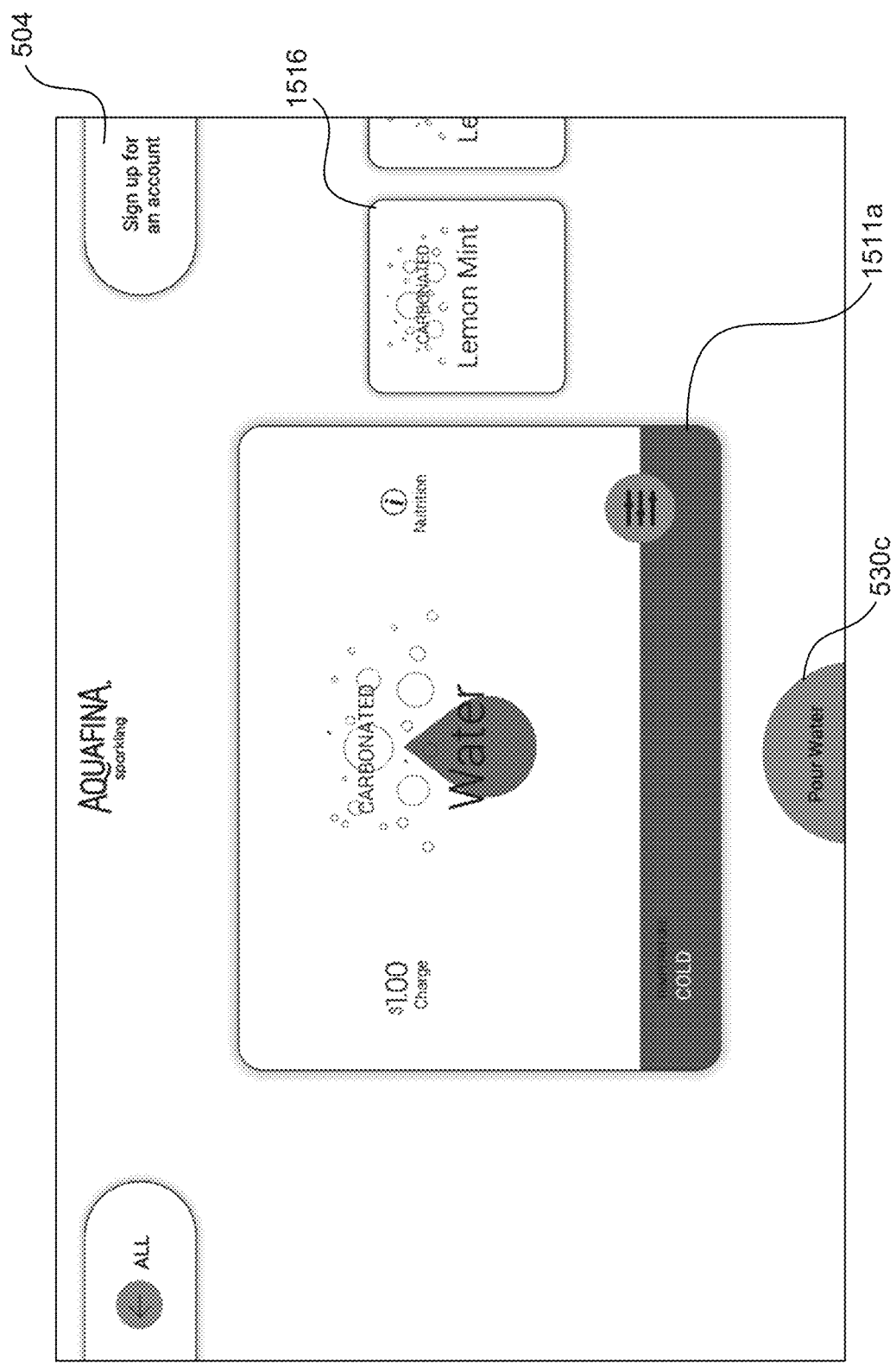
FIG. 86 is an exemplary graphical user interface in accordance with various aspects of the invention.

As shown in FIG. 83, beverage dispenser 204 can display recipe buttons for a user to select. Recipe button can include, for example, non-sparkling water button 1511, custom recipe button 1514 such as "Carbonated Blueberry Pomegranate," and custom recipe button 1516 such as "Carbonated Lemon Mint." In an aspect, beverage dispenser 204 can increase the size of one of the one or more recipe buttons to indicate that the enlarged button is a selected recipe button.

After a user selects a recipe button, beverage dispenser 204 can display a customization screen (FIG. 82). Beverage dispenser 204 can display a carbonation slider switch 1520, a temperature slider switch 1524, a flavor slider switch 1529, and a quick pour button 530b. If the user does not wish to customize the selected beverage recipe, the user can select quick pour button 530b without altering any of carbonation slider switch 1520, temperature slider switch 1524, or flavor slider switch 1529. Flavor slider switch can include a first position 1528aa for light flavoring, a second position 1528bb for regular flavoring, and a third position 1528cc for strong flavoring. Carbonation slider switch 1520 can include a first position 1520a for less carbonation, a second position 1520b for a regular amount of carbonation, and a third position 1520c for extra carbonation. Temperature slider switch 1524 can include a first position 1524a for cold, a second position 1524b for cool, and a third position 1524c for room temperature.

In an aspect shown in FIGS. 88-89, beverage dispenser 204 can display a "Sparkling" toggle switch 1521 to allow a user to add or remove carbonation from the beverage recipe. If "Sparling" toggle switch is in position 1521a for "On," beverage dispenser 204 can display user input selection 1511a "carbonated water", user input selection 1528b "carbonated lemon lime," user input selection 1528c "carbonated orange grapefruit," user input selection 1528d "carbonated cucumber," user input selection 1528e "carbonated raspberry lime," user input selection 1528f "carbonated lemon mint," and user input selection 1528g "carbonated blueberry pomegranate." If "Sparling" toggle switch is in position 1521b for "Off," beverage dispenser 204 can display user input selection 1511 "water", user input selection 1529b "lemon lime," user input selection 1529c "orange grapefruit," user input selection 1529d "cucumber," user input selection 1529e "raspberry lime," user input selection 1529f "lemon mint," and user input selection 1529g "blueberry pomegranate." In response to a selection, the beverage dispenser 204 can highlight the selected icon to indicate the selected flavoring to be added.

Figure 23:
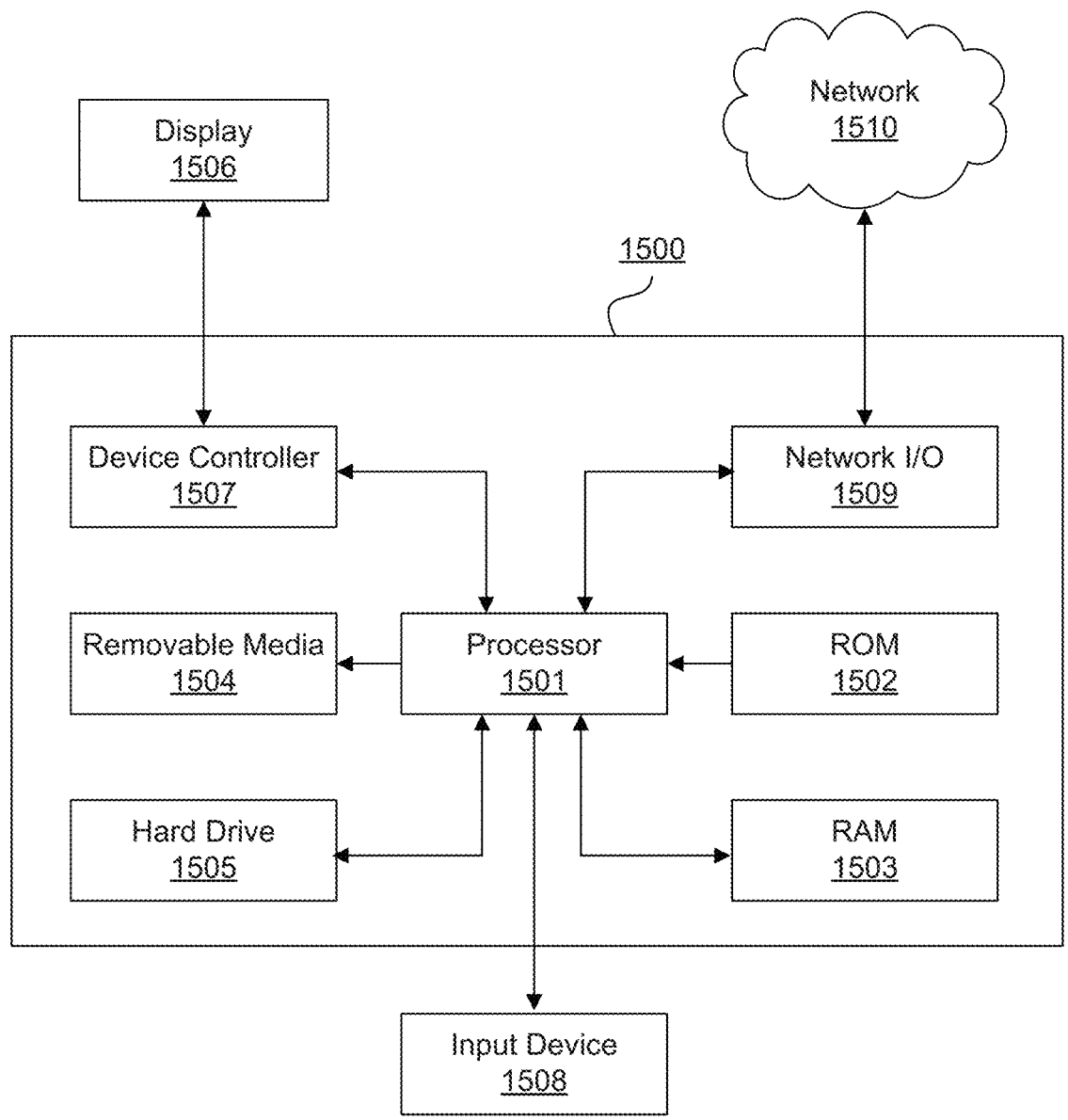
FIG. 23 illustrates an example hardware platform according to various aspects of the invention.

FIG. 23 illustrates an example computing device on which at least some of the various elements described herein can be implemented, including, but not limited to, various components of dispenser systems (e.g., dispensers 10, 1010, and 2010). Computing device 1500 may include one or more processors 1501, which may execute instructions of a computer program to perform, or cause to perform, any of the steps or functions described herein. The instructions may be stored in any type of computer-readable medium or memory, to configure the operation of the processor 1501. For example, instructions may be stored in a read-only memory (ROM) 1502, random access memory (RAM) 1503, removable media 1504, such as a Universal Serial Bus (USB) drive, compact disk (CD) or digital versatile disk (DVD), floppy disk drive, flash card, or any other desired electronic storage medium. Instructions may also be stored in an attached (or internal) hard drive 1505.

Computing device 1500 may include one or more output devices, such as a display 1506, and may include one or more output device controllers 1507, such as a video processor. There may also be one or more user input devices 1508, such as a touch screen, remote control, keyboard, mouse, microphone, card reader, RFID reader, etc. The computing device 1500 may also include one or more network interfaces, such as input/output circuits 1509 to communicate with an external network 1510. The network interface may be a wired interface, wireless interface, or a combination of the two. In some embodiments, the interface 1509 may include a modem (e.g., a cable modem), and network 1510 may include the communication lines of the networks illustrated in FIG. 15, or any other desired network.

The FIG. 23 example is an illustrative hardware configuration. Modifications may be made to add, remove, combine, divide, etc. components as desired. Additionally, the components illustrated may be implemented using basic computing devices and components, and the same components (e.g., processor 1501, storage 1502, user input device 1508, etc.) may be used to implement any of the other computing devices and components described herein.

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), controllers, application-specific integrated circuits (ASICS), combinations of hardware/firmware/software, and the like. Particular data structures may be used to more effectively implement one or more aspects of the invention, and such data structures are contemplated within the scope of computer executable instructions and computer-usable data described herein.

Figure 24:
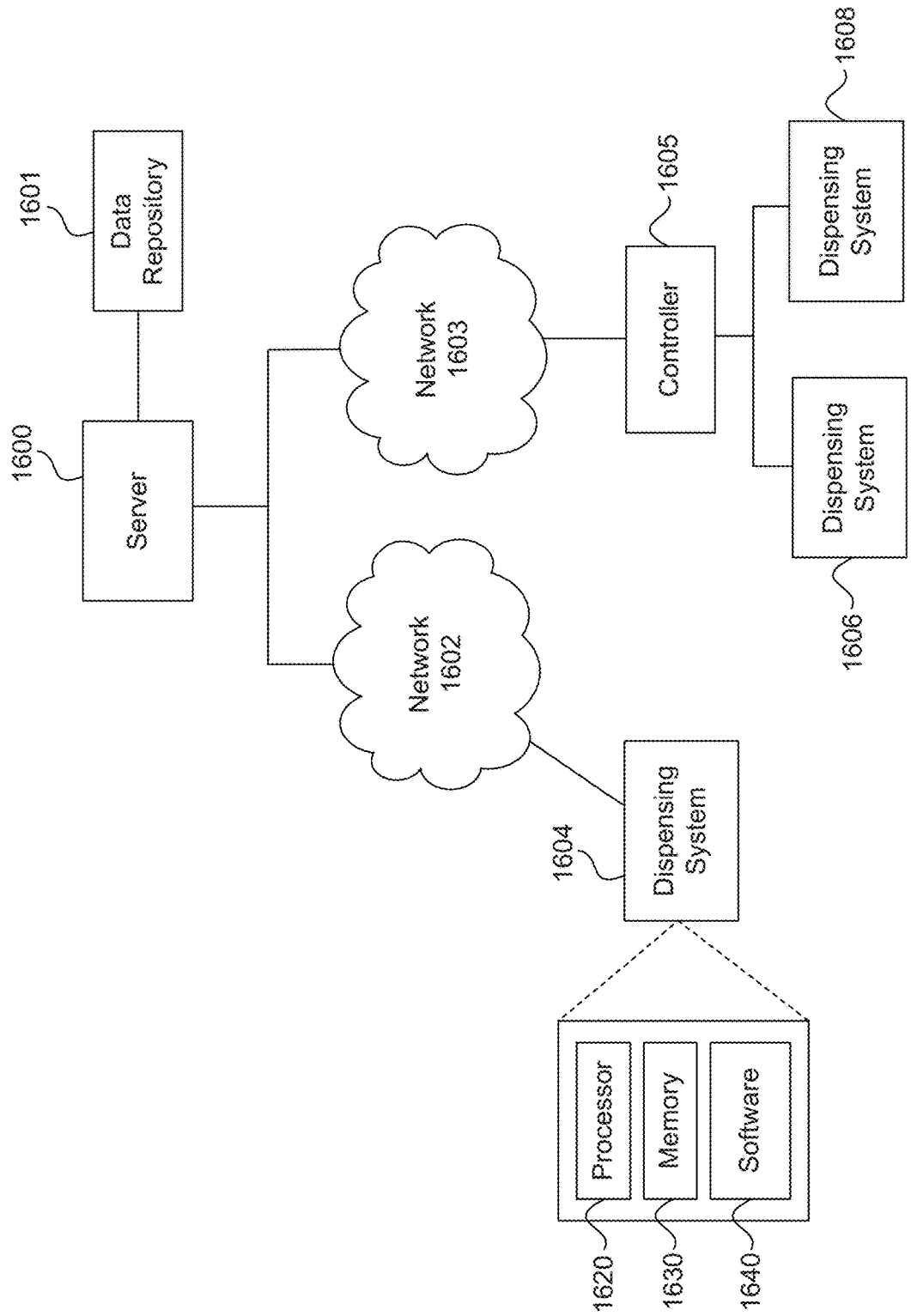
FIG. 24 is a block diagram of an example communication network according to various aspects of the invention.

FIG. 24 illustrates a block diagram of an example communication network in which one or more embodiments may be implemented. A dispensing system, e.g., beverage dispensing system 10, can be configured to dispense a product according to a user's selection. For example, a user can approach a dispenser 1604, and interact with the dispenser 1604 to make a selection (e.g., input a code or press a button corresponding to the desired product). In response, the dispenser 1604 may dispense the selected product. In general, examples of this disclosure relate to a beverage dispensing system; however, various aspects of this disclosure could be used in a dispenser for other types of products (e.g., candy or snack dispenser).

Dispensing systems may be located across different locations or premises. For example, FIG. 24 illustrates three dispensers: dispensing system 1604, dispensing system 1606 and dispensing system 1608.

In a further aspect, dispensing systems may be connected to a controller. A controller may be centrally located and/or a separate controller may be incorporated into each dispenser. As illustrated in FIG. 24, dispensing systems 1606 and 1608 are connected to controller 1605. Controller 1605 can be configured to receive instructions from dispensing system 1606 and/or 1608, and to cause the appropriate dispensing system to dispense an appropriate amount of the selected product. For example, if dispensing system 1606 is a beverage dispenser, a user may interact with the dispenser to select a beverage (e.g., via a touchpad, touch screen, keypad, etc.), instructions for the selected beverage may be transmitted to controller 1605, and controller 1605 may be configured to dispense an appropriate amount of the selected beverage in response to the instructions.

Components of a dispensing system may include a processor 1620, memory 1630, software 1640, and/or additional components suitable for implementing the functions and methods of the dispensing system. Software 1640 may be stored in computer-readable memory 1630 such as read only or random access memory in dispenser 1604 and may include instructions that cause one or more components (e.g., processor 1620, display, etc.) of a dispenser (e.g., dispenser 1604) to perform various functions and methods including those described herein.

A dispenser may communicate with other devices using one or more networks. For example, as illustrated in FIG. 24, dispensing systems 1604, 1606 and 1608 may communicate with server 1600 via network 1602 and/or network 1603. Network 1602 and network 1603 may include multiple networks that are interlinked so as to provide internetworked communications. Such networks may include one or more private or public packet-switched networks (e.g., the Internet), one or more private or public circuit-switched networks (e.g., a public switched telephone network), a cellular network, a short or medium range wireless communication connection (e.g., Bluetooth®, ultra wideband (UWB), infrared, WiBree, wireless local area network (WLAN) according to one or more versions of Institute of Electrical and Electronics Engineers (IEEE) standard no. 802.11), or any other suitable network. Devices in communication with each other (e.g., dispensing systems 1604, 1606, and 1608, server 1600, and/or data repository 1601) may use various communication protocols such as Internet Protocol (IP), Transmission Control Protocol (TCP), Simple Mail Transfer Protocol (SMTP), File Transfer Protocol (FTP), among others known in the art.

Server 1600, controller 1605, and dispensing systems 1604, 1606 and 1608 may be configured to interact with each other and other devices. In one example, dispenser 1604 may include software 1640 that is configured to coordinate the transmission and reception of information to and from server 1600. In one arrangement, software 1640 may include application or server specific protocols for requesting and receiving data from server 1600. For example, software 1640 may comprise a browser or variants thereof and server 1600 may comprise a web server. In some arrangements, server 1600 may transmit application data to dispensing systems, such as software updates to various components of the dispensing system (e.g., updates to the user interface, updates to firmware of the dispensing system, updates to drivers of the dispensing system, etc.). In one or more arrangements, server 1600 may receive data from the dispensing systems, such as data describing the current stock of the dispenser (e.g., a listing of products and the number remaining at the dispenser), operation history and/or usage metrics of the dispenser (e.g. counters tracking the selections of users of the machine), status of the dispenser (e.g., whether any components are working improperly), etc. Server 1600 may be configured to access and store data in data repository 1601, such as data that it receives and transmits in data repository 1601. Data repository 1601 may also include other data accessible to server 1600, such as different drink recipes that can be downloaded to dispensers.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for dispensing a custom beverage, the method comprising:
   providing a beverage dispenser having an electronic user interface;
   authenticating an electronic user profile at the beverage dispenser;
   providing a selection of diluent available for dispensing for use in an electronic custom recipe, the selection comprising still water and sparkling water;
   receiving a first user input on the user interface to select an ingredient to create an electronic custom recipe;
   dispensing a first custom beverage according to the electronic custom recipe;
   after dispensing the first custom beverage, prompting the user for an input rating the user's satisfaction with the first custom beverage;
   authenticating the electronic user profile at the beverage dispenser;
   dispensing a second custom beverage according to the electronic custom recipe;
   receiving a selection of a setting in the electronic user profile that enables dispensing of one of the first custom beverage or the second custom beverage without requiring further input from the user; and
   dispensing the one of the first custom beverage or the second custom beverage without requiring further input from a user after authenticating the electronic user profile.

2. The method of claim 1, further comprising:
   prior to dispensing the first custom beverage, displaying a price of the electronic custom recipe.

3. The method of claim 2, wherein the price is based on the ingredient.

4. The method of claim 2, further comprising:
   after dispensing the first custom beverage, billing the electronic user profile,
   wherein the electronic user profile includes payment information.

5. The method of claim 2, further comprising:
   prior to billing the electronic user profile, dispensing a free sample custom beverage according to the electronic custom recipe.

6. The method of claim 1, further comprising:
after dispensing the second custom beverage, authenticating the electronic user profile at the beverage dispenser; and
dispensing a free beverage.

7. The method of claim 1, further comprising:
prior to dispensing the first custom beverage, receiving a second user input on the electronic user interface to dispense the first custom beverage.

8. The method of claim 1, further comprising:
authenticating the electronic user profile at a second beverage dispenser; and
dispensing a third custom beverage according to the electronic custom recipe from the second beverage dispenser.

9. A method for creating a custom beverage, the method comprising:
authenticating an electronic user profile;
prior to receiving a first electronic user input, suggesting a custom recipe to the user based on data in the electronic user profile;
receiving the first electronic user input to select an amount of an ingredient for a first electronic recipe;
providing a selection of diluent available for dispensing for use in the first electronic custom recipe, the selection comprising still water and sparkling water;
providing a beverage temperature selection for use in the first electronic customer recipe to the user, the beverage temperature selection including a room temperature option, a cool option, and a cold option;
dispensing a first custom beverage from a beverage dispenser according to the first electronic recipe;
after dispensing the first custom beverage, requesting a second electronic user input related to the first electronic recipe;
altering the first recipe based on the second electronic user input to create a second electronic recipe;
authenticating the electronic user profile;
dispensing a second custom beverage according to the second electronic recipe;
receiving a selection of a setting in the electronic user profile that enables dispensing of one of the first custom beverage or the second custom beverage without requiring further input from the user; and
dispensing the one of the first custom beverage or the second custom beverage without requiring further input from a user after authenticating the electronic user profile.

10. The method of claim 9, wherein altering the first electronic recipe includes altering the amount of the ingredient.

11. The method of claim 9, wherein dispensing the second custom beverage according to the second electronic recipe occurs at a second beverage dispenser.

12. The method of claim 9, wherein the electronic user profile data comprises at least one of promotional information, user taste preferences, and beverage order history, and at least one of available ingredients, time of day, weather, user location, and sensed physiological data.

13. The method of claim 9, further comprising:
electronically sending the second recipe to a second electronic user profile;
authenticating the second electronic user profile; and
dispensing a third custom beverage according to the second electronic recipe.

14. The method of claim 9, wherein authenticating the electronic user profile is based on electronic information associated with a reusable beverage container.

15. The method of claim 9, wherein authenticating the electronic user profile occurs at a mobile electronic device.

16. The method of claim 9, further comprising:
determining the presence of a beverage container using an electronic sensor connected to the beverage dispenser prior to dispensing the first custom beverage.

17. A beverage dispensing system comprising:
a network interface coupled to an electronic network;
a first beverage dispenser including a first processor coupled to the network interface; and
a second beverage dispenser including a second processor coupled to the network interface,
wherein the first processor and the second processor are configured to:
authenticate an electronic user profile,
prior to receiving a first electronic user input, suggest a custom recipe to the user based on data in the electronic user profile;
receive the first electronic user input related to an amount of an ingredient to create an electronic beverage recipe;
provide a selection of diluent available for dispensing for use in the electronic beverage recipe, the selection comprising still water and sparkling water;
provide a beverage temperature selection for use in the first electronic customer recipe to the user, the beverage temperature selection including a room temperature option, a cool option, and a cold option;
save the electronic beverage recipe to the user profile;
dispense a custom beverage according to the electronic beverage recipe at the first beverage dispenser or the second beverage dispenser;
receive a selection of a setting in the electronic user profile that enables dispensing of custom beverage without requiring further input from the user; and
dispense the custom beverage from the first beverage dispenser or the second beverage dispenser without requiring further input from a user after authenticating the electronic user profile.

18. The beverage dispensing system of claim 17, further comprising:
a mobile electronic device including a third processor coupled to the network interface,
wherein the third processor is configured to:
authenticate the electronic user profile,
receive a second electronic user input to change the amount of the ingredient in the electronic beverage recipe to create an updated electronic beverage recipe, and
save the updated electronic beverage recipe to the user profile.

19. A beverage dispensing system comprising:
a network interface coupled to an electronic network;
a first beverage dispenser including a first processor coupled to the network interface; and
a second beverage dispenser including a second processor coupled to the network interface,
wherein the first processor and the second processor are configured to:
receive suggested beverage ingredient data;
transmit authentication information to a database to authenticate an electronic user profile;
retrieve a user order history associated with the electronic user profile;

provide access to the user order history on a user interface;
suggest a beverage ingredient to a user based on the suggested beverage ingredient data;
receive a first electronic user input related to the suggested beverage ingredient to create an electronic beverage recipe;
provide a selection of diluent available for dispensing for use in the electronic beverage recipe, the selection comprising still water and sparkling water;
dispense a custom beverage according to the electronic beverage recipe at the first beverage dispenser or the second beverage dispenser;
after dispensing the custom beverage, prompt the user for an input rating the user's satisfaction with the first custom beverage;
after dispensing the custom beverage, request a second electronic user input related to the electronic beverage recipe;
alter the electronic beverage recipe based on the second electronic user input to create a second electronic recipe;
authenticate the electronic user profile;
dispense a second custom beverage according to the second electronic recipe;
receive a selection of a setting in the electronic user profile that enables dispensing of one of the first custom beverage or the second custom beverage without requiring further input from the user; and
dispensing the one of the first custom beverage or the second custom beverage without requiring further input from a user after authenticating the electronic user profile.

20. The beverage dispensing system of claim 19, wherein the suggested beverage ingredient data includes one or more of top selling ingredient data, ingredient trend data, demographic data, and promotional data.

21. The beverage dispensing system of claim 19, wherein the suggested beverage ingredient data includes limited time ingredient data.

22. A method for creating a custom beverage, the method comprising:
receiving authentication information related to an electronic user profile, the electronic user profile having a recipe for a custom beverage;
receiving a selection of a setting in the electronic user profile that enables the dispensing step without requiring further input from the user;
dispensing the custom beverage from a beverage dispenser without requiring further input from a user after authenticating the electronic user profile.

* * * * *